(12) United States Patent
Akcasu et al.

(10) Patent No.: US 9,949,339 B2
(45) Date of Patent: Apr. 17, 2018

(54) METHOD AND APPARATUS FOR CONTROLLING ELECTRICAL POWER USAGE BASED ON EXACT SUN ELEVATION ANGLE AND MEASURED GEOGRAPHICAL LOCATION

(71) Applicant: Lonestar Inventions, L.P., Morgan Hill, CA (US)

(72) Inventors: Osman Ersed Akcasu, Morgan Hill, CA (US); Ibrahim Akcay, Istanbul (TR); Ibrahim Onur Uslu, Istanbul (TR); Jacqueline Mahan Akcasu, Morgan Hill, CA (US)

(73) Assignee: Lonestar Inventions, L.P., Morgan Hill, CA (US)

( * ) Notice: Subject to any disclaimer, the term of this patent is extended or adjusted under 35 U.S.C. 154(b) by 464 days.

(21) Appl. No.: 14/286,836

(22) Filed: May 23, 2014

(65) Prior Publication Data
US 2015/0342005 A1    Nov. 26, 2015

(51) Int. Cl.
*G01B 11/26* (2006.01)
*H05B 37/02* (2006.01)
(Continued)

(52) U.S. Cl.
CPC .......... *H05B 37/0209* (2013.01); *G01S 3/782* (2013.01); *H05B 37/0227* (2013.01);
(Continued)

(58) Field of Classification Search
None
See application file for complete search history.

(56) References Cited

U.S. PATENT DOCUMENTS

| 4,779,980 A | 10/1988 | Hulstrom et al. |
| 2013/0057158 A1* | 3/2013 | Josefowicz ............. G01S 19/14 |
| | | 315/152 |
| 2013/0151135 A1* | 6/2013 | Aubrey .................... G08G 1/00 |
| | | 701/118 |

FOREIGN PATENT DOCUMENTS

FR    2866514 A1 * 8/2005    ......... H05B 37/0281

OTHER PUBLICATIONS

European Search Report dated Sep. 25, 2015 for EP Application No. 15168312.5-1802, 7 pages.
(Continued)

*Primary Examiner* — Samantha K Abraham
(74) *Attorney, Agent, or Firm* — Kilpatrick Townsend & Stockton LLP; Kenneth R. Allen

(57) ABSTRACT

A method and apparatus are provided to control artificial lighting using accurate geographical location, date and time, in order to activate such electrical activity only during needed periods of actual terrestrial darkness related to sun elevation. Accurate, real-time calculation of sun elevation relative to geographical location and date/time allow natural lighting characteristics such as natural light spectrum and intensity to be matched to artificial lighting, in order to provide a smooth transition in ambient lighting and to save energy. An apparatus according to the invention comprises a global positioning system (GPS) element for determining latitude, longitude, altitude, date and time and a calculation element for determining sun elevation angle accurately. A specific embodiment requires only desired sun elevation angle inputs from the user for controlling electrical switches in a control system.

6 Claims, 109 Drawing Sheets

(51) Int. Cl.
  *G01S 3/782* (2006.01)
  *G01J 1/42* (2006.01)
  *G01S 19/14* (2010.01)
(52) U.S. Cl.
  CPC ....... *G01J 2001/4266* (2013.01); *G01S 19/14* (2013.01); *Y02B 20/40* (2013.01)

(56) References Cited

OTHER PUBLICATIONS

"Radiolite 310-320-330" dated May 15, 2012, Retrieved from the Internet: URL:http://www.bh-technologies.com/wp-content/uploads/2014/10/Rediolite-310-320-330.pdf., 2 pages.
EP15168312.5, "Extended European Search Report", dated Mar. 21, 2016, 11 pages.

\* cited by examiner

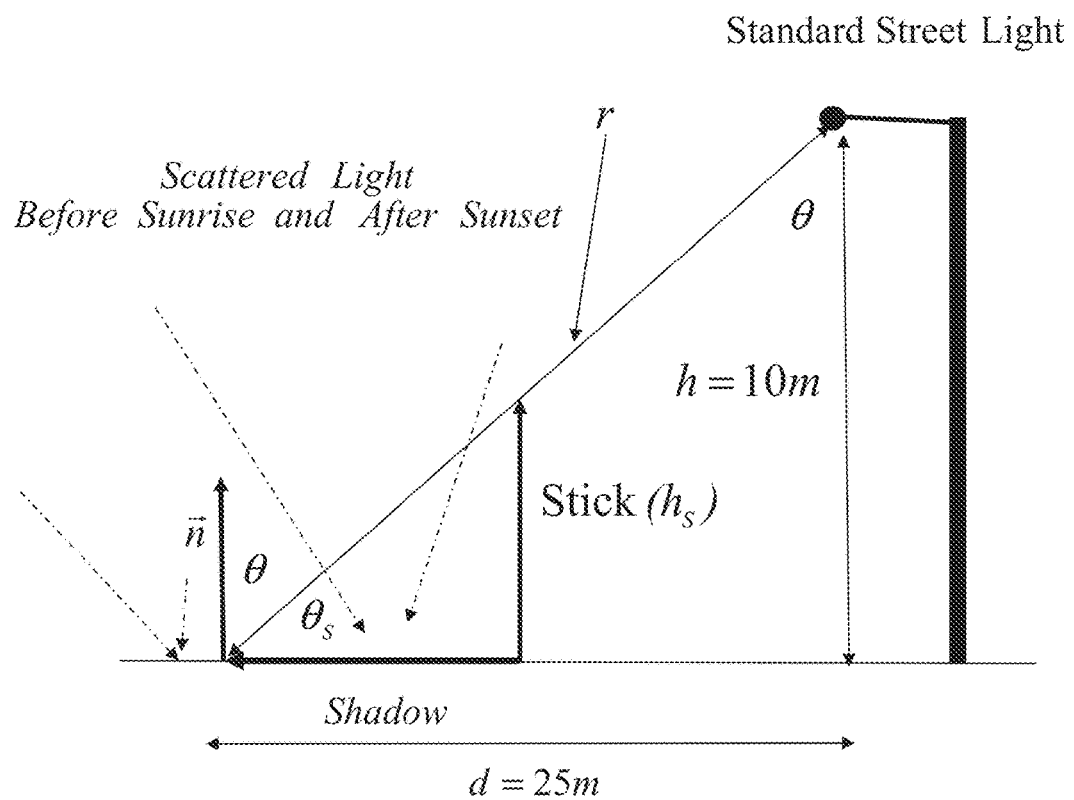
Fig.[1]

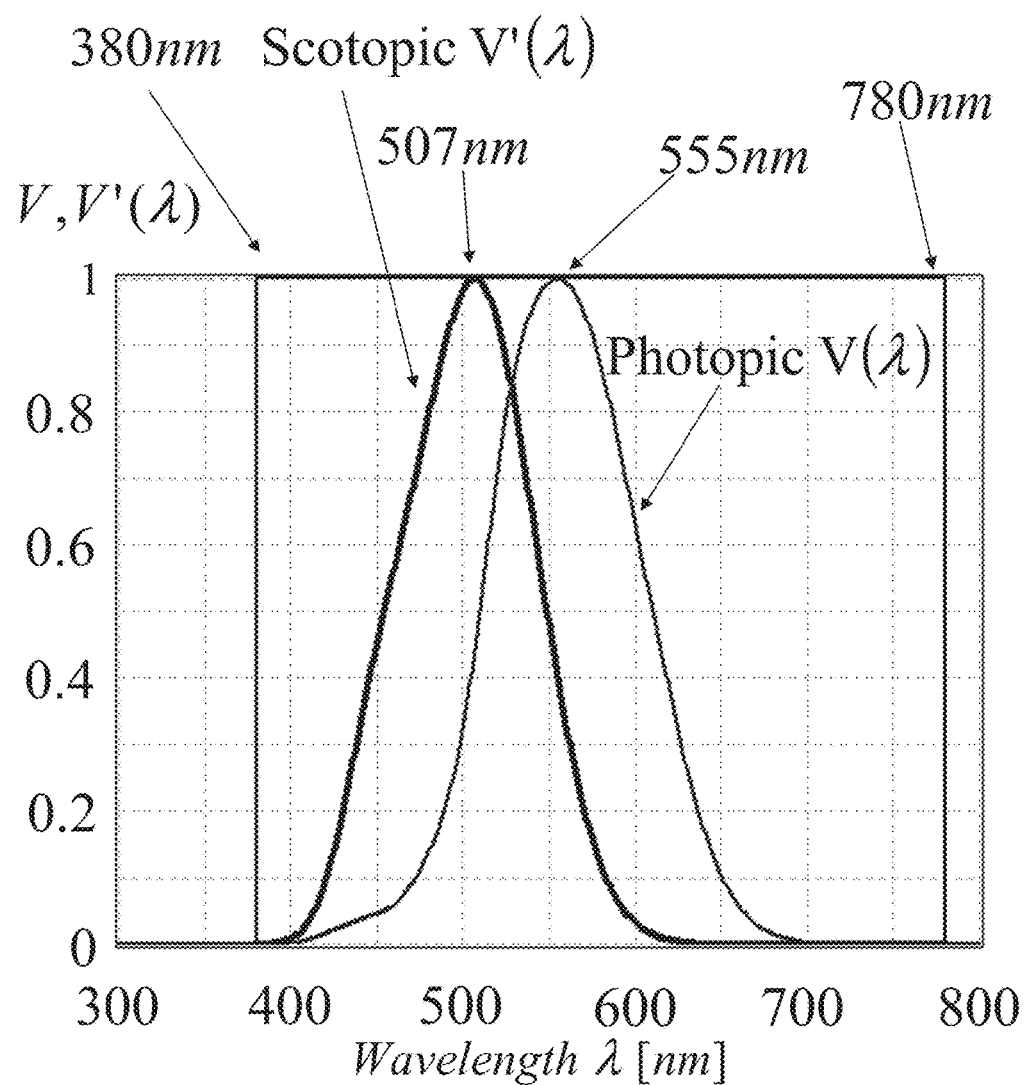
Fig.[2.1]

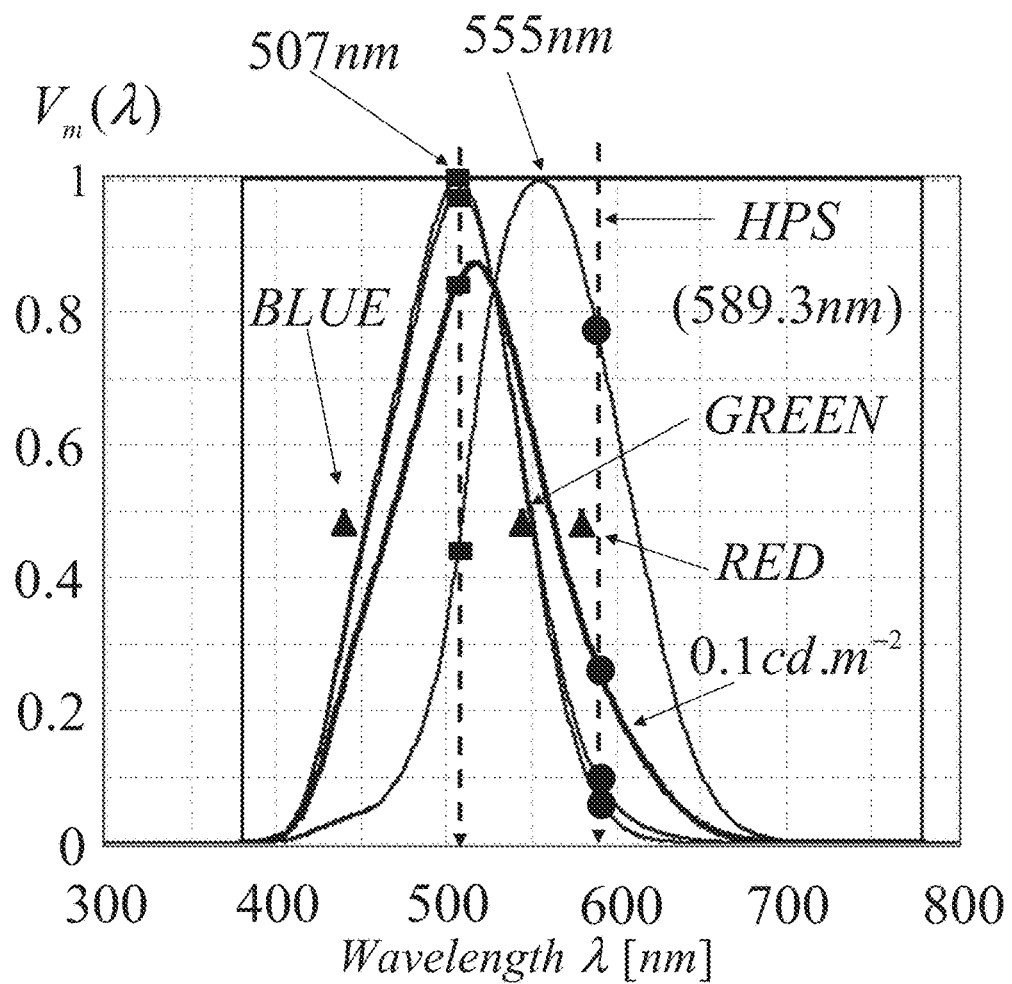
Fig.[2.2]

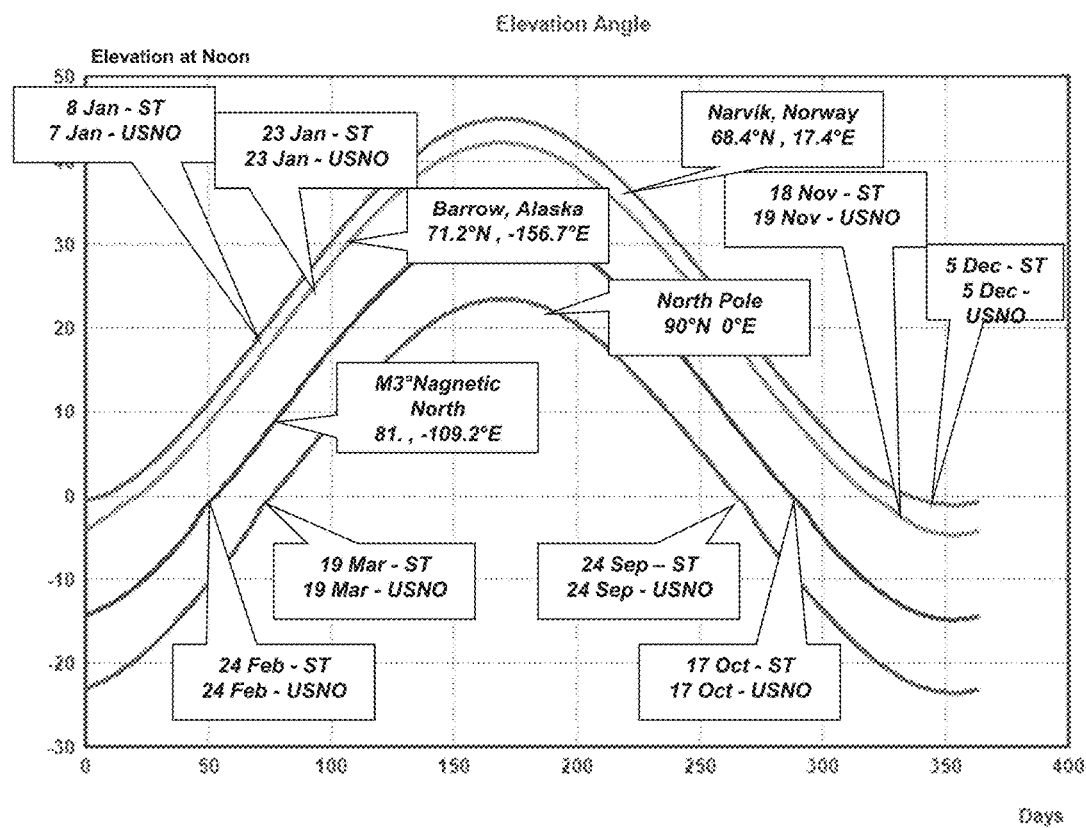
Fig.[3.1]

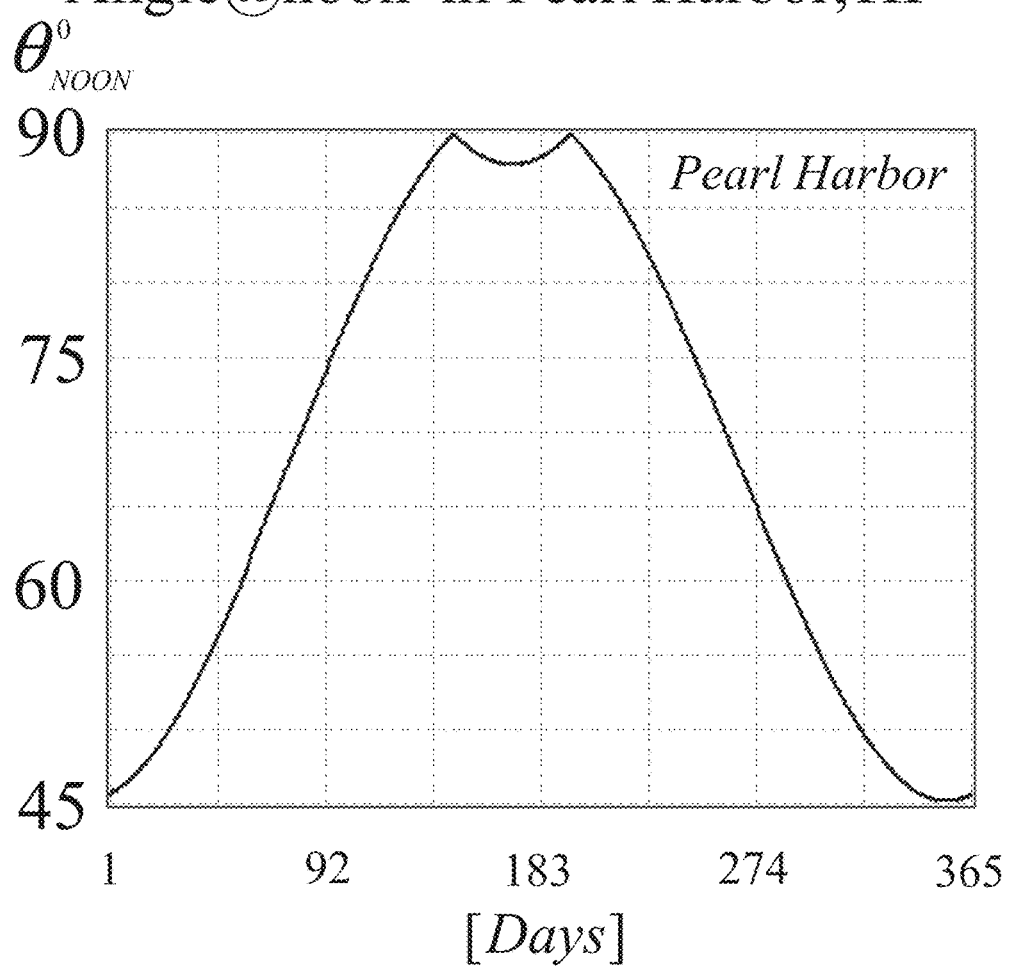
Fig.[3.2]

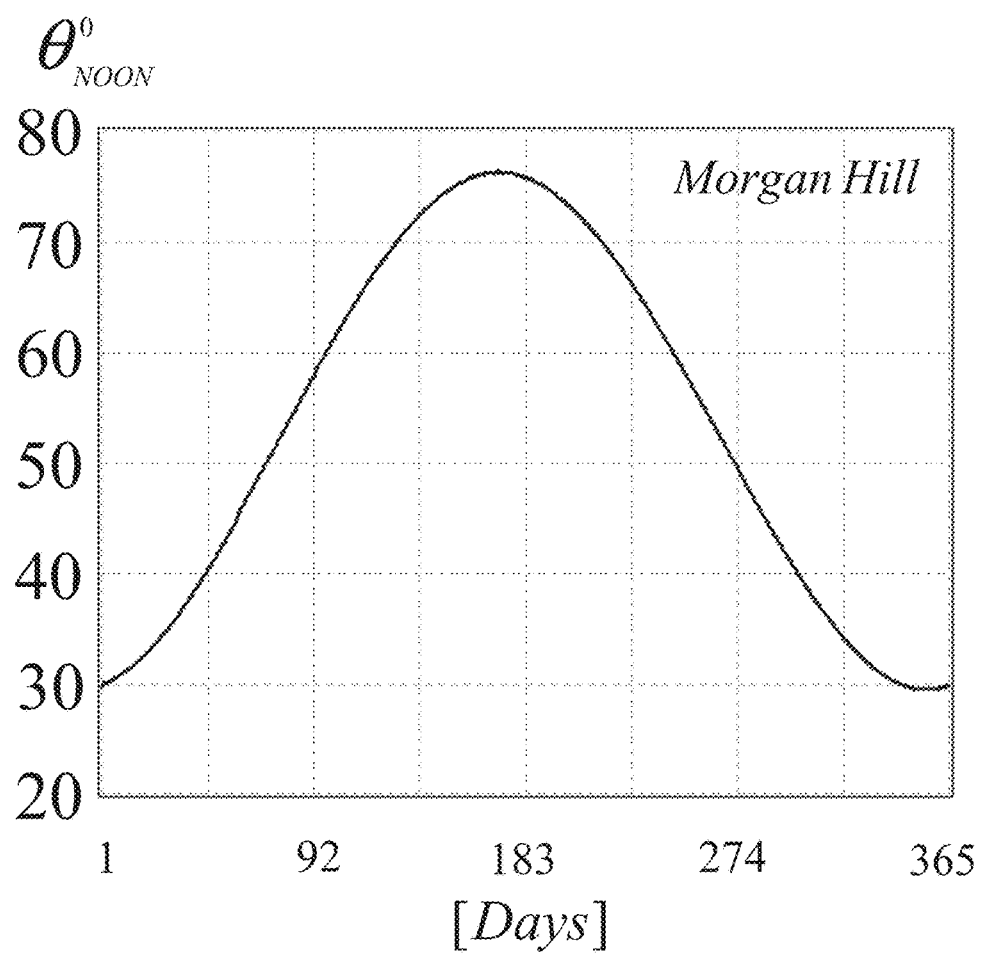
Fig.[3.3]

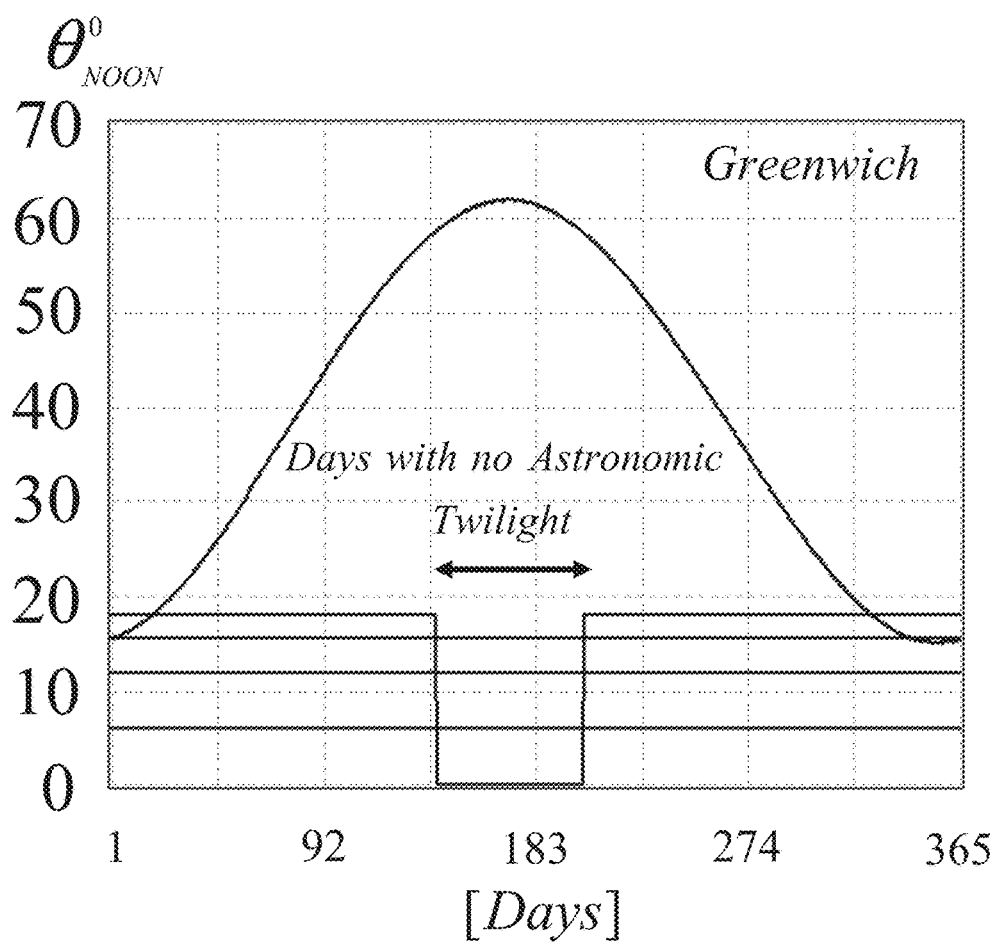
Fig.[3.4]

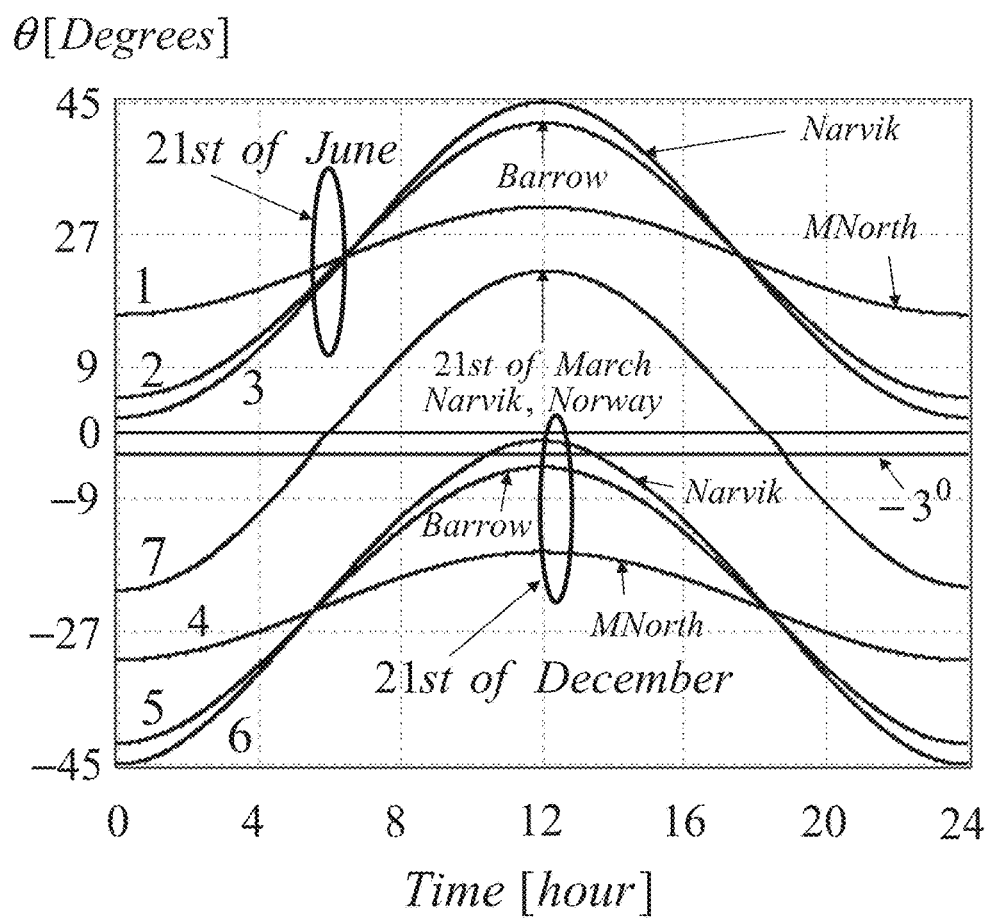
Fig.[4]

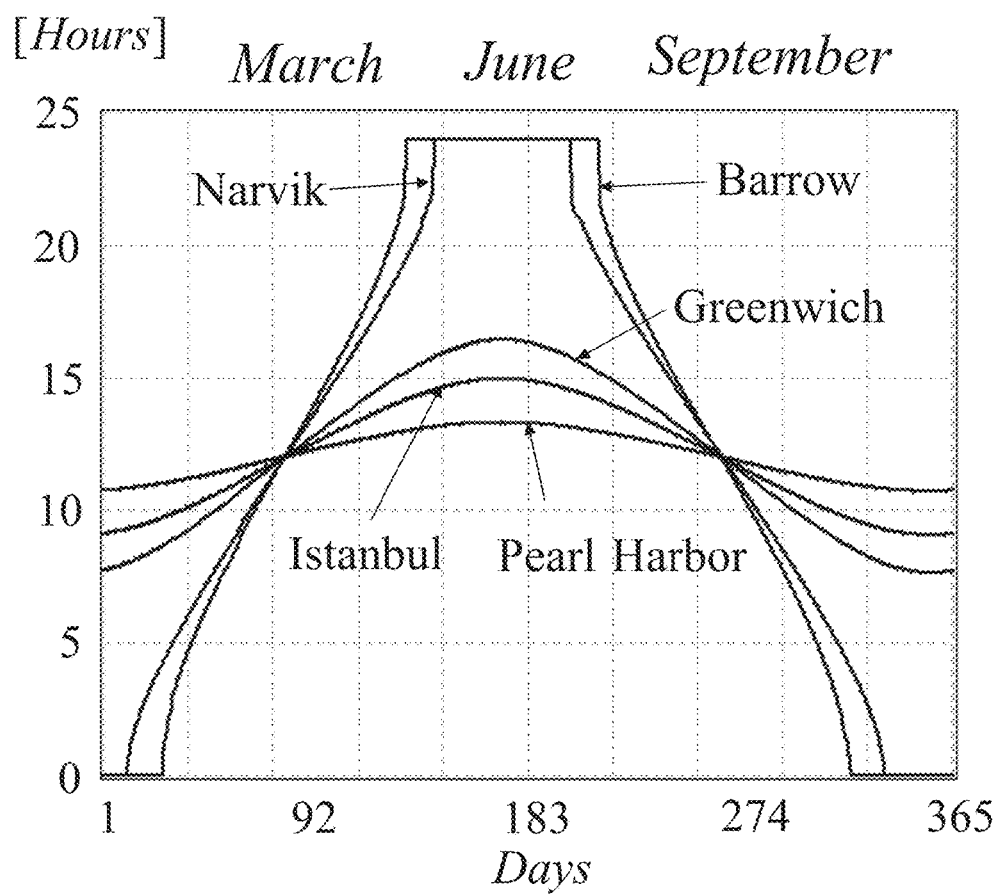
Fig.[5]

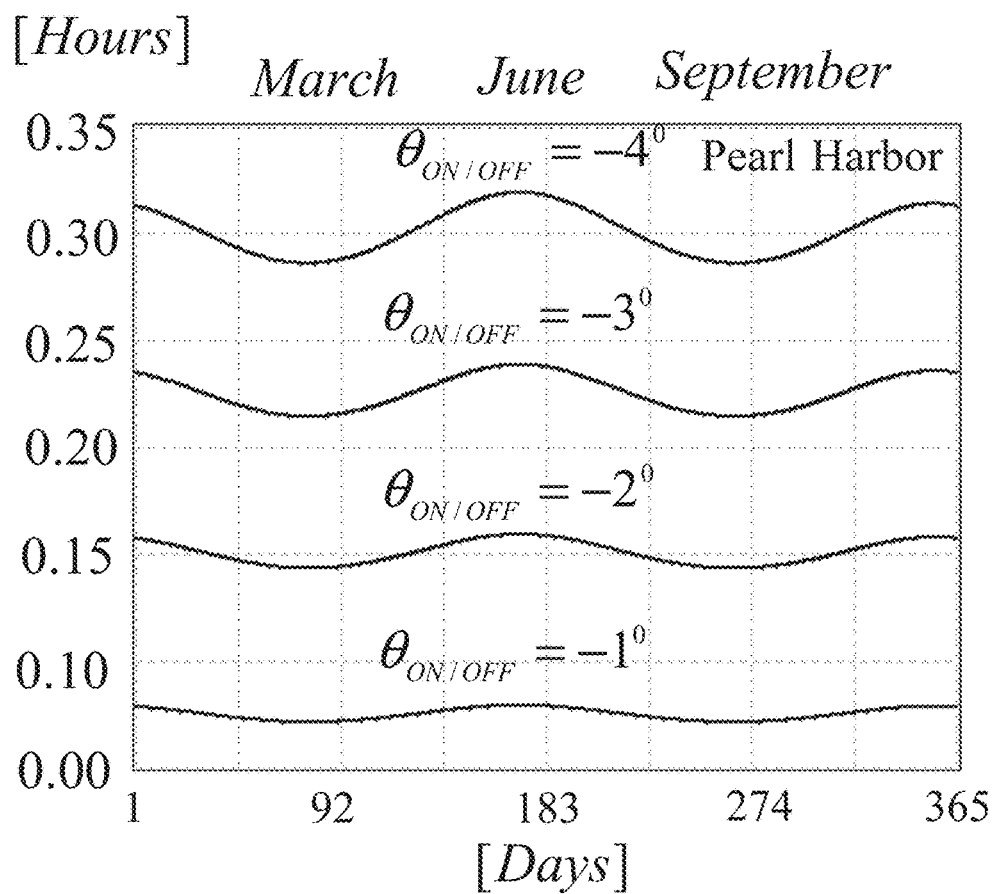
Fig.[6]

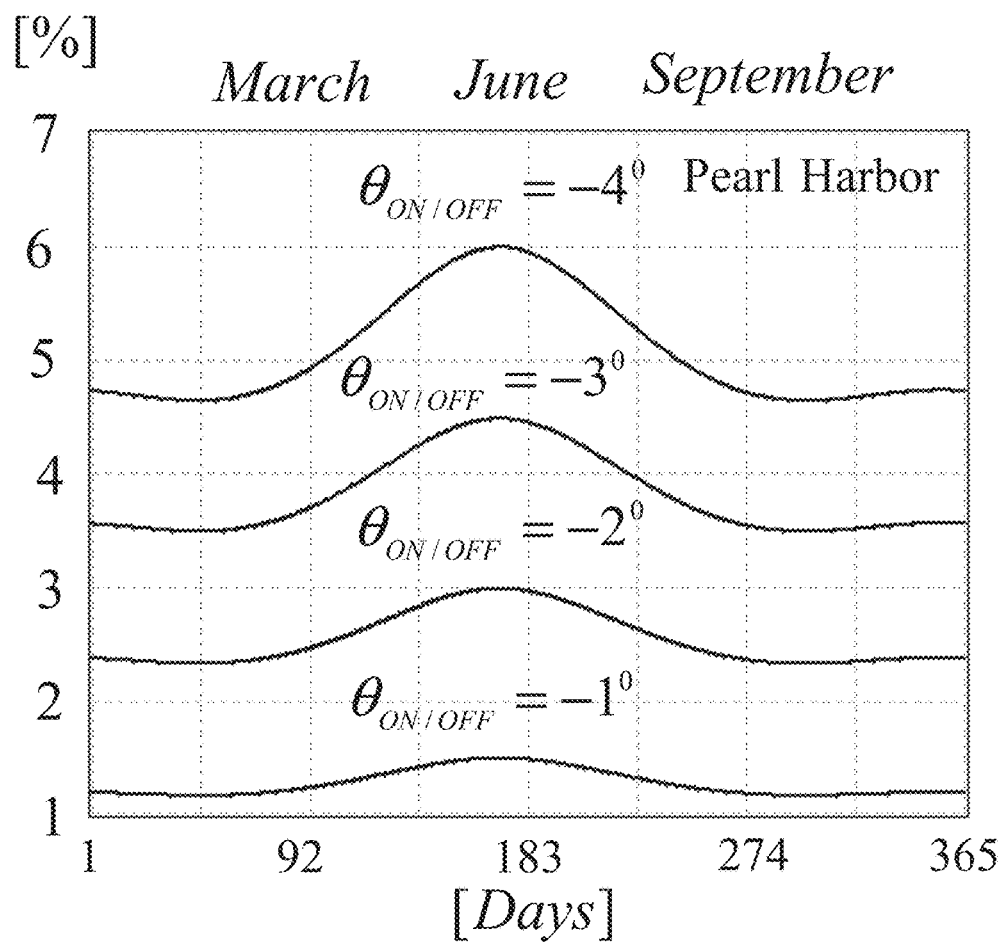
Fig.[7]

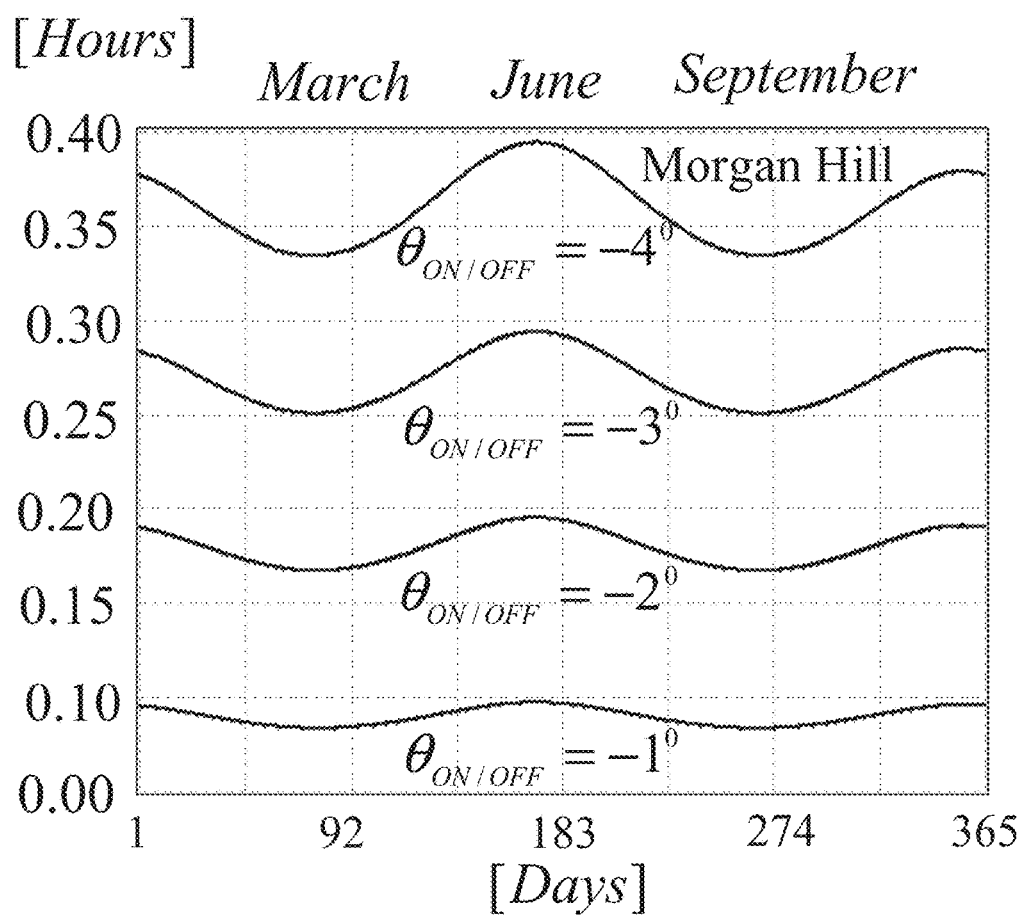
Fig.[8]

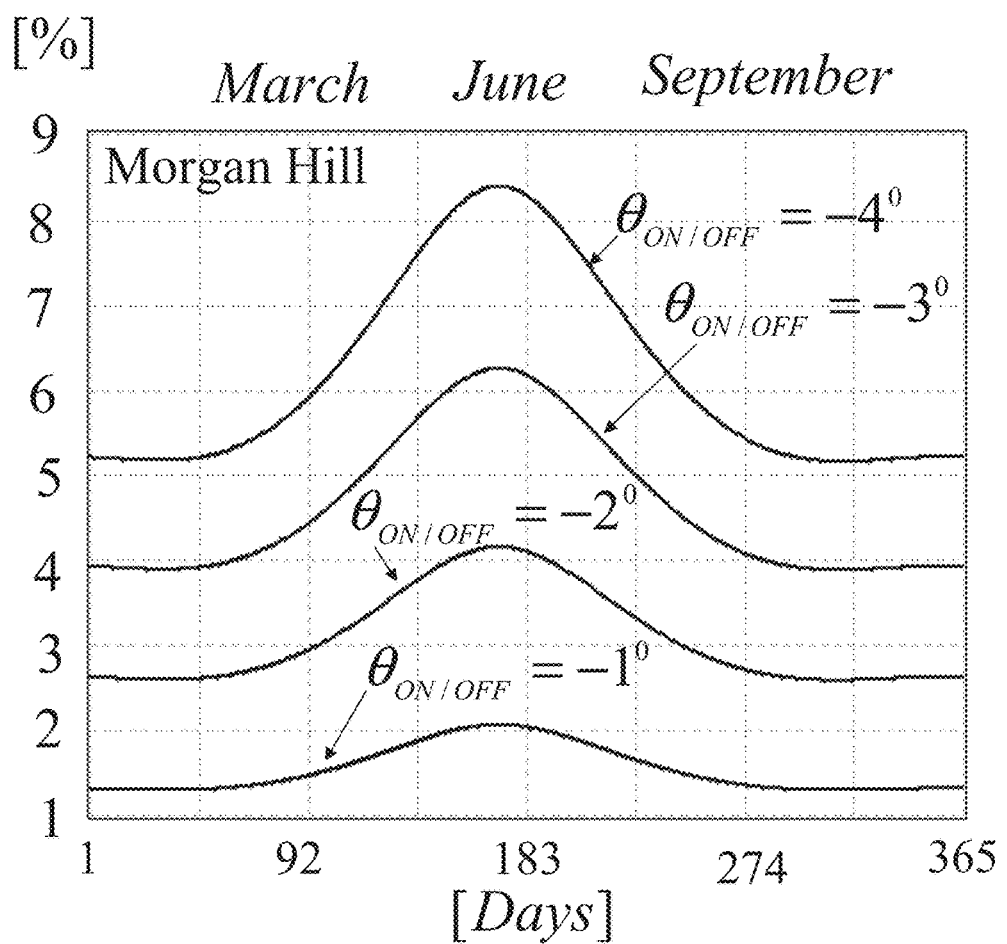
Fig.[9]

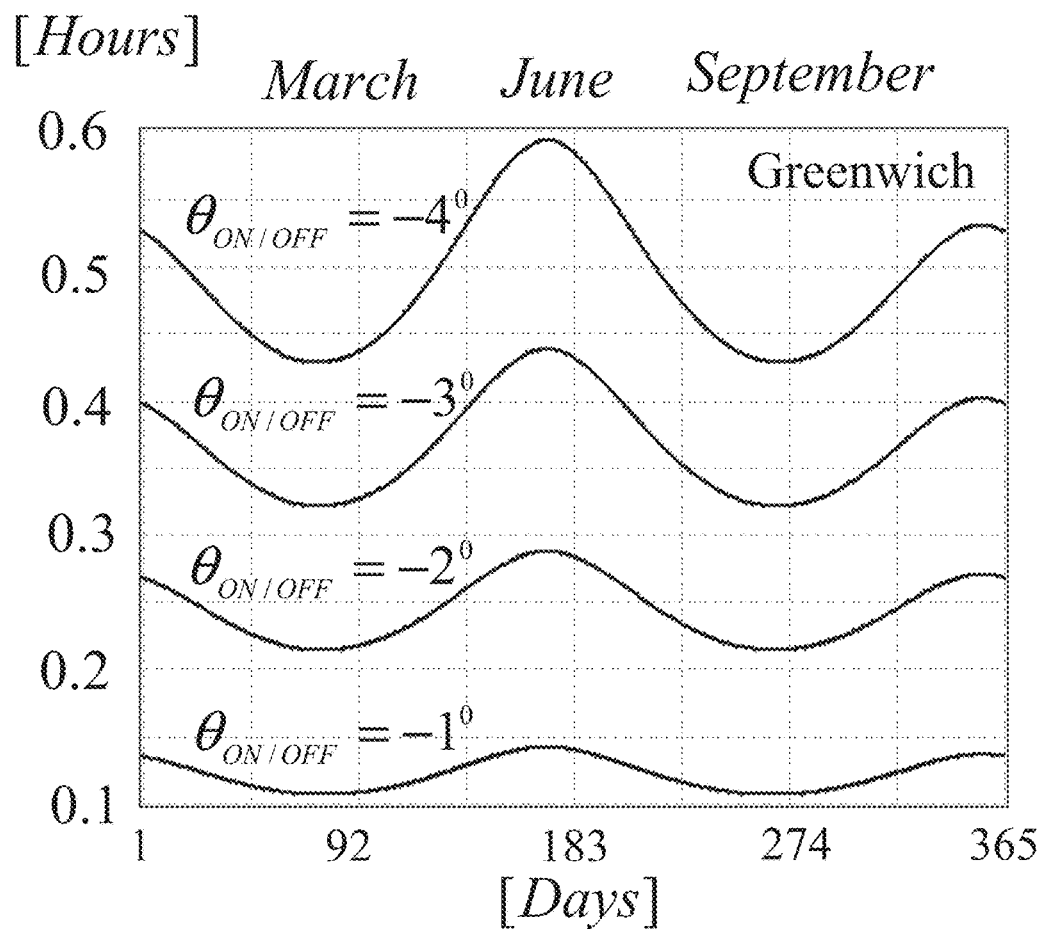
Fig.[10]

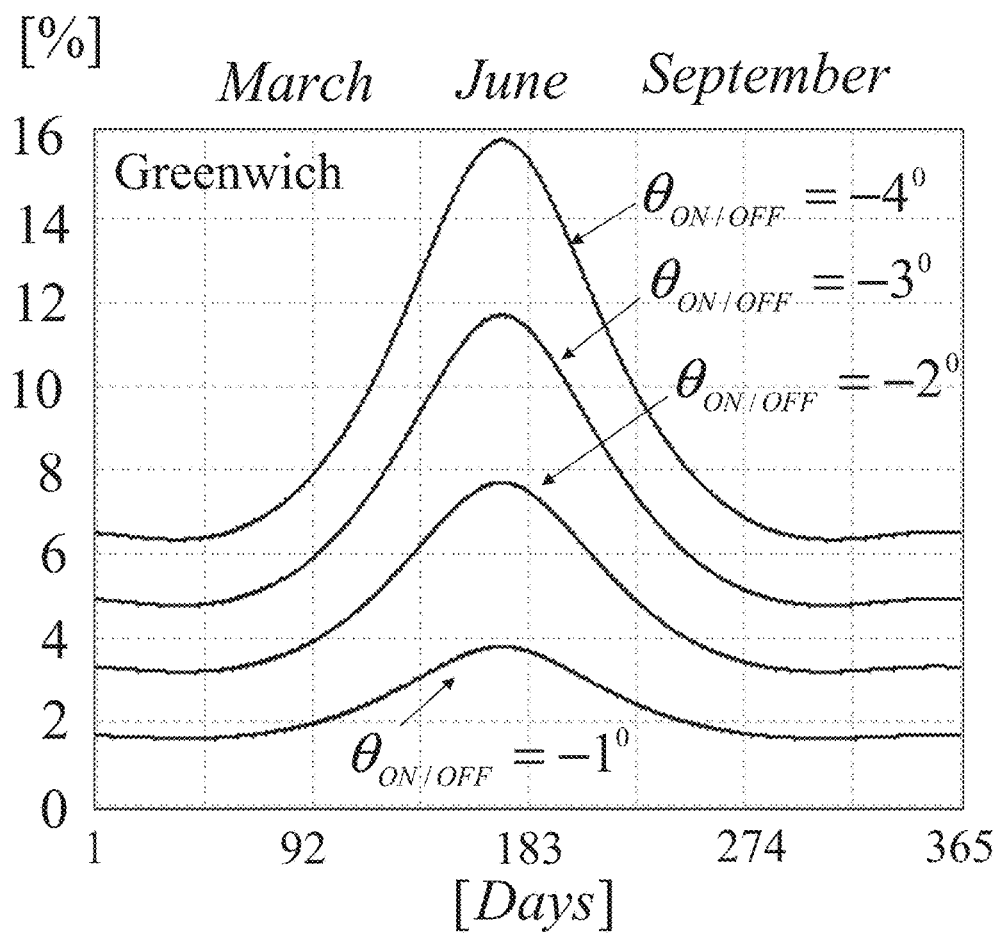
Fig.[11]

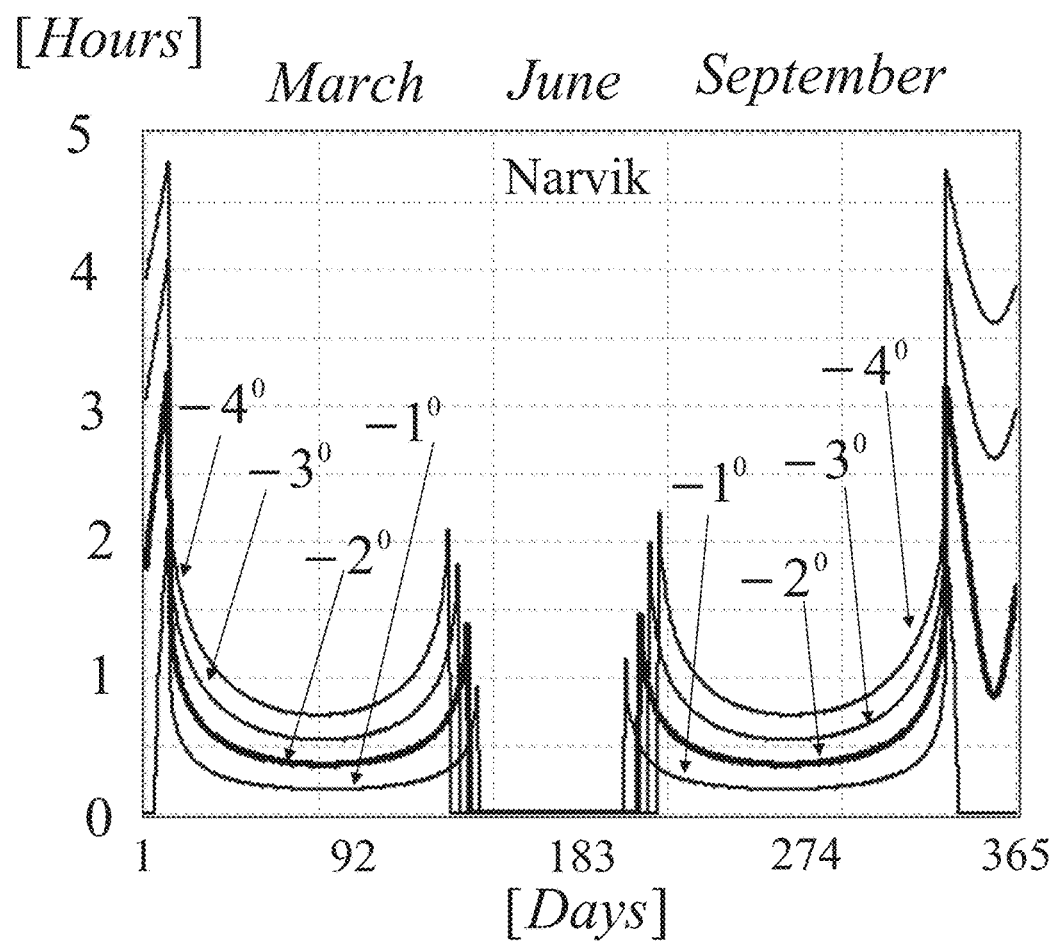
Fig.[12]

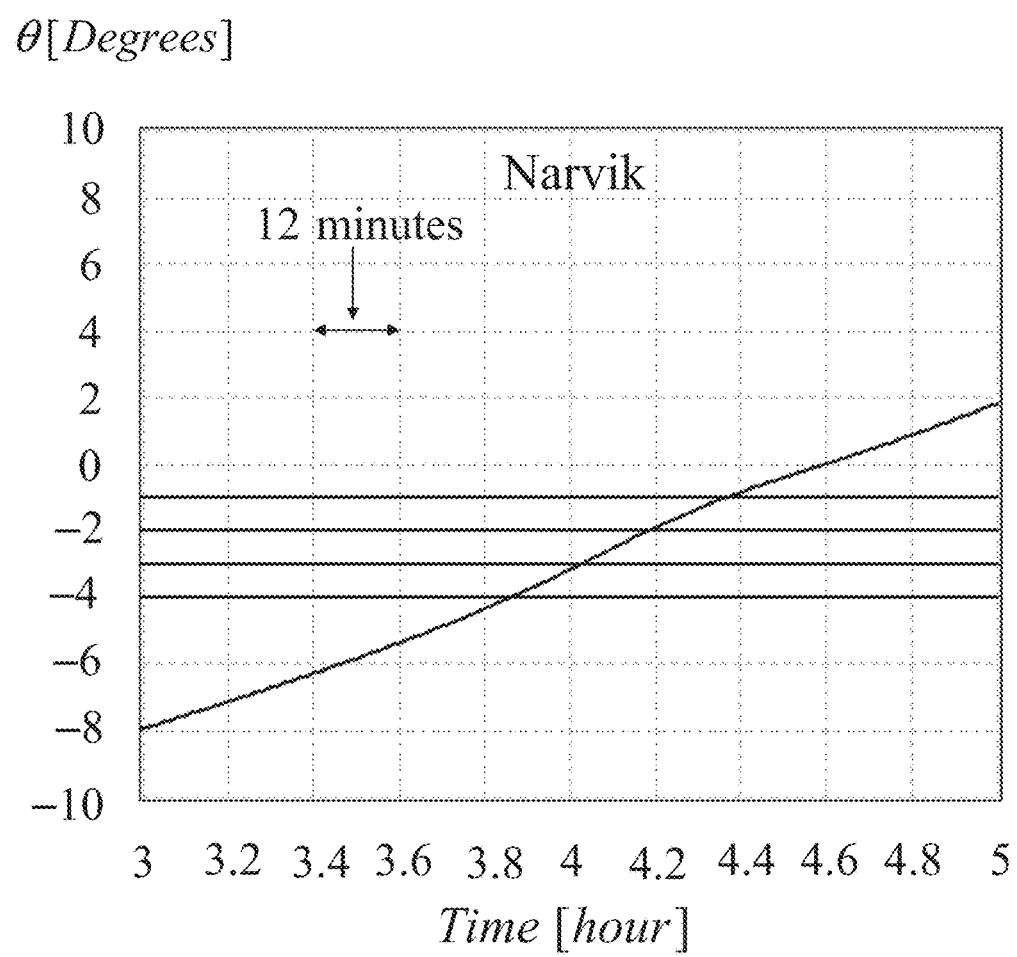
Fig.[13]

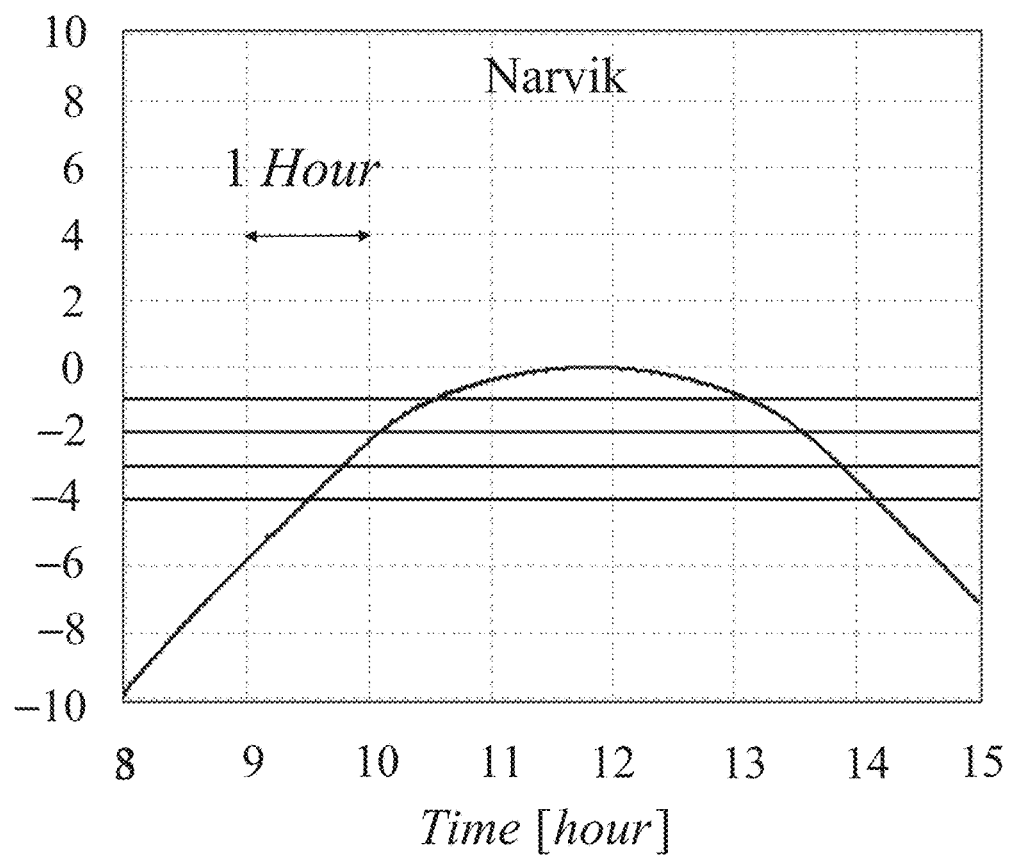
Fig.[14]

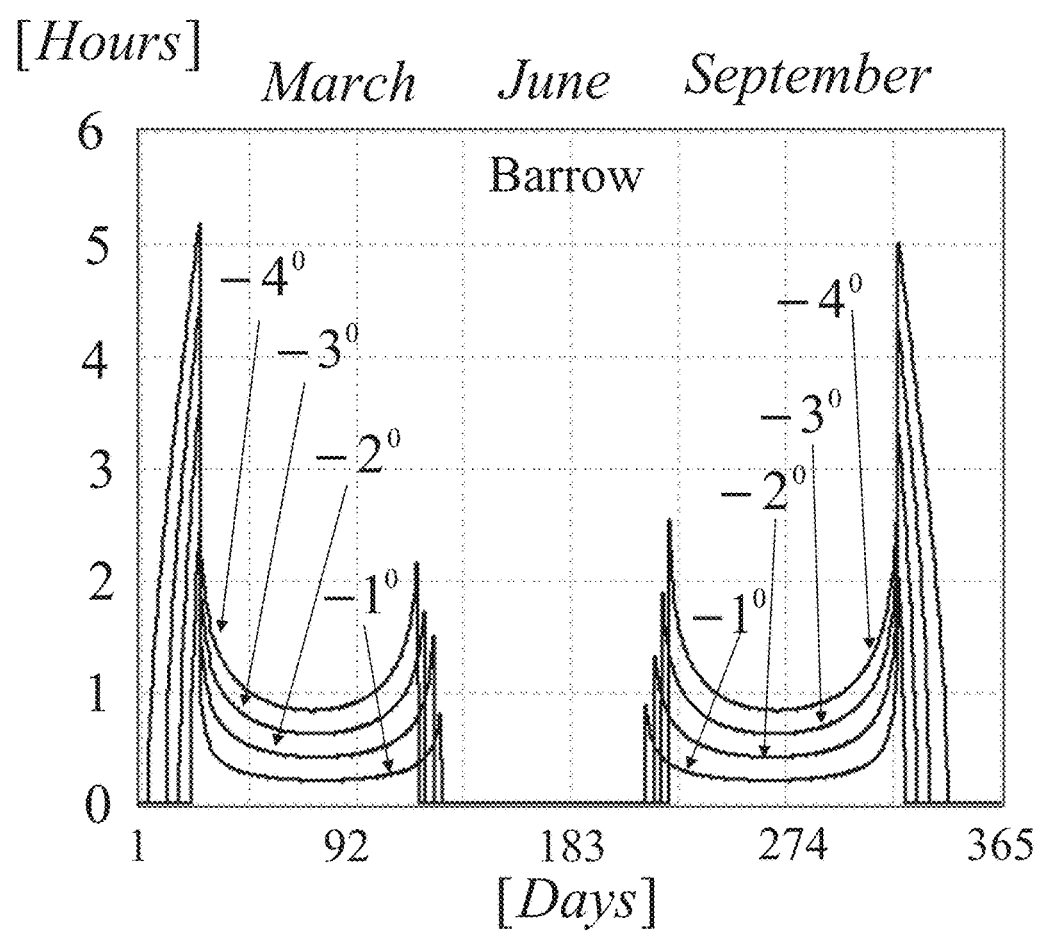
Fig.[15]

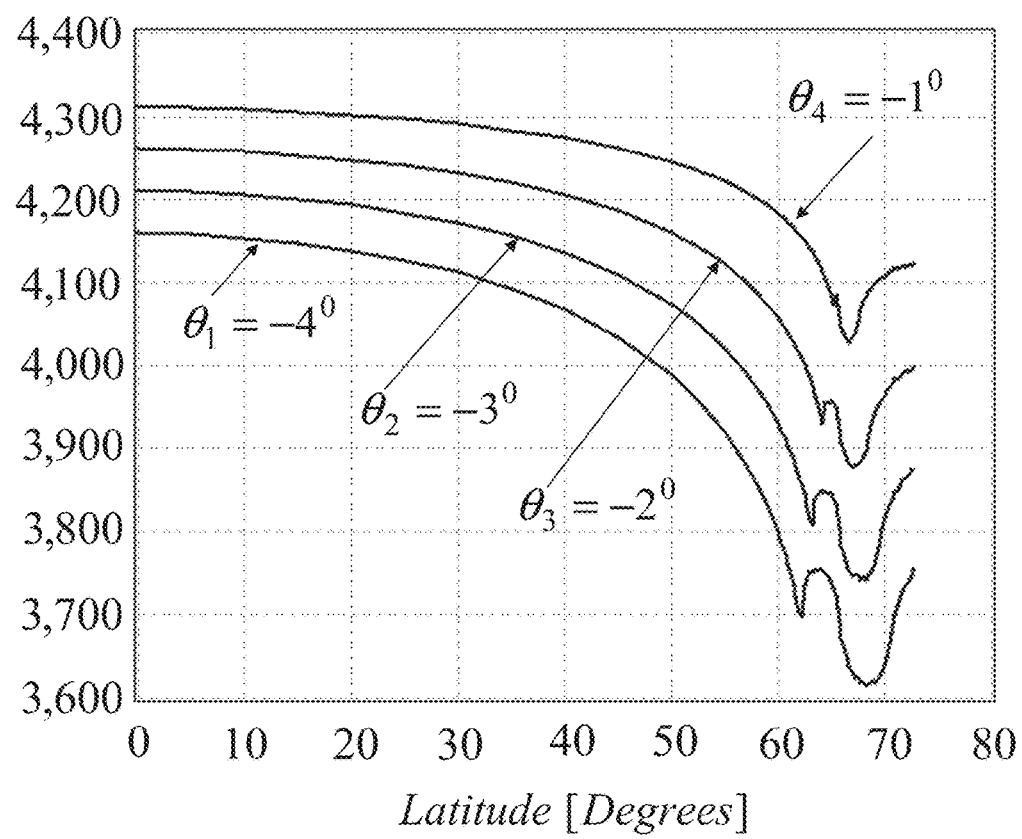
Fig.[16]

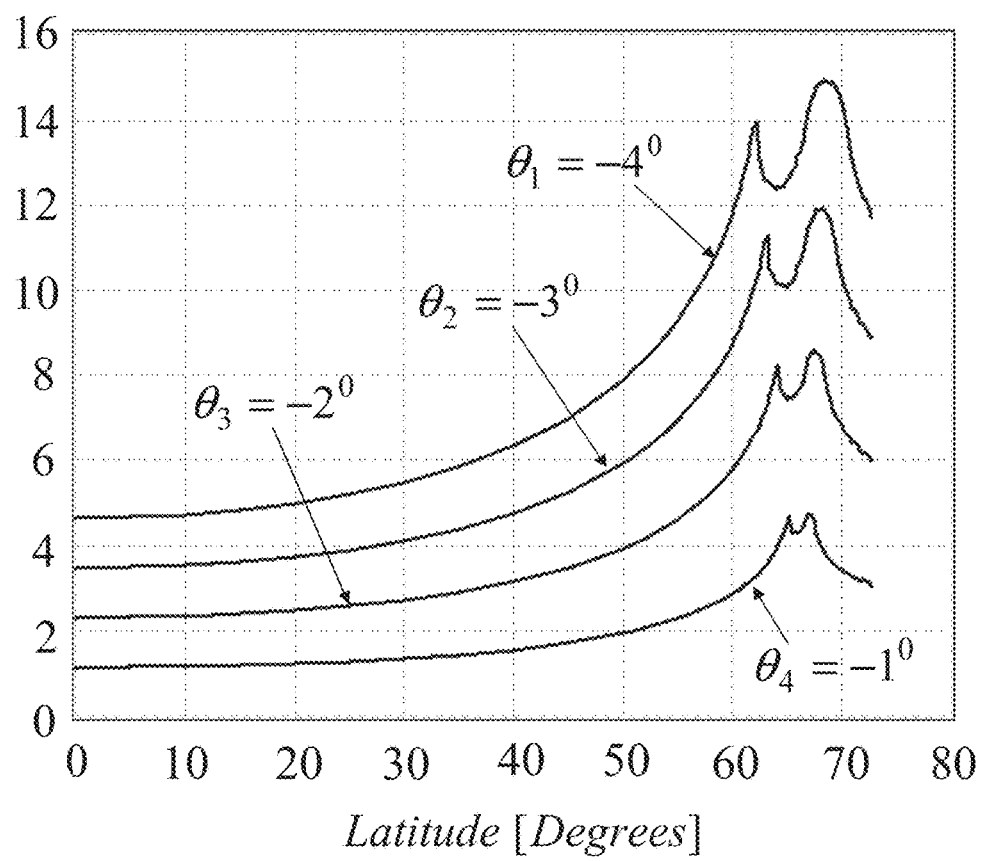
Fig.[17]

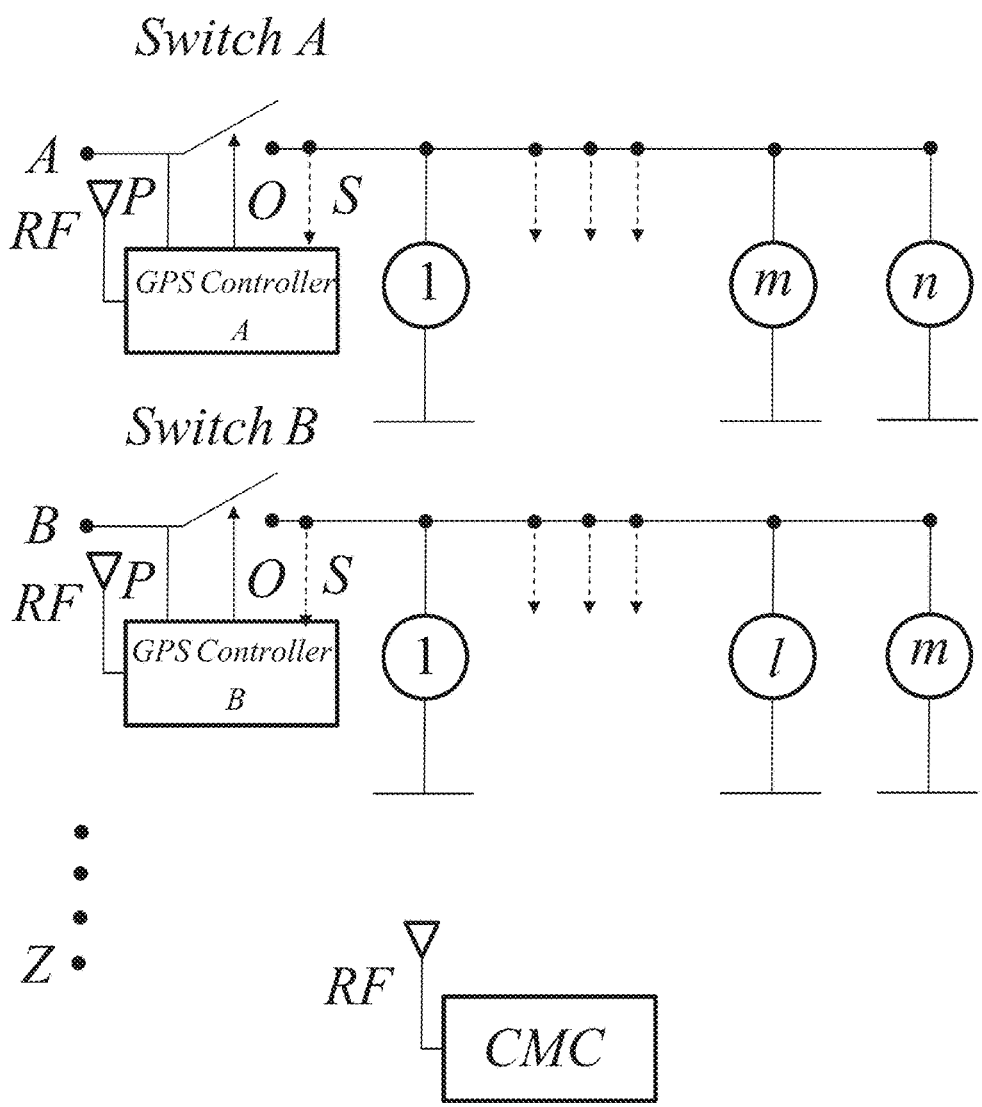
Fig.[18.1]

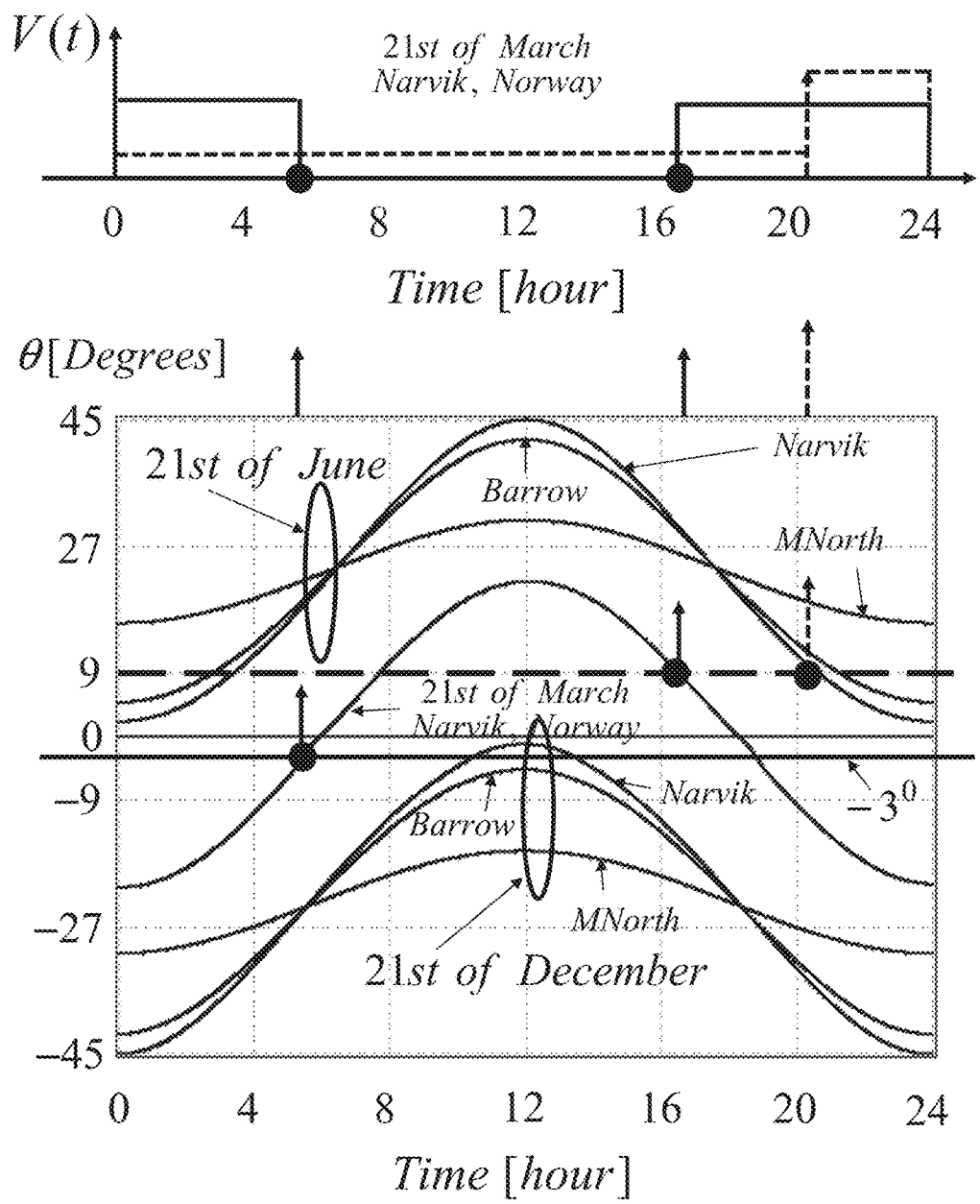
Fig.[18.2]

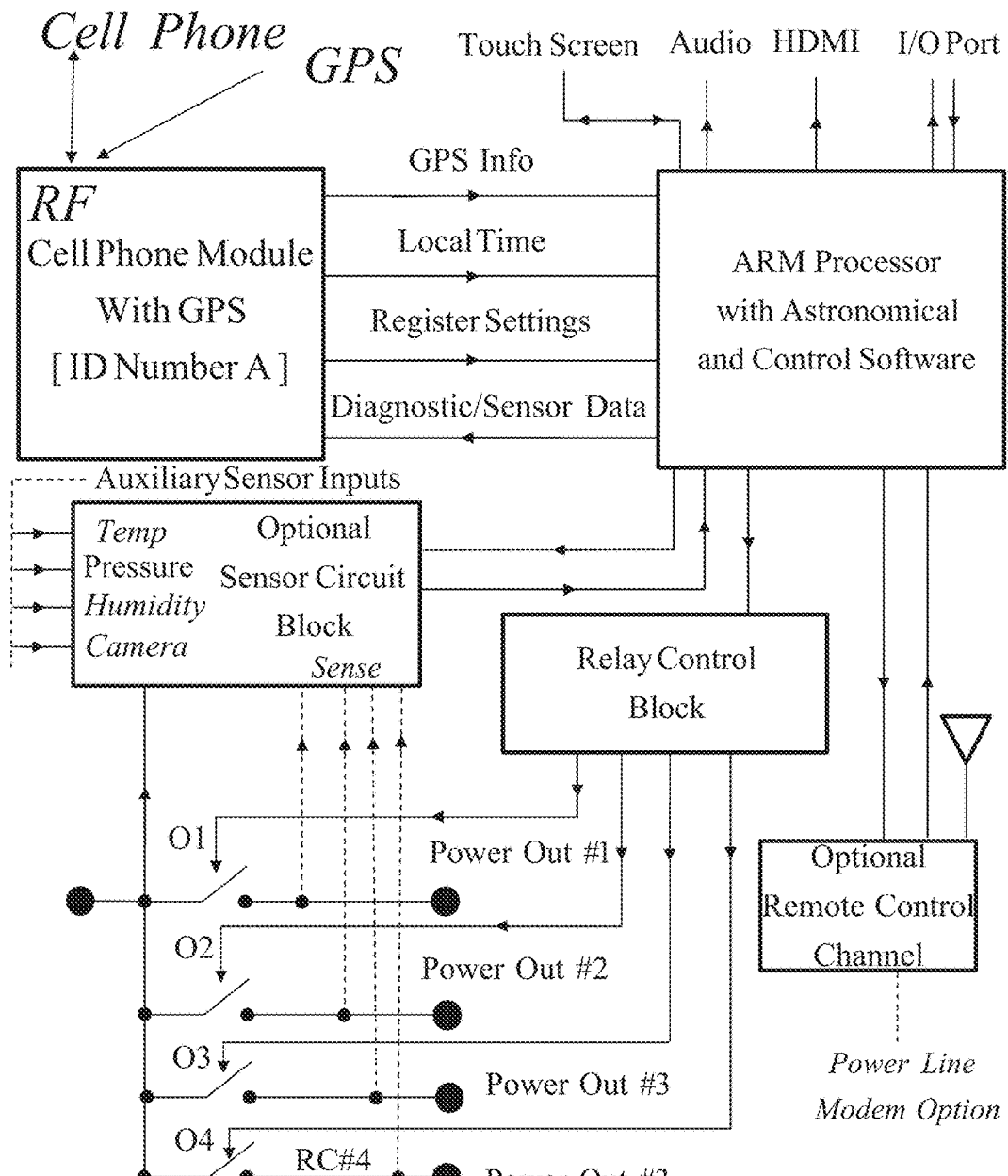
Fig.[18.3]

Registers for Switch 1 Activation

R1 Sun Elevation Angle in Degrees to Activate S1

R2 Time Bias for S1(± minutes)

R3 Sun Elevation Angle in Degrees to Activate S1

R4 Time Bias for S1(± minutes)

R5 Activation Register

Registers for Switch 2 Activation

R6 Sun Elevation Angle in Degrees to Activate S2

R7 Time Bias for S2(± minutes)

R8 Sun Elevation Angle in Degrees to Activate S2

R9 Time Bias for S2(± minutes)

R10 Activation Register

Registers for Switch (*n*) Activation

R(5*n*-4) Sun Elevation Angle in Degrees to Activate S(n)

R(5*n*-3) Time Bias for S(n)(± minutes)

R(5*n*-2) Sun Elevation Angle in Degrees to Activate S(n)

R(5*n*-1) Time Bias for S(n)(± minutes)

R(5*n*) Activation Register

Fig.[18.4]

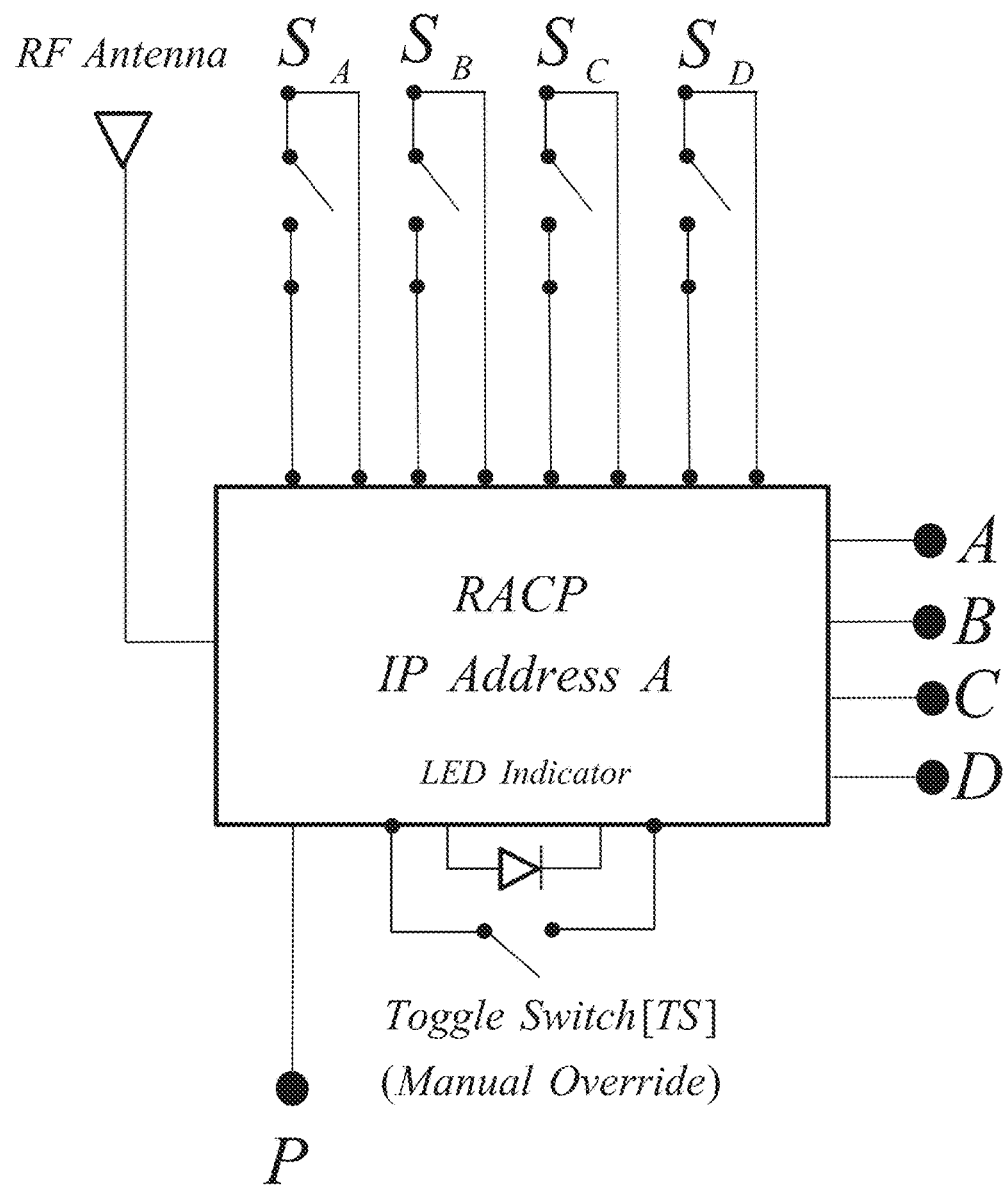
Fig.[18.5]

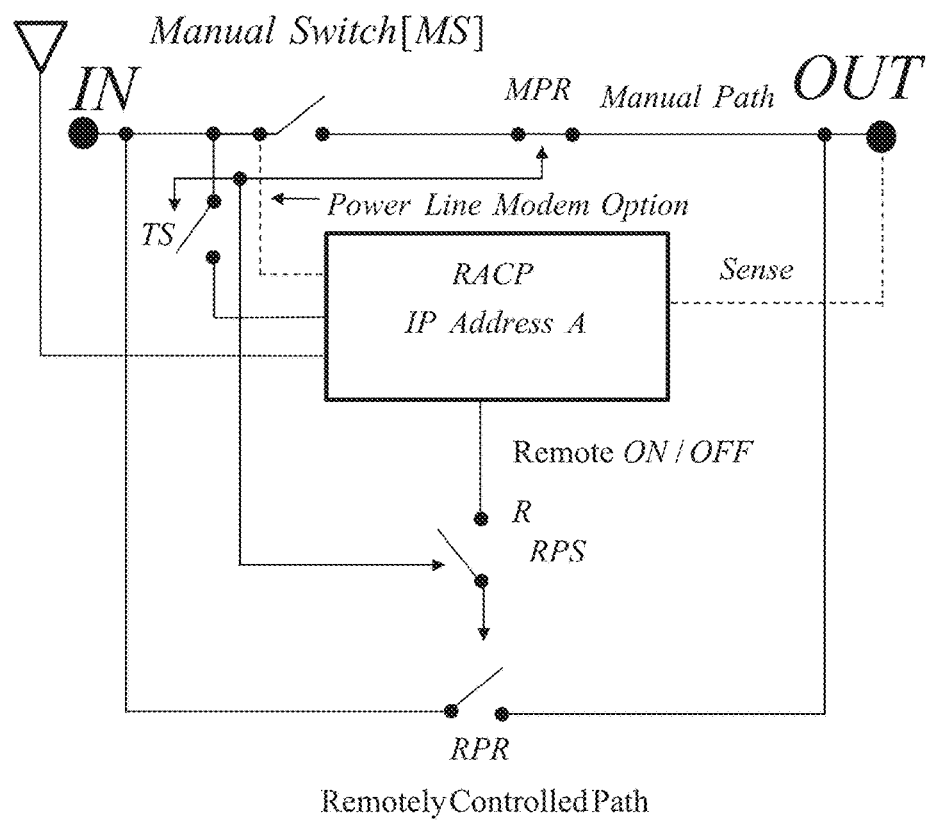
Fig.[18.6.1]

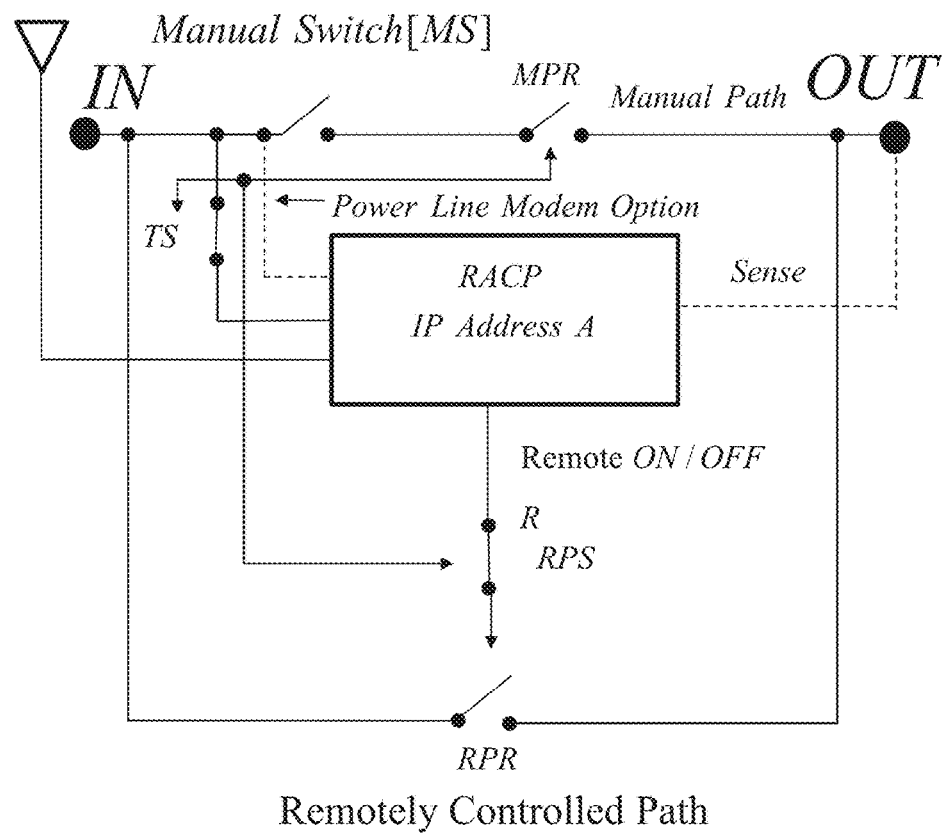
Fig.[18.6.2]

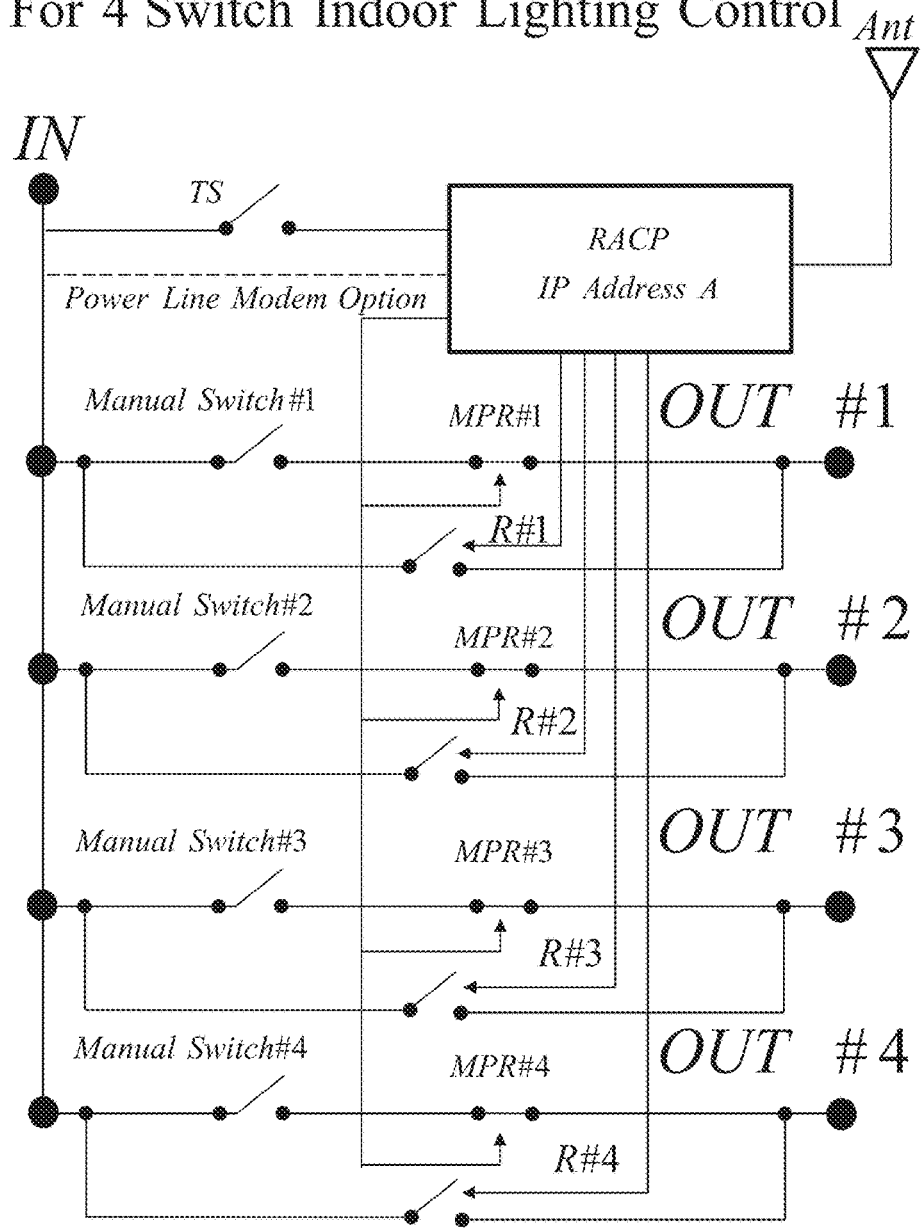
Fig.[18.7]

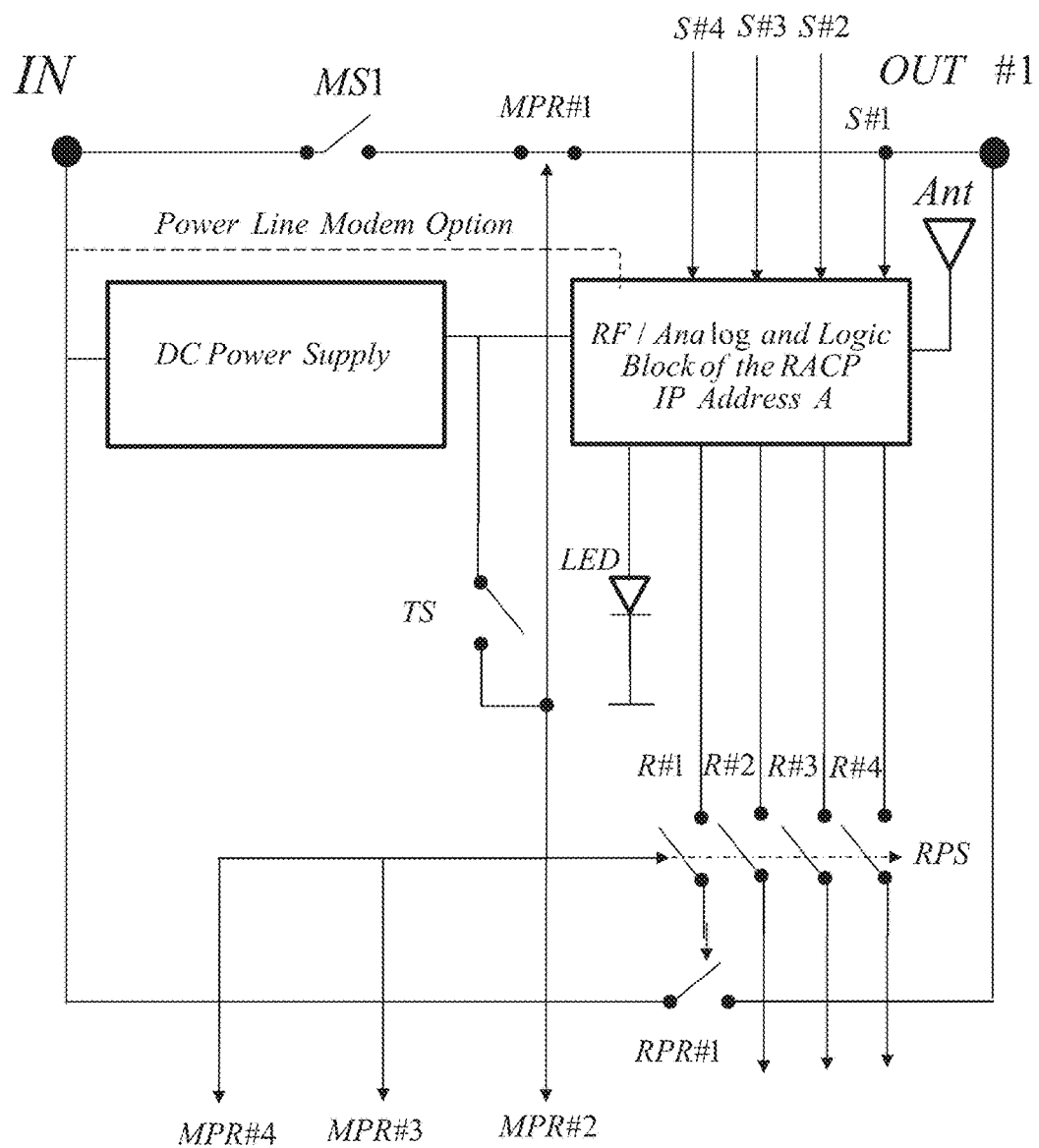
Fig.[18.8]

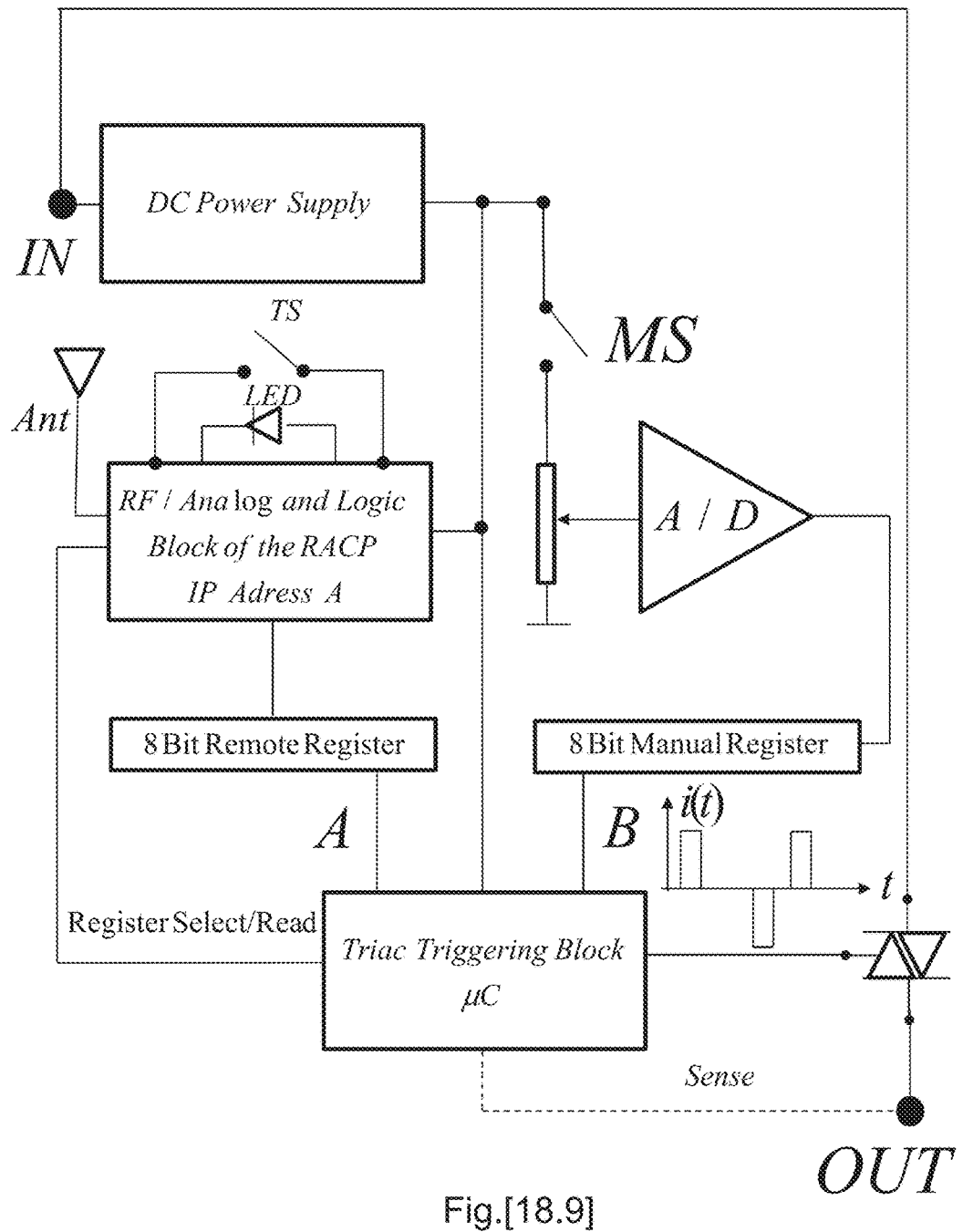
Fig.[18.9]

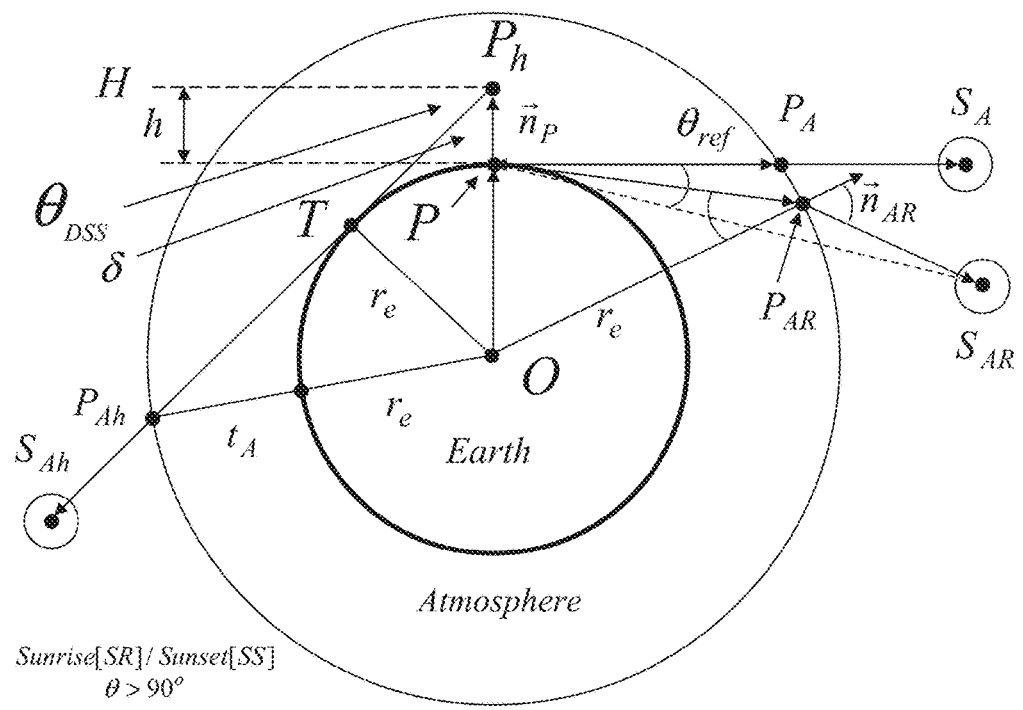
Fig.[19]

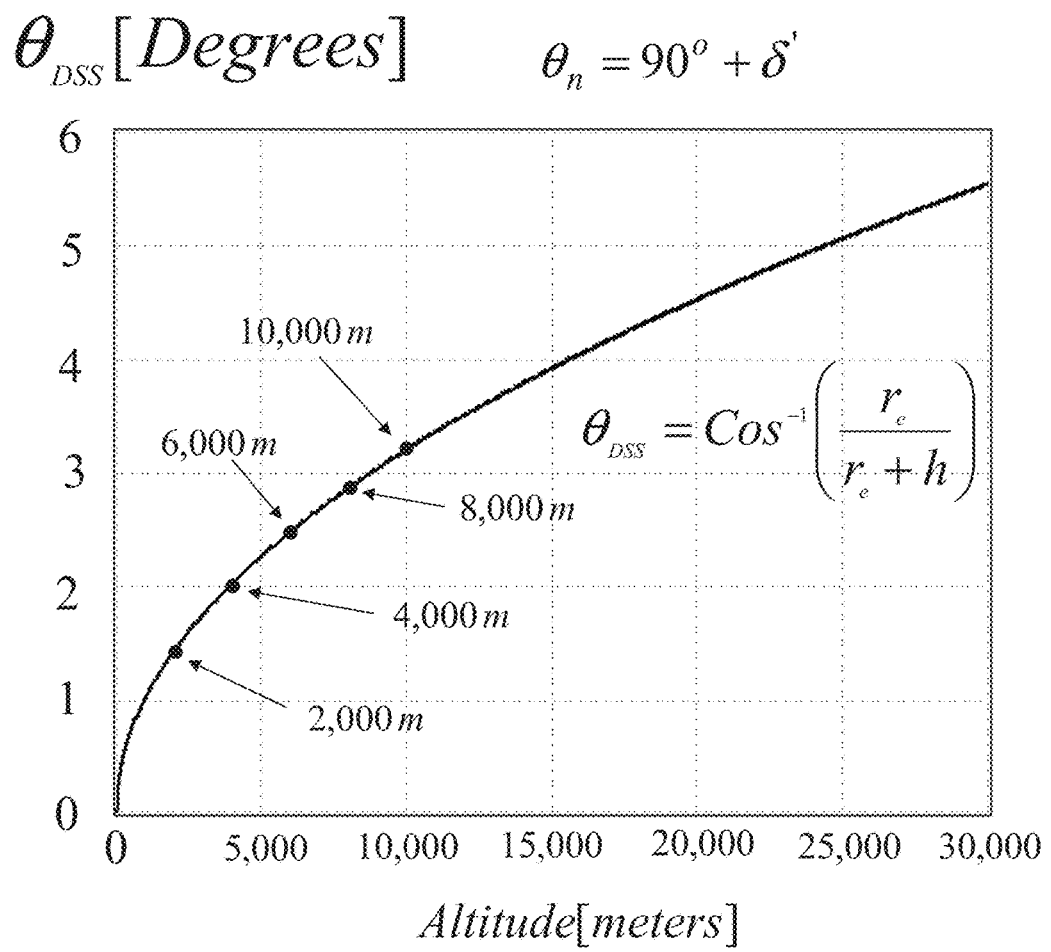
Fig.[20]

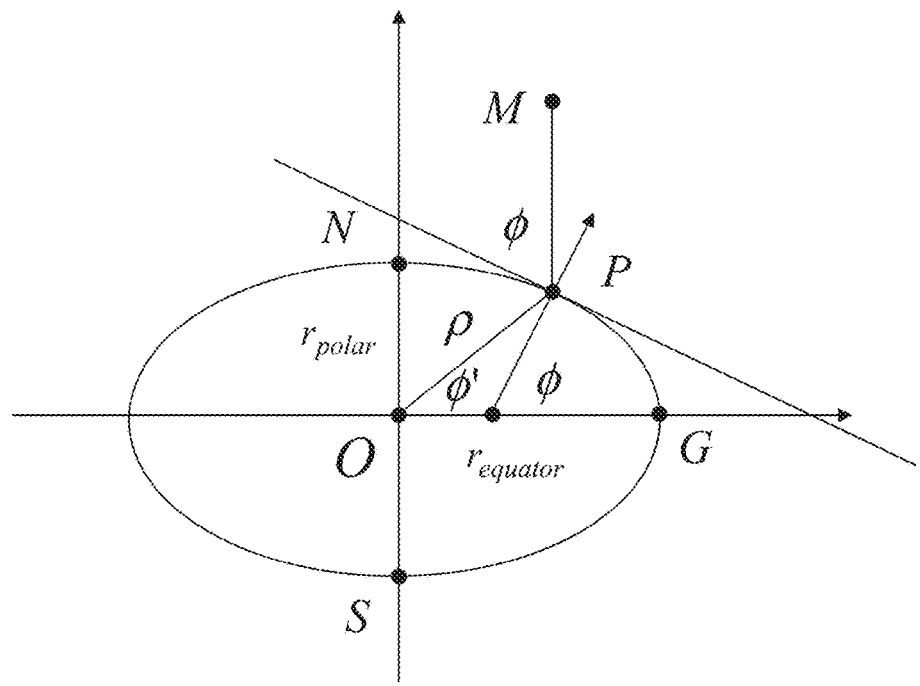
$r_{equator} = 6,378.1 km \, [r_{polar} = 6,356 km]$
$Geographical\ Latitude = \phi$
$Geocentric\ Latitude = \phi'$
Fig.[21]

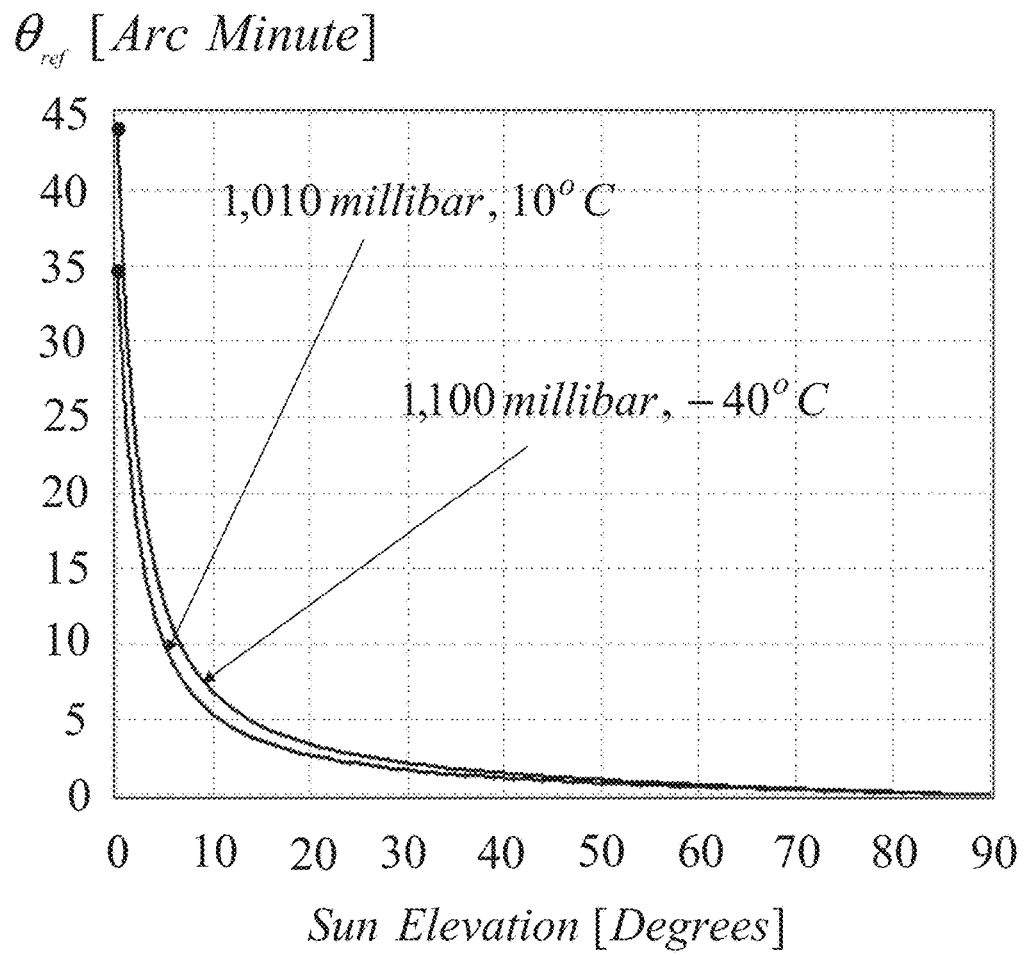
Fig.[22]

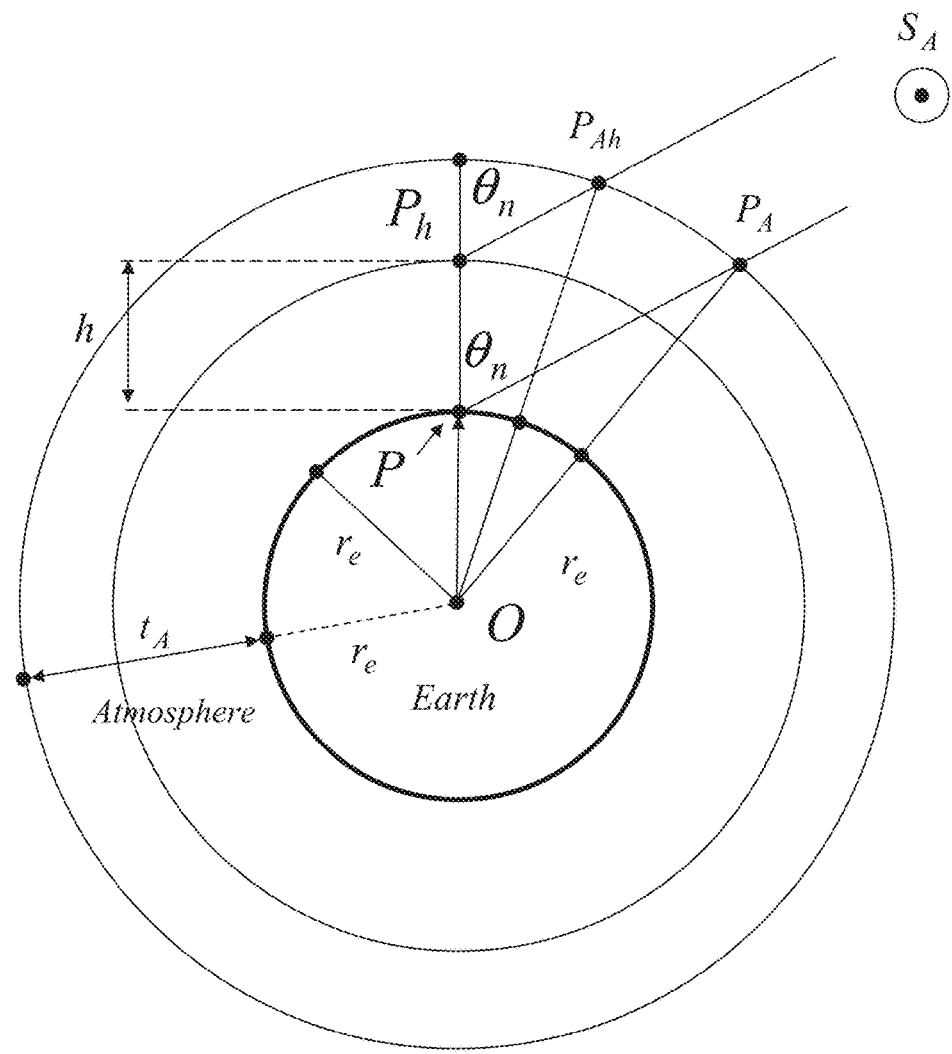
Fig.[23]

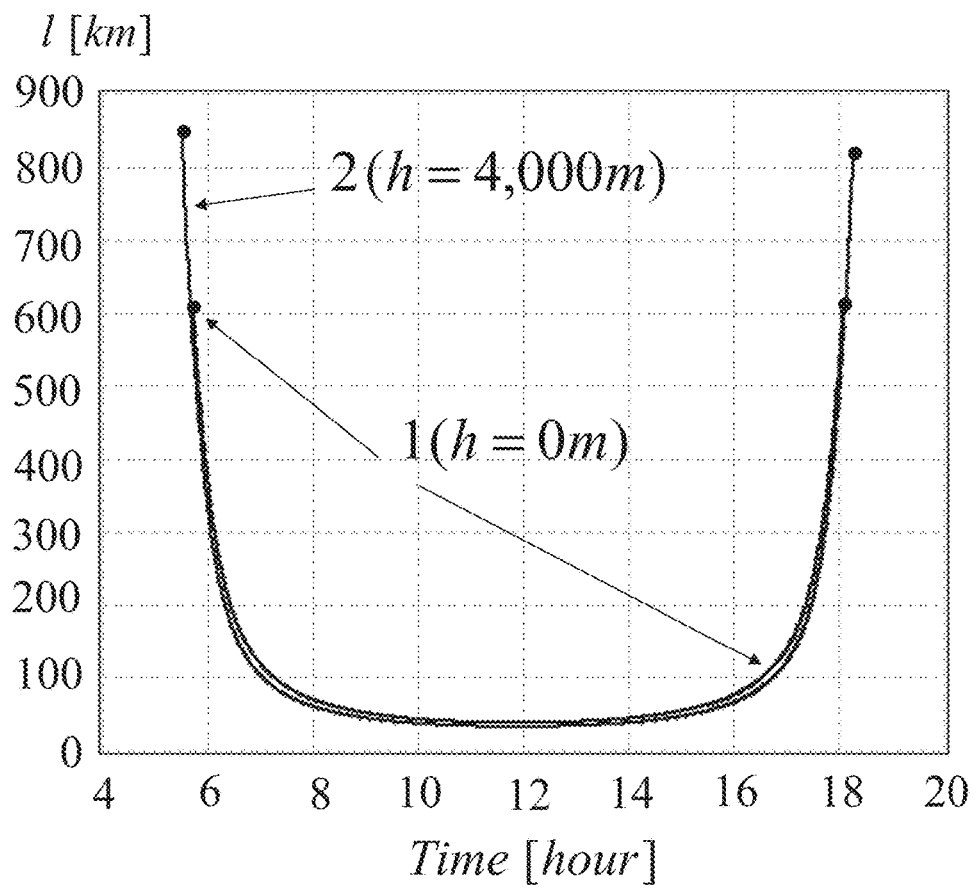
Fig.[24]

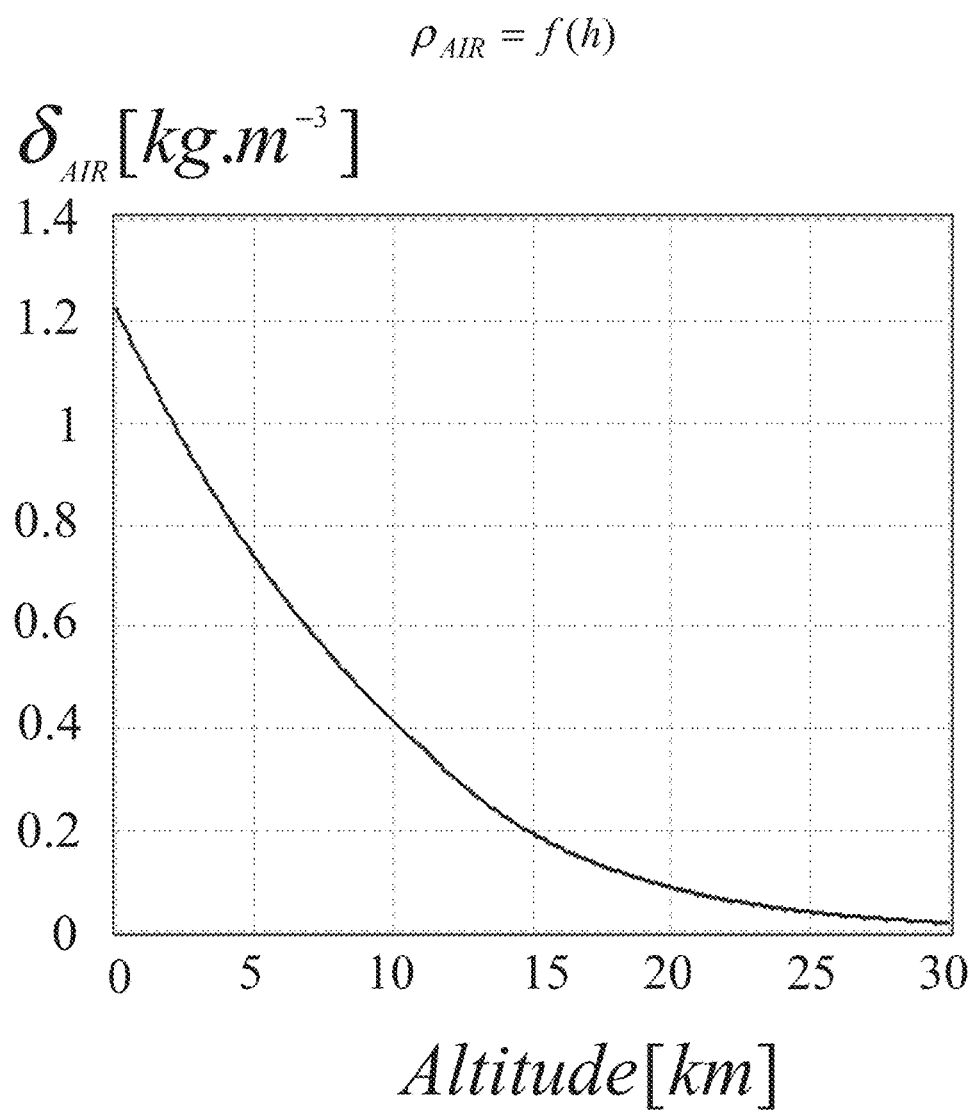
Fig.[25]

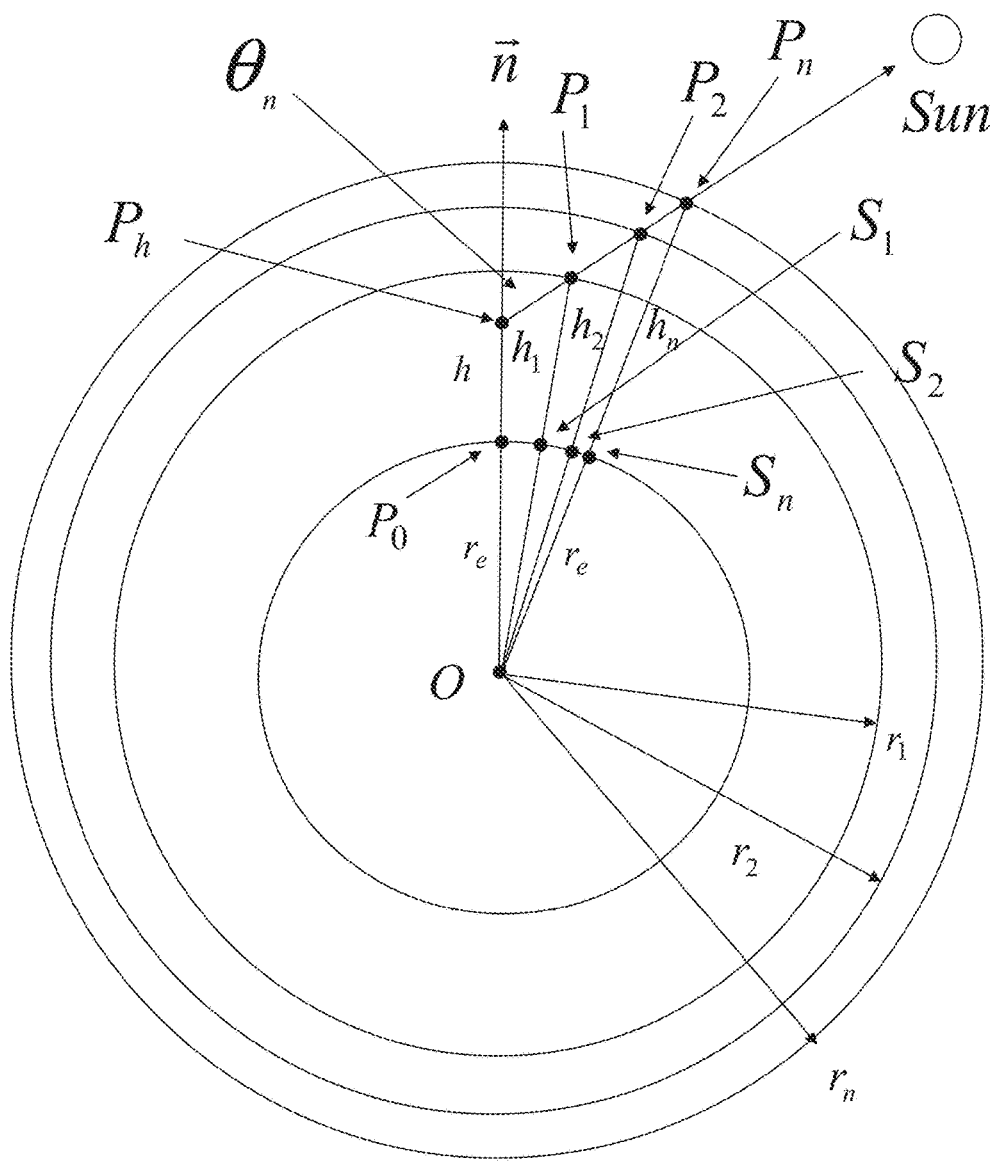
Fig.[26]

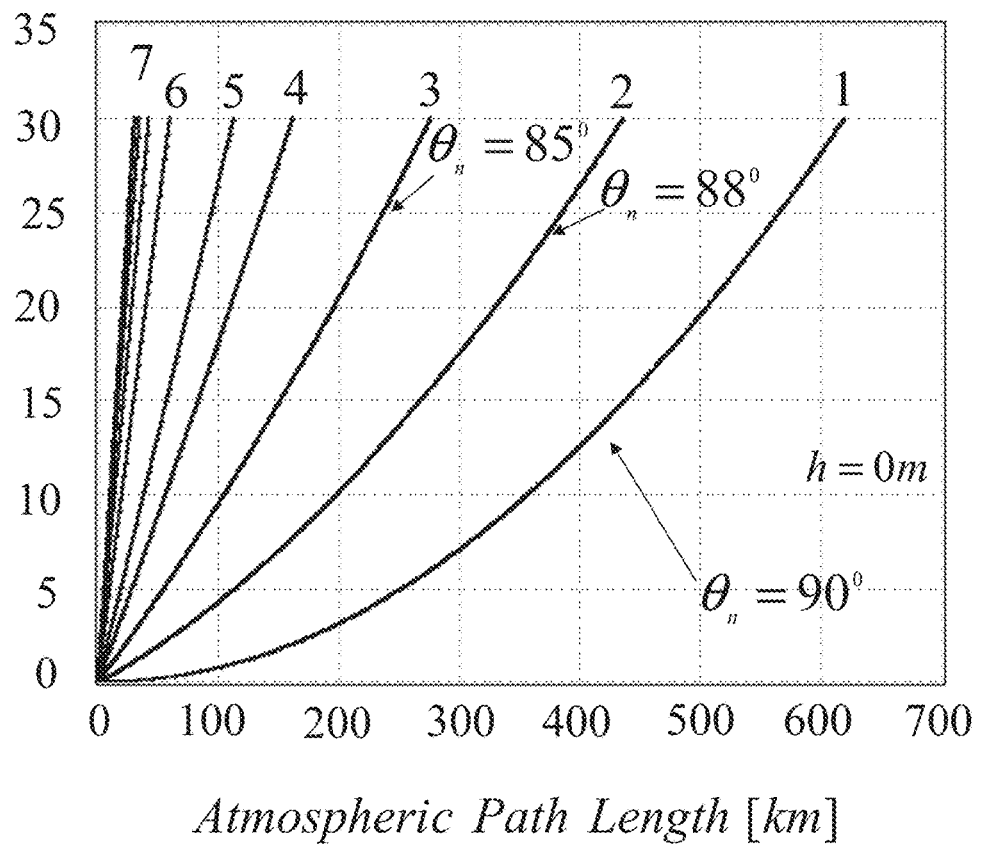
Fig.[27]

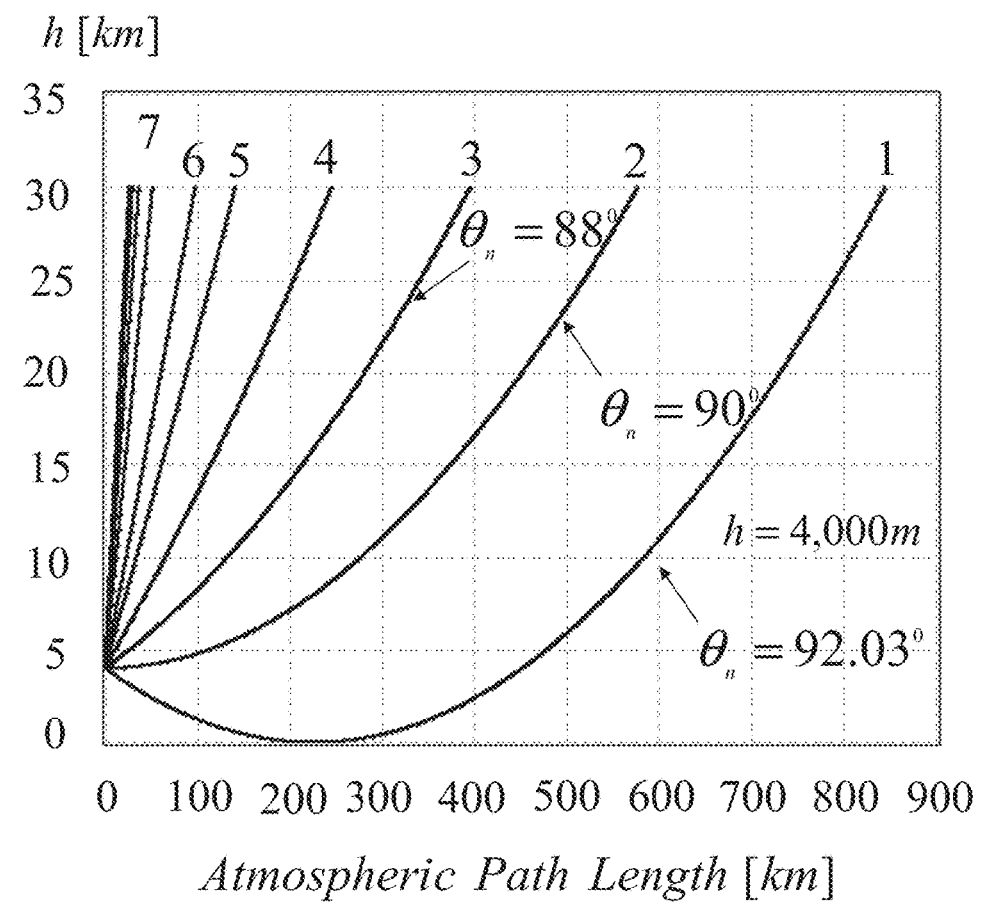
Fig.[28]

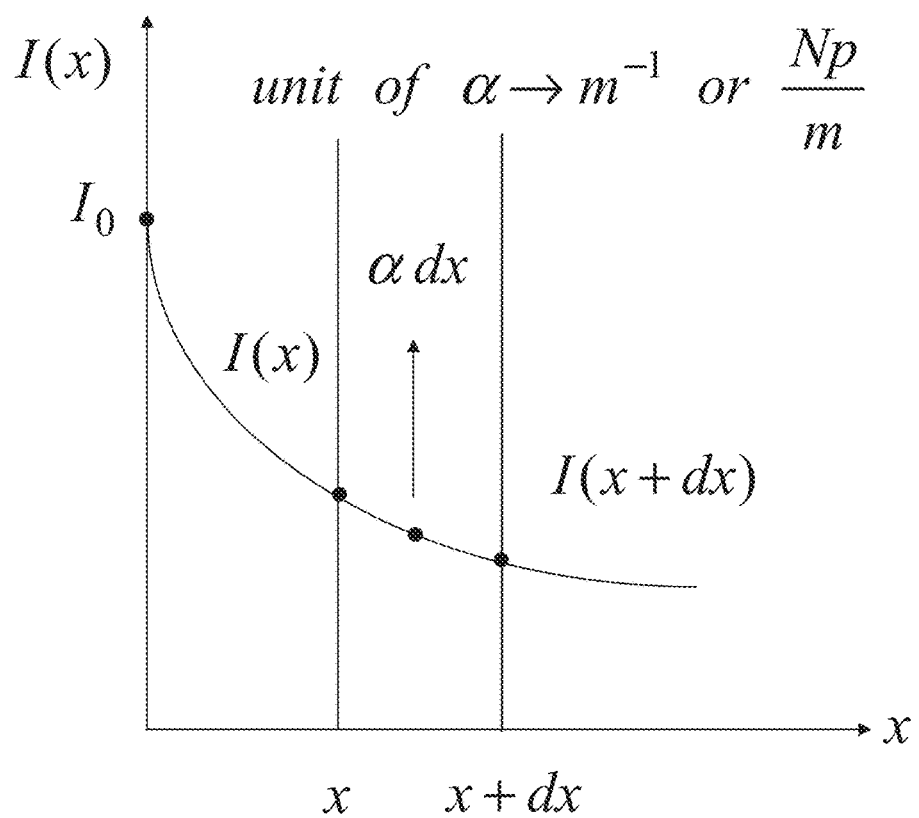
Fig.[29]

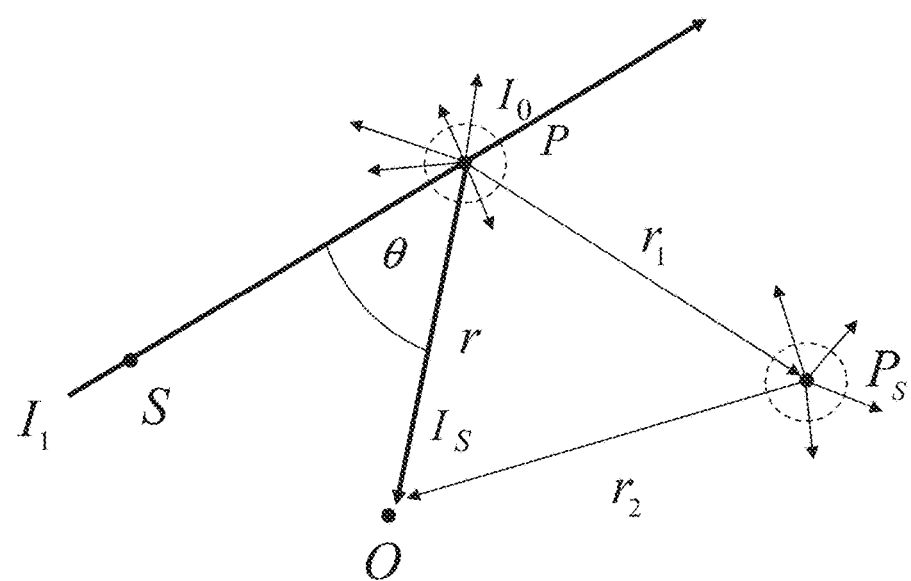
For Nitrogen Molecule = 5.1x10$^{-31}$ m @532nm
$Loss\ Rate\ \ 10^{-5}[m^{-1}]\ @1\,Atm.,25^{o}C$
Fig.[30]

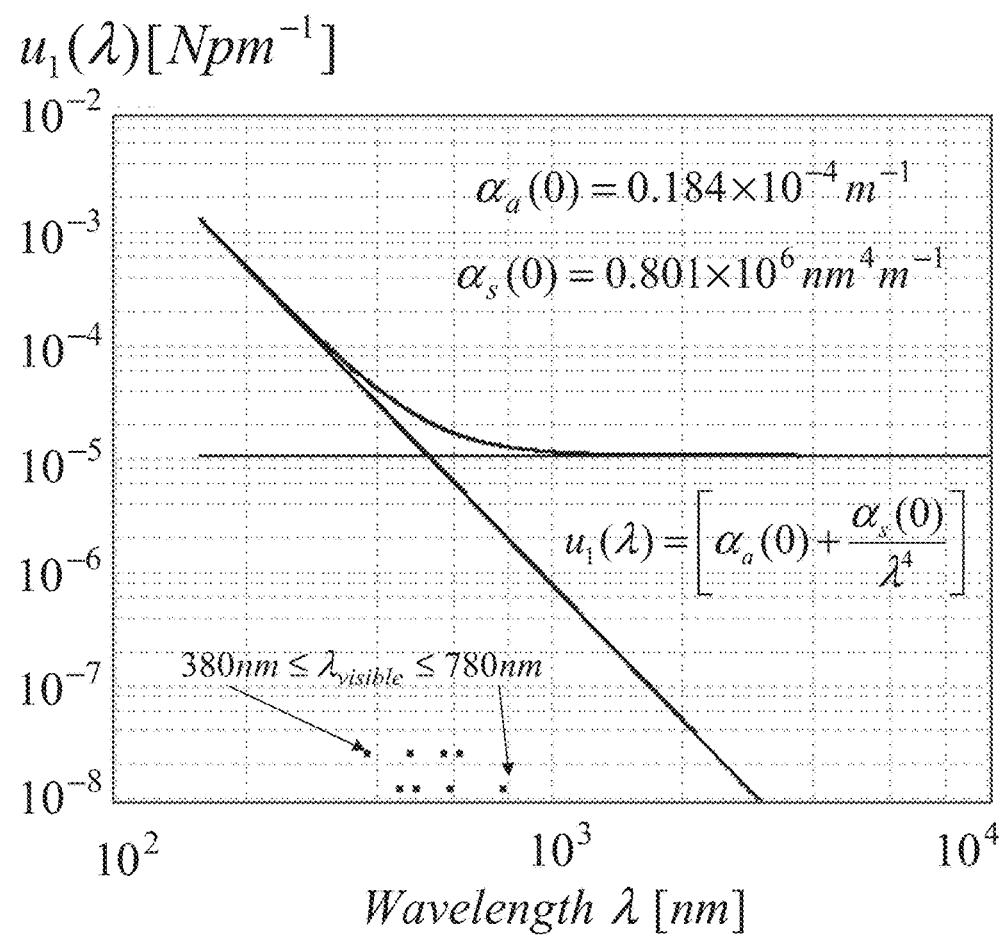
Fig.[31]

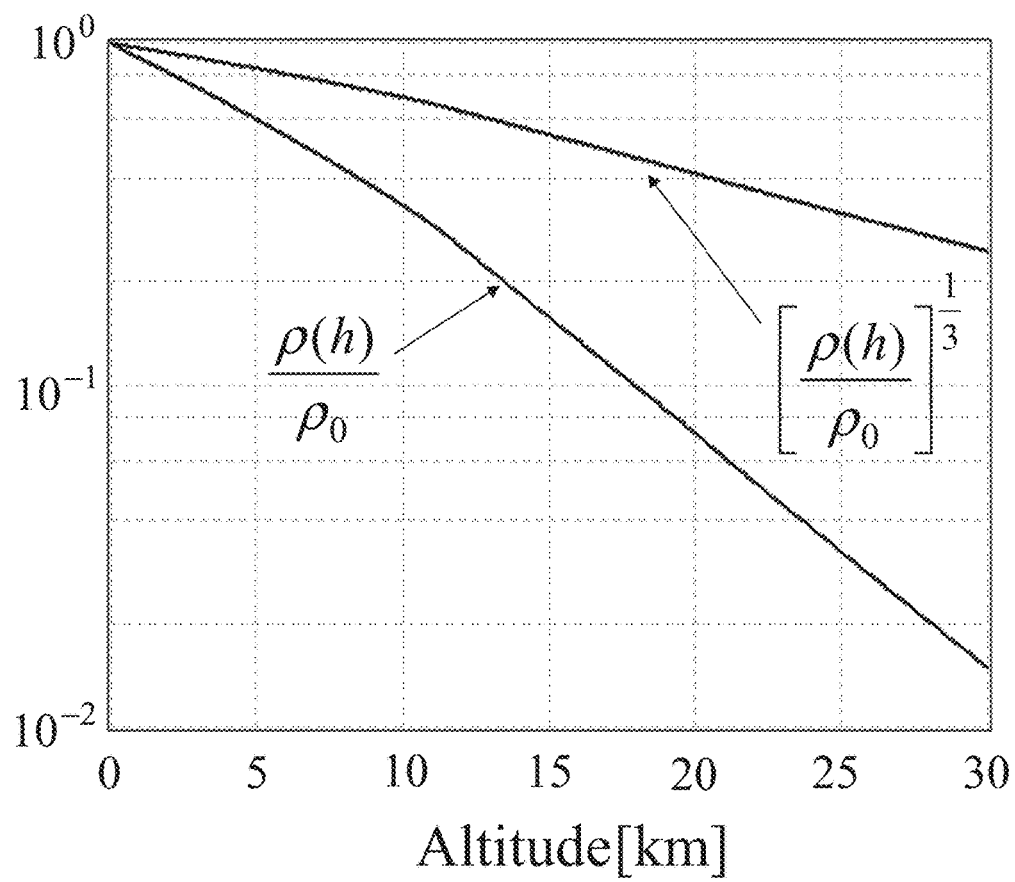
Fig.[32.1]

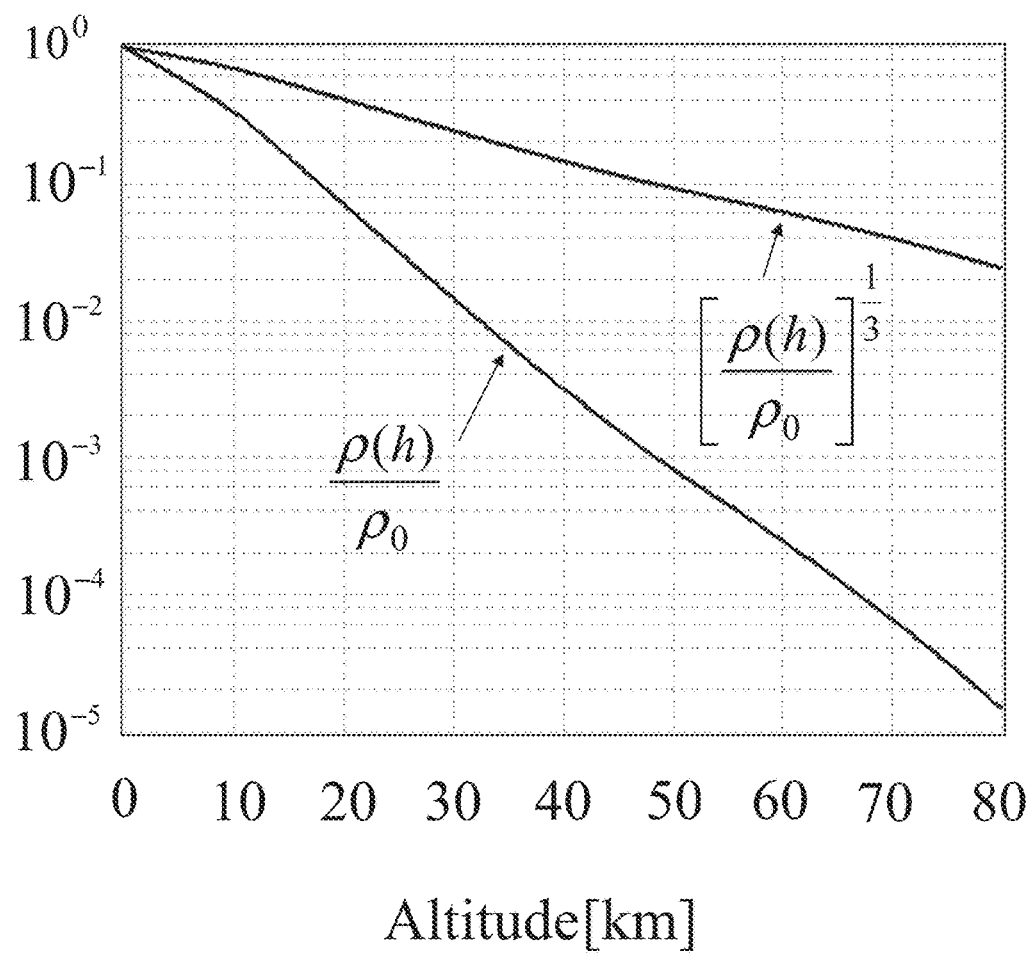
Fig.[32.2]

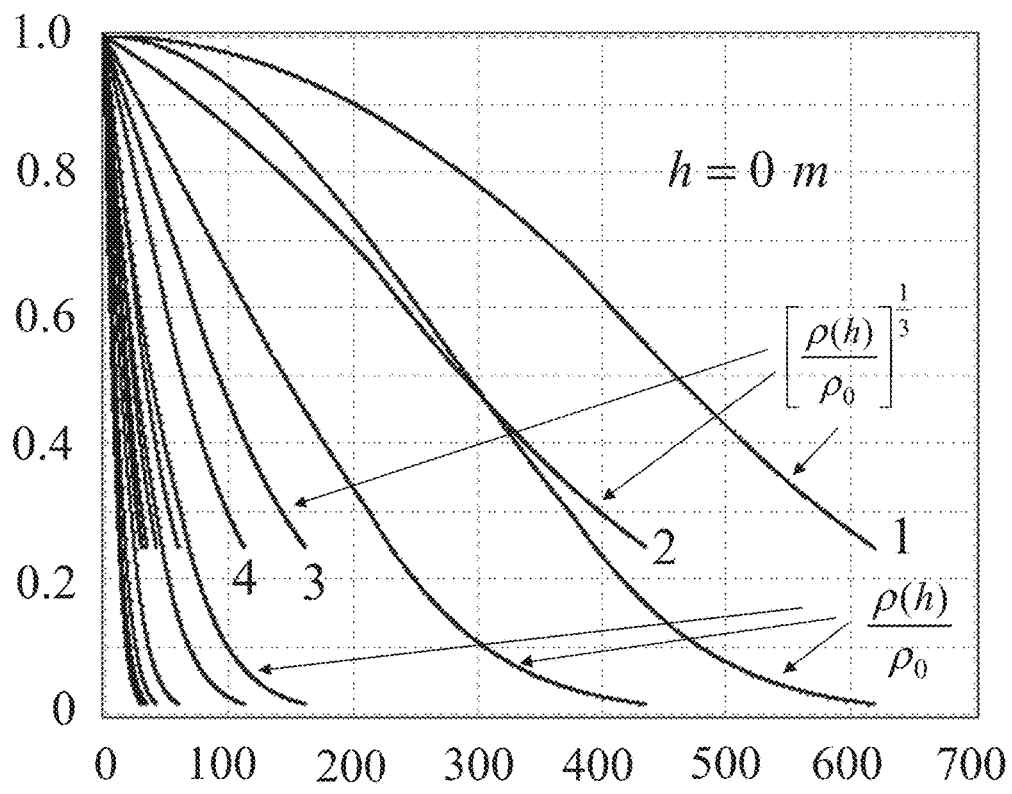
Fig.[33]

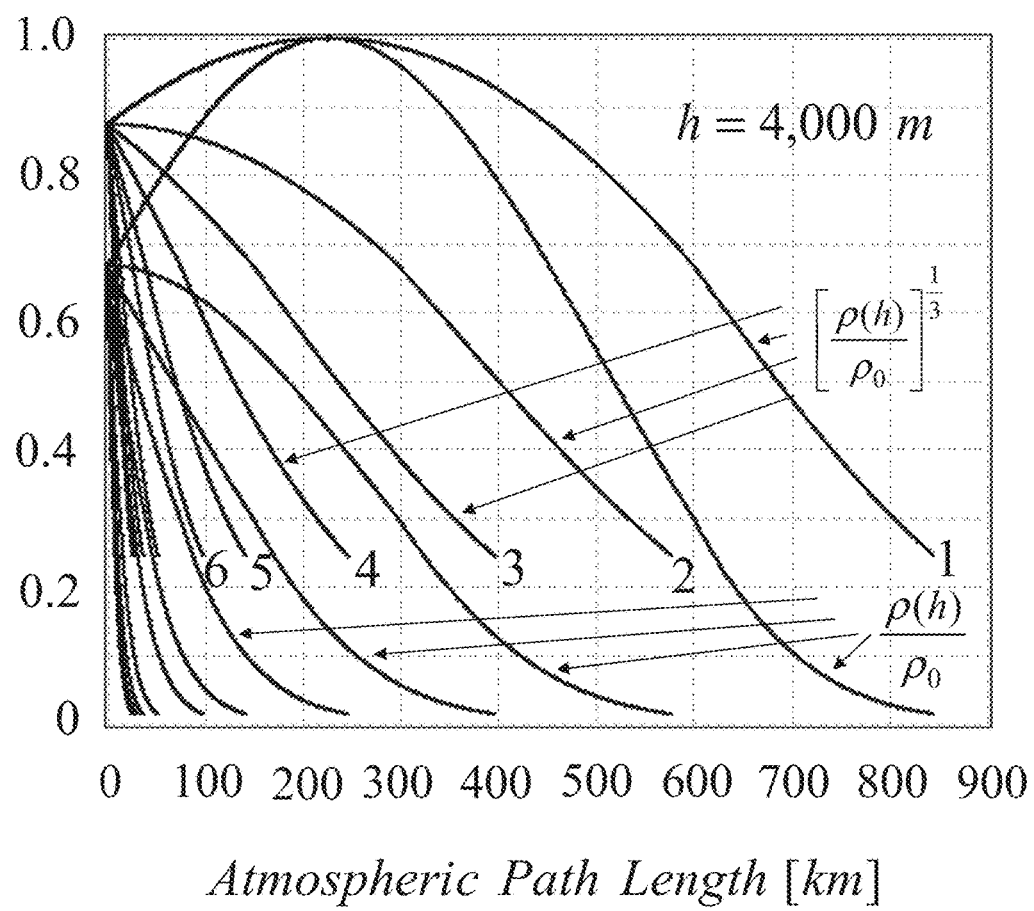
Fig.[34]

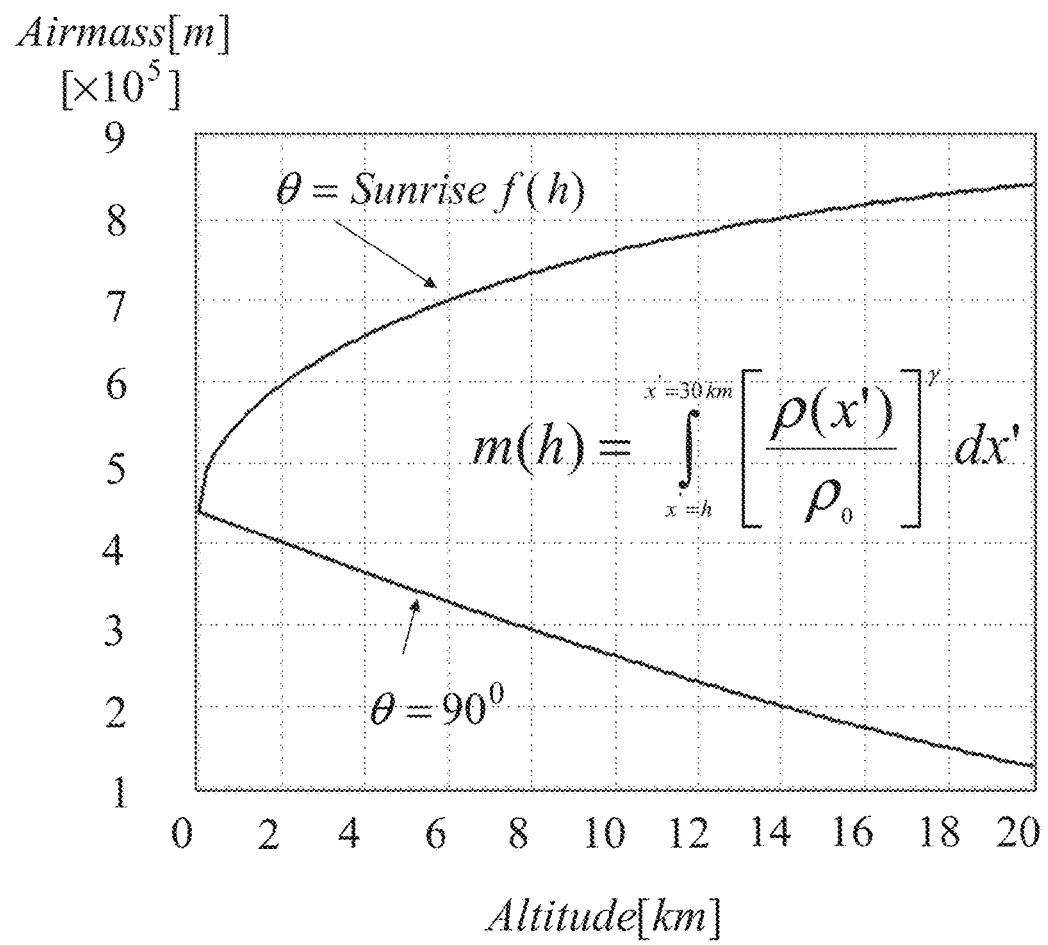
Fig.[35]

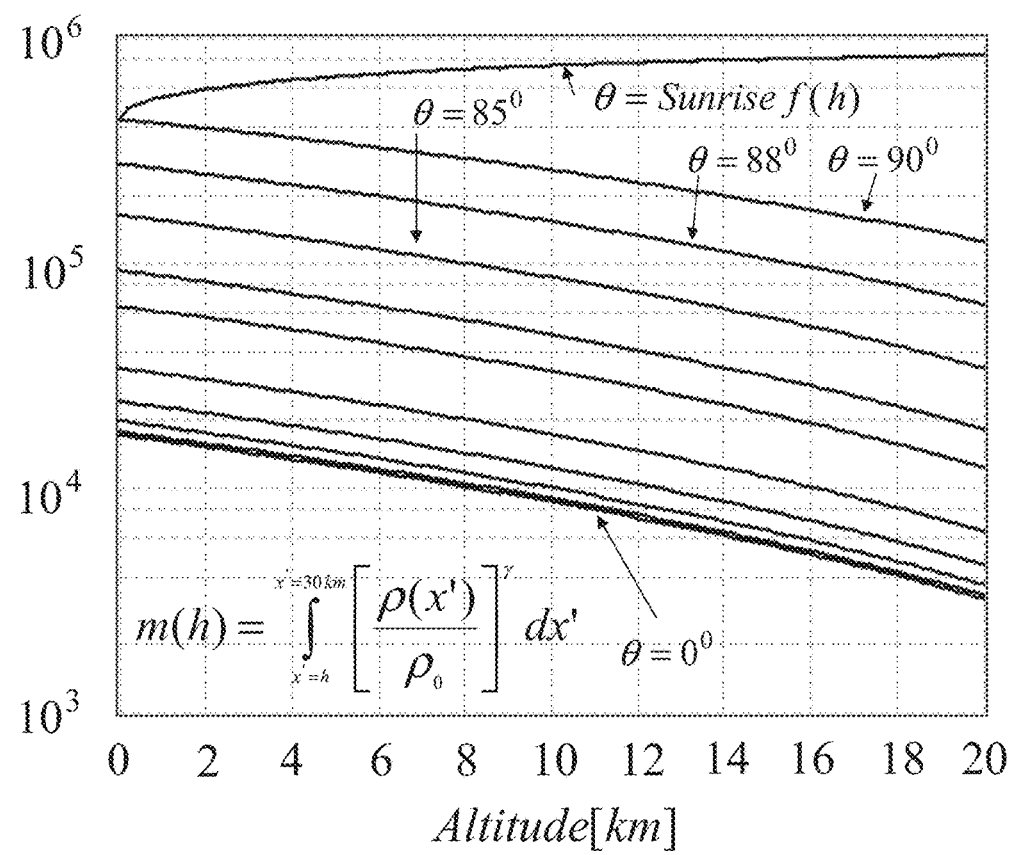
$\theta_n = 0°, 15°, 30°, 45°, 60°, 75°, 80°, 85°, 88°, 90°$
and sunrise
Fig.[36]

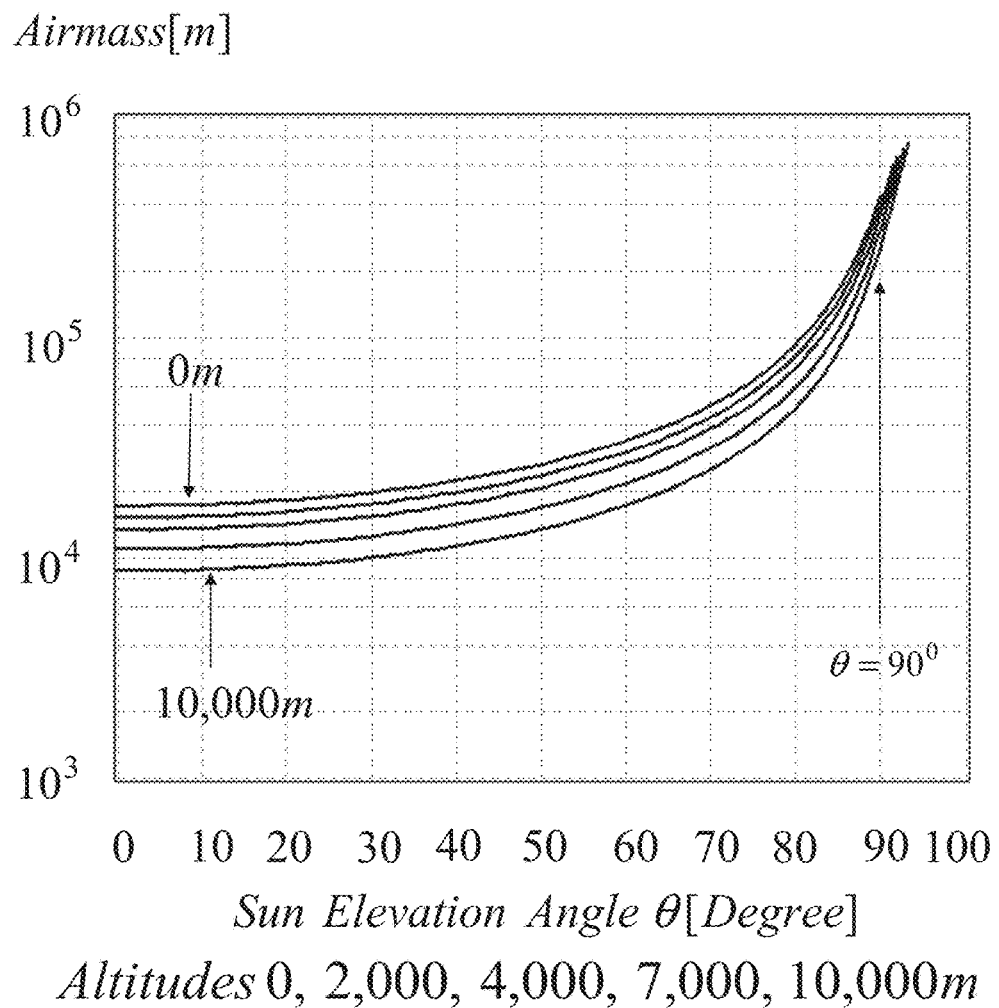
Fig.[37]

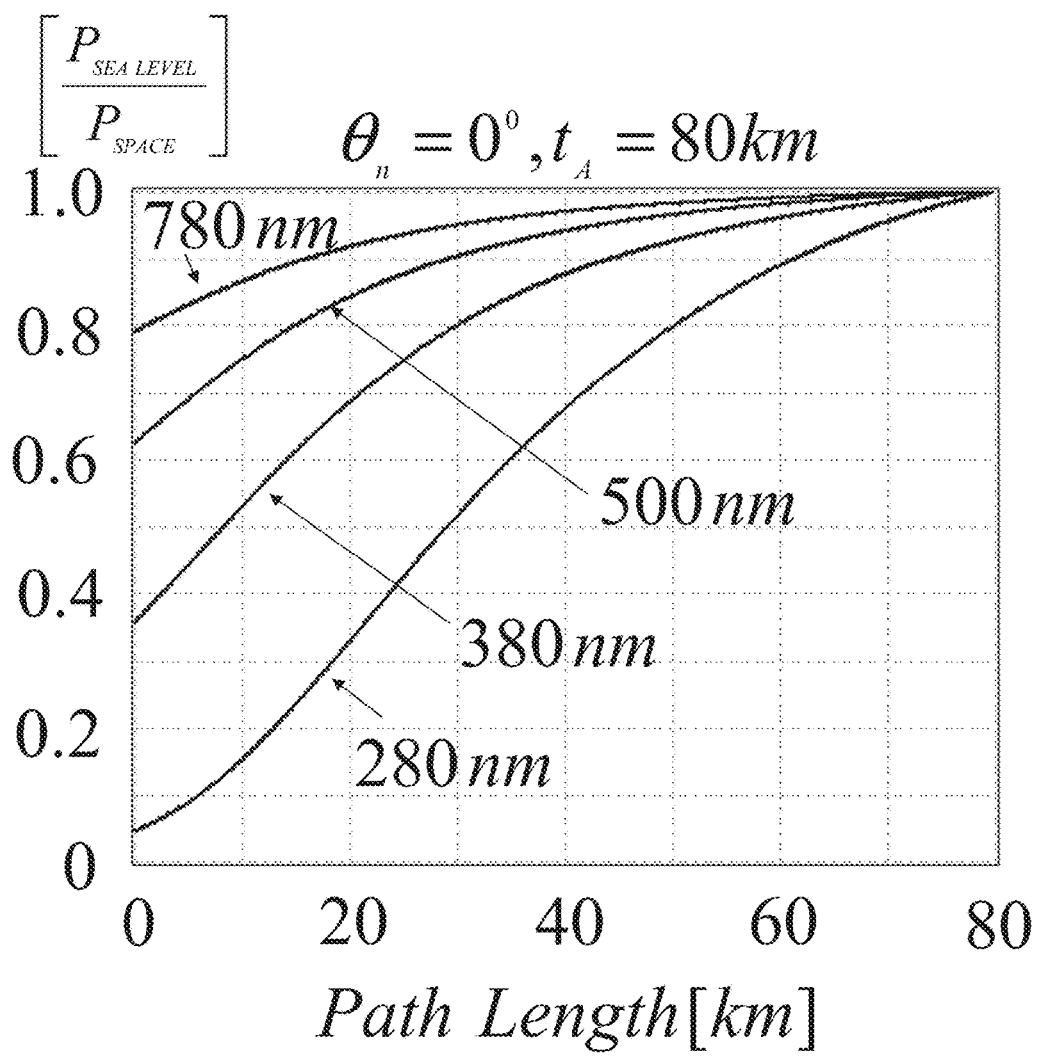
Fig.[38.1]

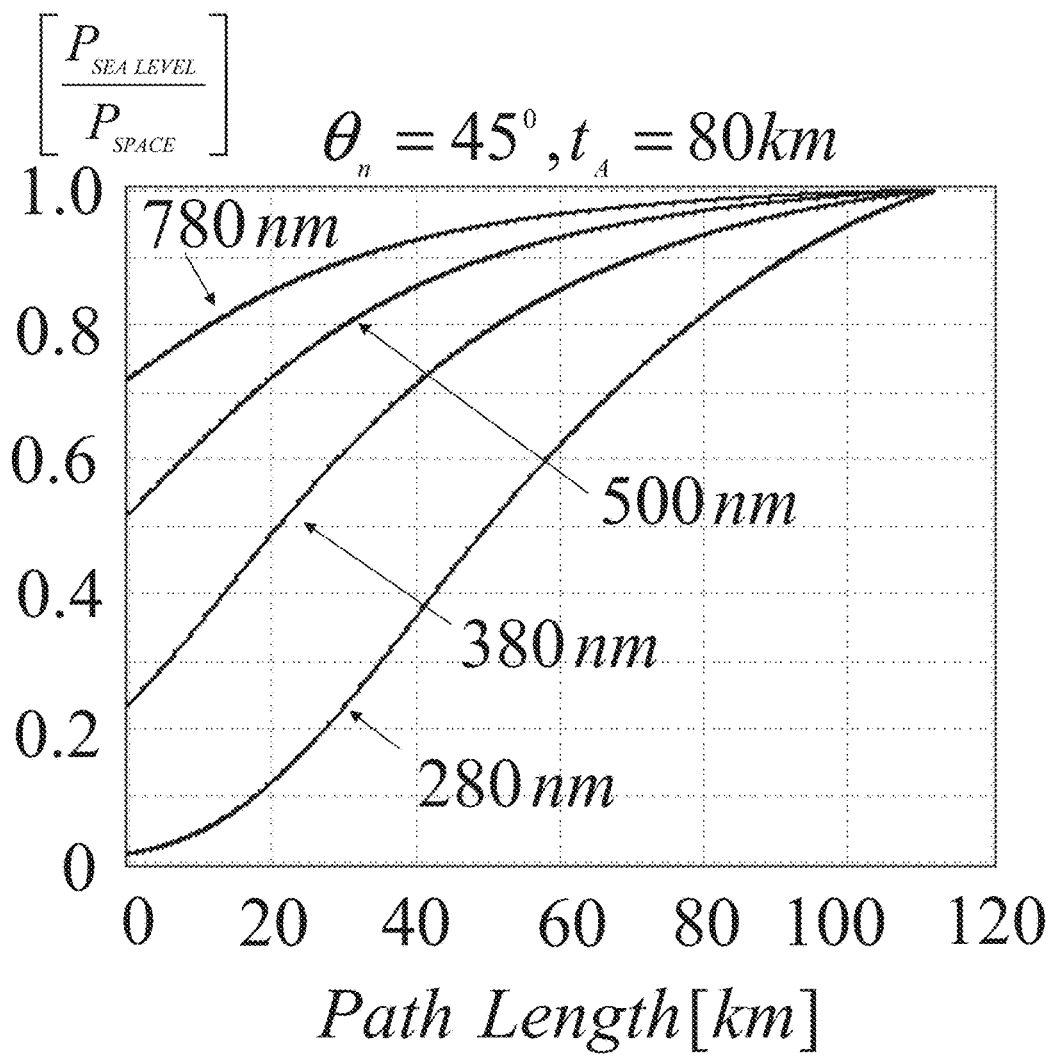
Fig.[38.2]

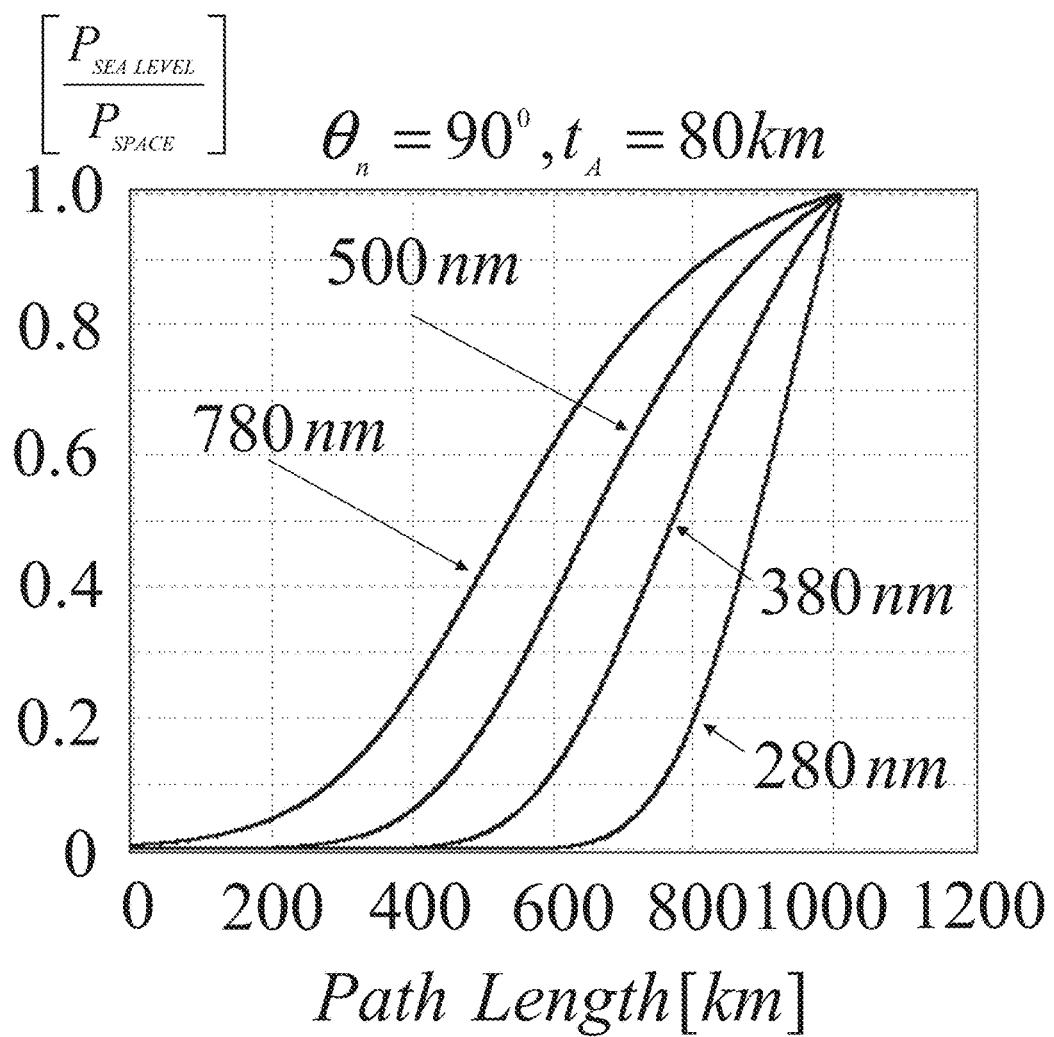
Fig.[38.3]

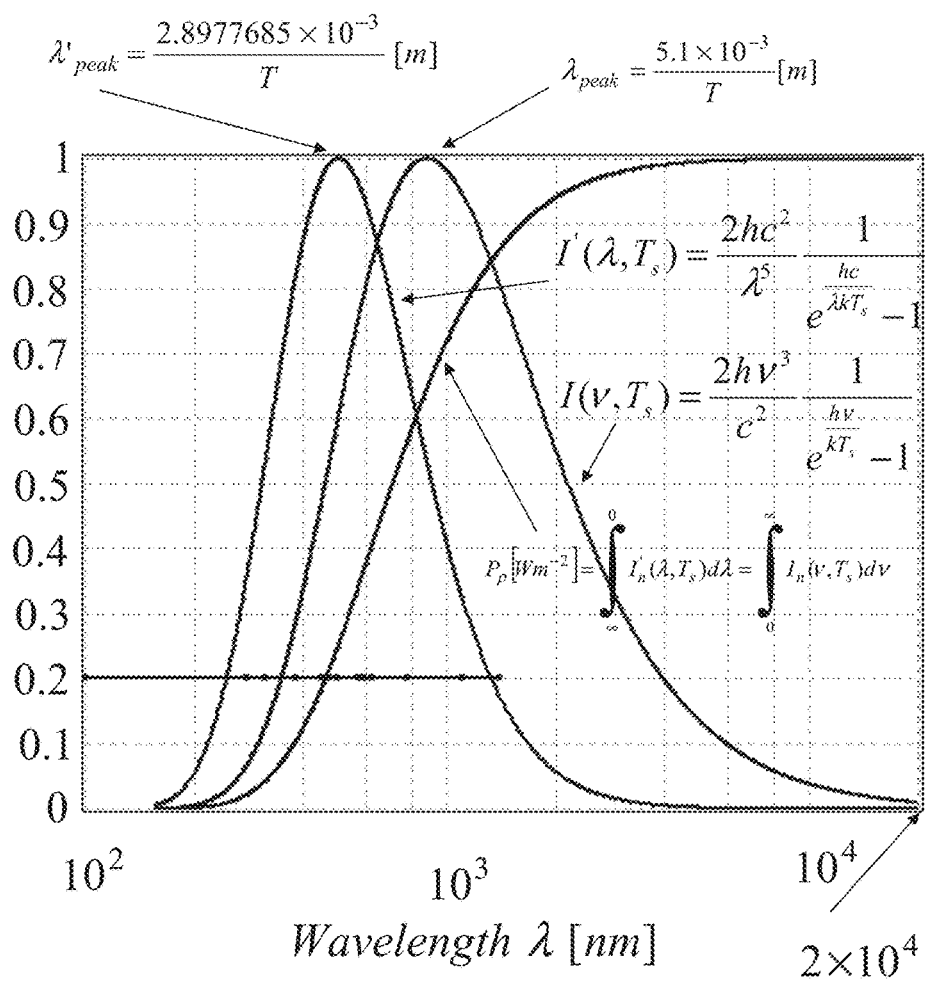
Fig.[39.1]

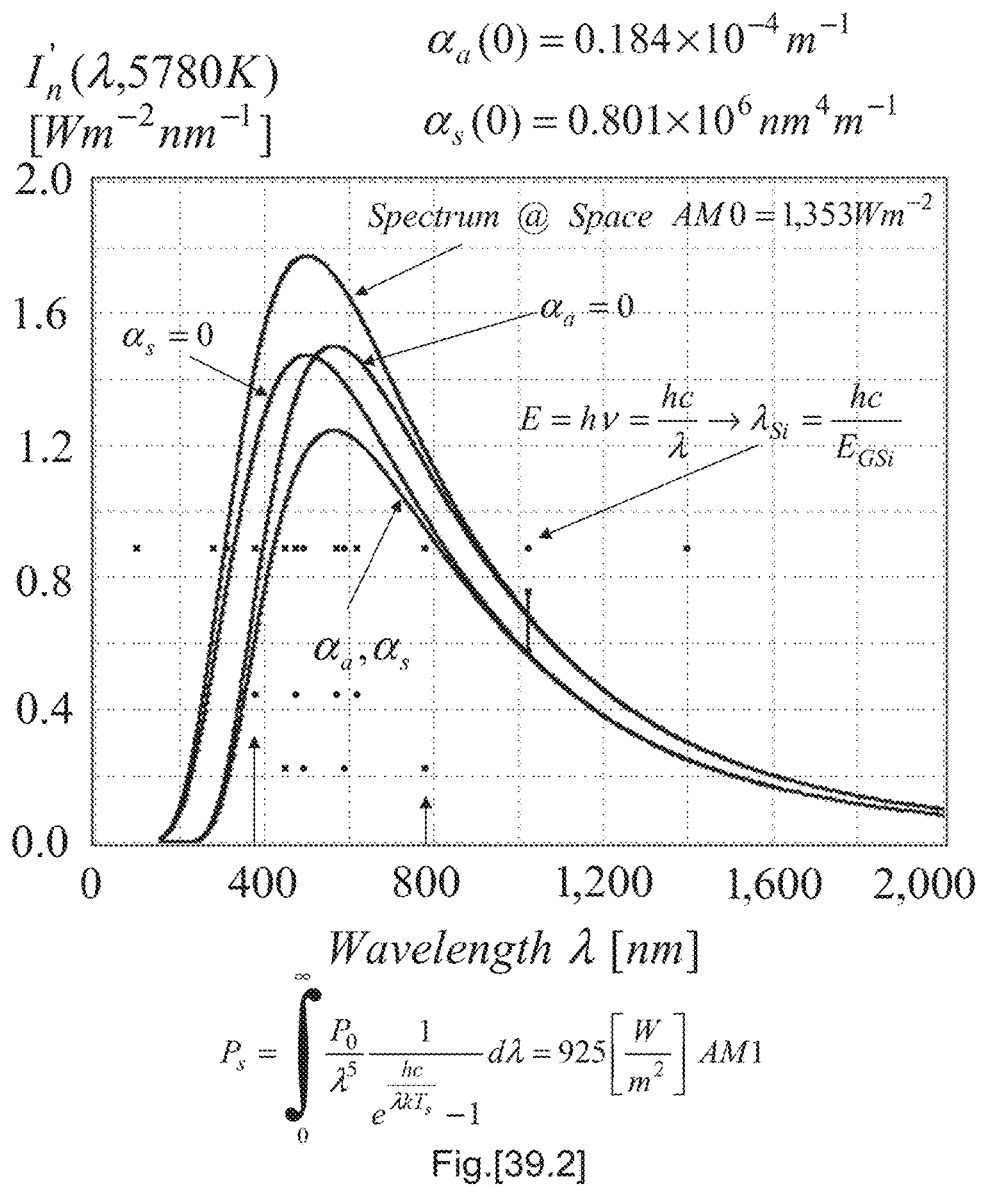
Fig.[39.2]

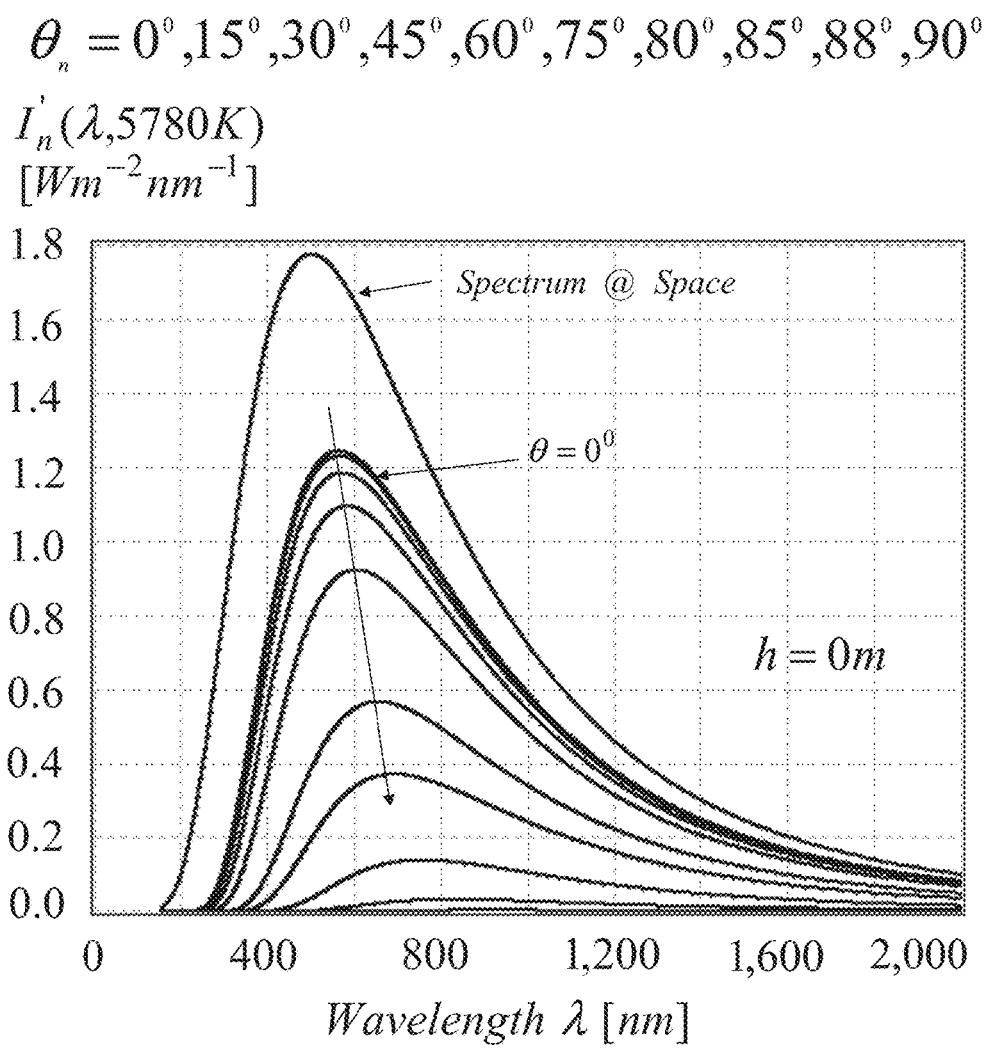
Fig.[40]

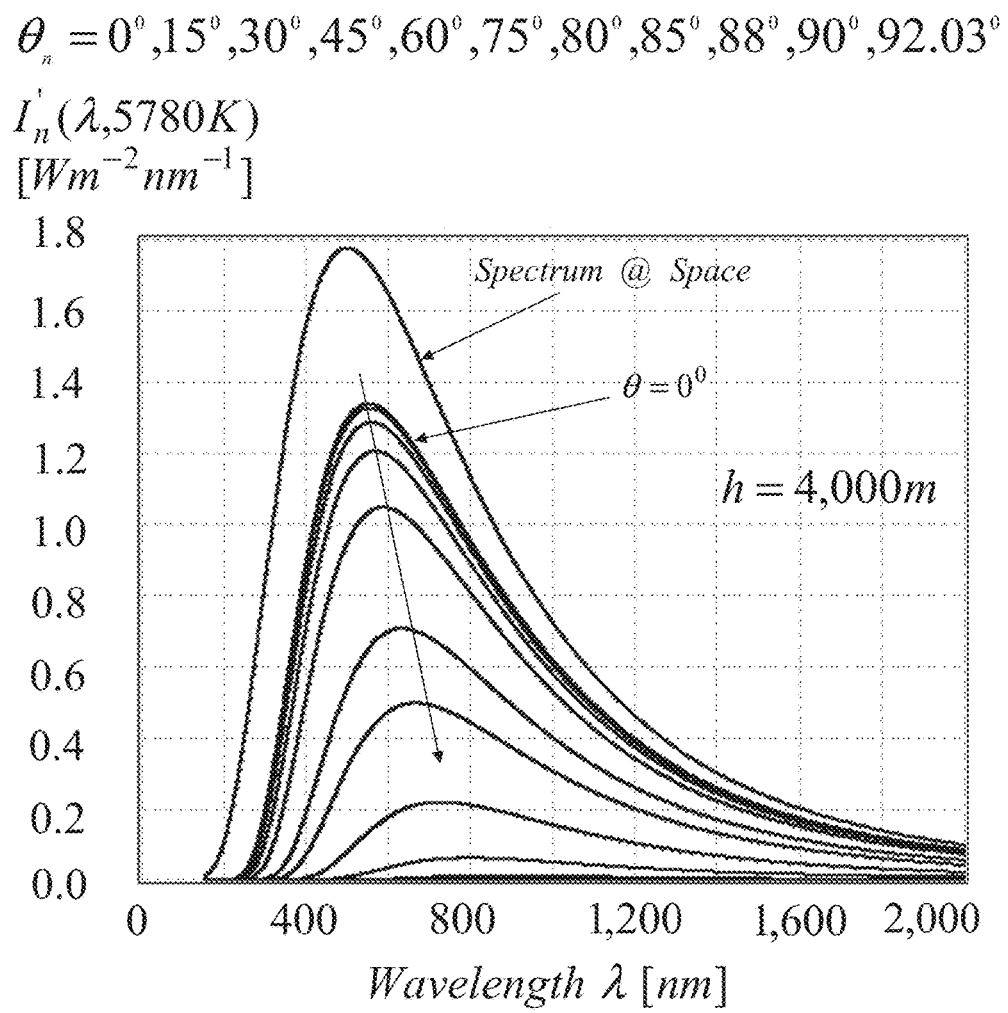
Fig.[41]

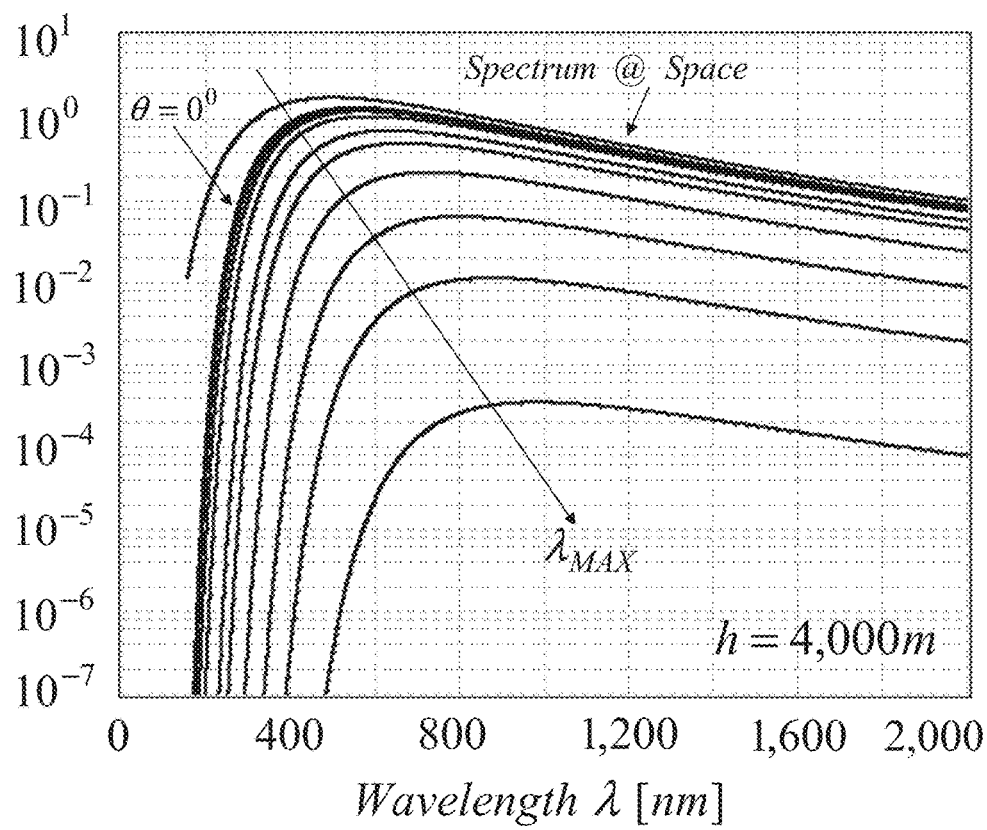
Fig.[42]

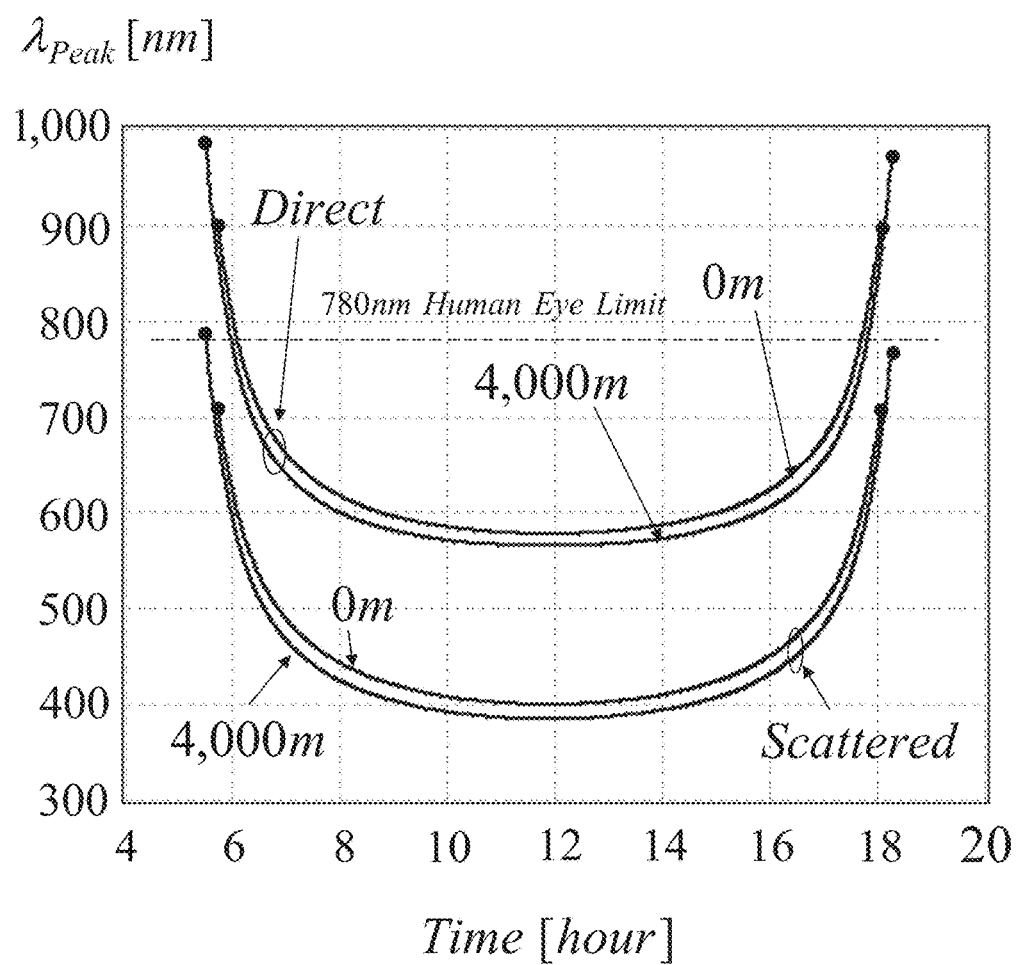
Fig.[43]

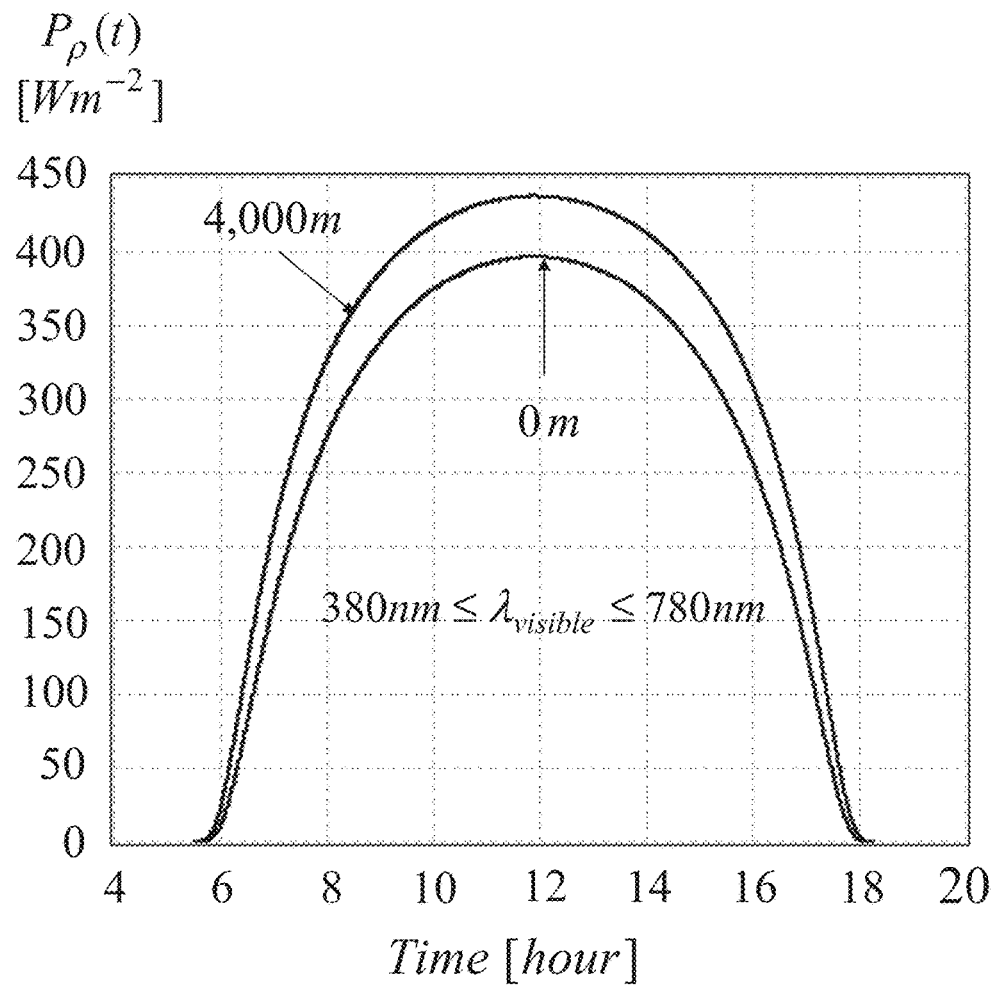
Fig.[44]

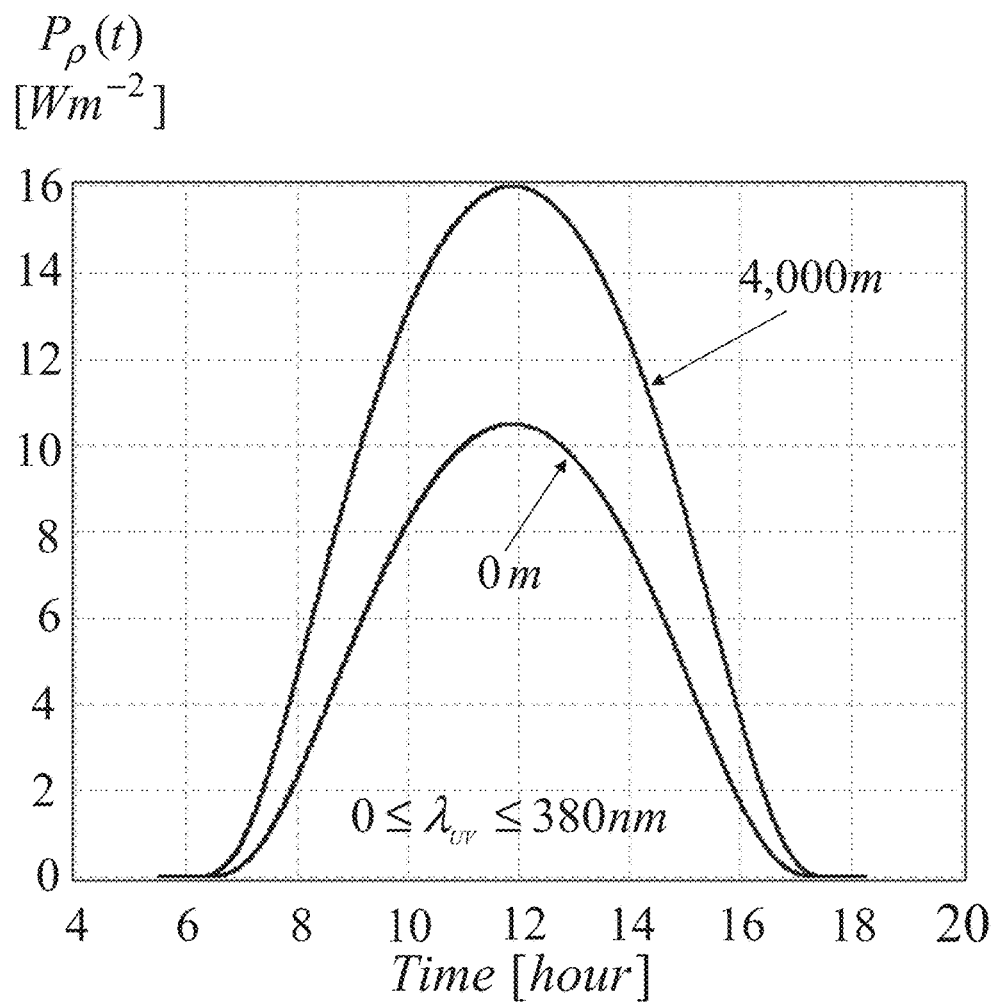
Fig.[45]

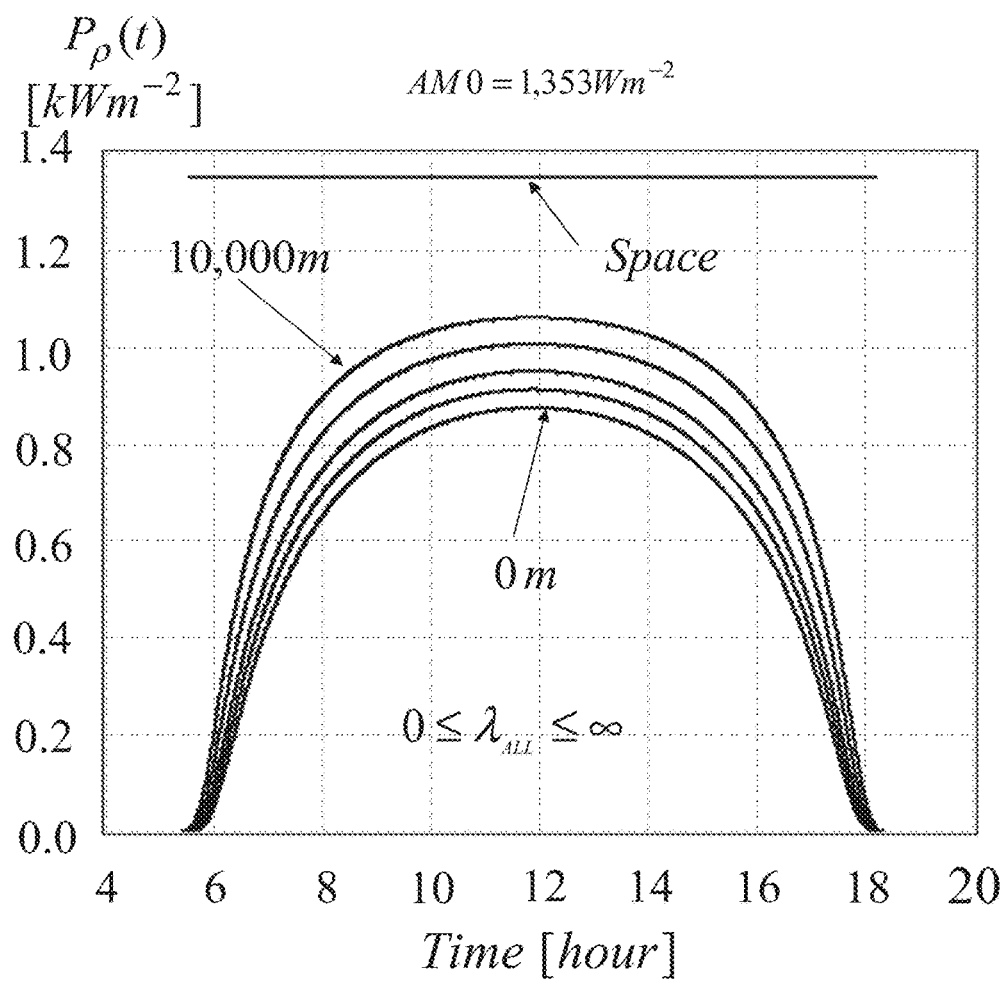
Fig.[46]

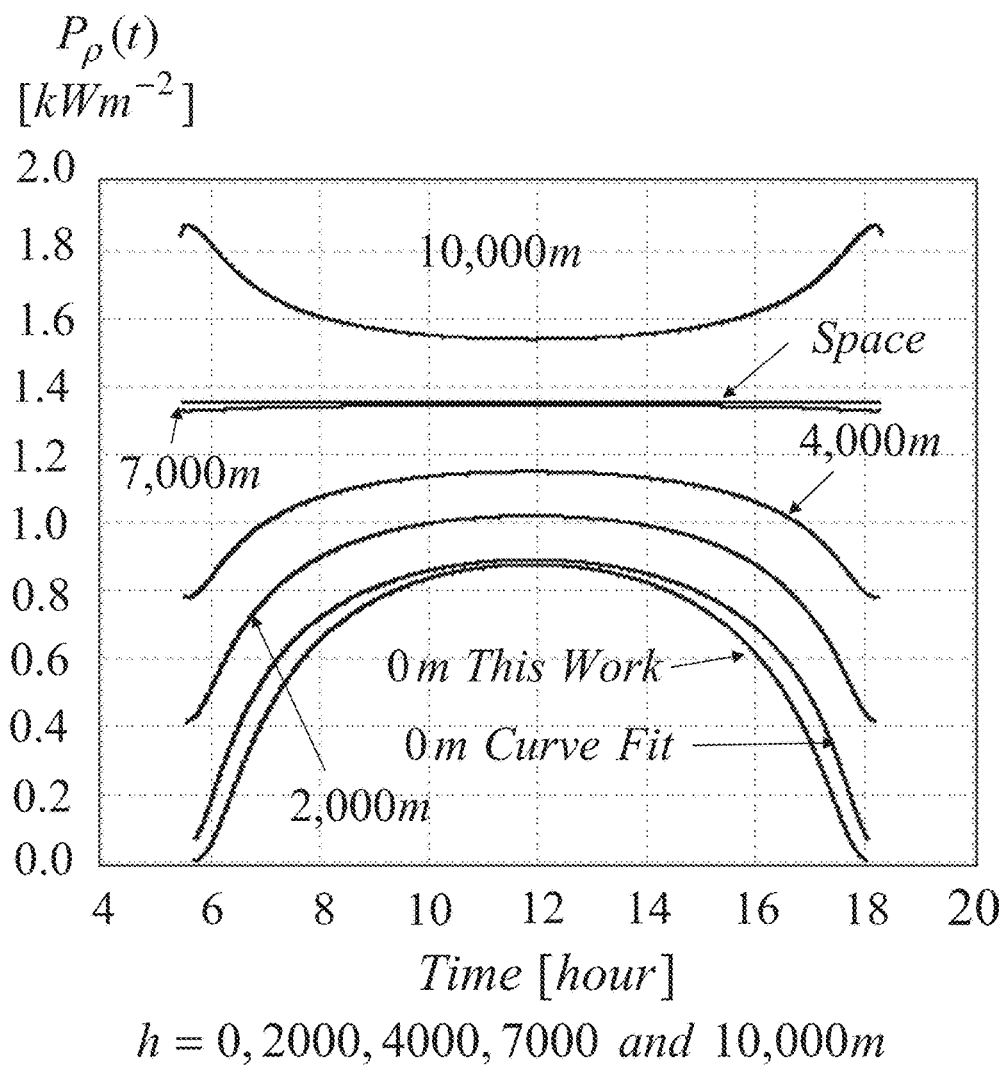
Fig.[47]

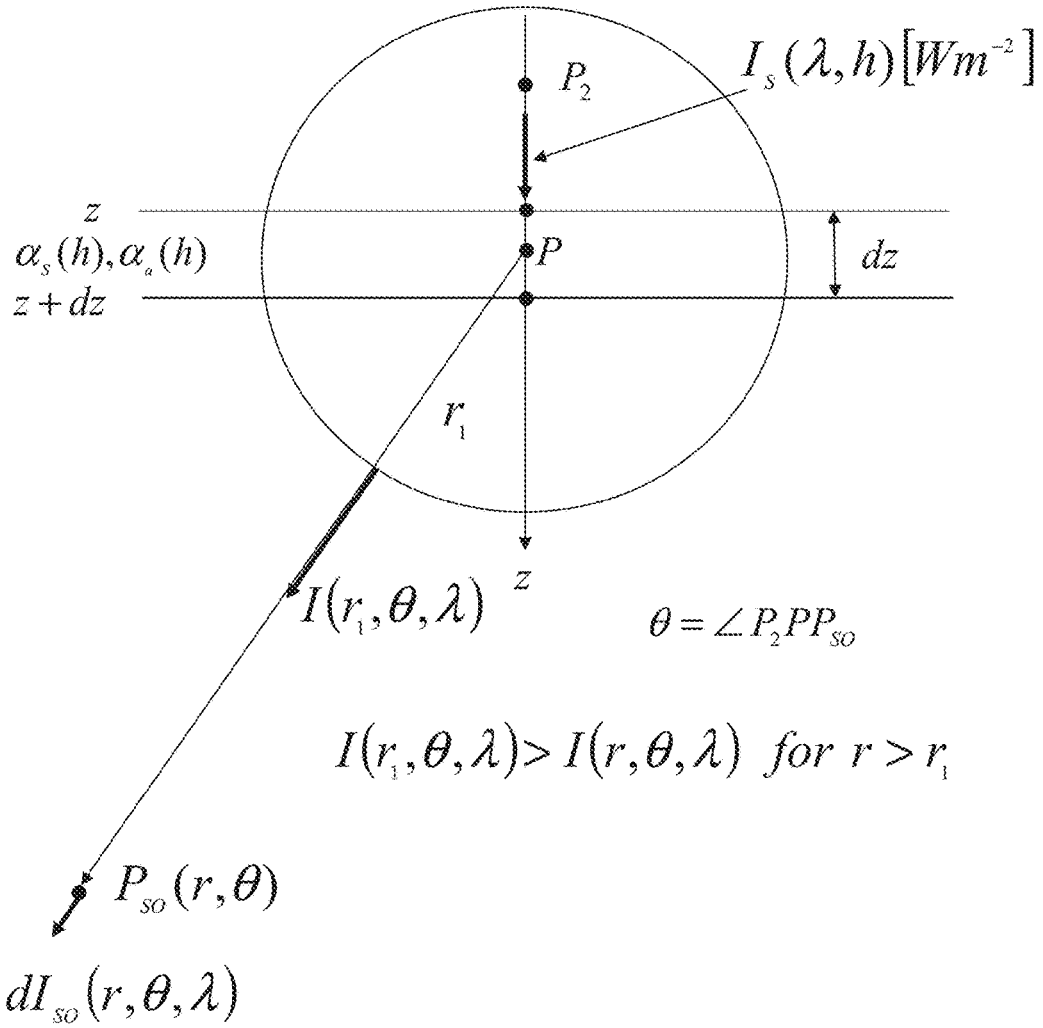
Fig.[48]

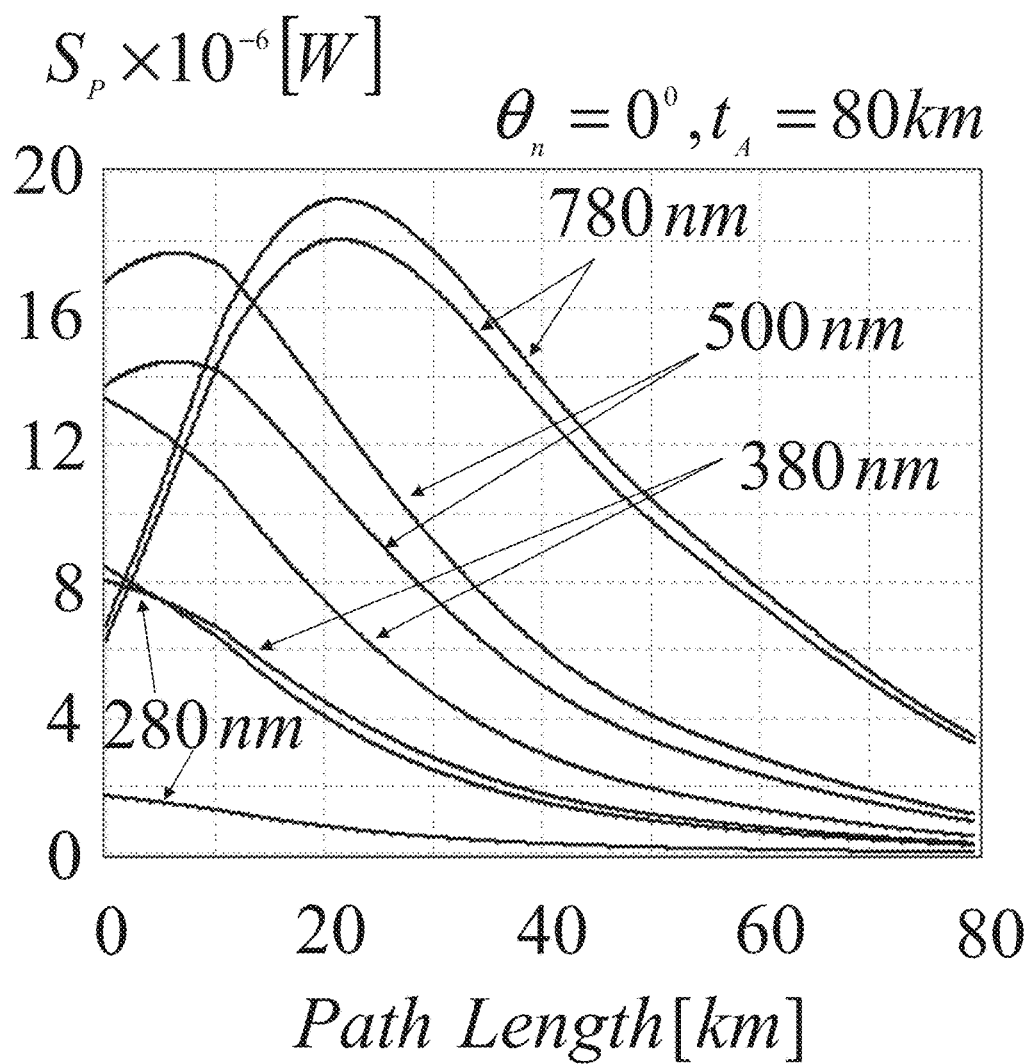
Fig.[49]

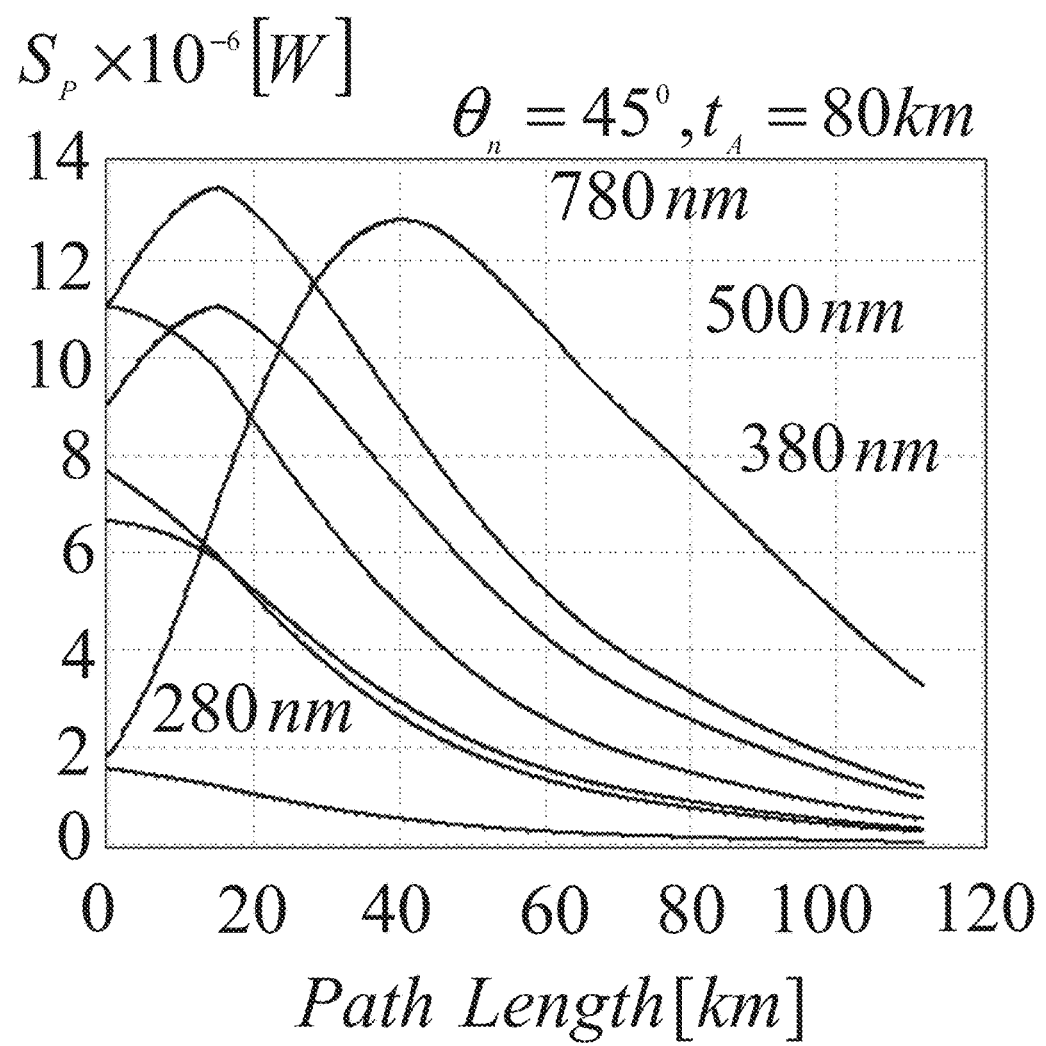
Fig.[50]

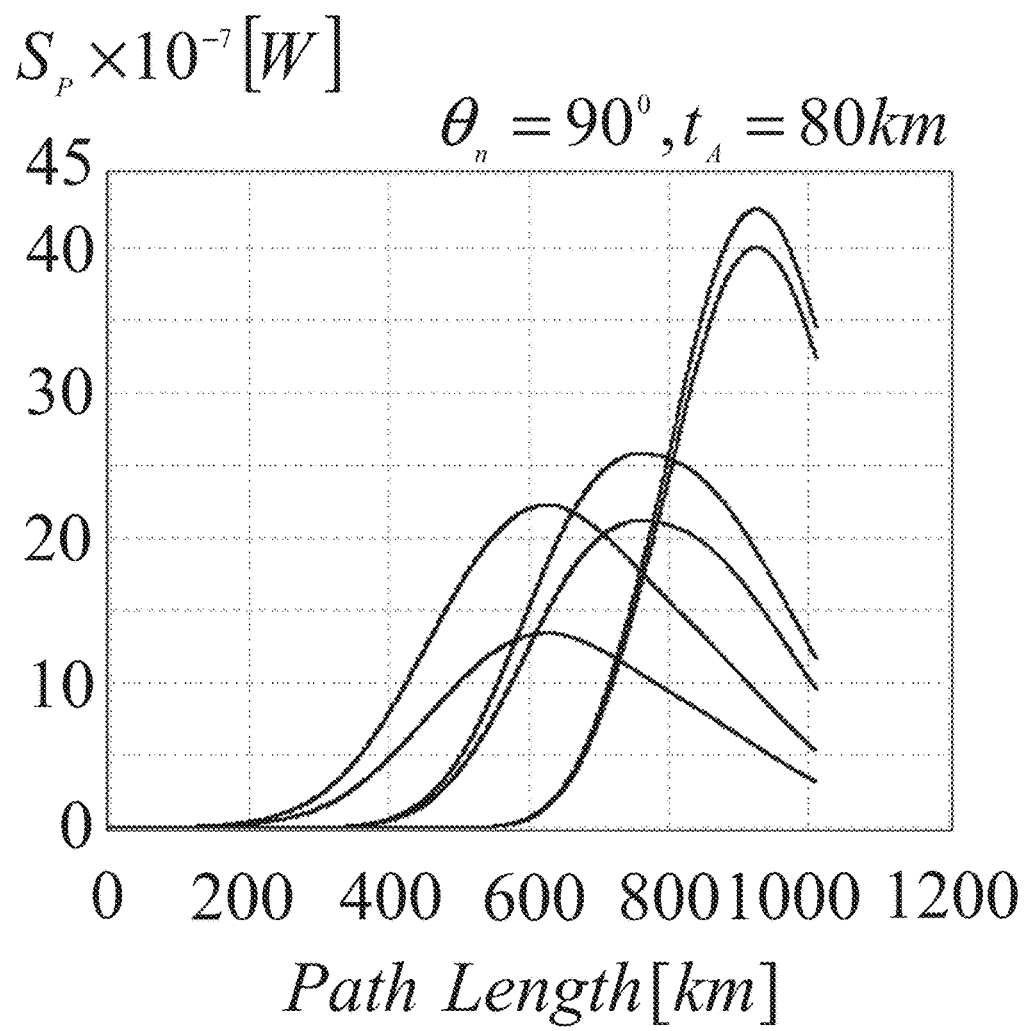
Fig.[51]

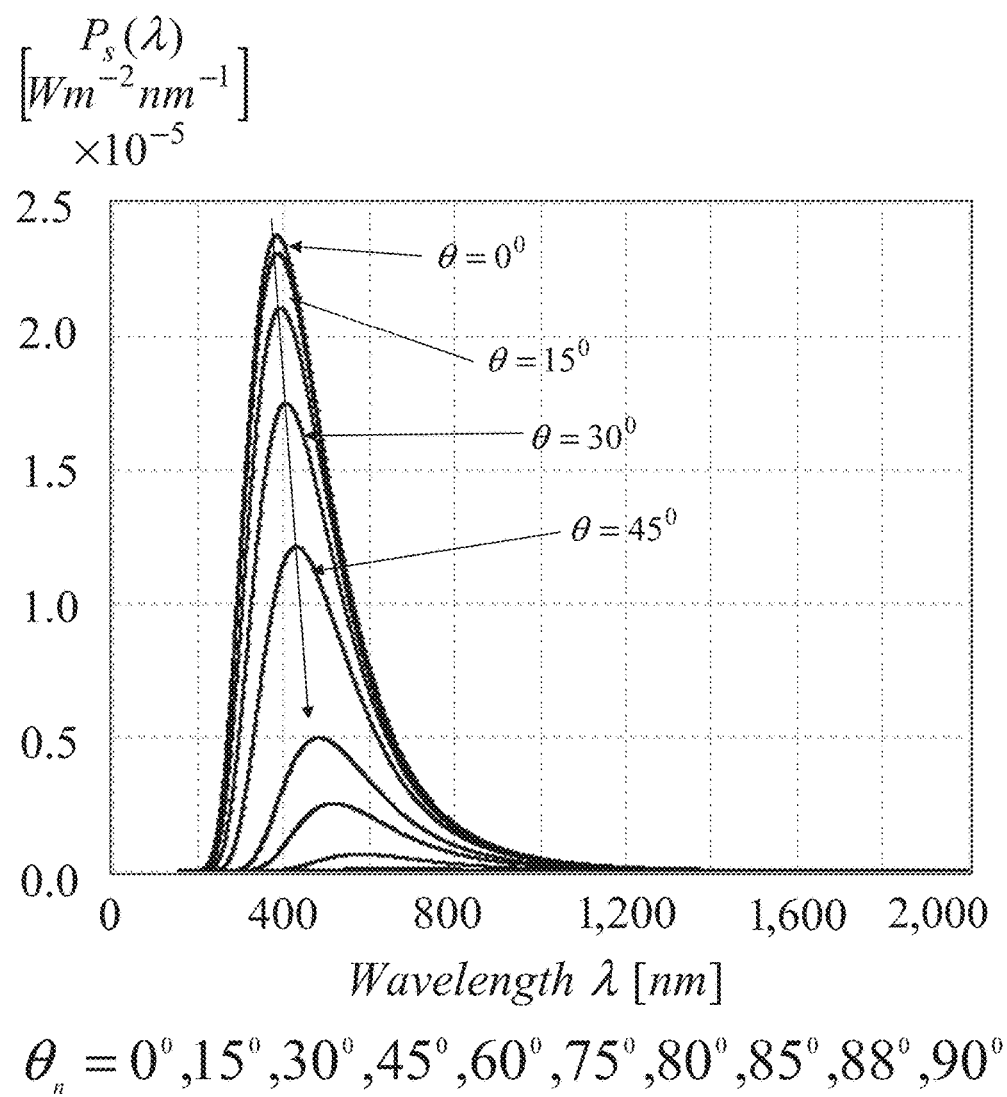
Fig.[52]

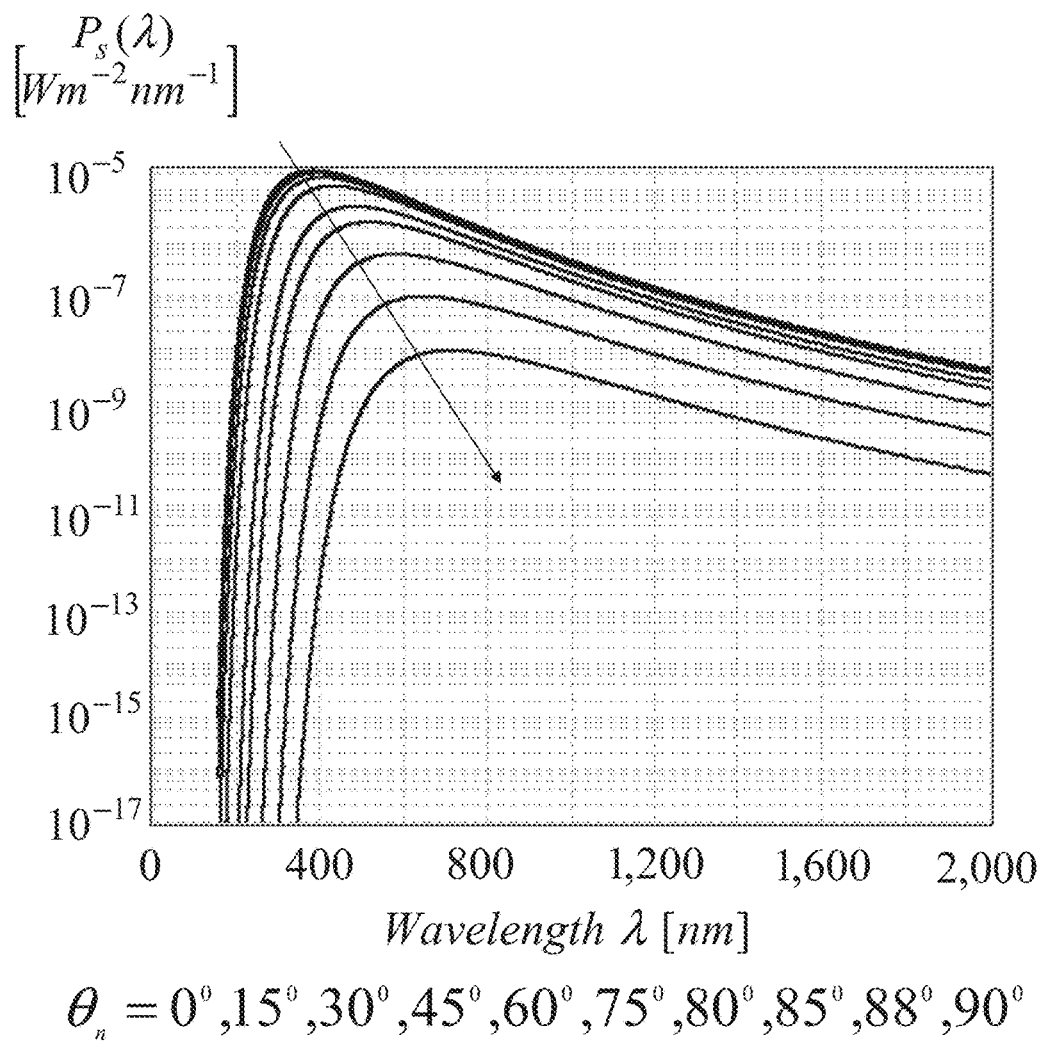
$\theta_n = 0°, 15°, 30°, 45°, 60°, 75°, 80°, 85°, 88°, 90°$
Fig.[53]

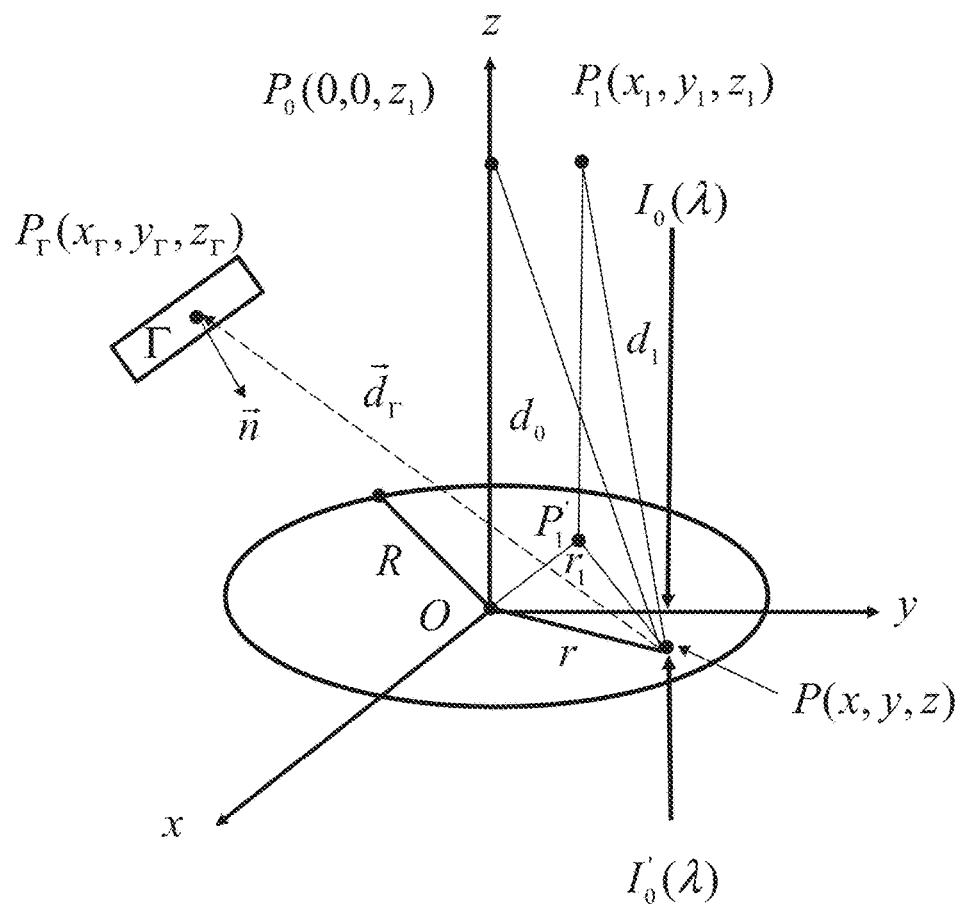
Fig.[54]

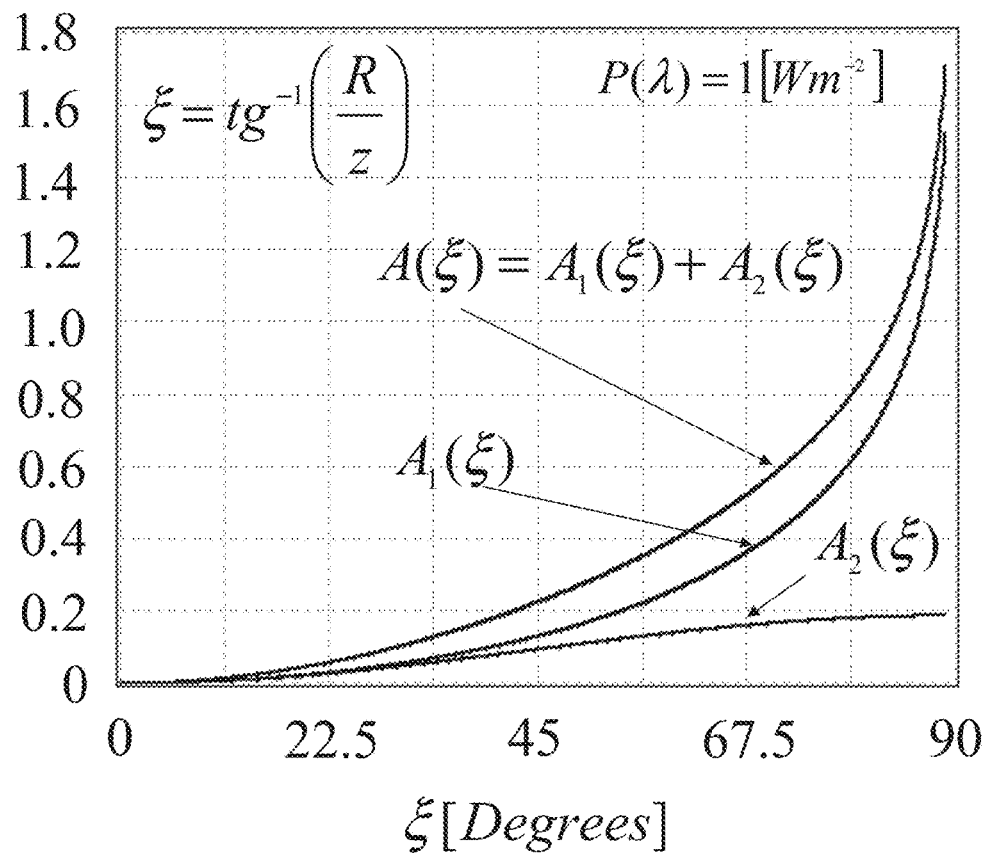
Fig.[54.1]

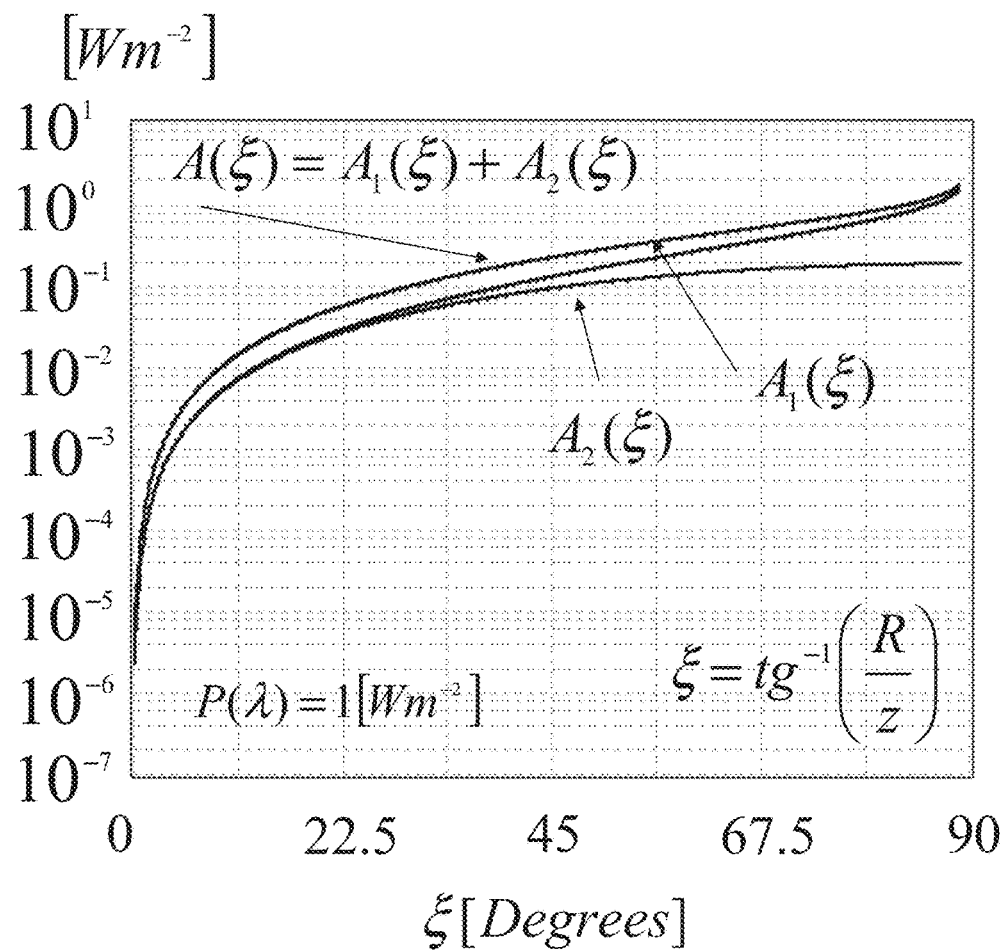
Fig.[54.2]

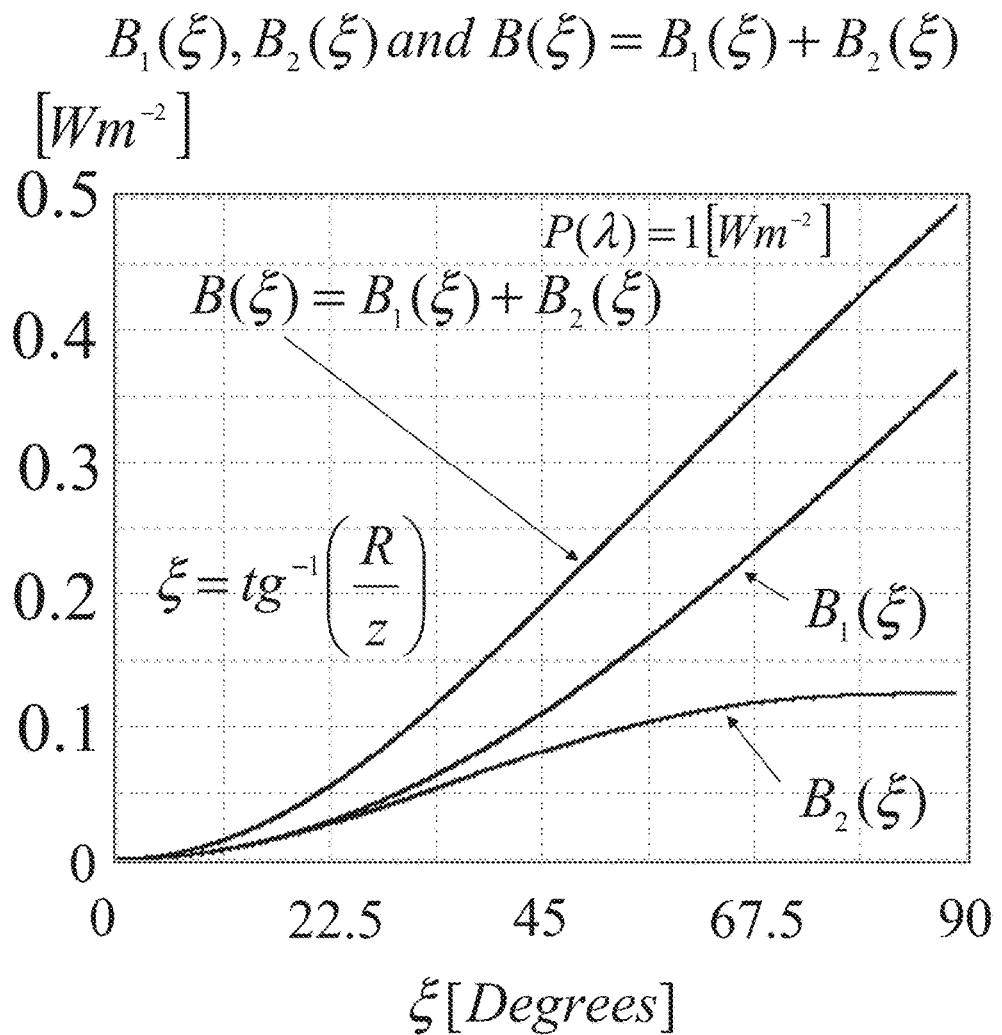
Fig.[54.3]

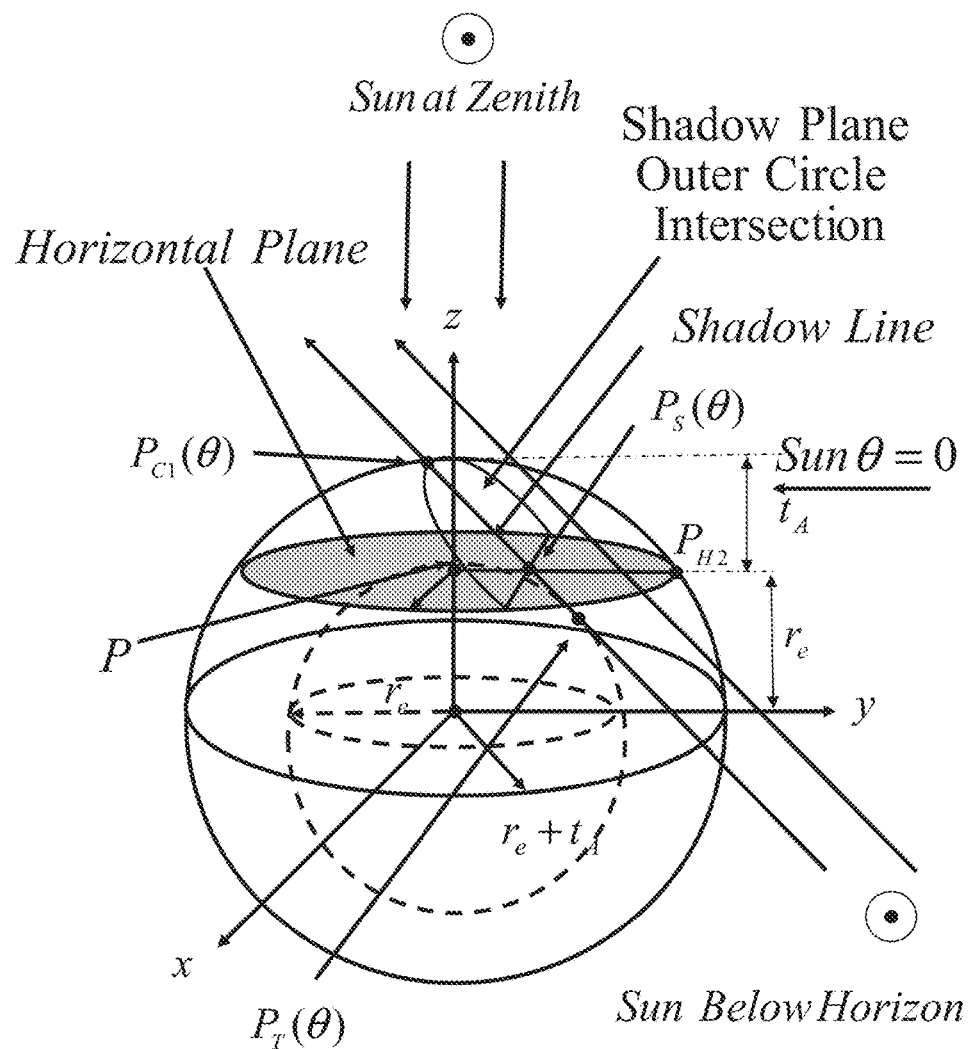
Fig.[55]

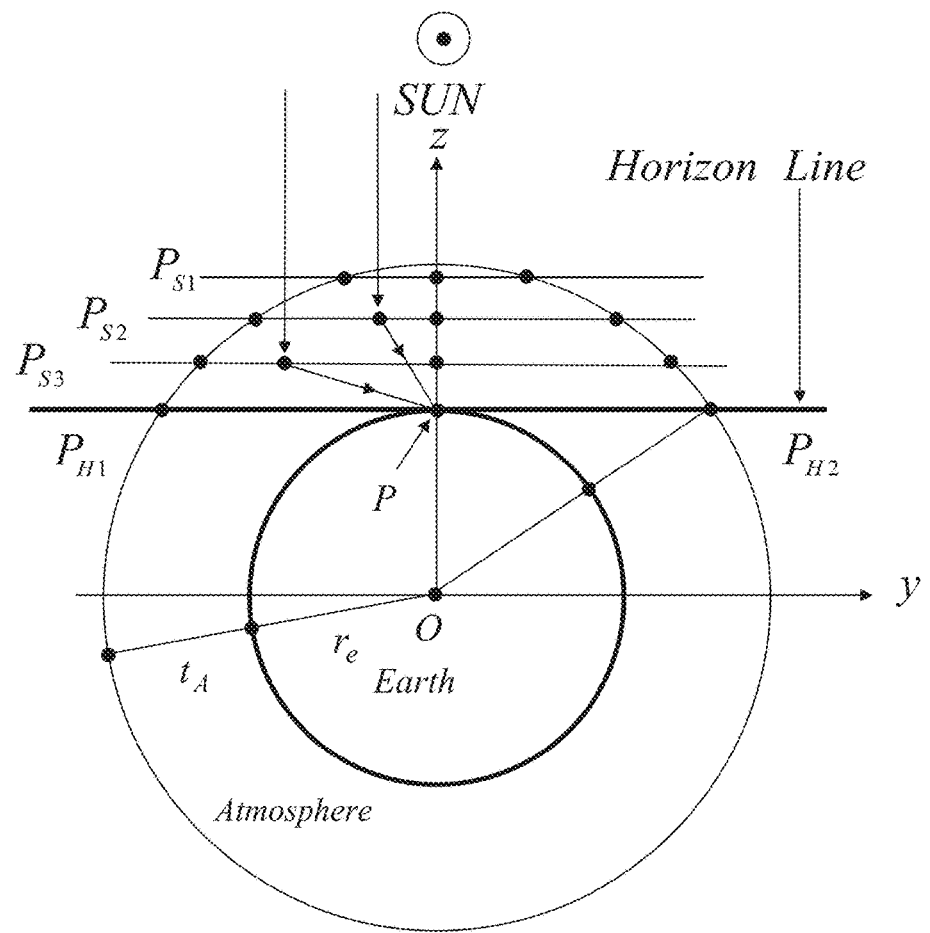
Fig.[56.1]

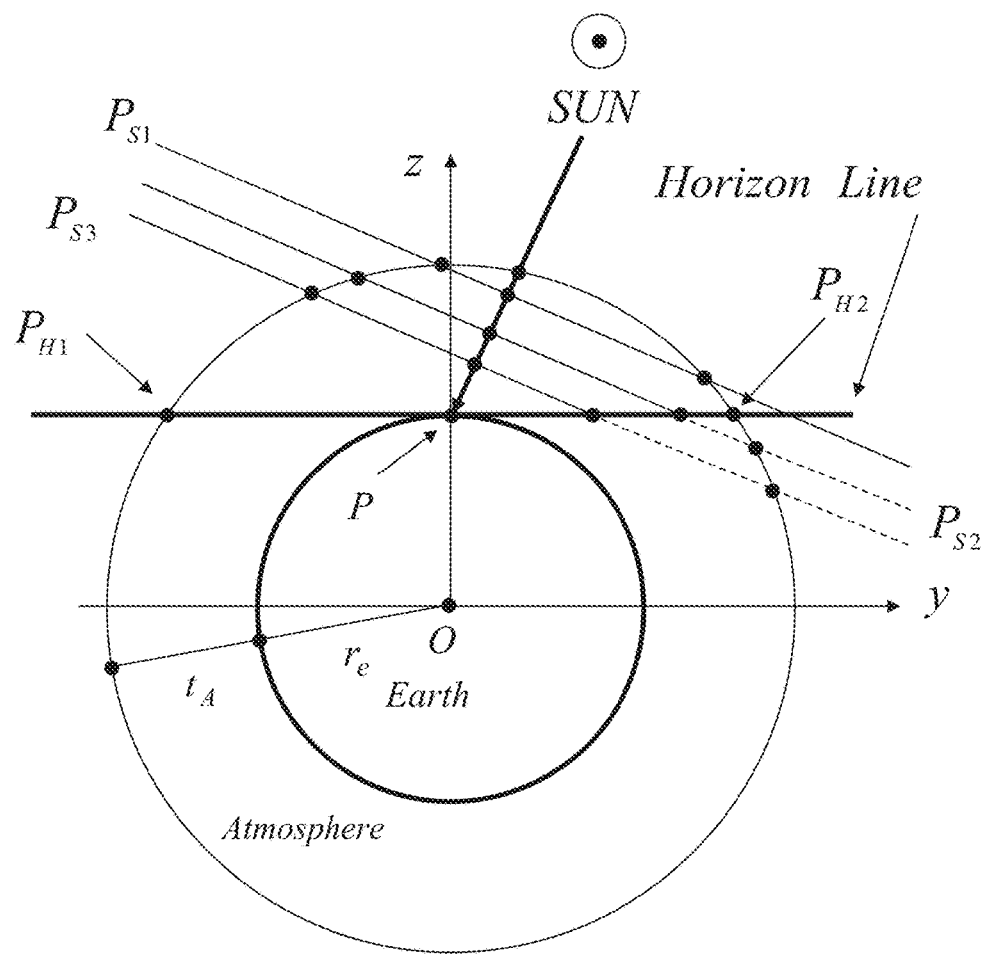
Fig.[56.2]

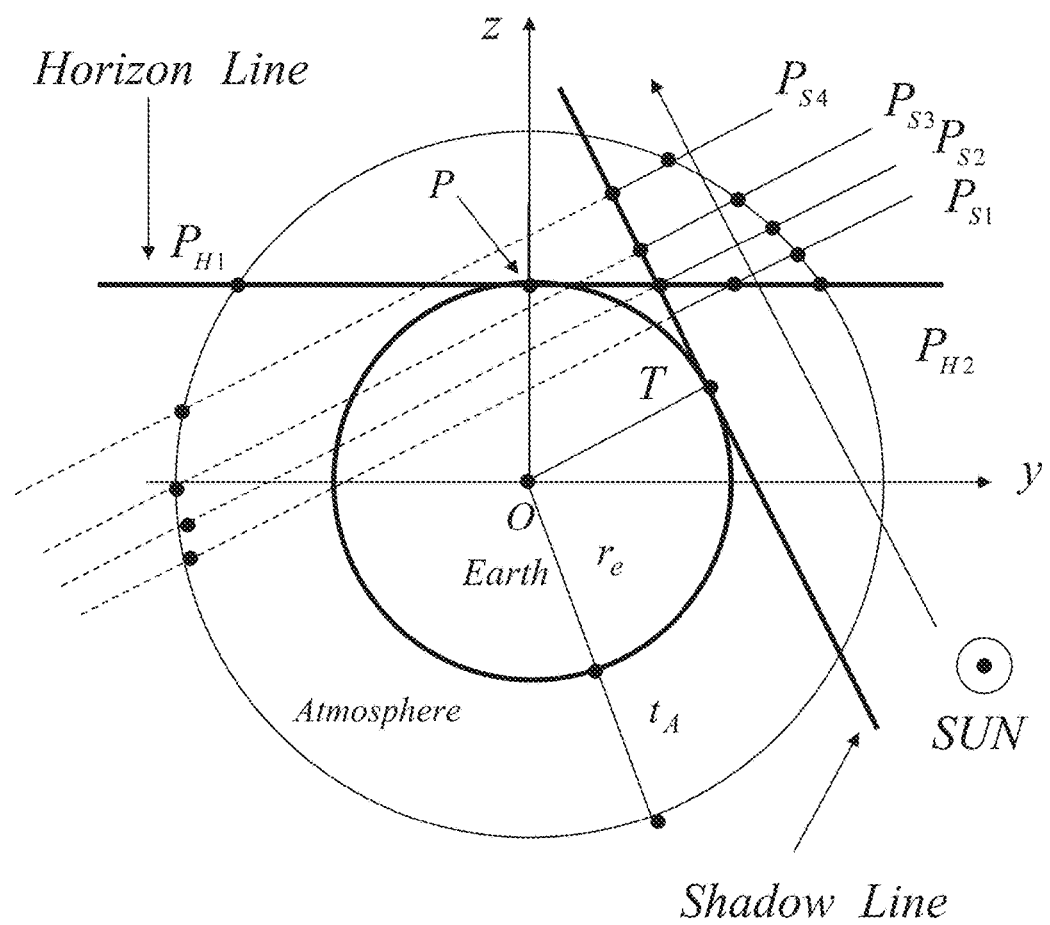
Fig.[56.3]

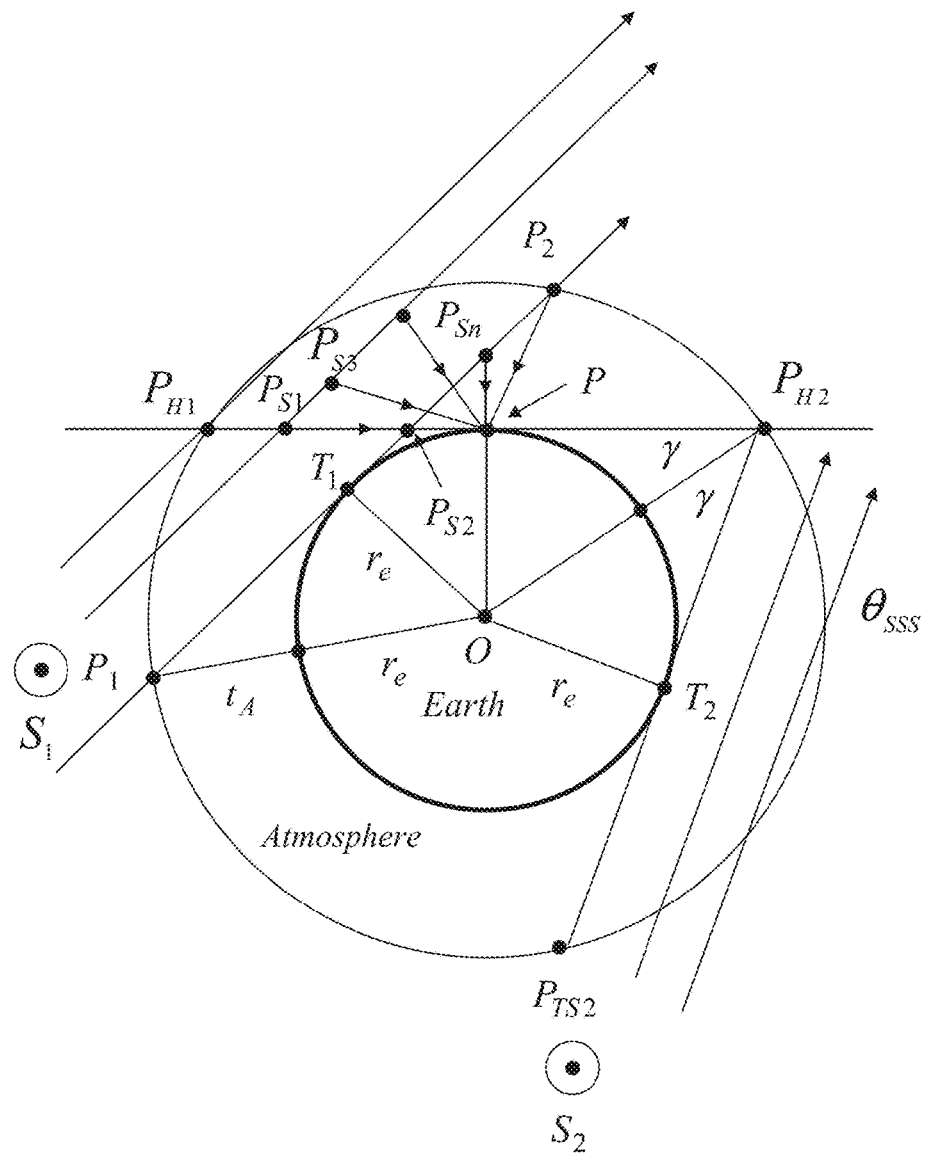
Fig.[57.1]

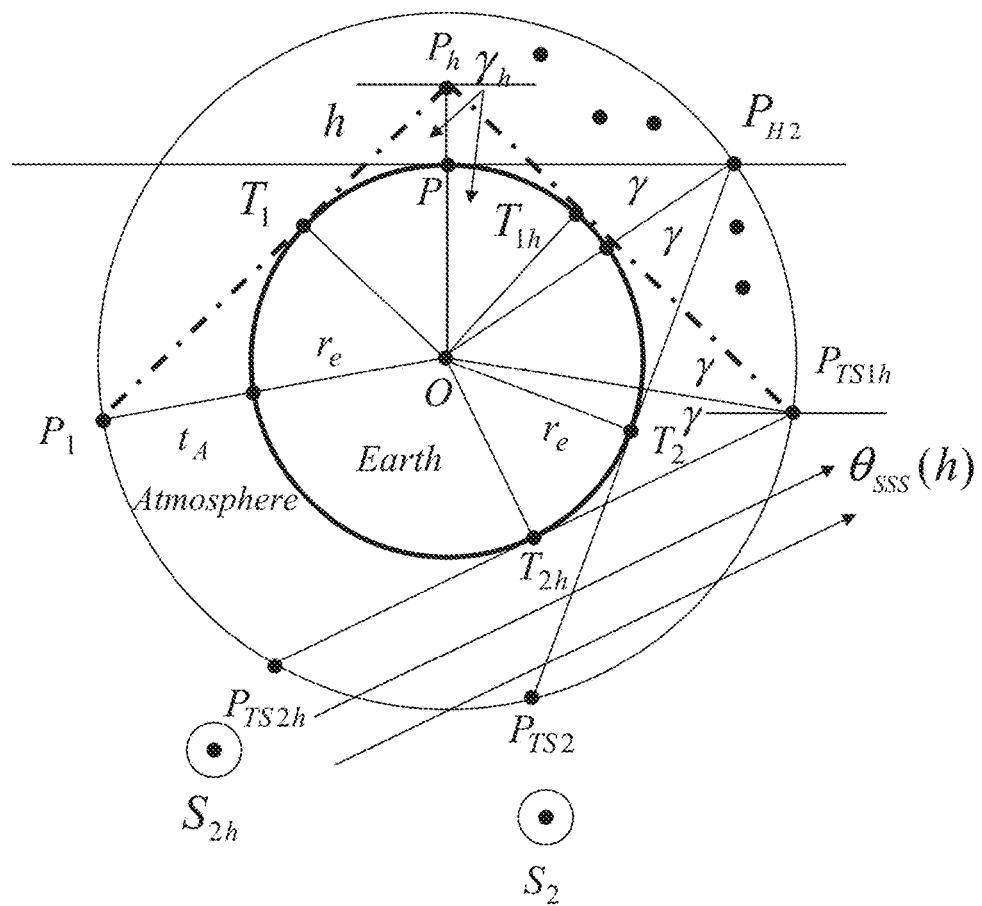
Fig.[57.2]

Scattered Sunrise / Sunset Angle $\theta_{SSS}$ Calculation for a given Altidude h
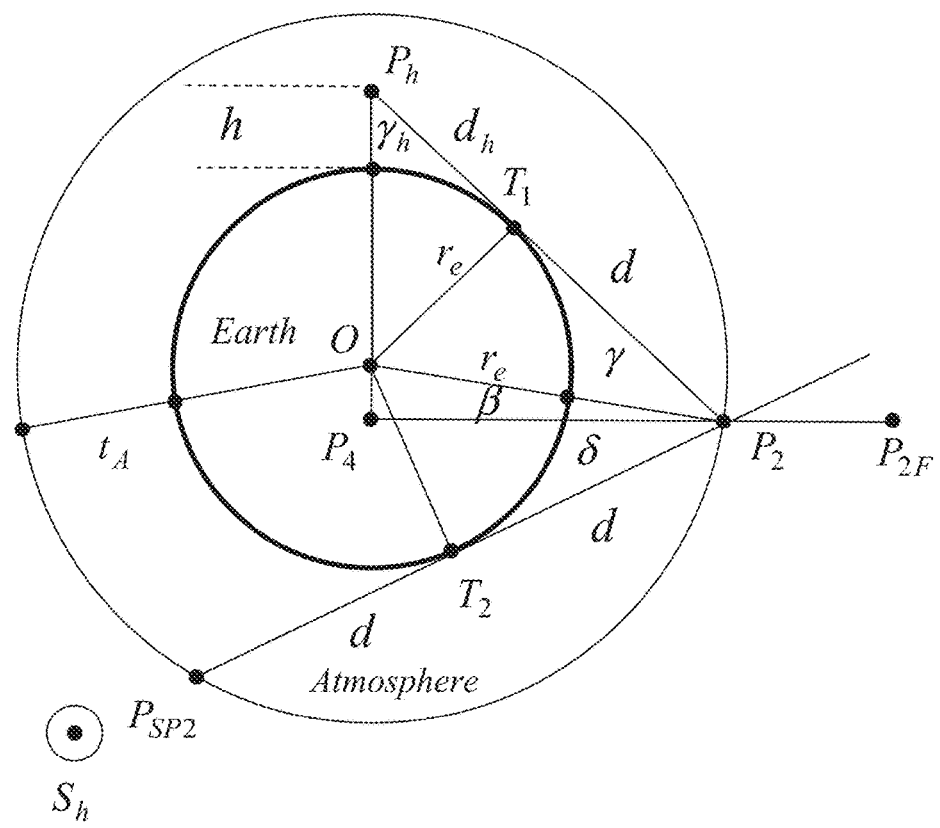
Fig.[58]

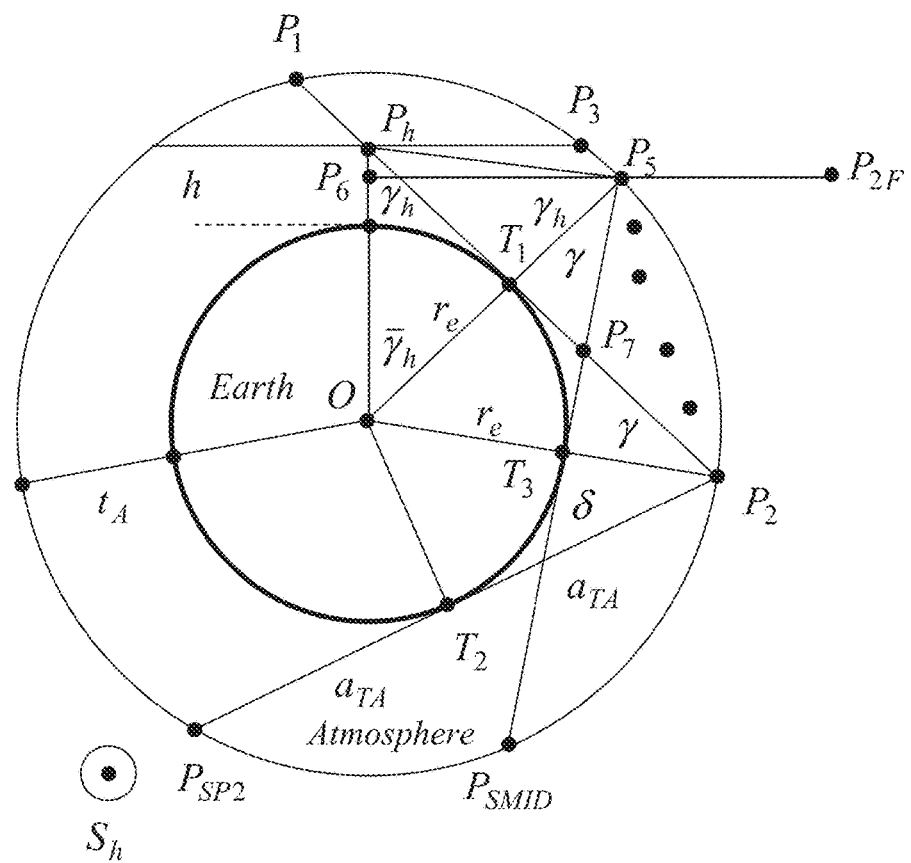
Fig.[59]

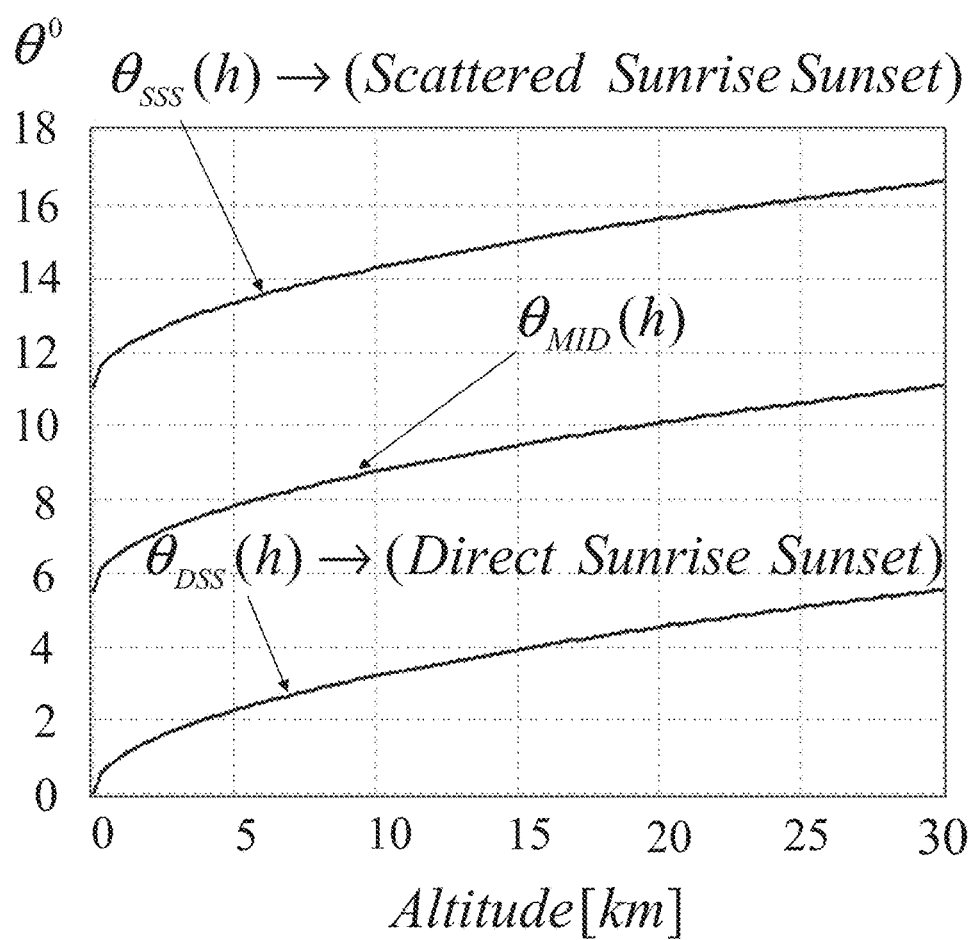
Fig.[60.1]

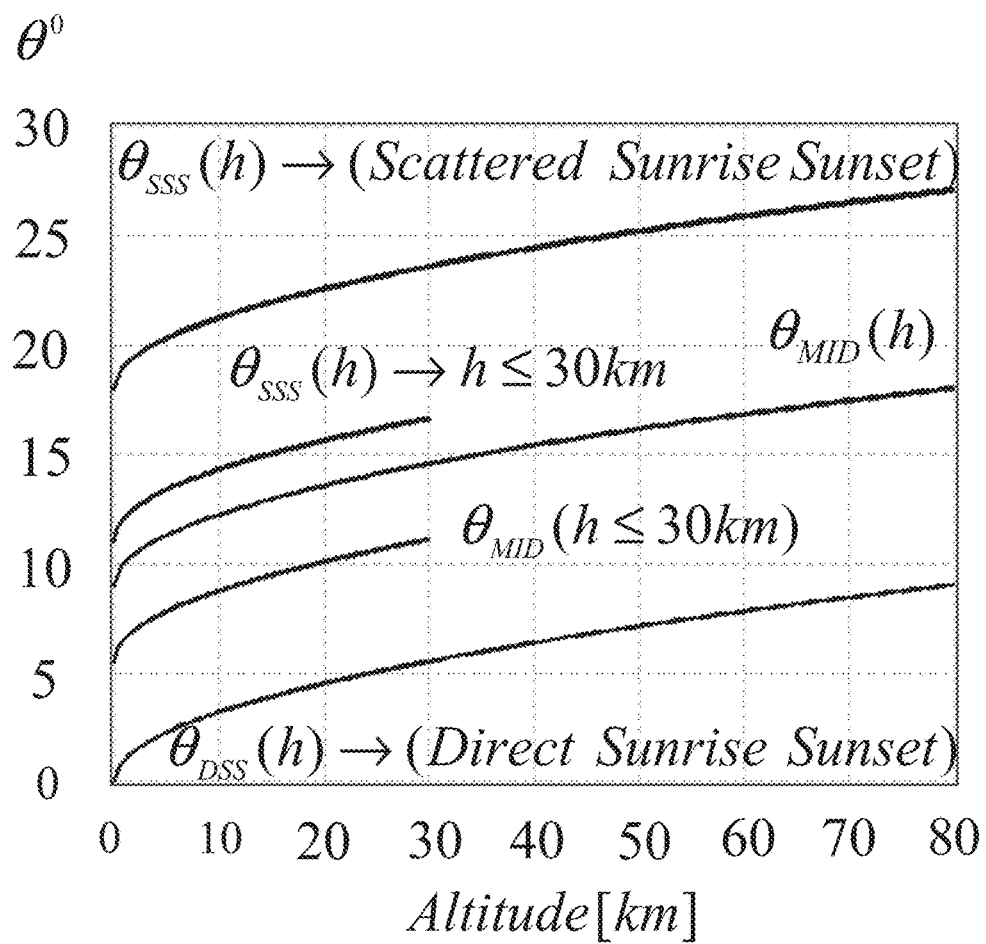
Fig.[60.2]

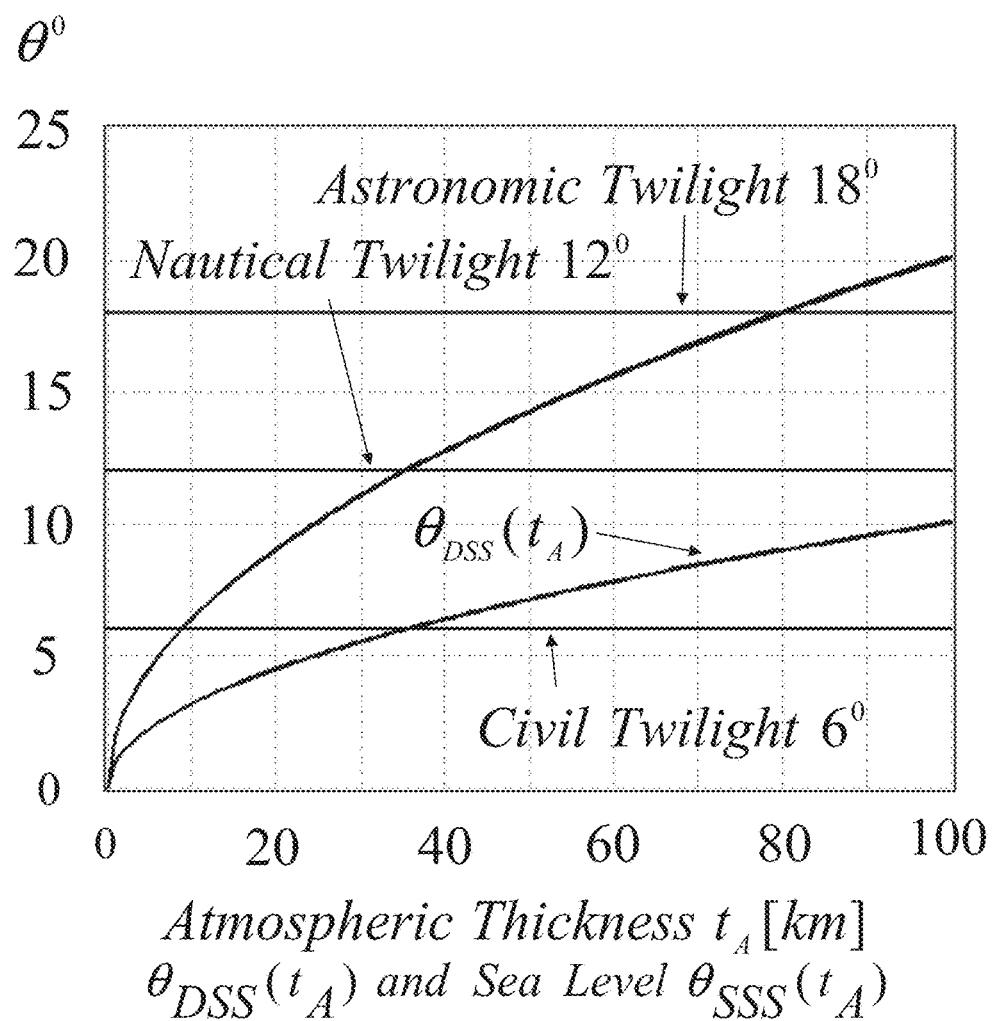
Fig.[61]

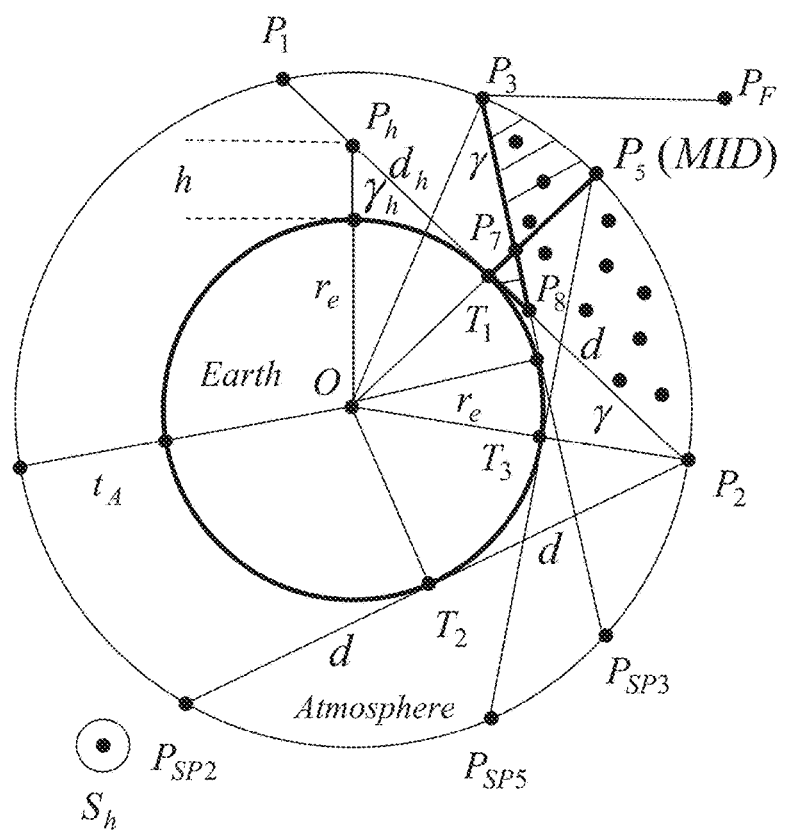
Fig.[62.1]

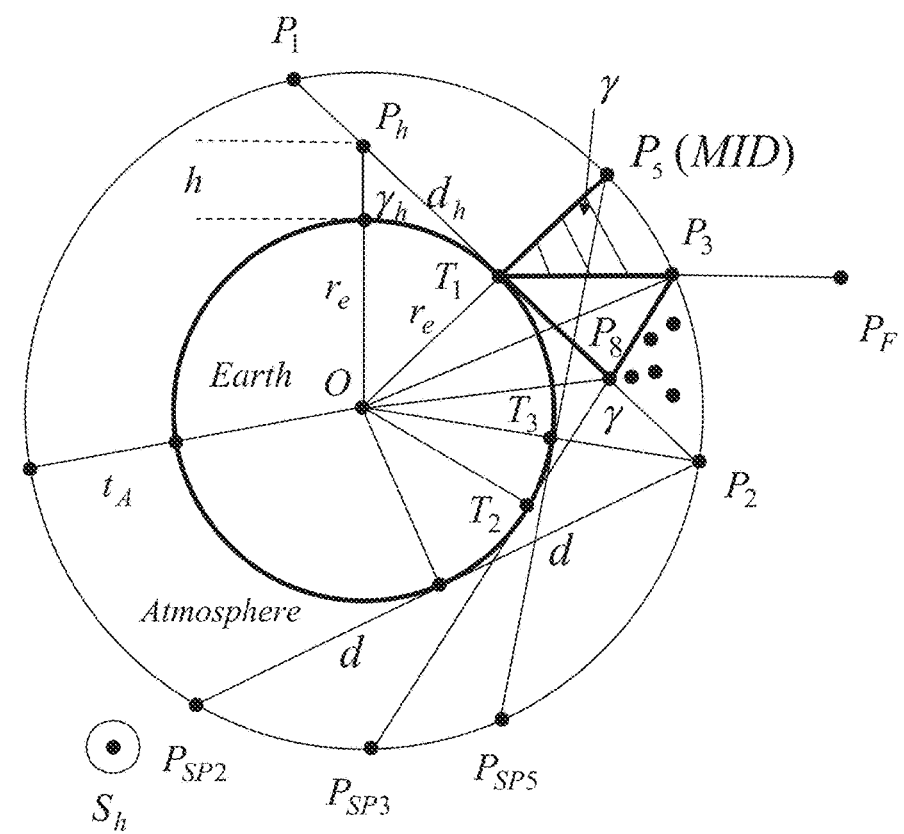
Fig.[62.2]

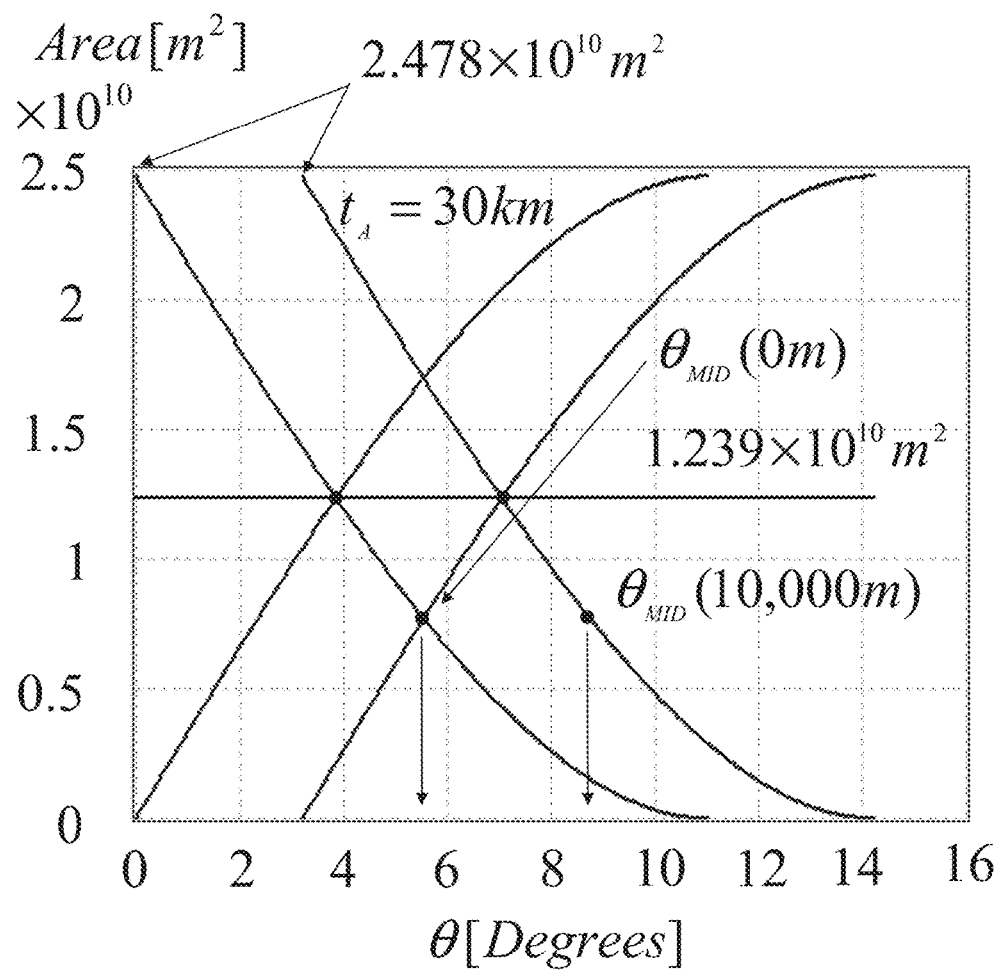
Fig.[63]

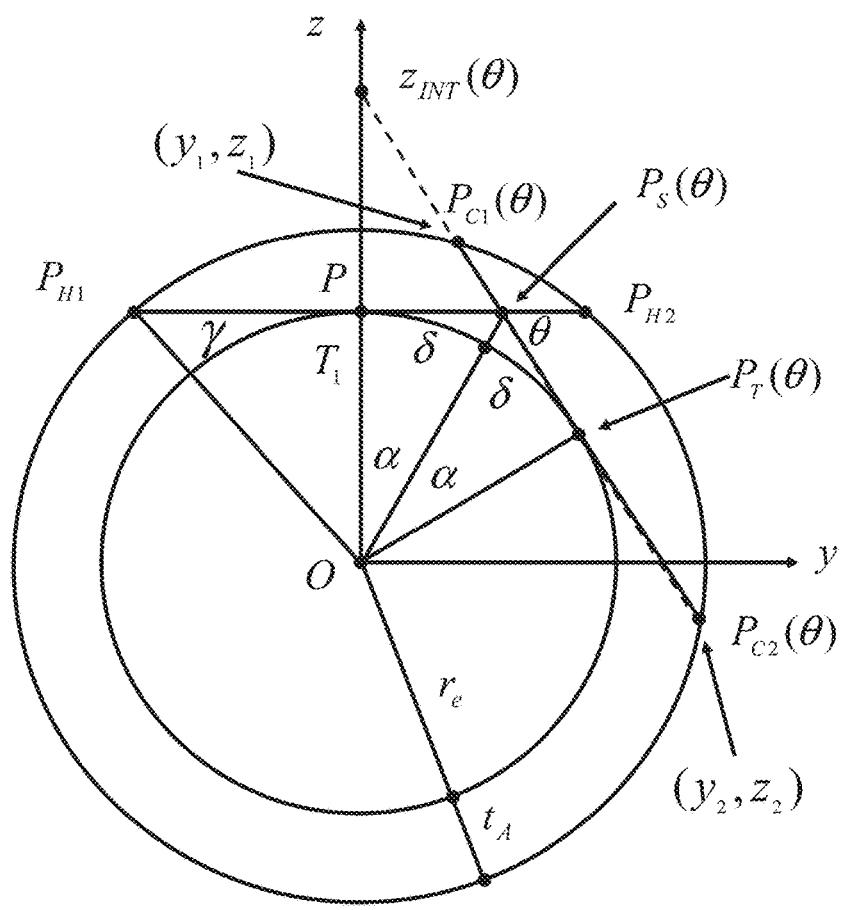
Fig.[64.1]

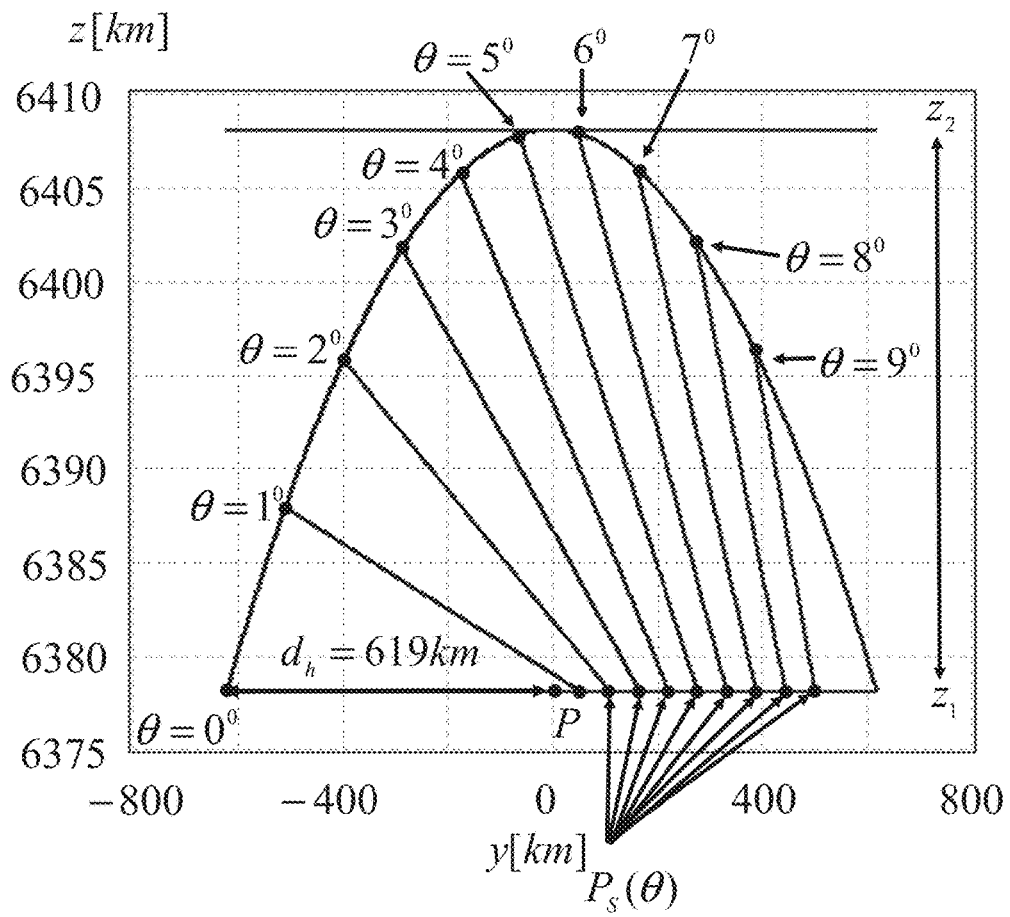
Fig.[64.2]

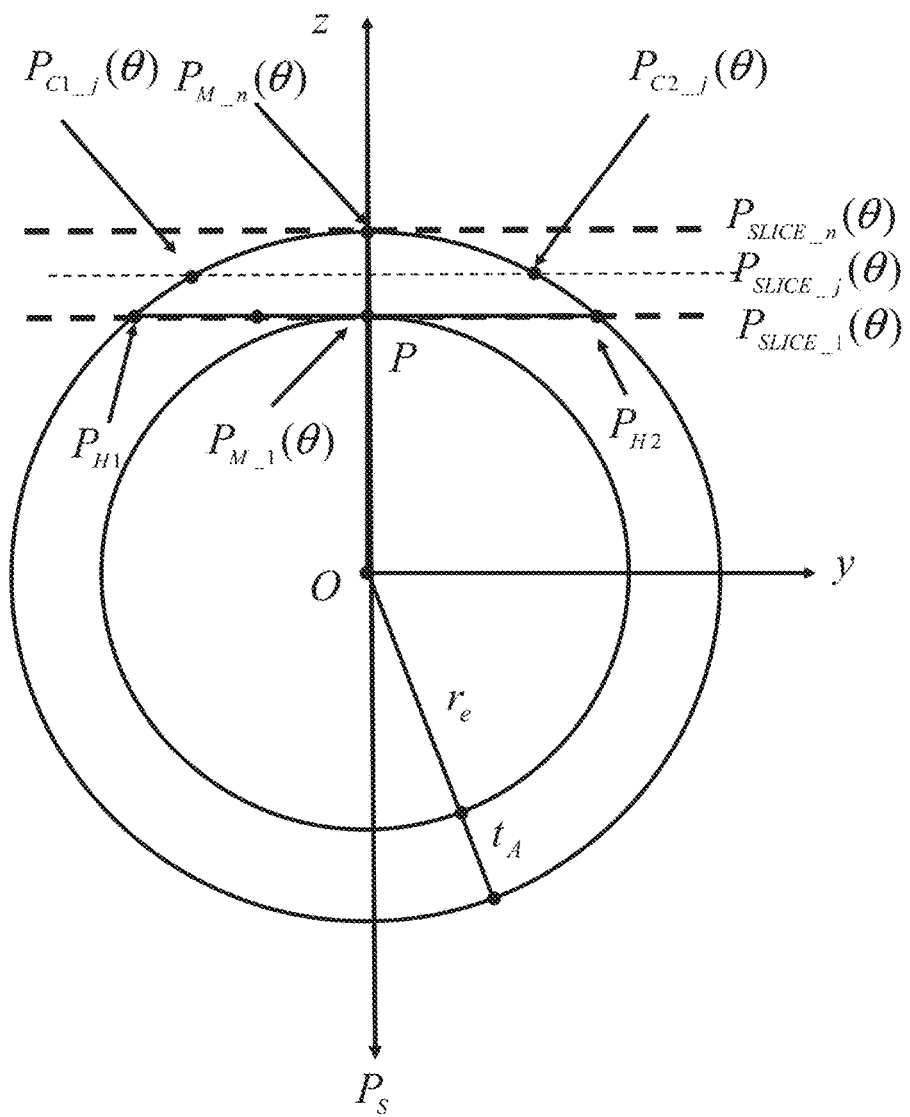
Fig.[65.1]

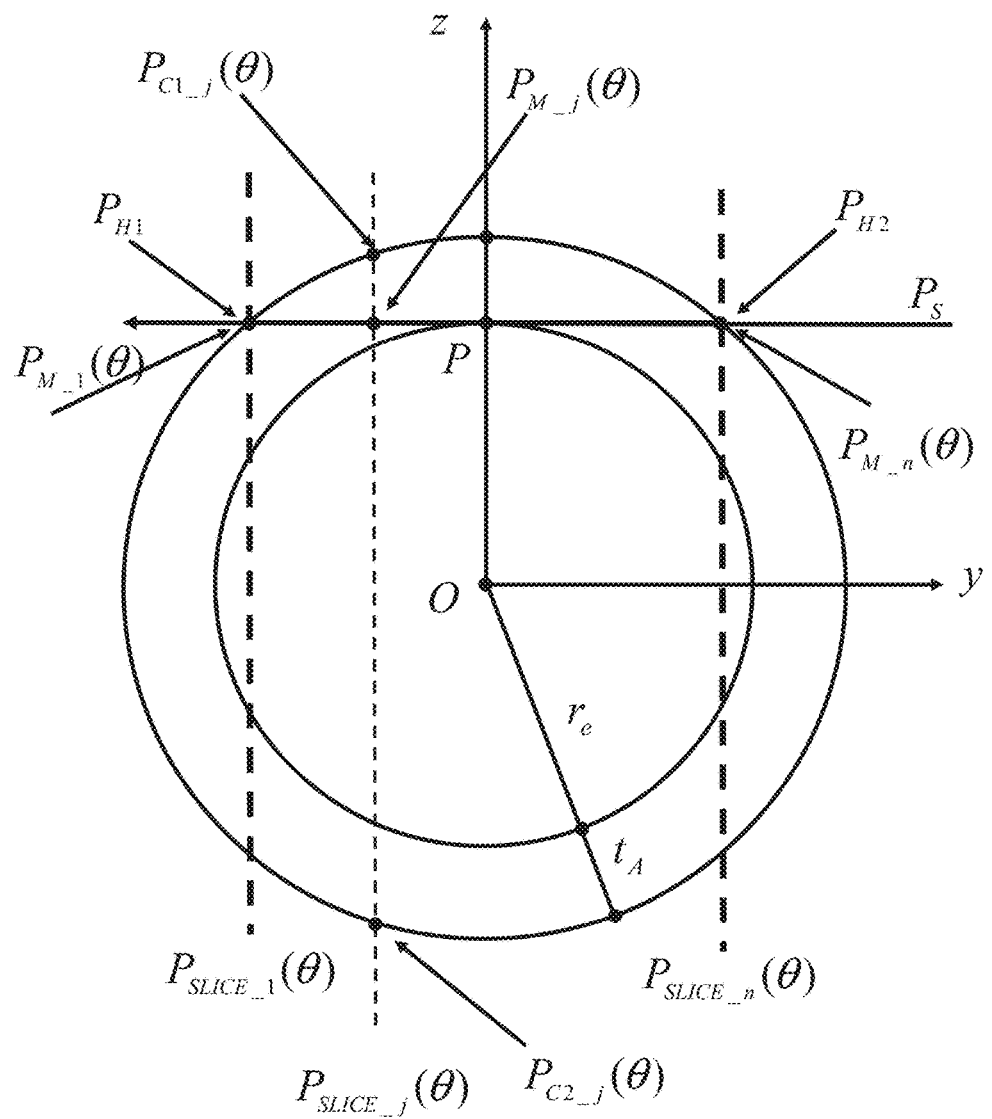
Fig.[65.2]

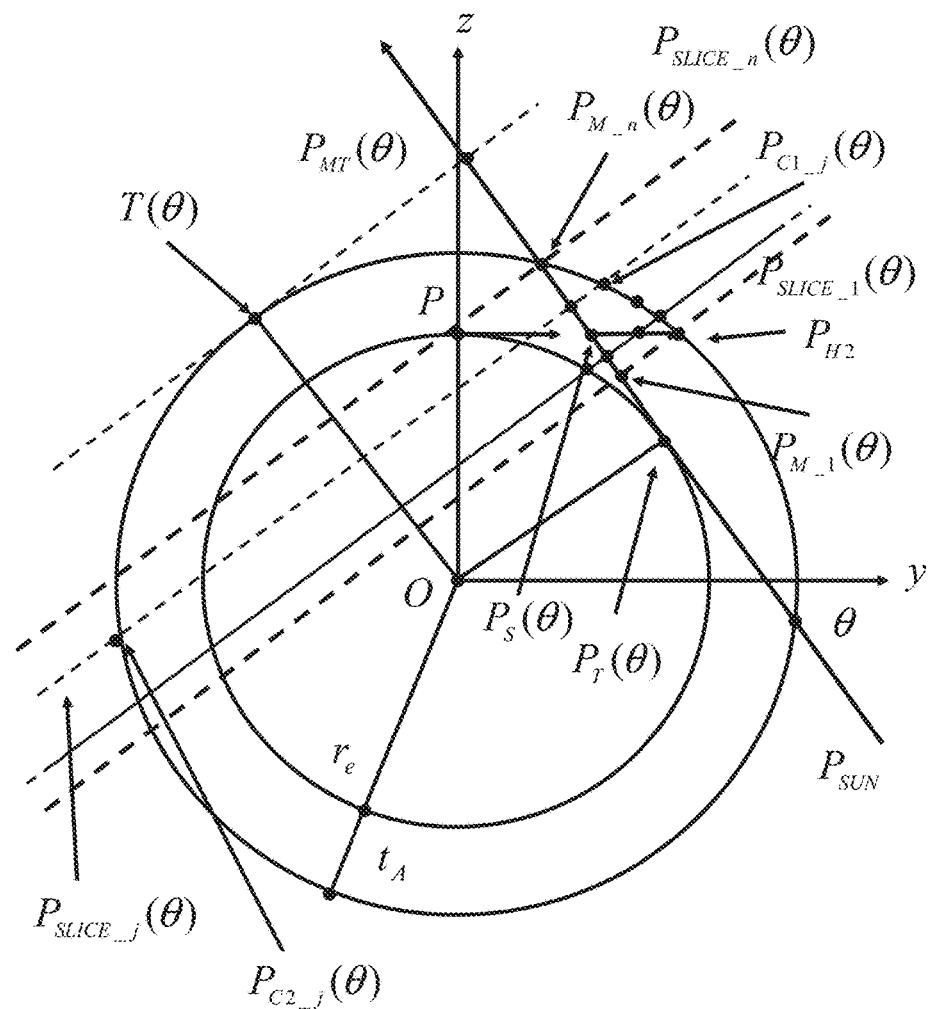
Fig.[65.3]

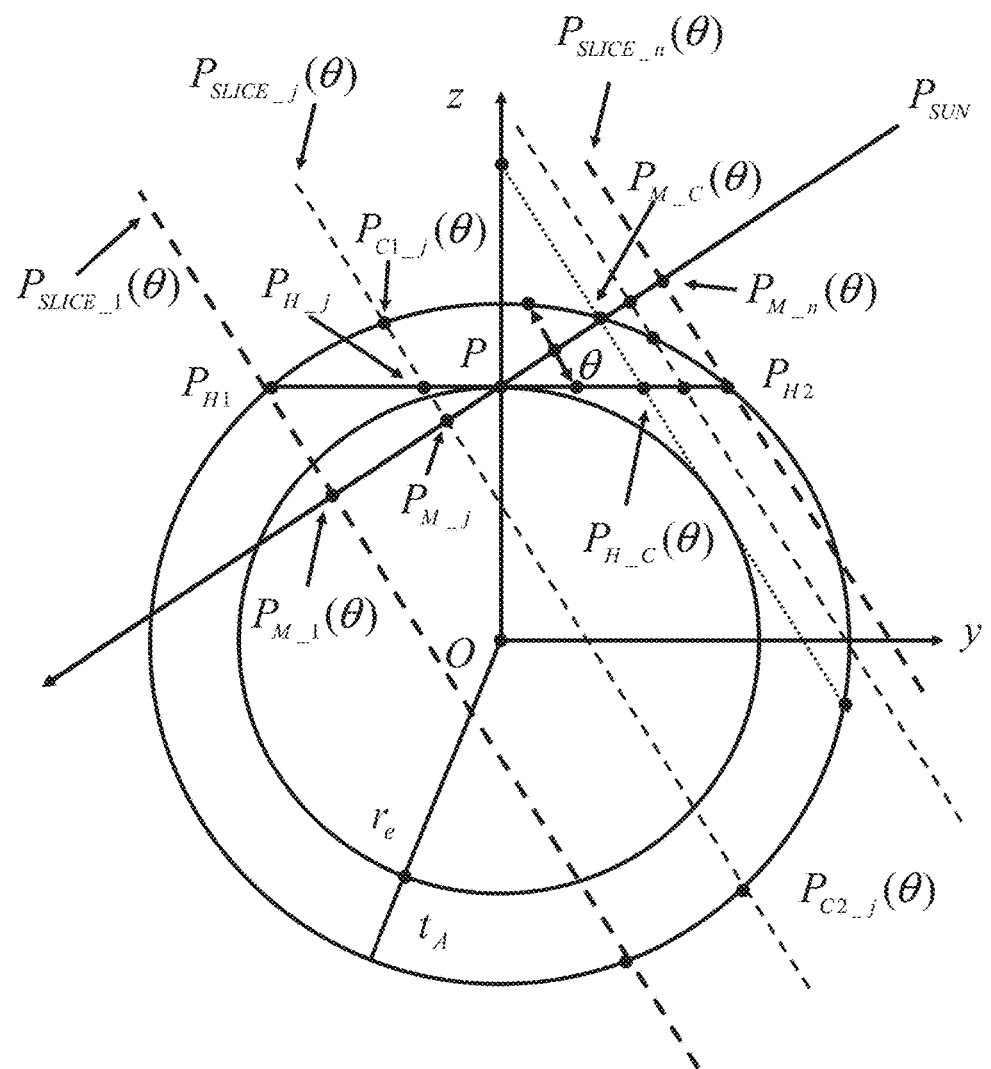
Fig.[65.4]

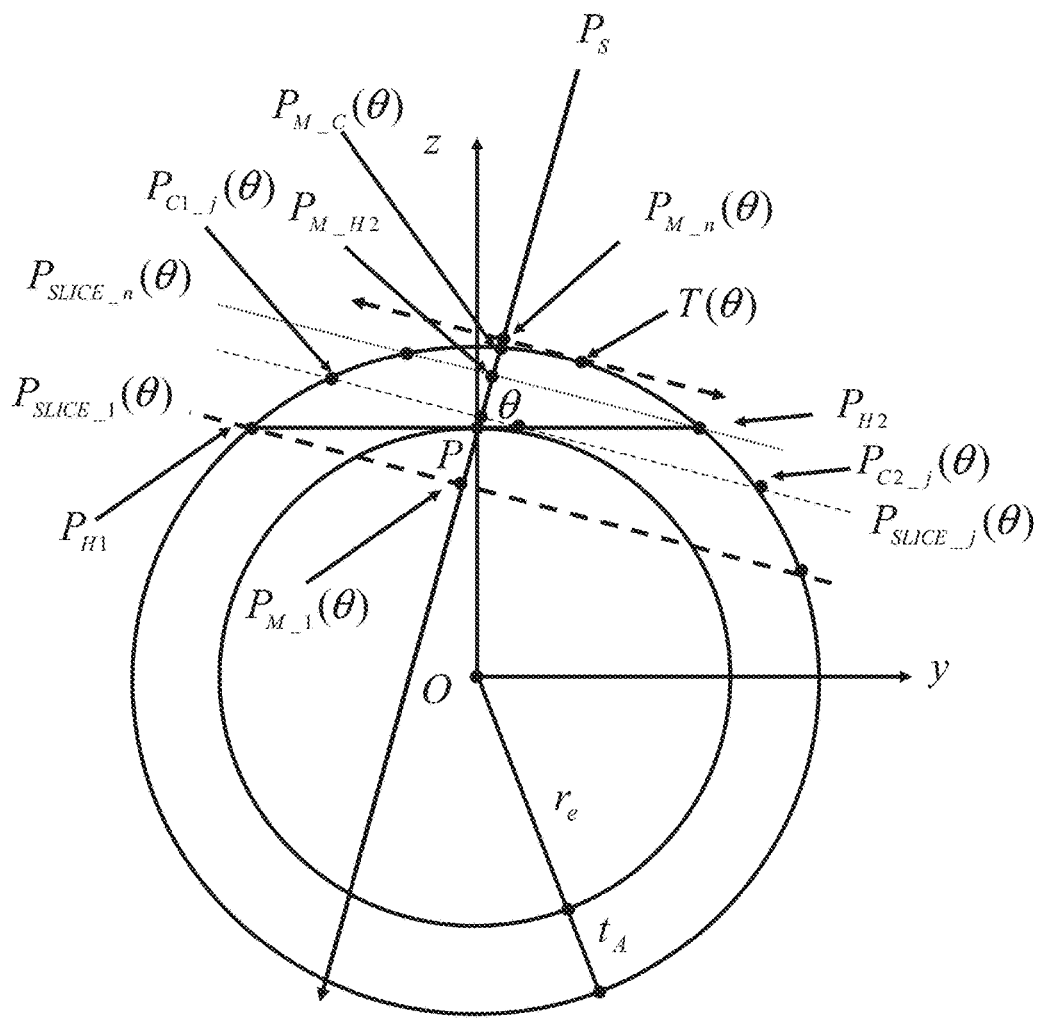
Fig.[65.5]

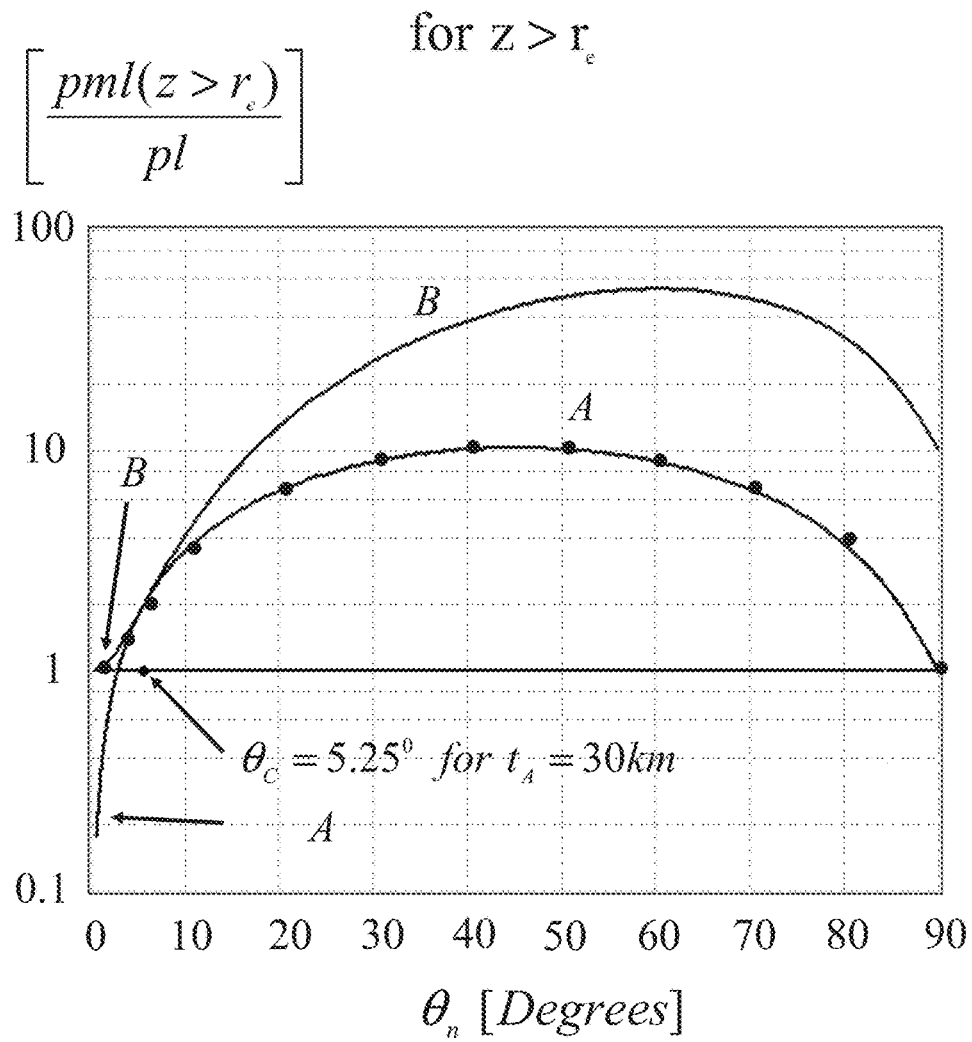
Fig.[66]

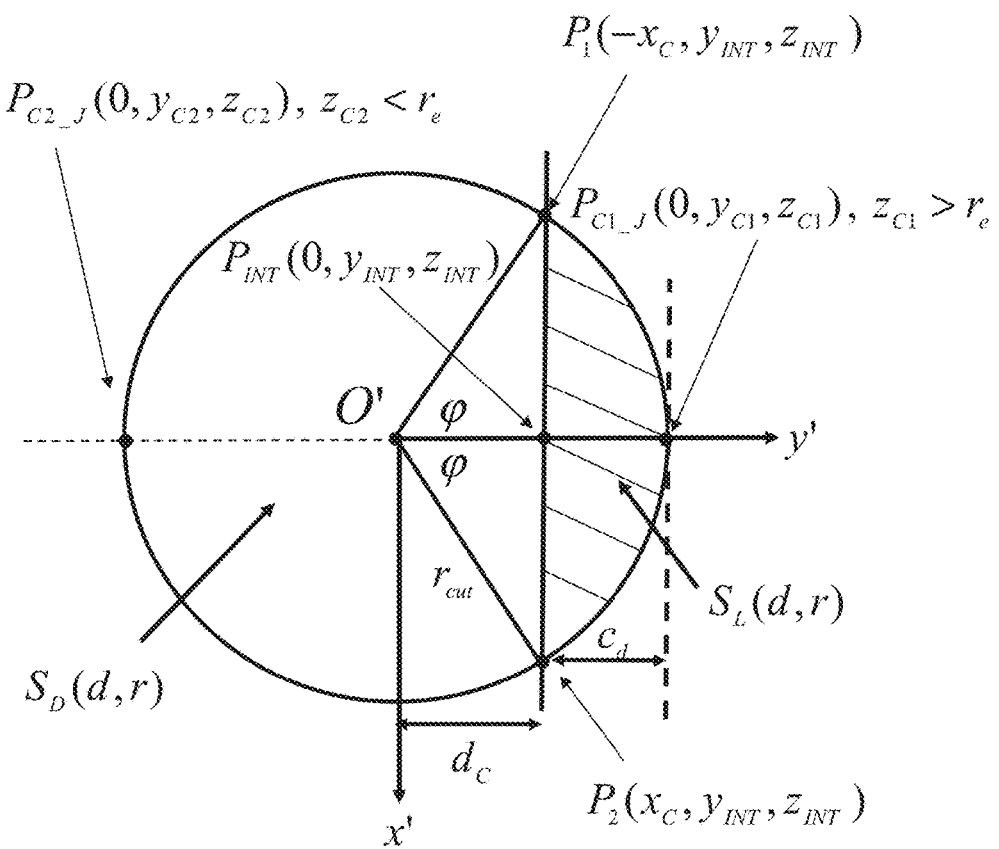
Fig.[67.1]

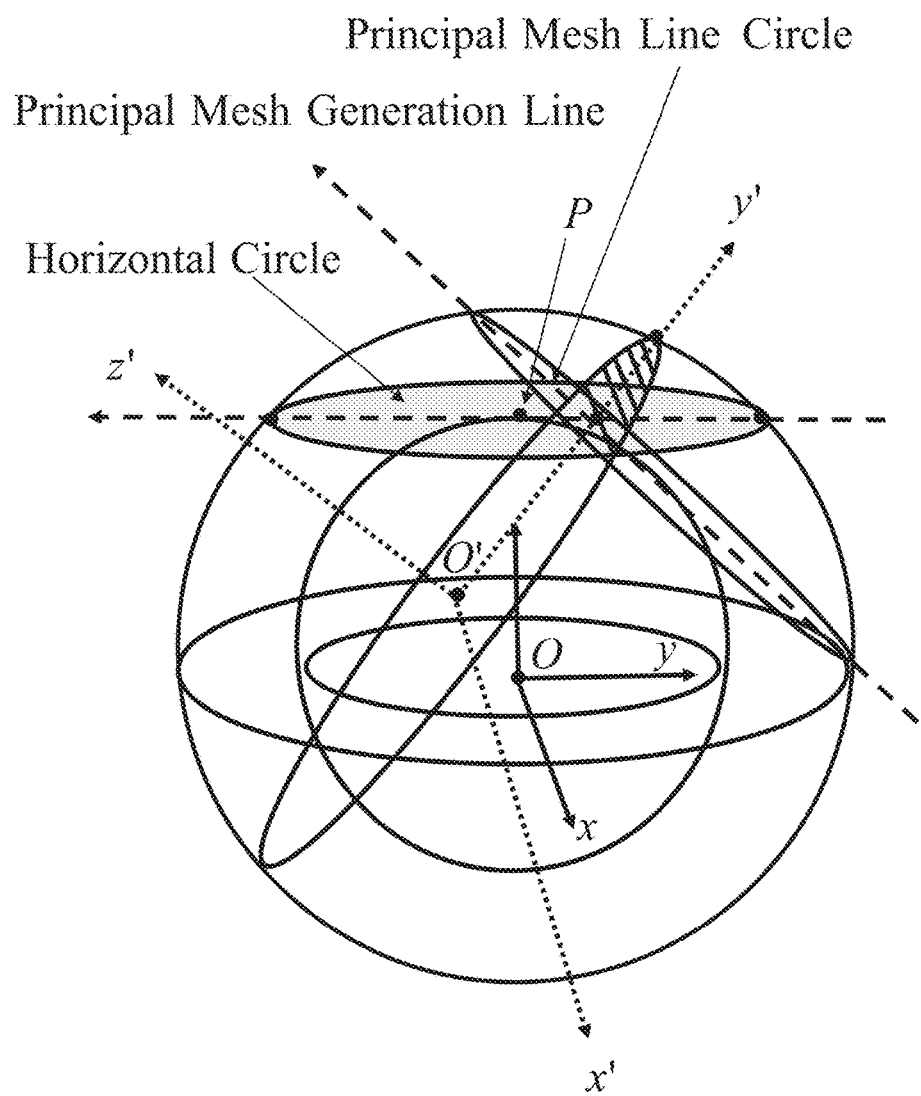
Fig.[67.2]

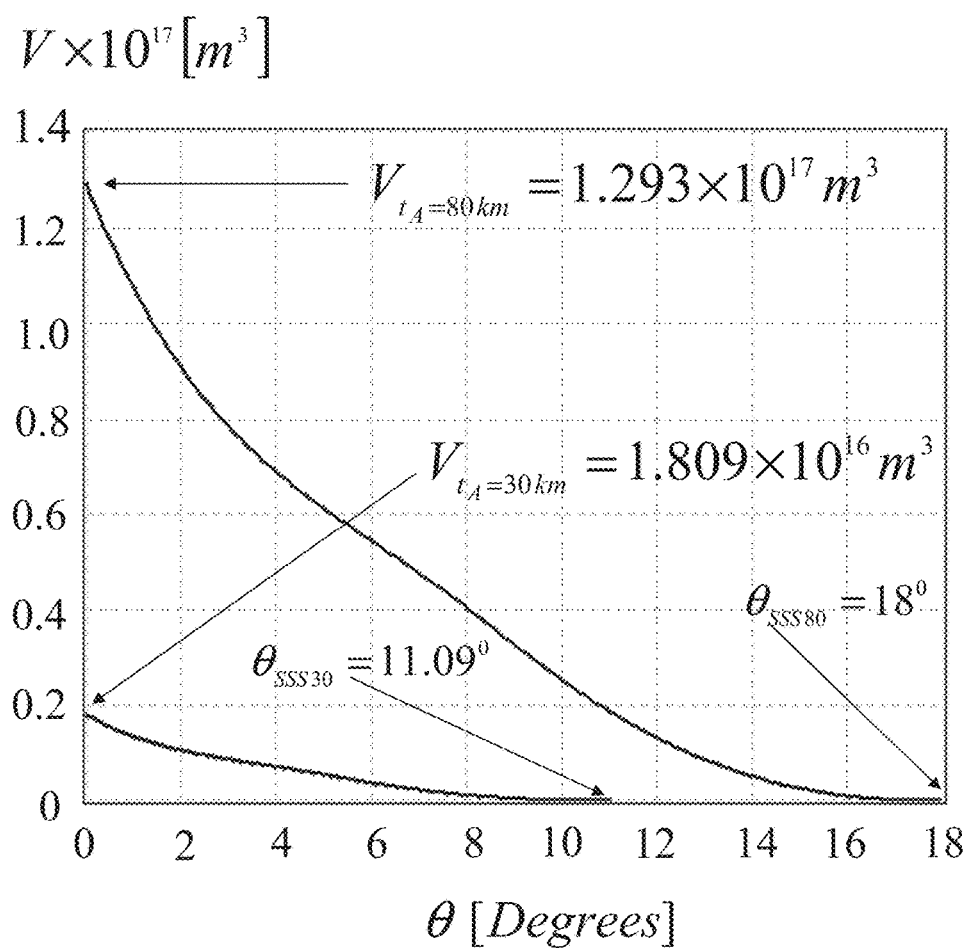
Fig.[68]

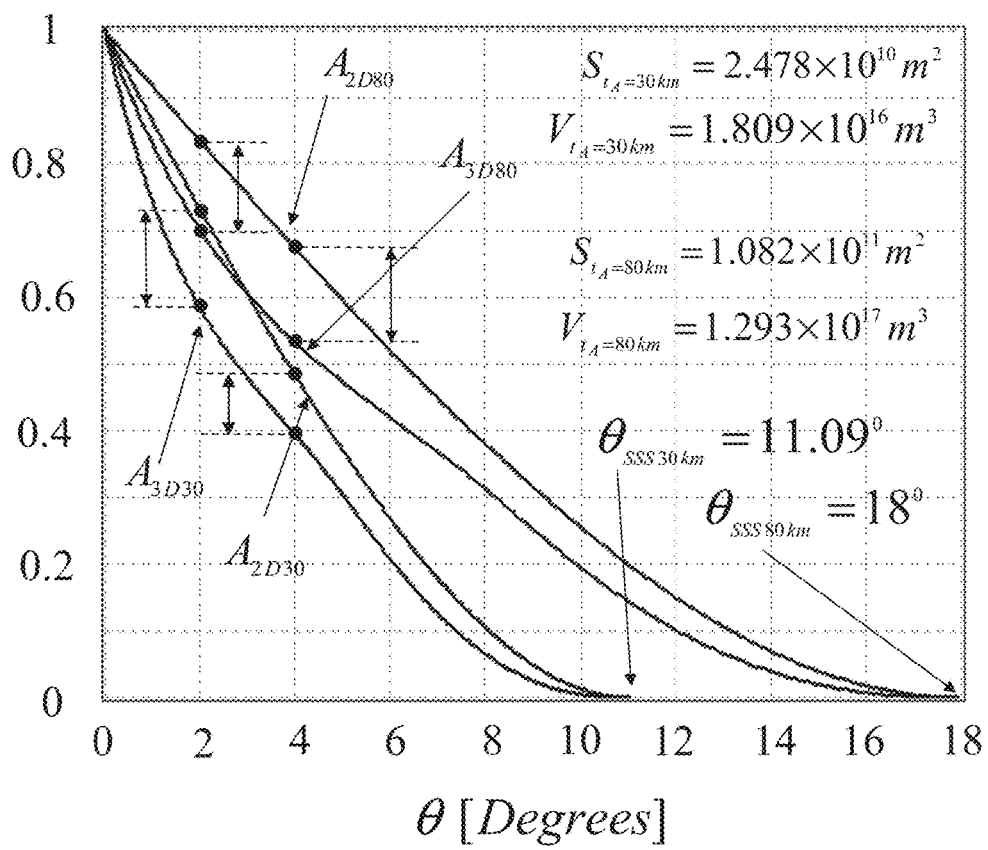
Fig.[69]

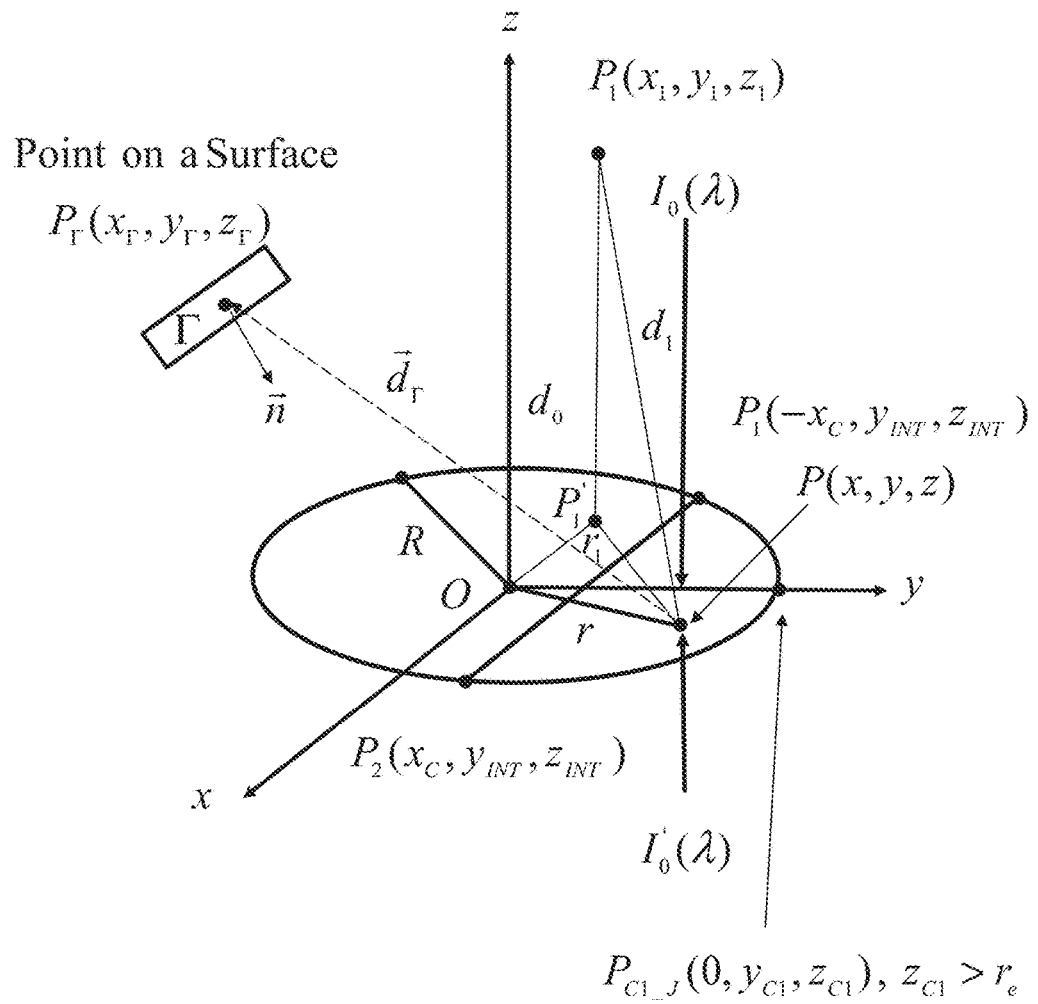
Fig.[70]

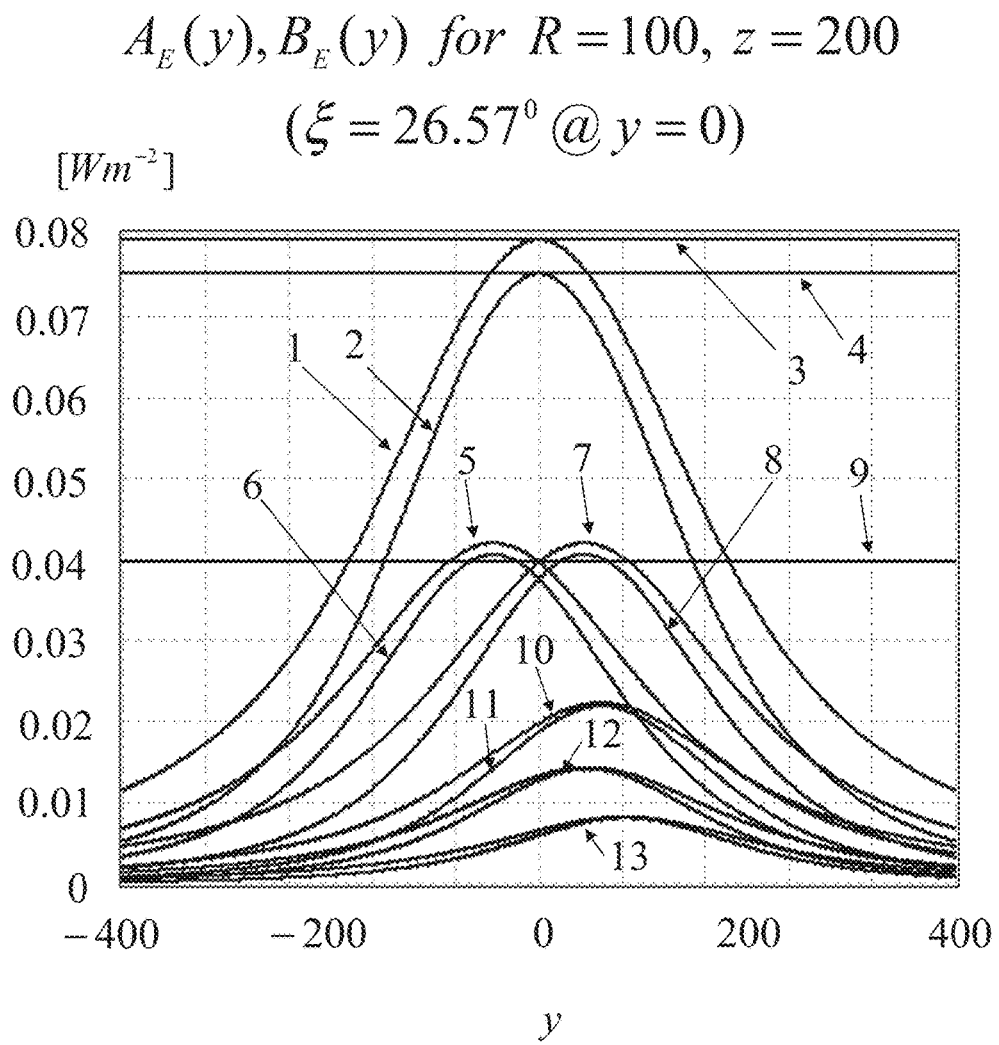
Fig.[71.1]

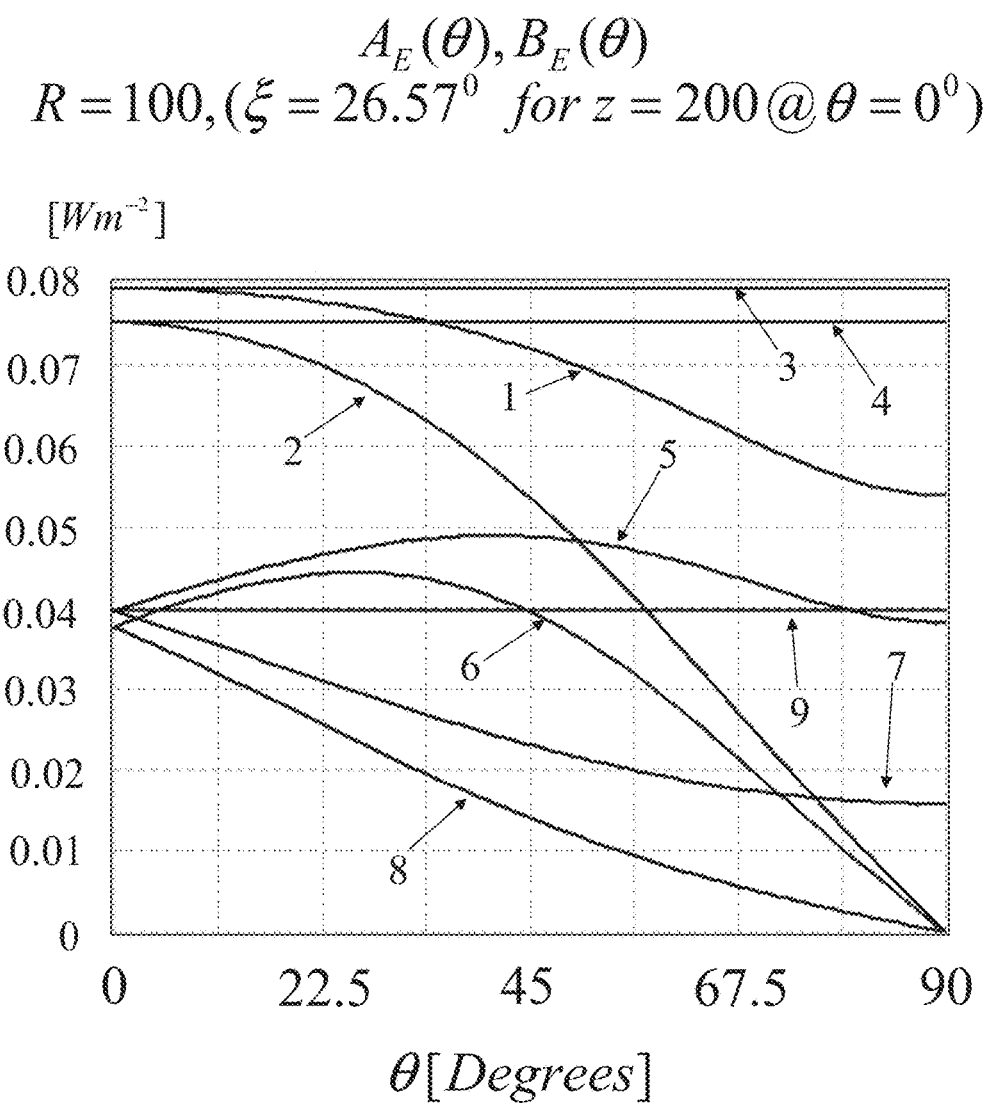
Fig.[71.2]

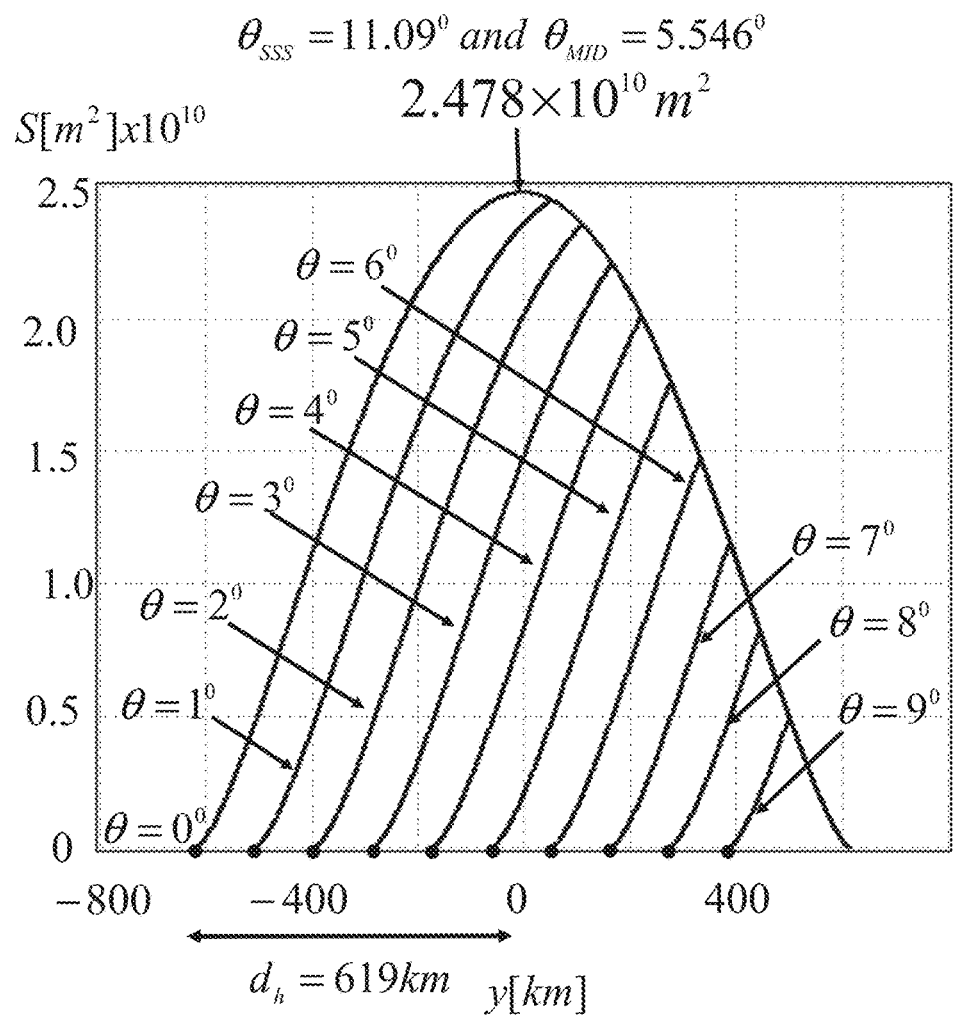
Fig.[71.3]

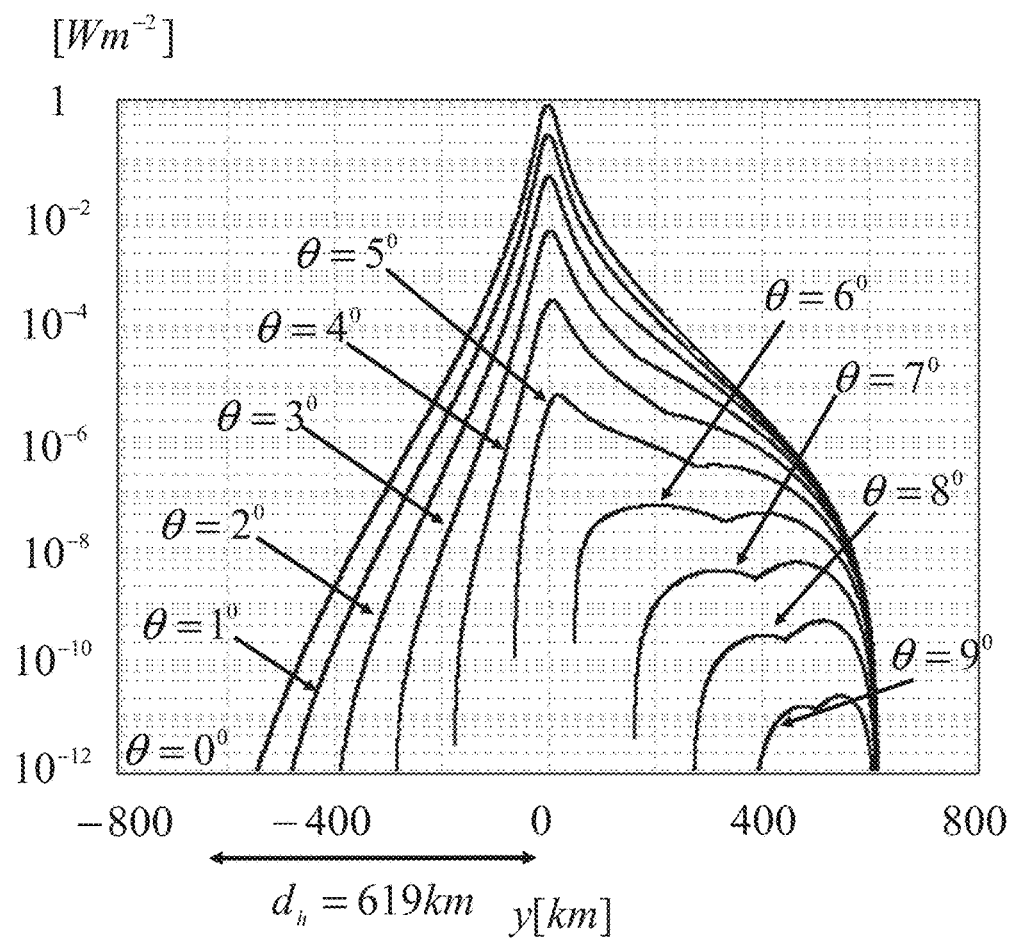
Fig.[71.4]

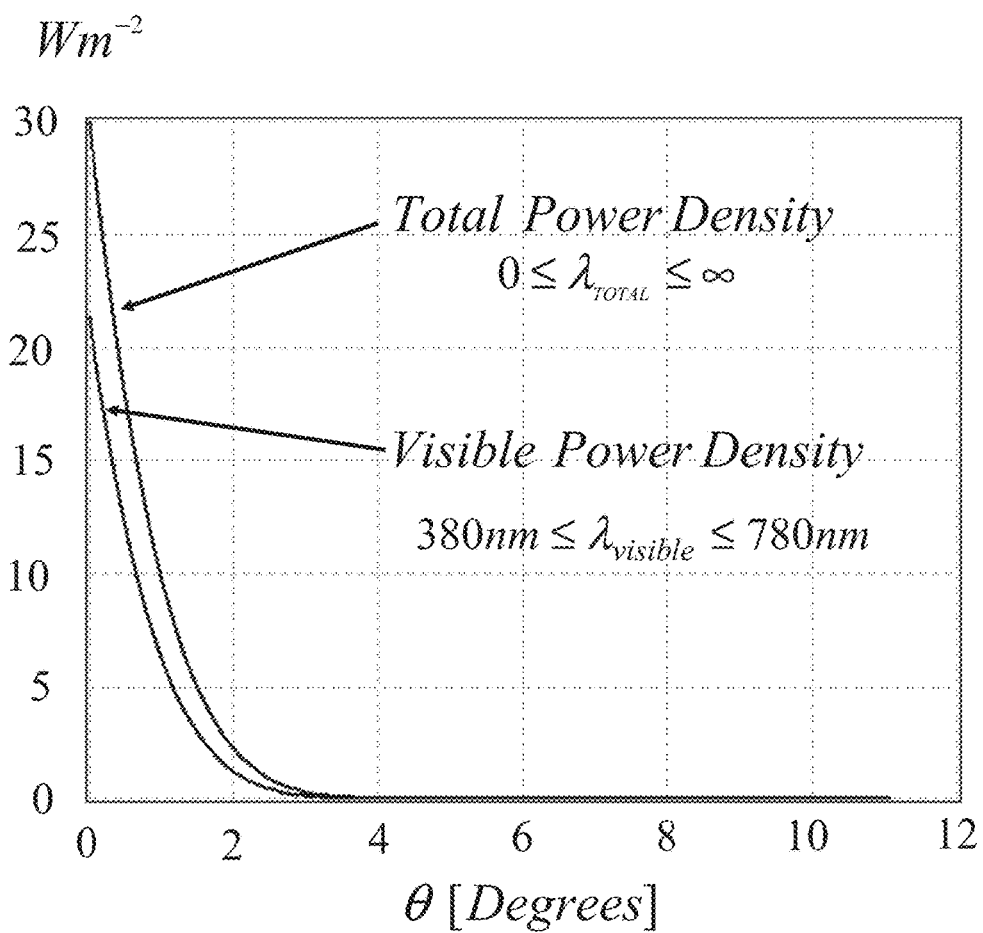
Fig.[72.1]

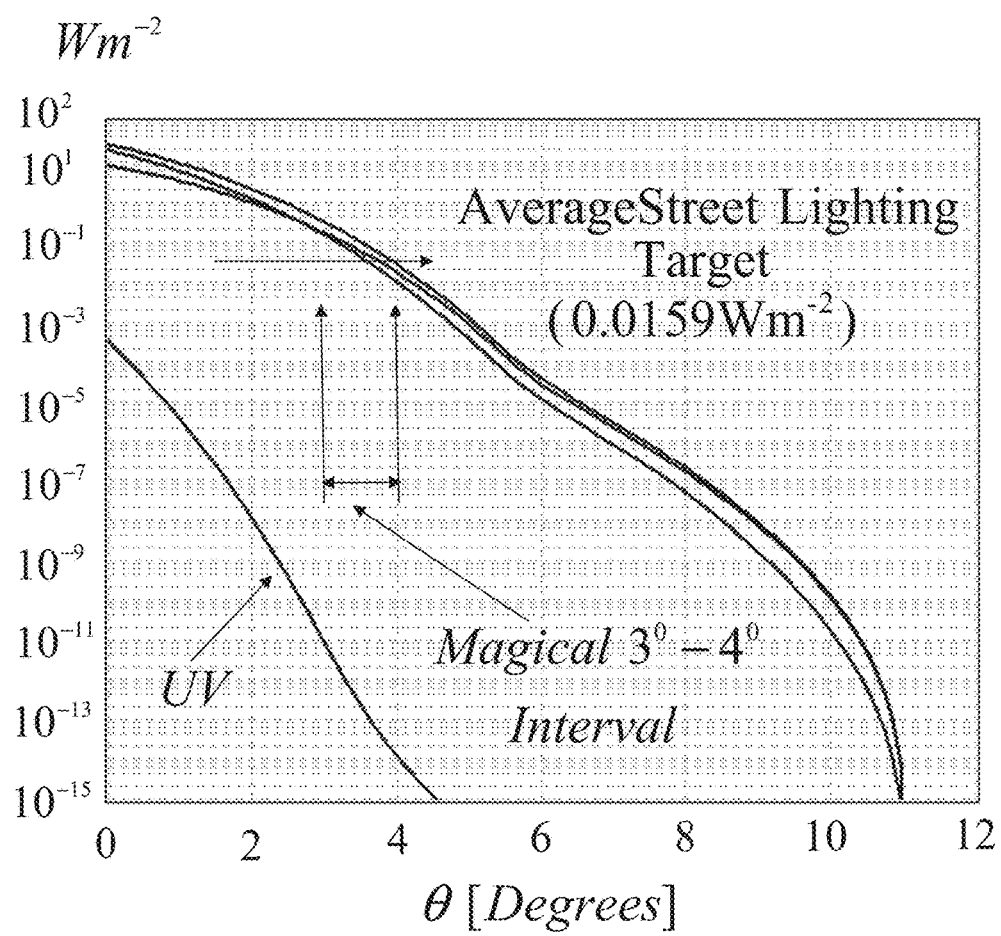
Fig.[72.2]

| Simulation Date: 07 August 2011 | Solar Timer | | U.S. Naval Observatory | | NOAA | |
|---|---|---|---|---|---|---|
| Latitude | Sunrise | Sunset | Sunrise | Sunset | Sunrise | Sunset |
| Narvik, Norway 68.4°N, 17.4°E | 8-Jan | 5-Dec | 7-Jan | 5-Dec | 8-Jan | 5-Dec |
| Barrow, Alaska 71.2°N, 156.7°W | 23-Jan | 18-Nov | 23-Jan | 19-Nov | 23-Jan | 20-Nov |
| Magnetic North 81.3°N, 109.2°W | 24-Feb | 17-Oct | 24-Feb | 17-Oct | *10-Apr* | *3-Sep* |
| North Pole 90°N 0° | 19-Mar | 24-Sep | 19-Mar | 24-Sep | *19-Mar* | *18-Mar* |

Table [1]

Fig. [73]

"Interpretations" of the Islamic Daily Prayer Times by Major Organizations

| | Fajr | Shurug | Dhuhr | Asr | Maghrib | Isha |
|---|---|---|---|---|---|---|
| MWL | 18° | =Sunrise | =Midday | * | =Sunset | 17° |
| ISNA | 15° | =Sunrise | =Midday | * | =Sunset | 15° |
| Egypt | 19.5° | =Sunrise | =Midday | * | =Sunset | 17.5° |
| Makkah | 18.5° | =Sunrise | =Midday | * | =Sunset | 90 min after Maghrib 120 min during Ramadan |
| Karachi | 18° | =Sunrise | =Midday | * | =Sunset | 18° |
| Tehran | 17.7° | =Sunrise | =Midday | * | 4.5° | 14° |
| Jafari | 16° | =Sunrise | =Midday | * | 4° | 14° |
| Diyanet [19] | 18° -2 min ** | 1° to Sunrise -6 min ** | +2 min from Midday +5 min ** | * +4 min ** | 1° from Sunset 8 min ** | 17° =2 min ** |

*The time when the length of any object's shadow reaches a factor (usually 1 or 2) of the length of the object itself plus the length of that object's shadow at noon.
** Equanimity adjustments MWL (Muslim World League)
ISNA (Islamic Society of North America
Egypt (Egyptian General Authority of Survey)
Mekkah (Umm al – Qura University, Mekkah)
Karachi (University of Islamic Studies, Karachi)
Teheran (Institute of Geophysics, University of Teheran)
Jafari (Shia Ithna Ashari, Leva Research Institute, Qum)
Diyanet (The Presidency of Religious Affairs, Republic of Turkey)

Table [2]

Fig. [74]

METHOD AND APPARATUS FOR CONTROLLING ELECTRICAL POWER USAGE BASED ON EXACT SUN ELEVATION ANGLE AND MEASURED GEOGRAPHICAL LOCATION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to applications of accurate measurement of geographical location including elevation as for example obtained by GPS information for use in control and more particularly in terrestrial spectral matching for control of infrastructure artificial lighting systems. This invention involves a mathematically rigorous proof of validity of the conclusions underlying embodiments of the invention. The present application contains a tutorial in support of the technology underlying the invention.

Many events and functions in daily life are controlled by natural light, and in particular by the sun's elevation angle. An example can be found in the field of agriculture and artificial lighting applications. In other words, lights for artificial illumination are turned on when it gets "dark." Many agricultural activities are done during the "day" or at "night." Darkness is thus a subjective term; it depends on the light sensitivity of the human eye in the visible spectrum. When the intensity of the sunlight goes below a certain level, which the human eye can't clearly see, this condition corresponds to "dark." When it is "dark" the need of artificial illumination is required to see comfortably. Since the sun is the major source of light on earth, received sunlight at a location on earth is directly related to the elevation angle of the sun at that location at that time from the horizon. The elevation angle of the sun at a location is a function of the latitude, longitude and altitude along with the date and time. When the sun is below the horizon, even it is not directly visible, there is enough light where the human eye can see comfortably. This is due to the scattered sunlight from the atmosphere, a phenomenon explained herein below.

There are basically three types of artificial illumination controls in use today. They are based on 1) the local time with a timer, 2) light intensity sensing circuits and 3) a combination of the first two. Each has particular disadvantages, as herein after explained.

Timer Based Control

The simple timer circuit control of the prior art involves setting the timer to local time so that light switches on and off at programmed times. However, the sunrise and sunset times vary a great deal over the year anywhere. Therefore for every location on earth the sunrise and sunset times based on local time needs to be calculated and supplied as a table. A general table can't be very accurate as well because the sunrise and sunset times are also altitude dependent. If the timer is not set correctly for that location for every day, some days the lights will turn on when there is more than enough light, wasting energy and some days the lights will be activated below the comfortable light intensity levels, causing issues with visibility. Once it is programmed for the dates and location, the timer will work as intended only at that location. A general factory preset is useless because of such factors. There are also issues related to time adjustments needed for the daylight savings time, for which there is no set standard, and related to the precision and accuracy of the clock.

In some places, astronomical routines are used to control lighting. These are considered timer based controls. They are typically set to sunrise and sunset times, not to a time corresponding to any sun elevation angle chosen. Time settings can only be roughly hard coded approximately corresponding to 0 to −0.5° of sun elevation angles. There are no known astronomical controls available that are customizable to any sun elevation angle nor specifically to the preferred angle as disclosed in this application, and which also takes the altitude and topography related effects into consideration.

Light Intensity Based Control

The second type of controller uses a photocell light detector preset to a light intensity level These types are known commercially as dusk-to-dawn detectors. They are cheap and most of the intelligent light controls today for outdoor lighting employ this method. Compared to the first type, they appear superior, but they have their own problems when the threshold level of light intensity is low for this application.

Off-the-shelf dusk-to-dawn detectors have a great deal of variation on light detection levels depending on the orientation, placement, temperature, and manufacturing differences but it is conclusively seen that they can't detect light intensity levels consistently when sun the elevation angles are lower than 1.5 degrees below the sunrise and sunset sun elevation angles for the same location. The photocell light sensitivity variation is very wide, even from the same manufacturer, and it is not consistent throughout the year, being greatly influenced by the detector temperature. The practical variations in the sensitivity of the dusk-to-dawn detectors are found to be in the light intensity levels corresponding to 3 to −1.5 degrees of sun elevation angle. There are many reasons for this, primarily due to the physics related to the operation of the photocells or any type of photo detectors [21,23,24], so one shouldn't expect significant consistency and improvement in the sensitivity in the future without very costly improvements.

The physics of the method is based on measuring the sun's irradiance using the current generated by the photo electric devices such as photo cells, photo diodes, photo transistors or solar cells. Basically there is a photo sensor that converts the light into electrical current. The magnitude of this current relates to the received light intensity, wavelength and the band gap of the semiconductor used. If the sun's irradiance goes below a threshold level, the photo current will also goes below a threshold level. This condition is detected by a comparator and followed by a simple logic circuit that drives the switch of the light circuit to an "on" or "off" state. The switch can be electro mechanical such as a relay or a solid-state triggered device-thyristor, triac or an IGFET. As can be seen, it is an "indirect" method of determining conditions when the lights must be turned on.

There are some physical issues with this methodology:

i) The magnitude of the generated photo current in a semiconductor photo electric device of any kind is directly related to the photon flux received by it and the band gap of the semiconductor detector [21,23,24]. Photon flux at a given wavelength is the number of photons per second per area of the incoming radiation. Designing an accurate light sensor for medium to high level of light intensity where the sun is at high elevation angles is easy. Designing a light sensor that can accurately detect low level of light intensities corresponding to low sun elevation angles such as −3° to −4° of the sun is challenging. There are two physical issues for this difficulty in outdoor applications.

The first obvious reason is simply that the received photon flux at the light sensor is too low for certain targeted sun elevation angles for accurate and consistent detection. A good practical example is the fact that very few CCD still cameras can take pictures without a flash, whereas humans do not need any kind of artificial illumination!

The second reason is related to the spectral power density of the scattered light in the atmosphere for sun elevation angles in the range of −3° to −4°. As predicted by the ASAR program methods and visually observed, the scattered light spectral power spectrum shifts to dark blue to violet at these sun elevation angles as in the Scotopic luminosity function. Human eye wavelength sensitivity closely adapts to the change in the scattered light spectrum at dusk conditions. This is a very remarkable feature of the human eye. On the other hand the highest ultimate efficiency of silicon photo detector is very close to 1,000 nm, determined by its 1.12 eV band gap value and the Planck constant h. For a monochromatic radiation at 507 nm wavelength, as in the peak Scotopic Luminosity response of the human eye, its ultimate efficiency drops approximately to half of its efficiency compared to the 1,000 nm radiation. A wide band gap detector is need that has its band gap in the order of 2 eV, for detecting the dusk conditions with the same ultimate efficiency of Silicon at 1,000 nm radiation.

ii) The "dark" current operations of a semiconductor device used in sensing the light and its sense and compare circuits are very strong functions of temperature [21,23,24]. Since the light sensor has to be exposed to the outdoor light, it is also exposed to the outside temperature. The design specification requires accurate operation over a very wide range of temperature variations throughout the year, around the world. This makes the design of these circuits very difficult even for low level lighting conditions which occur when sun elevation angles go below 1° below the horizon. In other words, an accurate light sensor design for low level light sensing applications is itself a challenging circuit design. The resulting inaccuracies due to the temperature effects will affect the "on/off" times.

iii) The sensors must all be exposed to sunlight, which makes them very susceptible to dirt, dust, rain, water, frost and snow. This also creates a reliability and product life problem due to harsh environmental effects. Since the sensing is done for low light intensities, these effects become more important and difficult to eliminate.

iv) The optical to electrical conversion performance degradation of the light sensors over time can be in the order of 5-10% over a period of 5 years under the direct sunlight!

v) Since the sensors cannot detect low enough light intensities, the scattered light for sun elevation angles corresponding to at 1° to −1.5° still have some directional dependency, which means that any object will still generate a shadow that gives them a placement and orientation dependency in their "on/off" times. The sunrise and sunset azimuth changes greatly for any location over the year and this will cause the orientation and the length of an object's shadow to be a complex variable of date and time. If the detector is in the shadow of any obstruction such as vegetation, landscape or buildings for that particular date and not for any other date, the detector will trigger at different times.

In practice all these issues are not eliminated, just avoided, by setting the threshold current in the sensor to higher levels than needed. This causes the switch to operate no better than sunlight intensity levels corresponding to 1°-1.5° below the horizon, where visibility is good for the majority of the population. This causes significant waste of electrical energy.

Study also included several types, even the "first class thermopile" pyranometers that are widely used in solar energy applications. None had sensitivity to detect light intensity levels corresponding to 1 degrees of sun elevation angle above the sunrise and sunset for the same location where they are installed. This was also confirmed with the discussions made with their manufacturers. Although they are far more accurate and consistent compared to simple and cheap dusk-to-dawn detectors for higher sun elevation angles, expecting performance well for this application is not realistic and is not even recommended by their manufacturers given the physics behind their operation principles.

As a final example consider the lower range of brightness measuring capability of well-calibrated light meters that are used in professional photography, which are in the order of 1 cd/m². However, they are only calibrated with photopic luminosity function. At the sun elevation angles of present interest, the light intensity is in the Mesopic range, so the measurement values that they provide are not valid for human eye vision for these conditions.

Hybrid Techniques

Since low level light detection is difficult, this is done with the timer, and any other loss of light intensity due to weather effects is done by light intensity sensing sensors. The disadvantages and advantages of both methods remain and thus the hybrid technique does not resolve the adjustment-related issues of the timer.

Thus "cheap" and "reliable" scattered light intensity detection hardware corresponding to −3° to −4° of sun elevation angle is not known or available in the market today. To maintain an acceptable and consistent comfort level in outdoor lighting, the light detection sensitivity of any light intensity sensing device available today has to be set to light intensity levels corresponding to not less than 1.5° of sun elevation angle below the horizon. As can be seen, the light sensitivity levels achievable using with widely used standard measurement methods in use today do not provide the goal of the outdoor light intensity levels corresponding to the sun elevation angle of 3° to 4° below the sunrise and sunset.

What is needed is to find out how much energy savings can be done, if by any other means the artificial illumination can be activated only when the sun elevation angle becomes lower than 3° to 4° below the sunrise and sunset. As can be seen the answer to this question is not easy and can't be given without some work. The best way of finding this out is using a very accurate simulator which can predict the sun's location, its elevation and azimuth, at any date, any altitude and any geographic location on the world and compare it through simulations having the sun elevation angle as a parameter [7]. If the energy savings becomes significant by having the capability of employing a technique which can consistently and accurately predict 3° to 4° of sun elevation angle below the sunrise and sunset anywhere, any date and any inhabited altitude, then it will be worthwhile to work on an improvement.

Thus, what is needed is a mechanism to take advantage of the scattered light phenomenon and to automate response to greater negative elevation angles of the sun at any arbitrary terrestrial location and elevation.

REFERENCES

The following citations are provided as of the date of this application as background for further reading and verification of the information disclosed in this document:
1. "Global Positioning System, Theory and Practice," B. Hofmann-Wellenhof, H. Lichtenegger and J. Collins, Copyright 1992, 1993, 1994, 1997 and 2001, Springer Wien New York, 5th Edition, ISBN 3-211-83534-2.
2. "The Feynman Lectures on Physics", Richard P. Feynman, Robert B. Leighton, Matthew L. and Sands, Copyright 1963, 1989 California Institute of Technology, ISBN 0-201-51003-0.
3. "Mathematical Handbook of Formulas and Tables", Murray R. Spiegel, Schaum's Outline Series, Copyright 1952 by McGraw-Hill, Inc.
4. "Handbook of Mathematical Functions", Edited by Milton Abramowitz and Irene A. Stegun, Dover Publications, Inc., New York, 1972, Library of Congress Catalog Card Number: 65-12253.
5. "Applied Numerical Analysis", C. F. Gerald, Addison-Wesley Publishing Co., 1980, ISBN 0-201-02696-1.
6. "Astronomical Algorithms", Jean Meeus, Second Edition ISBN-10: 0943396352, Copyright 1991, Willmann-Bell, Inc.
7. "Solar Timer Using GPS Technology", O. E. Akcasu, I. Akcay, US Patent Publication 2013/0116967 A1, May 9, 2013.
8. "The Calculation of Astronomical Refraction in Marine Navigation", G. G. Bennett, Journal of the Institute for Navigation, Vol. 35, pp. 255-259, 1982
9. "Sky and Telescope", Porsteinn Saemundsson, July, 1986.
10. \http://en.wikipedia.org/wiki/Mirage. [10 Jan. 2014]
11. "Revised Optical Air Mass Tables and Approximation Formula", F. Kasten and A. T. Young, Applied Optics, Vol. 28, pp. 4735-4738, 1989.
12. http://www.pveducation.org/pvcdrom.
13. "Precomputed Atmospheric Scattering", E. Bruneton and F. Neyret, Eurographics Syposium on Rendering, Vol. 27, No. 4, 2008
14. "A Practical Analytical Model for Daylight", Preetham A. J., Shirley P. Smits, B. E., Seegraph 99, 1999.
15. "A Critical Review of the Preetham Skylight Model", Zotti G., Wilkie A., Purgathofer W., WSCG 2007 Short Communications Proceedings I, pp. 23-30, 2007.
16. "Radiative Transfer in the Atmosphere and Ocean", Thomas G. E., Stamnes K., Cambridge University Press, 1999.
17. "Real-Time Rendering of Planets with Atmospheres", Schafhitzel T, Falk M., Ertl T., WSCG International Conference in central Europe on Computer Graphics, Visualization and Computer Vision, 2007.
18. "Physically Based Simulation of Twilight Phenomena", ACM Trans. Graph. 24, Vol. 4, pp. 1353-1373, 2005.
19. "Display Method of the Sky Color Taking into Account Multiple Scattering", Nishita T., Dobashi Y., Kaneda K, Yamashita H., Proceedings of Pacific Graphics, pp. 117-132, 1996.
20. "Accurate Atmospheric Scattering", O'Neil S., In GPU Gems 2: Programming Techniques for High Performance Graphics and General-Purpose Computation, 2005, Addison-Wesley professional.
21. "Solar Cells: From Basic to Advanced Systems", Hu C., White R. M. New York 1983.
22. "Measurement of Solar Spectral Irradiance at Different Terrestrial Elevations", Laue E. G., Solar Energy http://www.sciencedirect.com/science/article/B6V50-497T7KC-T/2/c932c2f01c2de3c36c0f461c991f791a.
23. "Modern Semiconductor Device Physics", S. M. Sze, John Wiley & Sons, Inc., 1998, ISBN 0-471-15237-4.
24. "Physics of Semiconductor Devices", S. M. Sze, John Wiley & Sons, Inc., 1981, ISBN 0-471-05661-8.
25. "Waves and Fields in Inhomogeneous Media", W. C. Chew, Van Nostrand Reinhold, 1990, ISBN 0-442-23816-9.
26. "Compact Distributed Ladder Attenuator", O. E. Akcasu and B. Sekerkiran, U.S. Pat. No. 7,986,197 B2, Jul. 26, 2011.
27. "Engineering Electromagnetic Fields and Waves", Carl T. A. Johnk, John Willey & Sons, Copyright 1975, ISBN 0-471-44289-5.
28. "Elements of Electromagnetics", Matthew N. O. Sadiku, Oxford University Press, Copyright 2001 Third Edition, 2001, ISBN 0-19-513477-X.
29. "Computer Graphics: Principals and Practice" J. D. Foley, Andries van Dam, S. K. Feiner and J. F. Hughes, Copyright 1996, 1990 Addison-Wesley Publishing Company, ISBN 0-201-84840-6.
30. http:/www.crl.org/database/text/lum/scvl.htm
31. "Color in Business, Science and Industry", D. B. Judd and G. Wyszecki, Copyright 1975, John Wiley. ISBN 0-471-45212-2.
32. "Billmeyer and Saltzman's Principals of Color Technology", R. S. Berns
33. "A Table of the Standard Atmosphere to 86 km", http://www.pdas.com/m1.htm
34. "Mesopic Street Lighting Demonstration and Evaluation Final Report", P. Morante, Lighting Research Center, Rensselaer Polytechnic Institute, January 2008.
35. "Low-rate Wireless Personal Area Networks Applied to Street Lighting", F. Domingo-Perez, A Gil-de-Castro, J M Flores-Arias, F J Bellido-Outeirino and A Moreno-Munoz, Lighting Res. Technology, pp. 90-101, Vol 45, 2013.
36. "Method for Emergency Alert Using SMS Text", O. E. Akcasu and I. Akcay, U.S. application Ser. No. 13/705, 708, filing date Dec. 5, 2012.
37. "Detailed and Comprehensive Mathematical Analysis and Method of Atmospheric Attenuation and Scattering of Radiation in Atmosphere and its Applications", O. E. Akcasu, 26 Aug. 2013, OEA International, Inc., Morgan Hill, Calif., Internal Report available upon request.

SUMMARY OF THE INVENTION

According to the invention, a method and apparatus are provided to accurately control electrical activity, such as artificial lighting, using accurate geographical location of longitude, latitude and altitude, as well as accurate date and time, in order to activate such electrical activity only during needed periods of actual terrestrial darkness, particularly as it relates to sun elevation. The method involves accurate, real-time calculation of sun elevation relative to geographical location so that natural lighting characteristics such as natural light spectrum and intensity can be matched to artificial lighting in order to provide a smooth transition in ambient lighting and to save energy. An apparatus according to the invention comprises a global positioning system (GPS) element for determining latitude, longitude, altitude, date and time and a calculation element for determining sun elevation angle accurately. A specific embodiment of the apparatus is a completely mobile and stand-alone unit, requiring only desired sun elevation angle inputs from the user for controlling electrical switches in a control system. Since electrical "on" and "off" states of any desired electrical functions are only controlled by the sun elevation or a function associated with it, this invention has particular advantages. Some are related to ease of use, such as no requirements for date and time adjustments and no initialization for a local system clock. The apparatus works anywhere on earth. Since the time and date is obtained via a GPS function, there are no issues related to time initialization requirements associated with power outages and arbitrary time adjustment, such as local daylight saving practices.

Since energy savings for artificial illumination is a key application area of this invention, the description of this invention is focused on this particular energy saving application. However, the invention has other application areas where the use of any selected sun-elevation-angle-dependent timing becomes favorable compared to the use of locally established time.

This invention is informed by a computation of a sun elevation angle which is below the horizon, based on a proof that the scattered light intensity is a function of sun elevation angle, and as such scattered sunlight at a predetermined sun elevation angle from below the horizon is still high enough for comfortable visibility under virtually all atmospheric conditions. This "critical sun elevation angle" has been found experimentally and confirmed theoretically to be when the sun elevation angle is in the range of 3° to 4° below the horizon for any date and location.

This "critical sun elevation angle" was found subjectively by surveying large numbers people at of different gender, age and origin at different locations, weather conditions and dates and confirmed by objective simple experimental procedures. In addition to subjective results, the "critical sun elevation angle" is derived through rigorous mathematical analysis involving Stefan-Boltzmann and Planck Radiation Laws, along with atmospheric attenuation including Rayleigh and Mie scattering which takes place in the huge volume defined by the entire visible atmosphere from an observation point. The methodology employed in this theoretical approach also has very wide application in areas such as solar energy, irrigation, farming, religious practice, accurate global warming studies, and computer-generated imaging in the film industry and photography. The analysis involves a complicated quadruple integral that does not easily admit to conventional numerical analysis. However, there is a commercially available computer program that can perform this complicated quadruple integral in the very large entire visible atmospheric volume. It is called ASAR (Atmospheric Scattering and Absorption of Radiation), and is available from OEA International, Inc., of Morgan Hill, Calif.

The invention is useful for achieving annual energy savings, on the order of 2%-18%, depending on the latitude and altitude compared to existing controls that may be in place. By using the very accurate sun elevation and azimuth calculation routines, such as those provided in the "OEA Astronomical and Navigational Utilities" again from OEA International, Inc., as described in [7], U.S. Patent Publication US 2013/0116967, published May 9, 2013, along with the derived "critical sun elevation angle" controlling the artificial illumination in a house, office, parking lot, street or highway, such a savings in energy consumption for lighting can result. The energy savings using this methodology as a function of latitude has been verified by the "OEA Astronomical and Navigational Utilities". This is a very significant energy saving without causing any comfort or safety issues and can be implemented very quickly and easily according to the invention.

The ability to quantitatively represent energy savings is another key point of this invention. It can be shown that the complete hardware with a GPS module costs less than $200.00, which pays for itself almost immediately for a great majority of its applications. In consideration of the national renewable energy initiative percentage goal is 20% by 2020 in the USA, a significant portion of this figure can be achieved very quickly by the energy savings that can be realized with the implementation of a system according to this invention.

The invention will be better understood by reference to the following tutorial and detailed description in connection with the accompanying drawings.

BRIEF DESCRIPTION OF THE DRAWINGS

FIG. 1 is a diagram for illustrating the shadow method for measuring sun elevation angle that yields comfortable visibility.

FIG. 2.1 is a spectrum graph illustrating Scotopic and Photopic functions.

FIG. 2.2 is a spectrum graph illustrating Mesopic function for 0.01, 0.1, 1 and 10 cd/m$^2$ of brightness.

FIG. 3.1 is a graph of elevation vs. time illustrating annual variation in sun elevation angle at noon for locations above the Arctic Circle.

FIG. 3.2 is a calculated plot of yearly variation of sun elevation angle at noon for a tropical zone at Pearl Harbor, Hi., USA.

FIG. 3.3 is a calculated plot of yearly variation of sun elevation angle at noon for a temperate zone at Morgan Hill, Calif., USA.

FIG. 3.4 is a calculated plot of yearly variation of sun elevation angle at noon along with civilian, nautical and astronomical twilight diagrams at the world central time reference of Greenwich, United Kingdom.

FIG. 4 is a graph of sun elevation angle vs. time illustrating daily variation in sun elevation angle at three locations at the summer solstice and the winter solstice.

FIG. 5 is a graph of hours of sunlight duration vs. days of the year at five locations.

FIG. 6 is a graph for illustrating daily artificial illumination hour savings at Pearl Harbor as a function of off time set for sun elevation angles 1, 2, 3 and 4 degrees below the horizon.

FIG. 7 is a graph for illustrating daily artificial illumination percentage savings at Pearl Harbor as a function of off time set for sun elevation angles 1, 2, 3 and 4 degrees below the horizon.

FIG. 8 is a graph for illustrating daily artificial illumination hour savings at Morgan Hill, Calif. as a function of off time set for sun elevation angles 1, 2, 3 and 4 degrees below the horizon.

FIG. 9 is a graph for illustrating daily artificial illumination percentage savings at Morgan Hill, Calif. as a function of off time set for sun elevation angles 1, 2, 3 and 4 degrees below the horizon.

FIG. 10 is a graph for illustrating daily artificial illumination hour savings at Greenwich, UK as a function of off time set for sun elevation angles 1, 2, 3 and 4 degrees below the horizon.

FIG. 11 is a graph for illustrating daily artificial illumination percentage savings at Greenwich, UK as a function of off time set for sun elevation angles 1, 2, 3 and 4 degrees below the horizon.

FIG. 12 is a graph for illustrating daily artificial illumination hour savings at Narvik, Norway as a function of off time set for sun elevation angles 1, 2, 3 and 4 degrees below the horizon.

FIG. 13 is a graph for illustrating sun elevation angle as a function of time at Narvik, Norway for September 3.

FIG. 14 is a graph for illustrating sun elevation angle as a function of time at Narvik, Norway for December 3.

FIG. 15 is a graph for illustrating daily artificial illumination hour savings at Barrow, Ak. as a function of off time set for sun elevation angles 1, 2, 3 and 4 degrees below the horizon.

FIG. 16 is a graph illustrating the number of "on" hours per year as a function of latitude for off time set for sun elevation angles 1, 2, 3 and 4 degrees below the horizon.

FIG. 17 is a graph illustrating percentage of energy savings achievable as a function of latitude off time set for sun elevation angles 1, 2, 3 and 4 degrees below the horizon.

FIG. 18.1 is a block diagram illustrating a system for controlling street lighting according to the invention.

FIG. 18.2 is a relay timing diagram with a sun elevation diagram for a street lighting system for two arctic locations on March 21, including comparisons of sun elevation for June 21 and December 12.

FIG. 18.3 is a block diagram of circuitry of a controller in accordance with the invention for controlling a power distribution system in accordance with the invention.

FIG. 18.4 is a block diagram description of registers used for power switch activation according to the invention.

FIG. 18.5 is a block diagram representing a remotely accessible control point.

FIG. 18.6.1 is a block diagram of a toggle switch remote configuration for a single-switch indoor lighting control for the state when the toggle switch is not pressed.

FIG. 18.6.2 is a block diagram of a toggle switch remote configuration for a single-switch indoor lighting control for the state when the toggle switch is pressed.

FIG. 18.7 is a block diagram of a toggle switch remote for a four-switch indoor lighting control.

FIG. 18.8 is a block diagram in more detail of a toggle switch remote for a four-switch indoor lighting control.

FIG. 18.9 is a block diagram in more detail of a toggle switch remote for a four-switch indoor lighting control using Triacs.

FIG. 19 is a diagram for illustrating sun angle as a function of altitude at sunrise and sunset relative to surface normal.

FIG. 20 is a graph for showing sun elevation angle below the horizon as a function of altitude at sunrise and sunset.

FIG. 21 is a diagram illustrating the impact of the geoid shape of the earth.

FIG. 22 is a graph showing atmospheric refraction as a function of sun elevation at sea level and different pressures and temperatures.

FIG. 23 is a diagram illustrating atmospheric path length as a function of altitude for a given sun elevation angle.

FIG. 24 is a graph showing atmospheric path length as a function of time for two different altitudes of 0 m and 4,000 m.

FIG. 25 is graph showing air density as a function of altitude.

FIG. 26 is a diagram showing a technique for calculating altitude of a point on the atmospheric path using the Cosine rule for triangles.

FIG. 27 is a graph illustrating altitude along an atmospheric path length with an altitude origin of 0 meters for different sun angles.

FIG. 28 is a graph illustrating altitude along an atmospheric path length with an altitude origin of 4,000 meters for different sun angles.

FIG. 29 is a graph illustrating a light beam I as a function of distance.

FIG. 30 is a diagram for illustrating Rayleigh scattering of a light beam.

FIG. 31 is a graph showing wavelength dependency of the function $u_1(\lambda)$.

FIG. 32.1 is a graph illustrating the argument of the air mass integral as a function of altitude up to 30 km.

FIG. 32.2 is a graph illustrating the argument of the air mass integral as a function of altitude up to 80 km.

FIG. 33 is a graph illustrating the argument of the air mass integral along the atmospheric path length at 0 m altitude.

FIG. 34 is a graph illustrating the argument of the air mass integral along the atmospheric path length at 4,000 m altitude.

FIG. 35 is a graph illustrating air mass as a function of altitude at a sun angle of 90 degrees and at sunrise.

FIG. 36 is a graph illustrating air mass as a function of altitude for various sun elevation angles.

FIG. 37 is a graph illustrating air mass as a function of sun elevation angles for various altitudes.

FIG. 38.1 is a graph illustrating attenuation along an atmospheric path for sun elevation angle of 90 degrees from the horizon for various wavelengths.

FIG. 38.2 is a graph illustrating attenuation along an atmospheric path at a sun elevation angle of 45 degrees from the horizon for various wavelengths.

FIG. 38.3 is a graph illustrating attenuation along an atmospheric path at a sun elevation angle of 0 degrees (Sunrise/Sunset at sea level) for various wavelengths.

FIG. 39.1 is a graph illustrating normalized Planck radiation curves.

FIG. 39.2 is a graph illustrating the effect of scattering and absorption on atmospheric attenuation at a sun elevation angle of ninety degrees from the horizon at sea level.

FIG. 40 is a graph illustrating spectrum of the sun light at sea level for various sun elevation angles.

FIG. 41 is a graph illustrating spectrum of the sun light at 4,000 m for various sun elevation angles.

FIG. 42 is a graph illustrating spectrum of the sun light at 4,000 m for various sun elevation angles in logarithmic scale.

FIG. 43 is a graph illustrating direct and scattered peak wavelength as a function of time for sea level and 4,000 m.

FIG. 44 is a graph illustrating daylight visible power density at sea level and 4,000 m at a defined latitude and date.

FIG. 45 is a graph illustration daylight UV power density at sea level and 4,000 m at a defined latitude and date.

FIG. 46 is a graph illustrating daylight solar power density for various altitudes.

FIG. 47 is graph illustrating daylight solar power density under a curve fit formula for various altitudes.

FIG. 48 is a diagram for showing calculations for a layer of the atmosphere at an altitude of h with a thickness of dz which is perpendicular to the propagation direction of the direct sunlight.

FIG. 49 is a graph illustrating power loss and scattered power for various wavelengths at a sun elevation angle of 90 degrees from the horizon.

FIG. 50 is a graph illustrating power loss and scattered power for various wavelengths at a sun elevation angel of 45 degrees from the horizon.

FIG. 51 is a graph illustrating power loss and scattered power for various wavelengths at a sun elevation angel of 0 degrees from the horizon.

FIG. 52 is a graph illustrating power spectrum of scattered sunlight at sea level for various sun elevation angles.

FIG. 53 is a graph on an expanded scale illustrating power spectrum of scattered sunlight at sea level for various sun elevation angles.

FIG. 54 is a diagram illustration for calculating the components of the scattering integral from a point on a circular disk of radius R to a remote point and a surface.

FIG. 54.1 is a graph illustrating scattering integral components for a "Point" from a circular disk of radius R as a function its normalized argument $\xi$.

FIG. 54.2 is a graph illustrating scattering integral components for a "Point" from a circular disk of radius R as a function its normalized argument $\xi$ in log scale.

FIG. 54.3 is a graph illustrating scattering integral components for a "Surface" parallel to the circular scattering disc of radius R as a function its normalized argument $\xi$.

FIG. 55 is a diagram illustrating the three-dimensional view of the scattering region for sun elevation angle below the horizon for an observer at a point P at sea level in accordance with the invention.

FIG. 56.1 is a two dimensional diagram of the scattering region showing planes perpendicular to the incoming sun rays at a sun elevation angle of ninety degrees from the horizon.

FIG. 56.2 is a two dimensional diagram of the scattering region showing planes perpendicular to the incoming sun rays at sun elevation angles between zero and ninety degrees.

FIG. 56.3 is a two dimensional diagram of the scattering region showing planes perpendicular to the incoming sun rays at sun elevation angles between zero degrees and the critical angle known as the "Scattering Sunrise or Sunset Angle" according to the invention.

FIG. 57.1 is a two dimensional diagram of the scattering region for calculation of the critical angle $\theta_{SSS}$ sea level elevation according to the invention.

FIG. 57.2 is a two dimensional diagram of the scattering region for calculation of the critical angle $\theta_{SSS}(h)$ for an arbitrary altitude h according to the invention.

FIG. 58 is a two dimensional diagram used for calculation of the critical angle $\theta_{SSS}(h)$ for an arbitrary altitude h according to the invention.

FIG. 59 is a two dimensional diagram of the scattering region used for calculation of the mid-angle $\theta_{MID}(h)$ for an arbitrary altitude h according to the invention.

FIG. 60.1 is a graph illustrating various critical sun elevation angles $\theta_{DSS}(h)$, $\theta_{SSS}(h)$ $\theta_{MID}(h)$ as a function of altitude up to 30 km.

FIG. 60.2 is a graph illustrating various critical sun elevation angles $\theta_{DSS}(h)$, $\theta_{SSS}(h)$ $\theta_{MID}(h)$ as a function of altitude up to 30 km and 80 km.

FIG. 61 is a graph illustrating critical angles $\theta_{DSS}(h)$, $\theta_{SSS}(h)$ as a function of atmospheric thickness along with twilight angles.

FIG. 62.1 is a graph illustrating scattered sunlight integration area after sunset or before sunrise before the mid-point angle.

FIG. 62.2 is a graph illustrating scattered sunlight integration area after sunset or before sunrise after the mid-point angle.

FIG. 63 is a graph illustrating scattering and dark areas as a function of sun elevation angle below the horizon at sea level and at 10,000 m altitude.

FIG. 64.1 is a two-dimensional diagram illustrating calculation of the shadow line as a function of sun elevation angle.

FIG. 64.2 is a two-dimensional diagram illustrating the shadow line as a function of sun elevation angle.

FIGS. 65.1, 65.2, 65.3, 65.4, and 65.5, are two-dimensional diagrams for illustrating a calculation according to the invention.

FIG. 66 is a graph illustrating the principal mesh generation line length to the path length ratio as a function of sun elevation angle.

FIG. 67.1 is a two-dimensional diagram illustrating the calculation of the lit and dark regions on a scattering circle always perpendicular to the sun light.

FIG. 67.2 is a three dimensional diagram illustrating parameters and features according to the invention.

FIG. 68 is a graph illustrating scattering volume as a function of sun elevation angle below the horizon for atmospheric thicknesses of 30 km and 80 km.

FIG. 69 is a diagram illustrating normalized scattering volume and area as a function of sun elevation angle below the horizon for atmospheric thicknesses of 30 km and 80 km.

FIG. 70 is a three-dimensional diagram to illustrate scattering from a point on a section of a circular disk to a point or surface.

FIG. 71.1 is a graph of scattering integral results $A_E$ and $B_E$ for full and partial circles by moving along y axes.

FIG. 71.2 is a graph of scattering integral results $A_E$ and $B_E$ for full and partial circles by rotating the point P.

FIG. 71.3. is the graph showing the area of the partial "lit" circles as a function of y for various sun elevation angles below the horizon.

FIG. 71.4 is a graph of received scattered visible power density as a function of y for sun elevation angles below the horizon.

FIG. 72.1 is a graph of total and visible power density as a function of sun elevation angles below the horizon.

FIG. 72.2 is a graph of total, visible and UV power density as a function of sun elevation angles below the horizon.

FIG. 73 includes Table 1 and shows solar timing for four locations.

FIG. 74 includes Table 2 and shows interpretations of Islamic daily prayer times.

DETAILED DESCRIPTION OF THE INVENTION

This invention is now described in connection with the experimental and theoretical efforts that verify the validity of the invention.

2.0. Introduction

The energy-saving nature of this invention is the key of focus for purposes of illustration. Energy savings can depend upon relating the sun elevation angle to a comfortable visibility, a visibility that is sufficient for driving and pedestrian traffic without artificial illumination. In the first part that follows, two subjective methods for defining this relationship are described, both based on surveying a large number of people. The result of these subjective methods shows that a "critical sun elevation angle" can be defined when the sun elevation angle is in the range of 3° to 4° below the horizon for any date and location. This range of elevation angles is almost independent of the weather conditions, including thick cloud cover, and provides lighting that is comfortable enough for safe driving conditions with no artificial illumination. The obtained subjective results are backed up with light measurements using a light meter to show that quantitative values for the comfort levels are obtained by the scattered light for these conditions.

The second part of the disclosure that follows shows the energy savings achievable by setting the "on/off" times of the artificial illumination control corresponding to various sun elevation angles, namely −1°, −2°, −3° and −4° from the horizon. This is done by using a very accurate sun elevation and azimuth calculation computer program, as for example the "OEA Astronomical and Navigational Utilities" from OEA International, Inc. of Morgan Hill, Calif. [7] It is shown that controlling the artificial illumination in a home, office, parking lot, street or highway with this methodology, based on no measurements of ambient light, just a prediction of sun elevation angle, and the setting the "on/off" times to between −3° and −4° can result in yearly energy savings compared to the existing controls of on the order of 2%-18%, depending on the latitude and altitude.

In addition to a disclosure of a specific methodology and system for controlling "on/off" times, the last part of this work is a theoretical derivation of the relation between sun elevation angle and solar power density spectrum for any given sun elevation angle. This is done through rigorous mathematical analysis involving Stefan-Boltzmann and Planck Radiation Laws, along with atmospheric attenuation computations involving Rayleigh and Mie scattering. A general purpose analysis program for this type of problems is called ASAR.

The results of this theoretical analysis show that the highly subjective experimental results obtained in defining the "critical sun elevation angle" of −3° to −4° is not mere observation. There are physical reasons that can be explained through simulations.

3.0. Experimental Procedure for Relating Comfortable Visibility for Determining the "Critical Sun Elevation Angle"

There are two subjective methods used in this work to relate the "Comfortable Visibility" illumination levels to the sun elevation angle before the sunrise and after sunset. Since "Comfortable Visibility" is a subjective term and depends on the subject's eye sensitivity, having a highly subjective measurement method is acceptable. The first method explained is a survey method. It does not give any ambient-power-density-related information, but it gives a comfort level and that what really counts in artificial illumination. Lights must be turned "on" when the natural illumination becomes below a threshold level where a great majority of observers feels the need for it. The second method gives more quantitative results, but still is subjective and depends on the individual's eye sensitivity. However, it is more objective and can give a power density levels in W/m² as a result of the measurements.

3.1. The Survey Method

Since "comfortable" itself is a subjective term, illumination levels that might be comfortable for good visibility for some are not for others. Therefore the first experimental procedure was done on a large number of people with good enough eyesight for driving. Age, gender, eye color are also factors in this highly subjective study. The selection of the groups in the surveys was done including this variation. Each subject to the experiment was only asked to answer a very simple subjective question: "Do you feel comfortable driving or walking at this light level?"

In this experiment the subject was asked not to focus on a specific point, rather the subject was asked to just look at many directions and distances for typical walking or driving conditions with no artificial illumination at various known sun elevation angles. Once the answer becomes a definitive "NO", the calculated sun elevation angle for that condition is taken as the "Critical Sun Elevation Angle" for that subject. This simple test was done at different seasons, locations on the earth and weather conditions.

The results were surprisingly consistent, especially for something that is presumably very subjective and where there is a very large variation of eye sensitivity levels among subjects. Results of the survey due to the large variation on the eye sensitivity is not a single number, but shows a very small variation in the corresponding sun elevation angle at which subjects felt comfortable in visibility. The "critical sun elevation angle" is found to be when the sun elevation angle is in the range of 3° to 4° below the horizon for any date and location almost independent of the weather conditions even when a thick cloud cover is present. In any case, there was not any single subject feeling uncomfortable with vision when the sun elevation angle is 3° below the horizon, for even thick cloud cover conditions in the coastal regions during the surveys.

Similar and even much more advanced surveys using greater number of samples are done by research organizations throughout the globe for characterizing the artificial illumination effectiveness, but so far as is known it has never before been done to test for the sun elevation angle correlation for activating an action [34].

3.2. The Shadow Method

Assume the only illumination source is a street lamp such as shown in FIG. [1] and no reflection and scattering in the region of interest. There will be a shadow formed from the obstruction, in this case a stick with a known height placed perpendicular to the surface of the earth as shown in FIG. [1]. One can calculate the direction and the length of the shadow and the power density of the illuminated region around the shadow by knowing the orientation and distance of the stick relative to the light source from the luminous power of the light source and its radiation pattern using simple trigonometry and Lambert's law. Since a human eye can see between 380 nm to 780 nm of the electromagnetic radiation spectrum, the luminous power $P_0$ is the radiative power in this wavelength range. Assuming the street light is monochromatic with a uniform radiation pattern having power of $P_0$ in the visible range and is placed on a light pole with a height of h, the luminous power density at a distance d from the pole ignoring the cosine effect will be given with relation, $$P_l = \frac{P_0}{4\pi r^2} = \frac{P_0}{4\pi(d^2 + h^2)} \qquad (3.1)$$

If one is interested in the luminous power density $P_n$, in the direction of surface normal, then Equation (3.1) will include the cosine effect and will become, $$P_n = \frac{P_0}{4\pi(d^2+h^2)}\cos(\theta) = \frac{P_0}{4\pi(d^2+h^2)}\frac{h}{r} \quad (3.2)$$

giving, $$P_n = \frac{P_0}{4\pi(d^2+h^2)}h. \quad (3.3)$$

Consider a 180 Watt Low Pressure Sodium lamp (LPS), as widely used for street illumination as an example. LPS lamps are currently the most efficient electrically powered light source when measured for photopic conditions, having up to 200 lm/W [Lumen/Watt] of luminous efficiency η. Their overall lighting efficiency can be in the range of 15-29%. This is high compared to some other light source lighting efficiencies such as 2%, 63% and 8-14% for incandescent, fluorescent and LED lighting respectively. On the other hand it is useful to mention that the LED lights have a theoretical upper efficiency limit of 44%. LPS lamps are available with power ratings between 10 to 180 Watts and also have a long life, typically 18,000 hours, with very little degradation toward end of life. Their emission spectrum is dominated by two spectral lines at 589.0 and 589.6 nm, wavelengths dominated by the sodium D line emission. For all practical purposes they can be assumed as a monochromatic light source, at an average 589.3 nm wavelength. This closely matches the 555 nm peak response of the human eye for the photopic luminosity function. For 180 Watt electrical power consumption of the lamp, and using the maximum possible lighting efficiency of 29%, its radiant power at 589.3 nm will be 52.2 Watts. The relation (3.1) will give 0.0207 W/m² of luminous power density or brightness, for $P_0$, h, d and r taken as 52.2 W, 10, 10 and 14.1421 meters respectively. This is the radiative raw power density at the point, not the effective power density that the human eye sees. Multiplying this with the photopic luminosity function at 589.3 nm (reading from FIG. [2.1]) gives 86%, producing an effective luminous power density of 0.0178 W/m².

It is to be noted that using a light source that emits an arbitrary spectrum rather than a single wavelength, as given in this simple example is not this straightforward. These apply to many types of light sources such as in incandescent, fluorescent, HPS lamps or LED lamps. HPS lamps are probably the most widely used among these and are also efficient; giving 12-22% overall lighting efficiency and with luminous efficiency η of 150 lm/W when measured for photopic lighting conditions, and having better Mesopic efficiency compared to LPS lamps due to the wide spectrum of emission. They can also have electrical power rating as high as 600 Watts.

To perform the similar power density calculation for these sources, one has to integrate the multiplication of the radiant power spectrum (RPS), which is given in the units of Watt per wavelength [Watt/nm], along with a choice of luminosity functions which both are given as functions of wavelength. RPS is a function of wavelength and is not typically shown or given on the label for the light source. This information must be obtained directly from the manufacturer. Integration of RPS function over the wavelength will give the total emitted luminous power in Watts, not the electrical power consumption of the source.

The units of photometry and radiometry are different because the photometry is related to human vision, whereas the radiometry is not. The basis of light intensity in photometry is given by the candle power and lumens that have photopic luminosity function in their definitions. The lamps are typically rated with their electric power consumption in Watts and the amount of lumens it produces, which is a function of their luminous efficiency η. On the packaging of a light source, one typically finds the electrical power consumption and its luminous power in candelas or its total emitted lumens of the source. In some cases, as in the case of LED lamps, the color temperature of the source will also be provided, which gives an idea of the emitted spectrum. Therefore it is useful to note very basic photometry relations that apply to the earlier example given in radiometric example.

If a light source emits a known luminous intensity $I_V$ in candelas, in a well-defined cone with an apex angle of A, the total luminous flux $\Phi_V$ in lumens can be calculated with the relation, $$\Phi_V(\lambda) = 2\pi I_V\left[1 - \cos\left(\frac{A}{2}\right)\right] \quad (3.4)$$

For the same example the 180 Watts of electrical power for the LPS lamp will produce 36,000 lumens. For A taken as 90°, the relation (3.4) will give the intensity of the light source equivalent to 19,562 candles. Using relation (3.1), this light intensity at the same location will give 7.7834 cd/m² of luminance. If this were the only source of illumination, ignoring the reflections from other surfaces in the proximity of the shadow region and scattering effects, the shadow region will be completely dark. It is to be noted that average photopic luminance for today's street lighting covers a very wide range of 0.06 to 0.2 cd/m² which are much less than our example.

When the sun is below the horizon the sources of illumination are due to atmospheric scattering of the sunlight, which comes almost uniformly in every direction. At a certain sun elevation angle, when the sun is below the horizon and the scattered sunlight power density becomes approximately uniform in the visible range, the shadow of the light source will either disappear or will be difficult to detect by the human eye. This happens when the scattered light power density at the shadow region becomes equal or in the order of the calculated power density at the region outside the shadow region of the street lamp, the difference not being detectable by the human eye. For this example, if the scattered sunlight from the atmosphere gives a comparable brightness of 7.7834 cd/m² or 0.0207 W/m² at a sun elevation angle θ, then the shadow of the stick will not be visible to the human eye. There will be some diffractive effects along with scattered light coming from every direction that will generate a fuzzy appearance in the shadow boundaries, but this fuzzy region is very small compared to the shadow length and are not very detectable by the human eye from a reasonable distance, as shown in FIG. [1] for low sun elevation angles. So this measurement can be considered as a contrast measurement for the human eye, but it also gives some approximate power density values to compare with the scattered light from the atmosphere versus the illumination resulting from a certain condition.

In this experiment the human eye is focused upon the shadow region and not on an arbitrary viewing distance determined by the individual with many objects with different reflectivities randomly present, as in the previous experiment. This method is thus more objective compared to the previously explained method, but there is still human eye sensitivity involved. Therefore it may still be considered subjective.

This method shows that in standard street lighting conditions at the typical midpoints between them, the shadow becomes indistinguishable when the sun elevation angle is on the order of −2° to −3°. The reflective properties, the angle of observation with respect to the shadow region and the color of the surface are also factors, but overall results are consistent with these numbers. What this means is at sun elevation angles above the range of −2° to −3° providing artificial illumination for a typical street lighting does not improve the human vision at the location where the experiments are conducted! Therefore having the streetlights ON when the sun elevation angle is above −2° to −3° is a significant source of waste of energy for illumination purposes with no improvement in the comfort or safety level that it provides.

As can be seen these experiments are very simple and do not require sophisticated measurement instruments and can be done by anyone, anywhere with just a tool to calculate sun elevation and azimuth angles as a function of latitude, longitude and date very accurately.

With these very simple experimentation procedures, it has been concluded that the illumination levels when the sun elevation angle is below an interval between −3° to −4° there is a need for artificial illumination. It is also useful to compare this figure with standard twilight conditions. There are Civil, Nautical and Astronomical twilights, which correspond to −6°, −12° and −18° of sun elevation angles respectively. As can be seen, this range of subjective figure of between −4° and −3° is well below the Civil Twilight condition. It will be important to find out what the current illumination controls compare to this. To give some idea of measured luminance values at certain conditions consider respectively the list 3.4, 80, 100, 400, 1,000, 10,000-25,000, 32,000-130,000 lux [lumen/m$^2$] for the dark limit of Civil Twilight under clear sky, office building hallway, very dark overcast, sunrise/sunset on a clear day, overcast day, full daylight and direct sunlight.

If one is interested in giving some measured values in photometry units for these conditions, one can use a simple light meter used in photography, such as a Sekonic L-478DR which has brightness and illuminance measurement capability. (It costs less than US$400. It is to be noted that even for this price the sensitivity of Sekonic L-478DR is rated between 0.63 to 2·10$^6$ lux for illuminance or 1 to 980,000 cd/m$^2$ brightness. For this price it only supports light measurement capability using the photopic luminosity function.)

3.3. Spectral Integral Matching Technique

Since the goal of artificial illumination is to provide comfortable illumination levels with an artificial light source for the human eye at a given area, one has to know the basis of the spectral response of the human eye. This is a fairly complicated subject, but it can be quantified due to a long history of research in the area of dyes, artificial illumination, color displays, CRT tubes, photography, cinematography, computer generated imaging and medical research, which led into some well-defined standards and data involving the spectral response of the human eye [13-20], [29-32].

It is known that the human eye visible range of the spectrum is between 380 nm to 780 nm. The vision of the human eye is due to light sensitive cells which are called "Cones" and "Rods" in the retina, named after their shapes. "Cones" are three types of cells, each of which is sensitive to "Red", "Green" and "Blue" colors. Their wavelength responses resemble overlapping band-pass filter responses and each are centered at wavelengths related to the "Red", "Green" and "Blue" colors. Extensive experimentation shows that their peak sensitivities are at 440 nm (Blue), 545 nm (Green) and 600 nm (Red). This is named the "tri-stimulus theory" of the human eyes color perception. The spectral responses of these cells are determined by extensive experimentation and functional representations are known. Using these spectral responses as a basis, CIE (Commission Internationale de l'Eclairage) standards are defined and are used for a wide range of applications such as for generation of computer generated color displays or imaging. At low level light conditions the color perception is lost and the vision is established by the Rods. "Rods" are sensitive to light intensity, and their spectral responses are also known, again based on extensive measurements.

What is needed for this work is to know the overall response of the human eye to any given spectrum, which is also related to the light intensity. This can be done by employing the "Luminosity Function" or "Luminous Efficiency Function" and it also forms the central color matching function in the CIE 1931 color space. There are two luminosity functions that are well defined by standards in use today. For every daylight levels it is the "Photopic Luminosity Function" and is represented as the $V(\lambda)$ function. Its peak wavelength response is at 555 nm. For low levels of light intensity the response of the human eye changes; its peak wavelength response shifts to 507 nm and its spectral response is represented by the "Scotopic Luminosity Function" and is represented with $V'(\lambda)$. Both CIE functions are publically available with 1 nm intervals in the visible spectrum [30] and both are shown in FIG. [2.1].

In between these well-defined luminosity functions for the illumination levels, which are in the range of 10$^{-3}$ to 3 [cd/m$^2$], there is also the "Mesopic Luminosity Function" definition, which can be represented by using the Photopic and Scotopic functions along with weighting functions defined as a function of illumination levels and with some spectral dependencies. The general form of the weighting function is:

$$V_m(\lambda) = (1-x)V'(\lambda) + xV(\lambda) \quad (3.5)$$

Recent studies show that the "Mesopic Luminosity Function" gives a better representation of human vision for outdoor illumination applications. This can result in significant energy savings with good enough color vision by tailoring the emission spectrum of the illumination sources. Being a relatively fairly new concept, there are currently no set standards, but it is definitely beginning to get a wide acceptance in the illumination industry. FIG. [2.2] show the "Mesopic Luminosity Function" for 0.01, 0.1, 1 and 10 [cd/m$^2$] of light intensity levels also having a "blue heavy" spectrum. As can be seen, the example corresponds to the "Mesopic Luminosity Function" for 0.1 [cd/m$^2$] of light intensity level.

The physical problem is to find the sun elevation angle that matches the same comfort level provided by any given artificial illumination source at a given reference point with respect to the light source. A logical reference point is the mid-point between the light sources in the middle of the road for the street lighting case. It could be selected differently for different uses, but this is adequate for the intended purposes of this invention.

Moreover, a person on the street, a pedestrian or a driver, does not look at a specific point but rather views a wide area. So a better choice is to compare the luminous power coming to a wide area in the street to make the comparative study more objective.

First to be considered is predicting the sun scattered power density spectrum at any given sun elevation angle at the reference point. This is the hard part and is explained in detail in this work and done by using the aforementioned computer program ASAR from OEA International, Inc. The calculated power density spectrum at a point is then multiplied with the "Luminosity Function" and integrated over the entire spectrum, yielding a number represented as $P_{SS}(\theta)$, which is in the units of [W/m$^2$] and is mainly a function of sun elevation angle $\theta$. The luminosity function used here is the "Mesopic Luminosity Function" employing the LRC (Lighting Research Center) weighting parameters for their definitions in both integrals. Since the interest is in the solar power density after sunset or before sunrise, the entire atmospheric illumination for these conditions is due to atmospheric scattering of sunlight. Therefore the subscript SS represent Scattered Sun. The relation between the sun elevation angle $\theta$ and time is a function of latitude, longitude, altitude of the reference point and date and is obtained by using astronomical routines. Therefore one using astronomical routines can calculate the time t for the desired $P_{SS}(\theta)$ to turn the lights on or off.

Light sources in use for artificial illumination are not monochromatic; they are defined by a spectral power distribution which is not uniform over the visible wavelength as in the scattered sunlight. The second and relatively easy part is calculating the "direct" power density spectrum of a light source with a given radiation pattern and power spectrum in [W/nm] over the visible spectrum at the reference point. This calculated power density spectrum is then multiplied with the same "Luminosity Function" used earlier, giving a number $P_{LS}$, in the units of [W/m$^2$]. The subscript LS represent Light Source. This is a fair way of comparing two different spectral power distributions for human vision instead of going into confusing lumen, lux and candela units of photometry for many.

There is a wide choice of street light sources for outdoor illumination in use today, such as incandescent, florescent, high and low pressure sodium and LED lights with different power levels given as lumens or candelas with some radiation patterns. Therefore it is useful to give their definitions which are used in the conversions between the photometric and radiometric units. Using the candela definition:

$$I_V(\lambda) = 683.002 V(\lambda) I_e(\lambda) \quad (3.6)$$

where $I_V$, $I_e$ are luminous intensity in candles and radiant intensity in [W/sr] (Watt/steradian) along with:

$$F = 683.002 \left[\frac{\text{lm}}{W}\right] \int_0^\infty V(\lambda) J(\lambda) d\lambda \quad (3.7)$$

where F, $J(\lambda)$ are luminous flux in lumens and spectral power distribution of the radiation in power per unit wavelength, one can determine the luminous power density value in W/m$^2$ at any desired location to compare it with the calculated atmospheric scattering source of illumination. The ASAR tool will provide such a result.

A much simpler and obvious method of comparing two different spectral power distributions in the visible range is to compare their integrated values in the visible spectrum range of 380 nm to 780 nm, without using any of the Luminosity Functions. This "raw" integration will not factor in the human vision in the comparison, but it gives a better insight to issues when compared to the choices of the luminosity functions used.

One can theoretically predict the sun elevation angle $\theta$ and the corresponding time at any date that gives the target $P_{LS}$ for the same illumination levels that can be achieved at any desired reference point. This capability makes this invention even "customizable" for any illumination application anywhere on earth using any artificial illumination source with any type of arrangement and any given spectral power density spectrum.

In reality the spacing between street lights and the power of each light source and their radiative patterns is not done methodically, that is, with not a lot of science behind them. It is known that almost 30% of the street lights in use are very old and outdated [35]. Furthermore, when light sources are changed, there is rarely any attempt to match exactly the previously obtained illumination levels at a reference point. Lamps are simply replaced with more efficient light sources roughly corresponding to same luminous power and even with completely different spectral power densities and radiative patterns. Thus setting a switch to respond to a sun elevation angle at −3° to −4° is a general range and could save a considerable amount of energy, but energy savings can be increased even more by customizing settings in already installed lighting configurations. Some street lights at low traffic or rural areas are placed with larger spaces in between them. So this integral value $P_{LS}$, that is to be matched with the scattered light from the atmosphere $P_{SS}(\theta)$ can vary significantly. The sun elevation angle at the mid points between the lights can even be achieved at −5° of sun elevation angles even saving more energy.

Comparing $P_{SS}$ and $P_{LS}$ for any lighting configuration at any arbitrary reference point is one of the key claims of this invention.

5.0. Energy Savings as a Function of Sun Elevation Angle, Latitude and Date

The attractiveness of the method clearly shows when the energy savings of the methodology is quantifiable. For this a simulator is needed that can predict the sunrise, sunset, elevation and azimuth angle of the sun anywhere on earth, any altitude in the atmosphere and at any date accurately. With the requirement of "any date any place any altitude" this becomes mathematically a fairly difficult task. Even very reputable government organizations have difficulties in performing this task with the desired accuracy in the Arctic and Antarctic regions where the percentage savings increase dramatically.

5.1. The OEA Astronomical and Navigational Utilities

There are many sites on the Earth's surface where the sun's elevation and azimuth angle calculations have been done and published with accurate results, but mostly in the range of 60° North Latitude to 60° South Latitude. The reason for this is not because of lack of interest, or small population densities at higher or lower latitudes close to the poles; it is due to the mathematical difficulties in the calculations.

Calculation of the sun's elevation and azimuth angles as a function of time and date at higher and lower latitudes close to the poles becomes very complex. The basic reason of the complexity comes from the day and night at those higher latitudes can last more than 24 hours, even several months, depending on the date. The boundary for these regions is given by the Arctic Circle's definition. Arctic Circle is defined as the latitude which at least for one day a year the sun will be visible for 24 hour period [6]. This is directly related to the axial tilt of the earth which is 23.4 degrees, defined as the angle between the rotational axes of the earth and its orbital axes, while rotating around the sun. The axial tilt varies by 2 degrees over 40,000 year period and there are also daily variations caused by the tidal motions due to the moons orbital motion around the earth. For Epoch 2011 it is at latitude 66 deg 33 min 44 sec (66.5622 Degree) North. The Antarctic Circle is at the symmetric position of the Arctic Circle with respect to the Equator which is at 66 deg 33 min 44 sec (66.5622 Degree) South.

The majority of the sun tracking algorithms and formulas take the day as 24 hours. However above the Arctic Circle in northern hemisphere and below the Antarctic Circle in the southern hemisphere, this assumption is invalid, and so the sun tracking algorithms and formulas with that assumption fail [6].

As of Aug. 26, 2011 the sun elevation and azimuth angle calculation results of the present invention as hereinafter explained matches the NREL (National Renewable Energy Laboratory) results "exactly" below 68 degrees North or above 68 degrees South latitudes. In the NREL Solar Positioning Algorithm (SPA) report, the claim is ±0.0003 degrees accuracy "wherever they can give results." As of Aug. 26, 2011 NREL did not produce any data above 68 degrees North or below 68 degrees South latitudes. It is inferred that the program does not produce results for day lengths exceeding the 24 hours. Since the accuracy-related claim given in the SPA report is ±0.0003 degrees accuracy "wherever they can give results", this does not violate their claim, although it is incomplete.

Again, as of Aug. 26, 2011 the sunrise and sunset results produced by calculations used in conjunction with the present invention are within a second of NOAA (National Oceanic and Atmospheric Administration) results below 78 degrees North or above 78 degrees South latitudes. For below 78 degrees South or above 78 degrees North latitudes, NOAA gives the sunrise and sunset dates but with different results compared to observed and recorded dates.

The technical challenge is thus to predict the sun's elevation angle above the Arctic Circle over a period of a year, not merely on a selected convenient day. US Naval Observatory and the tool "OEA Astronomical and Navigational Utilities" results match extremely well in any latitude at any date, and both are all in line with historical measured data. This type of correlation with official USNO numbers over an entire year period, especially in the extreme latitude is considered remarkable. The following information provides verification.

FIG. [3.1] shows the sun's yearly elevation angle variation at noon from the horizon for extreme Arctic latitudes like the North Pole, the Magnetic North Pole, Barrow, Ak. and Narvik, Norway. Their GPS coordinates are given as in FIG. [3.1] are (90° N, 0° W), (81.3° N, 109.2° W), (71.2° N, 156.6° W) and (68.4° N, 17.4° E) respectively. As can be seen the USNO and "OEA Astronomical and Navigational Utilities" results are indistinguishable over a period of a year. FIG. [3.2]-FIG. [3.4] show the yearly variation of the sun elevation angle from the horizon at noon for Pearl Harbor, Hi., Morgan Hill, Calif. and Greenwich, UK respectively. FIG. [3.4] also shows the Civilian, Nautical and Astronomical Twilight sun elevation angles drawn as an elevation angle positive from the horizon to clearly show there will be a some period of time in the summer at Greenwich, UK the Astronomical Twilight conditions will not be met!

Altitude can have fairly important effect on the sunrise, sunset times and twilight times. The magnitude of the altitude effects on the sunrise, sunset times and twilight times depend on the latitude and the date. Noon does not change as expected but the altitude effects on the twilight, sunrise and sunset times and the desired −3° to −4° for this work are fairly significant.

This invention uses the "OEA Astronomical and Navigational Utilities" provided by OEA International, Inc., and which has been used for numerous other applications. The results of its computation matches the historic data as published almost exactly at those extreme latitudes [7].

FIG. [4] shows the date and latitude dependency of sun elevation angle with respect to local time at sea level, for Narvik, Norway, for Barrow, Ak. and for Magnetic North in Canada, which are all above the Arctic Circle. The dates are chosen as $21^{st}$ of December and $21^{st}$ of June which correspond to the dates for the longest night and the longest day in the northern hemisphere for all their locations. (In addition, FIG. [4] also shows sun elevation angle as a function of local time for $21^{st}$ of March only for Narvik.) The "critical elevation" angle, herein specified as −3° is also shown as a straight line in FIG. [4] assuming the sunrise and sunset sun elevation angle as 0° at sea level. However, this is not the universal case. It depends on atmospheric effects and altitude as well. The latitude and longitudes for these locations are given in Table [1]. The reason of choosing these extreme latitudes is to show the issues associated with this invention very clearly.

Curves 1-3 in FIG. [4] clearly show the 24 hour daylight where the sun elevation angle is always above 0° corresponding to $21^{st}$ of June. In curves 4-6 the 24 hour darkness is also clearly seen for $21^{st}$ of December. As can be seen in FIG. [4] for all of the locations noon time, where the sun elevation angle reaches its peak, can be defined and it is almost at the same time in terms of the local time. Therefore one can always determine noon by knowing the sun elevation angle as a function of time, even when the sun is not visible for 24 hour period for any location and date on earth, as if it is "marked" for reference. One can determine if it is 24 hour darkness for that particular date at that location by checking the peak elevation angle of the sun which corresponds to "noon". If the peak elevation angle of the sun is below the horizon, it is a 24 hour darkness period for that day. Similarly if the minimum sun elevation angle is above the horizon, this corresponds to 24 hour daylight for that particular date. If the maximum sun elevation angle is above and minimum sun elevation angle is below the horizon this corresponds to day and night and can be observed for that particular date at that location. This is the case for any latitude between the Antarctic and Arctic Circles throughout the year. This is clearly seen in curve 7 in FIG. [4] March 21 for Narvik. The daily variation of sun elevation angle at any geographical location between the Arctic and Antarctic regions at any date will look like the curve 7, shifted up or down, but for all locations and every day in any year sun elevation angle will always intersect the x axes which will correspond to sunrise and sunset for those locations.

FIG. [5] shows the duration of daylight period as a function of date for Barrow, Ak., for Narvik, Norway, for Greenwich, England, for Istanbul, Turkey and for Pearl Harbor, Hi., obtained simply by determining the difference between the sunrise and sunset times for any location for that date. The x axis shows days from 1 to 365 for the year 2012, day 1 being January $1^{st}$ and 365 being December $31^{st}$. As can be seen, the variations are relatively small compared to the locations in extreme locations which are in the Arctic Circle.

5.2. Latitude Dependency of the Energy Savings

Since the "daylight" and its 24 hour complement "darkness" duration is a function of date and latitude one would expect energy savings to be latitude dependent over a year period. In this section the energy savings latitude dependency over the year is quantified. The detailed analysis is done for samples of popular inhabited locations from the Equatorial regions to the Arctic regions for Pearl Harbor Hi., for Istanbul, Turkey, for Greenwich, UK, for Narvik, Norway and for Barrow, Ak.

FIG. [6] shows differences in hours between sun elevation angles of 0° to −1°, −2°, −3° and −4° for Pearl Harbor, Hi. over a year period. Day 1 in all the figures corresponds to January 1$^{st}$ and day 365 corresponds to December 31$^{st}$ in the x axes. This is a straightforward calculation as long as the times corresponding to any sun elevation are known. Since a simulator is used to determine sun elevation angle as a function of time, they are known and this time difference $\Delta t_i$ for a day i can be calculated as:

$$\Delta t_i = [t(\theta_i^{SRR}) - t(\theta_i^{ksr})] + [t(\theta_i^{kss}) - t(\theta_i^{SSR})] \text{ where}$$
$$\theta_i^{ksr} = \theta_i^{kss} \quad (5.1)$$

For convenience and simplicity the Sun Rise Reference and Sun Set Reference sun elevation angles $\theta_i^{SRR}$ and $\theta_i^{SSR}$ are taken as 0°. The superscript ksr and kss in (5.1) have integer values of 1, 2, 3 and 4 which correspond to the target angles of −1°, −2°, −3° and −4° respectively. Again for convenience and simplicity, they are set to the same angles for sunrise and sunset conditions denoted as superscripts ksr and kss for sunrise and sunset. As can be seen there are two periods on each day where energy savings is possible, one during sunrise and the second one during the sunset, which is indicated as bracketed terms in equation (5.1) for a day i which has day and night. The total saving in terms of time will be the sum of them as given in (5.1) for a 24 hour period which has sunrise and sunset.

The percentage savings compared to the "Reference ON Time" for each day can also be calculated as:

$$ps_i = 100 \times \frac{\Delta t_i}{TON_{SSR-SRR}} \quad (5.2)$$

Time difference between the sun elevation angles corresponding to the referenced sunrise and sunrise sun elevation angles $\theta_i^{SRR}$ and $\theta_i^{SSR}$ that corresponds to the darkness period is:

$$TON_{SSR-SRR} = 24 - [t(\theta_i^{SSR}) - t(\theta_i^{SRR})] \quad (5.3)$$

The term in brackets in equation (5.3) is the daylight period for the day i and its 24 hour complement will the darkness period, which gives the "ON" time for artificial illumination.

FIG. [7] shows the percentage difference or in other words daily percentage energy savings which can be achieved by changing the "ON" times from 0° to −1°, −2°, −3° and −4° in Pearl Harbor, Hi. As can be seen, the maximum daily percentage energy saving becomes 6% and it will be on the 21$^{st}$ of June. Consider now north at Morgan Hill, Calif., near San Jose, as seen in FIG. [8], the saving hours and the percentage energy savings increase compared to Pearl Harbor as shown in FIG. [9] and reaches 8.5%, also on the 21$^{st}$ of June. Further north to Greenwich, UK as shown in FIG. [10] and FIG. [11], the percentage energy savings gets close to 16%, again on the 21$^{st}$ of June.

Still further north in the Arctic regions there is a very sudden change starting in the Arctic Circle. Since the day length can be 24 hours in those regions there will be no savings using the methodology in this invention for the days having 24 hours of daylight as very clearly seen in FIG. [12]. Lighting for any case will be "OFF" for the duration of 24 hours. The same argument can be done for the days that there is 24 hour darkness; artificial lighting is "ON" for the duration of 24 hours. As a result for these cases there will be no energy savings by the methodology used according to this invention. As can be seen at a first glance it looks as if the methodology has energy savings only for during the days where there is day a transition between daylight and darkness. For the days that have 24-hour daylight periods in the Arctic regions, the denominator in (5.2) becomes zero; therefore it is not possible or logical to plot the percentage savings on daily basis for the Arctic regions. For this reason there are no meaningful daily percentage saving plots for the Arctic regions.

FIG. [13] show the significance of a small difference in the threshold sun elevation angle on the energy savings. As can be seen for Narvik for September 3, the time difference between the sun elevation angles of −4° to 0° is close to an hour. So, one can expect close to 2 hours of savings per day. FIG. [14] shows up to 5 hours of energy savings during the 24 hour darkness periods, which contradicts our initial conclusion. This is explained by the "Bonus" hours.

5.3. "Bonus" Hour Savings in the Arctic Region

The initial conclusion of "no energy savings for the days are 24 hour daylight or darkness" is not correct. It is true for the days having 24 hour daylight, but incorrect for the days having 24 hour darkness. In the Arctic regions during the transition days between 24 hour darkness and 24 daylight or visa-versa there will be many days, depending on the latitude, where there is 24 hour darkness, but the sun elevation angle from the horizon is above the threshold sun elevation angles −1°, −2°, −3° and −4°. For those days when the sun does not rise above the horizon, ambient light meets the conditions set by this invention and lighting may be triggered "OFF" for a considerable amount of time whereas normal lighting would have been "ON" for 24 hours for the sunrise/sunset elevation angle which is set to 00. This, not-very-obvious twist in the Arctic regions, are the "Bonus Hours". FIG. [14] illustrates this for Narvik on December 3. Here the sun doesn't rise; it remains below 0° all day, but it is above −1°, −2°, −3° and −4° for 4.5 hours, translating to more than 25% of energy savings by setting the threshold sun elevation angle to −4° compared to 0° as shown in FIG. [14]. For these conditions the above energy saving formula of (5.1) is invalid and becomes:

$$\Delta t_i' = [t(\theta_i^{kss}) - t(\theta_i^{ksr})] \quad (5.4)$$

The percentage savings as given in (5.2) becomes:

$$ps_i' = 100 \times \frac{\Delta t_i'}{24} \quad (5.5)$$

FIG. [15] shows the daily savings over the year at Barrow, Ak., which is the second highest latitude of inhabited locations on earth, giving a different picture compared to Narvik, Norway to show the degree of the non-linearity of the problem as a function of latitude above the Arctic circle.

5.4. Yearly Energy Savings as a Function of Latitude and Threshold Sun Elevation Angle The bottom line is to calculate the yearly savings as a function of latitude. For this, calculate the "ON" hours each day and simply add it for every day for the given threshold sun elevation angles as a function of latitude. This is shown in FIG. [16] for −1°, −2°, −3° and −4° given as threshold sun elevation angles. Mathematically speaking, FIG. [16] is the plot of:

$$T_{ON} = \sum_{i=1}^{365} \{24 - [t(\theta_i^{ss}) - t(\theta_i^{sr})]\}, \quad (5.6)$$

$$\theta_i = \theta_i^{ss} = \theta_i^{sr}$$

As can be seen the sum of "ON" hours for all threshold sun elevation angles decreases as a function of latitude continuously and smoothly until the Arctic region. For the reasons explained earlier, the reduction in the "ON" hours displays some discontinuities and anomalies, but still decreases. Anomalies and discontinuities increase as the threshold level decreases.

To calculate the yearly percentage energy saving yps, compared to 0° threshold sun elevation angle, simply calculate the "ON" hours for 0° reference for each day and sum it up for the year as:

$$T_{REF} = \sum_{i=1}^{365} \{24 - [t_i(\theta_{ref}^{ss}) - t_i(\theta_{ref}^{sr})]\}, \quad (5.7)$$

where $\theta_{ref}^{ss} = \theta_{ref}^{sr} = \theta^0$ giving:

$$yps = 100 \times \frac{T_{REF} - T_{ON}}{T_{REF}} \quad (5.8)$$

FIG. [17] shows the yearly percentage energy as a function of latitude for −1°, −2°, −3° and −4° of threshold sun elevation angles. Since all the curves are referenced to 0° threshold sun elevation angle, one can easily calculate the percentage savings at any latitude for any threshold setting between 0° and −4° by interpolation and subtraction on FIG. [17]. As can be seen, the percentage energy savings which can be realized is between 1-15% depending on the latitude and sun elevation angle threshold level compared to 0° setting. If −1° is used as the standard settings which is achievable in some conditions by prior art measurement methods, and use −3° threshold sun elevation angle, this will translate to 1%-7.5% depending on the latitude. Although there is not much savings at Pearl Harbor, there are very significant savings above latitude of 30° where majority of the human population resides.

5.5. Additional Savings Due to Population Activity Pattern

Since the method is purely based on calculations, not measurements, the sun elevation threshold angle can also be adjusted based on public activities, such as the date, day of the week and hour dependent. As an example, since the threshold level for sunrise and sunset can be set differently, it can be adjusted based on the traffic conditions that are basically set by the working hours. Rush-hour periods, where heavy traffic is present, coincides with sunset and/or sunrise for that date, so the threshold sun elevation can be set to −3°; if not it can be set to −4°, where there is still fair illumination due to scattering. For this capability one needs the local time information for the hardware. This can be obtained in hardware built around a smart phone module which can communicate with the central control center for remote access capability, monitoring and for diagnostic purposes, which also gets the local time information from the cellphone provider as in cell phones.

It is quite normal to expect much lighter traffic and people on the streets in the early hours on weekends or holidays compared to sunset hours, so sunrise threshold level can be set to −4° while having the sunset threshold level set at −3° for additional comfort for many. This is 2/7 ratio (28.5%) every week for 52 weeks a year everywhere in the world giving another 1% more savings as shown in FIG. [15]. None of these adjustments can be done by methods based on any prior art methods.

5.6. Taking Topography Effects into Consideration

For low sun elevation angles above the horizon, the light intensity at a point is also affected with the topography around the region of interest. As an example, if there are high mountain ranges in the path of the sun during the sunrise and sunset, the direct sunlight will be blocked and the light intensity will drop below the desired levels different than predicted by the assumption of a smooth earth surface. A very good extreme example to this is the small town of Whitney, in California on Highway 395 which is in the very close proximity of Mt. Whitney, with an elevation of 4,421 m [14,505 feet] above sea level, the highest peak in the 48 contiguous states in the USA. The entire western horizon of the town of Whitney is blocked by the High Sierra, while its eastern horizon is flat. This will cause the visible sunrise and sunset elevation angles to be different from each other on top of being different compared to places where the smooth earth surface assumption applies. There are many places like the town of Whitney, such as most of Switzerland and Norway, Austria and regions in the close proximity of the Rockies and the Sierra in the US. In these conditions, the only modification to the input information is the visible elevation angle of the horizon as an additional variable. This is only a function of the location and its 360° surrounding topography. Since astronomical algorithms calculate sun's elevation and azimuth angle as a function of location and time for a given date, the visible sunrise and sunset time for any day can be calculated by taking the topography effects into consideration. This capability itself may have important military and many other civilian and navigational uses as well.

The topography related effect is a nonlinear effect, so it can't be done by simple means. As an example, assume for a place like Whitney the visible sunset is at sun elevation angle of 20° at a particular date determined by the azimuth angle of the sun and the topography determined by the High Sierra. Whitney will not have direct sunlight when the sun elevation angle is below 20°, it will only have scattered light from the atmosphere. Using the "magical" −3° to −4° will give 16° to 17° of sun elevation angle to turn the lights on. This shows the need of calculating scattered light for any sun elevation angle. Simulation results however show that 16° to 17° of sun elevation angle to turn the lights on is an overkill. The correct values are again close to the −3° to −4° value.

5.7. Other Energy-Saving Applications

The underlying techniques presented here can be used for many other energy-saving applications as well without changing the hardware. Examples follow.

5.7.1. Indoor Lighting Control

For security reasons it is customary to leave some lights on when a house is vacant, especially for long periods. Where lights are always "ON" day and night, significant energy is wasted. Moreover leaving lights "ON" all the time gives a potential intruder a "no one is home" signal, so it defeats the security concern. In addition to the indoor lighting, most private houses have door and yard lights which are typically turned "ON" when it is dark and turned "OFF" during the day. Automating this process as herein described will save energy compared to other alternatives. The percentage energy savings that can be achievable for this application is not easy to calculate, but is actually more than for street lighting, since the majority of these lights are not controlled with great precision or discipline and mostly forgotten at "ON" state, even during the day. If selected power outlets and switches have a remote control capability employing WiFi, ZigBee or a power line modem, the hardware explained in this invention has the capability of controlling these as a function of any chosen sun elevation angle.

Compared to indoor light level sensing alternatives, the present is superior for indoor lighting control. Indoor light intensity can be very low even during the day. Therefore sensing the indoor light level for indoor light control faces similar issues as explained earlier, whereas the present methodology is completely immune to these issues. As long as the control unit can receive the GPS signal it will work anywhere with same accuracy and energy saving features as shown earlier.

5.7.2. Irrigation and Agricultural Automation

Sun elevation angle is important for many agricultural applications. Simply stated, milking of dairy animals such as cows, are done before sunrise and sunset all around the world! For some crops irrigation is best when it is at twilight and some at night. Having these functions and functions that are related to them controlled by the hardware disclosed herein gives great flexibility in each of the tasks and results in better efficiency, increases productivity and will result in energy saving. In other words, scheduling of irrigation systems can be done using the time interval defined by the sunrise/sunset times rather than set by local time. This approach will increase the irrigation effectiveness and will save water and since almost all of the irrigation water is pumped, it will also save significant energy. The disclosed methodology, combined with moisture sensing probes communicating with a central irrigation control based for example on the ZigBee (brand) wireless mesh network communication system has demonstrated a 35% savings in irrigation water in several large test farms and gardens.

5.7.3. Alarm Clock Based on Sun Elevation Angle with User Settable Time Bias

An alarm clock based on sun elevation angle with user settable time bias is a very useful instrument for people dealing with agricultural activities. As explained in 5.7.2., many agricultural functions are controlled by the sunrise and sunset, which is basically a sun elevation angle issue. The farmers or people engaged with these activities must be ready on time at the locations where these functions are to be performed. So they must be informed "before" a certain time for them to get ready for these activities. Having a user settable time bias associated with any sun elevation angle control function gives a great flexibility compared to an alarm clock which is set to the a specific local time. As is known, the sunrise and sunset times are location, altitude and date dependent and cannot be preset to a specific time for a year, it has to be adjusted daily!

5.7.4. Curtain, Blind and Shade Automation Based on Sun Elevation and Azimuth Angle Curtain, blind, shade automation and like indoor applications are the most complex of all because they involve sun elevation and azimuth as a function of time, date, location and altitude information combined with window orientation where the curtains, blinds or shades are to be controlled. It also complements home security functions along with indoor and yard lighting control. The electrically controlled shades, blinds and curtains are in use today in many homes and are controlled manually by an on/off switch. If the windows where the shades, blinds and curtains are installed are supplied to the controller with their azimuth angle and if they can be controlled remotely as will be explained, this manual operation can be automated in accordance with the invention. This capability adds more security to the residences when not occupied along with lighting control based on only sun elevation angle as explained in 5.7.1. The OEA Astronomical and Navigational routines can be used to calculate when the sun and moon will be at a given azimuth and elevation angle. This is a more difficult problem to solve than just sun elevation angle. Some azimuth and elevation angles do not give a solution on any date for that location for an arbitrary elevation and azimuth angle for the sun or the moon. In May of 2012, OEA International, Inc. introduced a smart phone application product called "Sun and Moon Dater" (found in the Apple App Store) for use in photography and architectural applications that has features and flexibilities now recognized as applicable for this particular home automation function.

Each azimuth and elevation angle limit for shades, blinds and curtains must be supplied to the controller. For each day the controller is configured to calculate when the sun will be in the elevation and azimuth angle for all the windows and then this information is used to activate control automatically.

5.7.5. Smart Home/Yard/Office Control with Sun Elevation and Azimuth Information and with Added Security Functions as the "SMS Door Bell with Cell Phone Access" Feature All of the functions explained in sections (5.7.1)-(5.7.4) can be integrated along with security functions into the existing hardware as an effective and easy-to-use security system. The central controller and an associated ZigBee wireless remote control capabilities can support any kind of sensor used in a home or office security system along with other sensors such as thermostats, motion detectors, yard irrigation moisture sensor probes and even an intelligent doorbell with remote access capability from a cell phone. The current state in home automation and control is one of having separate control systems all based on a very difficult-to-use user interface. If one adds the hardware cost of a yard irrigation system, yard illumination controls, home security system and thermostats, the total cost becomes three to four times the cost of the hardware described herein! Having a central control unit that controls all functions and that supports a high resolution touch screen display as in a tablet containing the OEA astronomical routines. GPS and a cell phone module could make every home, yard and office very energy efficient and be very easy to control locally or remotely with a smart phone—and with a very easy-to-use graphical user interface at much less cost! (This is where a high performance processor that can support multiple functions and is capable of supporting high level graphical software utilities in an integrated manner with very easy plug-in modularity really pays back!)

Consider the "SMS Door Bell with Cell Phone Access" application. This system employs a small CCD camera placed at the entrance of a home or an apartment and connected to a doorbell that is also a Remotely Accessible Control Point (RACP) of the system. It may have has a speaker and a microphone as in many existing door accessing system. When the doorbell is pressed, the bell will ring and the camera will take a picture and send the image data captured to the Central Control Unit (CCU) via LAN Ethernet, WiFi or ZigBee connectivity. If the remote access function of the doorbell is activated, the CCU will attach this image to a text with time, address and GPS location information and send it to one or more of preselected telephone numbers. If anyone who received the text message wants to answer the doorbell, they can call the phone number of the CCU and can connect to the loudspeaker and the microphone at the door. Thus the doorbell can be answered from any location with interactive voice communication between the person ringing the doorbell and the contact resident of that house or apartment. This is an added security feature to security systems that has very practical.

5.7.6. Mosque and Masjid Automation

In the Islamic religion, prayer times are set by sun elevation angle five times a day, every day. Typically the mosques broadcast proper melodies using a high power audio amplifier. The played tunes not only might be different based on the daily prayer time, but also can be different based on the Islamic calendar date. The times for prayer are called Athan times and the mosques typically have a prepared table for broadcasting these Athan Times daily. Since the sun elevation angle is date, altitude and location dependent, they are different for every mosque, and it is not a trivial process to determine the "correct" Athan Times for each mosque for a given date. Another complexity added to the problem comes from the different interpretations of the Quran by the Islamic scholars. There are eight different documented and widely used sun elevation tables along with some time adjustments for predicting the Athan Times in the world based on various schools of belief. Table [2] shows the Athan-Time-to-sun-elevation-angle relationships for all widely accepted and practiced interpretations of the Quran. As can be seen Table [2] gives the sun elevation angle corresponding to only four Athan times, excluding the "Asr". Sun elevation angle calculation requires the sun elevation angle at noon at that day, as given in the footnotes of Table [1], which is also date and location dependent. This brings additional complexity to the problem.

FIG. [1] is useful to determine the sun elevation angle corresponding to "Asr," as FIG. [1] is used to formulate the shadow-length-to-sun-elevation-angle relationship. Significantly, there is never a shadow when the sun elevation angle is 3° below the horizon at sunset and sunrise regardless of cloud cover. This is shown and proved hereinafter. To use this method, one must first formulate the shadow length for "Asr" as given in the footnotes of Table [1] as:

$$s_{ASR} = kh_S + s_{NOON} \text{ where } k=1 \text{ or } 2 \quad (5.9)$$

where $s_{ASR}$, $h_S$, $s_{NOON}$ are shadow length, height of the stick placed perpendicular to the ground and the sun elevation angle at noon for that location and date respectively. The k parameter is 1 or 2, based on again interpretation of Quran by the school of belief.

The sun elevation angle that satisfies the shadow length corresponding to "Asr" which is given in (5.9) can be calculated by trigonometry as:

$$\frac{h_S}{tg(\theta_{SASR})} = kh_S + \frac{h_S}{tg(\theta_{SNOON})} \quad (5.10)$$

where $k = 1$ or 2 where $\theta_{SASR}$ and $\theta_{SNOON}$ are the sun elevation angle corresponding to "Asr". Dividing both sides of (5.10) with $h_S$ gives:

$$\frac{1}{tg(\theta_{SASR})} = k + \frac{1}{tg(\theta_{SNOON})} \quad (5.11)$$

where $k = 1$ or 2 and solving $\theta_{SASR}$ from (5.11) gives the sun elevation angle corresponding to "Asr" as:

$$tg(\theta_{SASR}) = \frac{1}{k + \frac{1}{tg(\theta_{SNOON})}} \quad (5.12)$$

where $k = 1$ or 2.

The sun elevation angle at noon for a given latitude is a complex function of the date and requires astronomical routines. As an example FIG. [3.1] shows its date variation for 4 latitudes above the Arctic circle. To show the date dependency of (5.12) one can include "date" as a variable, giving:

$$\theta_{SASR}(\text{date}) = tg^{-1}\left\{\frac{1}{k + \frac{1}{tg[\theta_{SNOON}(\text{date})]}}\right\} \quad (5.13)$$

where $k = 1$ or 2.

If the sun elevation angle at noon dependency in (5.13) is ignored, it simplifies the calculation and gives:

$$\theta_{SASR} = tg^{-1}\left(\frac{1}{k}\right) \text{ for } \theta_{SNOON} = 90° \text{ and} \quad (5.14)$$

where $k = 1$ or 2 which $\theta_{SASR}$ becomes independent of the date. Following give a range of $\theta_{SASR}$ based on school of belief and $\theta_{SNOON}$ as:

$\theta_{SNOON} = 90°$ $\theta_{SASR} = 45°$ for $k=1$ $\theta_{SASR} = 26.565°$ for $k=2$ \quad (5.15)

$\theta_{SNOON} = 45°$ $\theta_{SASR} = 26.565°$ for $k=1$ $\theta_{SASR} = 18.434°$ for $k=2$ The noon sun elevation angle giving 90° in (5.15) is only satisfied two days in a year between latitudes 23°26'14.40" south and north, which are known as "Tropic of Capricorn" and "Tropic of Cancer" respectively. FIG. [3.2]-FIG. [3.4] show the yearly variation of sun elevation angle at noon for Pearl Harbor, Morgan Hill, Calif. and Greenwich, UK. As can be seen calculating the times corresponding to each Athan Times becomes a complex astronomical problem and in some locations for certain dates it will not even give a solution! Such a case is illustrated in FIG. [3.4], which shows the yearly variation of sun elevation angle at noon. The three horizontal lines in FIG. [3.4] show the civilian, nautical and astronomical twilight conditions. As can be seen at Greenwich, UK, which is well below the Arctic Circle, there are many days in summer where the sun does not go below 18° below the horizon. Astronomical twilight condition as well as Fajr and Isha times for some of the schools of belief as shown in Table [2] correspond to sun elevation angle of 18° below the horizon as well. This creates a problem for strict religionists and has been among the debate subjects for a long time.

In general even if the astronomical solution exists, since the time for a given sun elevation angle is a function of location, date and altitude along with atmospheric conditions, the Athan Times vary differently with date, for each mosque location over the year. As can be seen even by ignoring the altitude effects, preparation of the Athan Times for each mosque every day is a very involved task and lacks a great deal of accuracy in practice.

Another complexity of calculating Athan Times relating to the Islamic calendar can be seen in the last column of Table [2] for the school of belief in Mecca. As can be seen the "Isha" times are related to the "Maghrip" times according to the school of belief adopted in Mecca and is given as 90 minutes after "Maghrip", but this time bias becomes 120 minutes during Ramadan, which requires incorporation of an Islamic calendar into automatic software programs to make this adjustment to the software to be fully automatic.

OEA International, Inc. has introduced a smart phone product called AthanTimer, that calculates the exact Athan Time for any date anywhere on earth with greater precision than heretofore known, using again OEA Astronomical and Navigational Utilities along with the GPS data provided with the hardware. This product also has an Islamic calendar function to calculate religious dates practiced worldwide in Islam, including the unique events of Ramadan. This capability allows correct calculation times of "Isha" at any date even according to the school of belief adopted in Mecca!

With the present invention the audio amplifier in mosques can be turned on automatically at five times a day to play proper tunes using hardware explained in herein. This automates the Athan broadcasting process and brings about unprecedented accuracy. The hardware is not limited to use for only mosques, but it can be used for small public prayer places called Masjid's, which are located in many places (such as gas stations, airports and hospitals) as is common in many Islamic countries.

During Islamic prayers one turns toward Kaabe, and that requires the knowledge of the latitude and the longitude of the mosque and Kaabe. It is a classical "forward bearing" problem in geodesics. The aforementioned OEA Astronomical and Navigational Utilities can automatically calculate the azimuth angle with respect to "magnetic" as well as "true" north in order to give the direction to Kaabe anywhere on earth. Since the sun positioning algorithms are as accurate as 0.0003° on any date anywhere, using sun and moon as a reference it can calculate the Kaabe direction from the "Sun" or "Lunar" compass capabilities for places having magnetic anomaly issues effecting the proper operation of the magnetic compass. When mosques are built the orientation of the mosque is related to the Kaabe direction, but cannot be determined by anyone more than several hundred meters from the mosque or if the mosque is not visible.

The hardware supporting an additional time bias added to the sun elevation angle setting can control other control channels such as air conditioning, heating, lighting controls in the mosque as well. Since the mosques are basically visited for prayers during the period of Athan Times and have very little occupancy the rest of the time, there is no need to have all the electrical or heating to be on all the time. By controlling the energy consuming functions with Athan Times and a properly set time bias associated with them will also save an additional considerable amount of energy.

As can be seen this type of control based on sun elevation angle can be considered controlling an electrical function at a location multiple times a day, which are all at different times for every day, along with different functions that are also based on date and altitude.

6.0. The Control System

As herein after explained, the control system hardware for the general application consists of a GPS module, a programmable computer hardware module where the sun elevation angle versus time and date calculations are performed and compared with a value selected by the user, touch screen display for user interface and switches which are controlled by it. The software comprises the Astronomical Utilities, such as those available from OEA International of Morgan Hill, Calif. In addition, there is a user interface and the touch screen display control software. The hardware itself is an off-the-shelf hardware with RAM, Flash memory and a CPU with a real time clock. The GPS module is of the type incorporated into a smart phone. The operating system for this system is a flavor of UNIX. It may have Ethernet, WiFi, ZigBee and power line modem remote control capability and a simple cell phone module to make it accessible from anywhere on earth by a cell phone.

The processor may be an Atmel SAM9G45 ARM926EJ-S microcontroller 32-Bit RISC CPU operating at 400 MHz with onboard 128 MByte DDR2 SDRAM, 256 MByte NAND Flash and 4 MByte Data Flash. CPU operating voltage is 1.8-3.3V and total board current consumption of 0.16 A from a 12V supply. The operating system is LINUX kernel 2.6.30 and has a GPS module. It has Ethernet, WiFi, ZigBee and power line modem remote control capability and a simple cell phone module to make it accessible by a cell phone via text messaging or directly connecting to the web through a 3G or later cellular phone network. If the cell phone module supports GPS functions, there will be no need for another GPS module.

An alternative device is built around an Android-based smart phone/tablet module with touch screen, GPS module with Ethernet, WiFi, ZigBee and power line modem remote control capability for controlling switches and power outlets that supports any one of these means.

Both systems have hardwired to four relays or SCR/TRIAC-operated switches, which gives them next to the module control capability with no additional programming required for remote control devices.

For the system according to the invention to operate properly, the location where the system is installed must have good GPS reception. The controlled circuits in this configuration have to be in the vicinity of the system, which might not be always possible, which creates a limitation to the system. To overcome this issue the system has a digital remote control and data exchange capability for switches far from the system and utilizes Ethernet, power line modem, WiFi or a ZigBee wireless mesh network to control communication. This extends the range of the control functions performed by the unit and also provides a capability of accessing a remote GPS unit on the network where there is adequate GPS reception, such as a roof top. Besides increasing the range of control, this capability brings a great deal of flexibility to the system, basically giving limitless numbers of points of control only by software, without any change in hardware. The system can also work as a WiFi access point, so the user does not even have to be at the system location, can control, make changes and monitor remotely using a smart phone or a computer tablet running an application program or a PC connected to the Internet.

All of the controlled switches or ports can have independent sun elevation angles and time biases which are all user settable with very easy to use graphical user interface. The switches are controlled by sun elevation angle and user settable time biases to bring in a very desirable control capability to the system. As an example switch A can be turned on 5 minutes before the sun elevation angle goes below −4° and turned off 7 minutes after the sun elevation angle becomes 12° or higher.

The minimal hardware for controlling street lights for a city based on this invention is fairly straightforward. As it is shown in FIG. [18.1] in a city there will be a large number of points to control the street lighting, but there is only one switch to control per control point. Having just a GPS and setting the sun elevation angles to turn on and off for each intelligent switch controller will make the system operational in the entire city. Each control point with the help of embedded astronomical routines will automatically calculate the sun elevation angle for every day as a function of time at each location provided by their GPS receiver and perform the switching functions as a function of the preset sun elevation angles. This is done by running the OEA Astronomical and Navigational routines every day to generate the timing tables for all controls at a control point.

Remotely monitoring, setting of sun elevation angles for each control point depending on the location and its surrounding topography, if desired, and the diagnostics of the entire system that is done at a Central Monitoring and Control (CMC) location (FIG. [18.1]) for a city wide application puts some additional requirements into the system. A CMC is based on a computer configured for storing and displaying large amounts of data, mapping, user friendly graphical interface control, diagnostics and monitoring capabilities. It also needs to communicate with a large number of Central Control Units (CCU's) located very long distances away, on the order of several tens of miles. Since each CCU is intelligent and can perform switching functions autonomously, the remote data communication is minimal. The data communication between the switch controller and CMC therefore may be done through an existing cellular phone network using text messaging between the CMC and switch controllers. This gives a reliable, flexible and cheap solution to the problem and extends the system usefulness with additional capabilities in addition to energy saving street lighting control. Having the switch controller connected to the cellular network also provides the correct local time to each switch controller, which gives some additional power saving capabilities as explained in Section 5.5 above.

For indoor electrical control applications the problem is more complex. There is only one intelligent controller CCU per home or like location, but it has to have the capability to control many switches in the house or an office wherein many are set at different times to turn on or off. They typically also require manual control in the traditional way of flipping a switch. Some lights may also have dimming capabilities so that adjusting as desired might also be an option. One location might have multiple switches, again each with different sun elevation and time bias settings.

In the mosque automation case some switches must be activated five times a day based on sun elevation angle with time bias. There are many other applications that require similar kinds of multiple sun elevation angle and adjustable time bias controls as well. Therefore the hardware design goal is a hardware system that can perform these tasks plus have additional flexibility for future add-on requirements, for example through use of a graphical interface. Since the invention is based on controlling electrical switching activity based on sun elevation angle consider its application here.

6.1. Sun Elevation Angle Controlled Timing

FIG. [18.2] shows daily sun elevation angles for Barrow, Ak., Narvik, Norway and Magnetic North as a function of local time at different dates. These curves show all the possible cases all around the world for any date. These curves are generated by the OEA Astronomical and Navigational Utilities routines for given GPS coordinates, date and altitude. The inputs to the OEA Astronomical and Navigational Utilities are latitude, longitude, altitude, temperature, atmospheric pressure, date and time, all provided by the GPS module and other sensors or provided by remote input. If atmospheric pressure and temperature are provided, it can take these effects into account for sun elevation and azimuth angle calculations as well. The routines calculate the maximum/minimum sun elevation angle, sunrise/sunset sun elevation angles and their times, along with time of noon, and the length of the day and night at any given date. Ideally no local time information is needed; the sun elevation and azimuth are calculated at any location for a date and altitude in real time! Time zone can be calculated by integer division of the longitude by 15 (a function supplied to the OEA Astronomical and Navigational utilities) to get all the information as a function of the local time. Thus the time zone can be calculated if it cannot be externally provided. The only issue is that the geopolitical time zone can be different from calculated, because they are set by international rules and agreements. There are several half-hour time zones and they follow geographical pattern other than just longitude. Moreover they can vary with the daylight saving (DST) practices employed. These are set with local authorities, and there is no set rule. But an important feature of the OEA Astronomical routines is that it will give the correct sun elevation and azimuth angle at any instant of time anywhere on earth at any date using only the GPS time, which is the UTC (Universal Time Coordinated) time [1]. If the target sun elevation angle to turn on and off is given, it can also calculate the time of these events. As the example shown in FIG. [18.2] (top scale), the switch setting is set to ON state when the sun elevation angle is above −3° until it reaches the elevation angle of 9° and is set to OFF state until it reaches again the −3°. The OEA Astronomical routines calculate the times for these conditions and may generate a timing diagram as shown on top of FIG. [18.2] (here shown for 21 Mar. 2013 at Narvik, Norway).

If both of the sun elevation angle settings are possible on a single day, the problem of setting the timing diagram becomes trivial. But timing for any sun elevation angle settings is not that trivial. As can be seen for 21 June at Narvik, Barrow and Magnetic North, there is a 24-hour daylight period, so the sun elevation angle never goes below −3°. However, it does go below 9° for Narvik and Barrow. For Narvik, it is shown with a dashed line. So the timing diagram will not give a 24 hour OFF state as it does for the Magnetic North that day. Instead, it will give the timing diagram as given with the dashed curve for Narvik as shown on the top scale, where the switch will be ON between a little after hour 20 until hour 24 and OFF from hour 0 to a little after hour 20. If the OFF setting were set to −3°, this issue would not have even existed; the switch would have remained OFF for 24 hours! So in general, the artificial illumination problem is a "state problem" and must be solved carefully, as given in this example.

The second problem originates at the time artificial illumination is needed when the sun elevation angle goes 3 to 4 degrees below the visible horizon. First the sunrise and sunset sun elevation angles are needed, then the target sun elevation angles for artificial illumination control is set. This is dependent on altitude, temperature and atmospheric pressure and topography. While these are not an important factor between the Arctic and Antarctic latitudes, these are significant above the Arctic or below the Antarctic circles. Small degrees in sun elevation can make big time differences at certain dates.

6.2. The Generalized Central Control Unit (CCU)

To run an astronomical algorithm which is accurate on any date, time, at any altitude and place on earth, a hardware platform with a reasonable CPU power and memory is needed, typically more than an 8 or 16 bit microcontroller. This CPU power can also execute sophisticated and complex control and communication tasks, which are very useful with very low cost hardware add-ons. This will make the system a very general, flexible and programmable control unit for almost anything from energy efficient home automation to sophisticated street lighting control as well as other applications.

In a typical house, simple functions such as thermostat settings and yard irrigation control is done with complex and often confusing controls. This is mainly due to limitations in the hardware and numbers of switches and buttons available on the systems. One model might have two buttons and their functionality might be controlled by duration of their activation and the other one might have four buttons and the number of touches are counted and decoded to control some of the other setting etc. It is fair to say that none of these devices are user friendly for their settings and as a consequence they are not programmed properly to utilize their full effectiveness in practice. It can be considered actually a puzzle to program them and check which program is running even for an engineer! Having a powerful hardware as in the CCU, with a color touch screen and with an easy-to-use graphical interface that can be programmed through a high level programming language makes these presently cumbersome setting functions a comprehensible and easy task. (It also makes the life of the programmers of the CCU easy as well, because the software development is done through a very flexible and powerful high level language supported by the CPU hardware on the CCU. One CCU can do any number of thermostat settings, yard and indoor illumination with dimming functions, yard irrigation and servo motor controls as well as very sophisticated burglar alarm functions in a house or an office including their energy saving control functionality with the sun elevation angle!)

FIG. [18.3] shows a functional block diagram of a Central Control Unit (CCU) in accordance with the invention. In reality the hardware is configured differently, based on available component configurations. Functionally, the CCU comprises a cell phone module with GPS sub-module coupled to receive GPS signals via an antenna, an ARM processor, a programmable microcontroller programmed with routines needed in accordance with the invention, and a Relay Control Block coupled to control a plurality of power controlling relays O1, O2, O3, O4 each of which controls one circuit of power output. Optionally there may be a Sensor Circuit Block and with particular usefulness for a home environment, a Remote Control channel Block, with perhaps a Power Line Modem Option. Some of these elements are discussed in greater detail below.

6.2.1. The Cell Phone Module

The cell phone module with GPS is assigned an ID number (phone number) to be used to establish long range two way communication tasks between the CCU and the "distant outside world." It also provides local time and GPS data to the ARM processor. The "distant outside world" for street lighting is the CMC and for the general house/office electrical control it is a list of authorized cell phone numbers. Basically the control hardware can initialize a phone call to given list of phone numbers if necessary and receive a phone call from any one of them and communicate through standard text messaging protocols that also support image attachment to a text message, as is widely used in many cell phones. The sun elevation angle settings and other inputs can be loaded, monitored, updated or changed in the processor registers remotely through the cell phone module as shown with bus lines connecting them. Since most of the smart phone modules already have GPS modules, it can also provide GPS information to the ARM processor.

6.2.1.1. Communication Means with the "Distant Outside World" Using the Cell Phone Module and Existing Cell Phone Provider Services The CCU can communicate with the outside world, technically to any place on earth, utilizing the cell phone network. This can be done by five generally provided methods used by cell phone providers today:

i) Text Messaging: While this appears to be the most unsophisticated technique for communication, it is the most efficient way to communicate because it uses existing infrastructure. Under most tariffs one can send up to several hundred free text messages per month from any service provider in almost any country. A text message can cost in the range of 10 cents. The methodology employed for this method is given in reference [36], available upon request from the source.

ii) GPRS (General Packet Radio Service): The GPRS spectrum permits a range of 56-114 Kbit/sec data rate and is cheap. However, the setting time of websites is slow.

iii) EDGE: (Enhanced Data rates for GSM Evolution) Officially known as 2.9G but commonly used as "2G", EDGE theoretically provides 1 Mbit/sec data rates but in practice it is on the order of 400 Kbit/sec. However the website setting times are much faster than provided by GPRS.

iv) 3G: 3G mobile internet became a reality with 3G phone service, and it allows up to 28 Mbit/sec data rates. One can watch video and surf the web with this service.

v) 4G and LTE (Long Term Evolution): 4G service can provide 100 Mbit/sec and LTE service can reach 300 Mbit/sec data rates.

Pricing for data services given in ii-v basically depends on the amount of data transferred per month and it varies in the range of $5 to $30/month depending upon the tariff in each country and the provider.

Since the system described herein operates autonomously with very small data exchange between CCU and the CMU, all two-way data exchange can fit in a text message. In reality the system will not communicate more than once a month with a single text message for its normal operation in street lighting control. If the unit is intended to take over some live video security applications on top of its main energy saving use, all that needs to be done is to add the additional means of high speed data communication services provided by the cell phone provider.

6.2.1.2. Remote Access GPS Module

In many situations. GPS reception can be inadequate at the location of the CCU. As an example, some street light controls are placed in poor GPS reception locations. In a high rise apartment building the GPS signal can be very weak in the lower floors, even when next to a window! For these cases where the internal GPS unit is provided with the main control unit that cannot get the GPS data, a long range wired or wireless means of communication with an external GPS module is placed at a location with an adequate GPS signal level. This requires both the external GPS module and the CCU to support Ethernet, WiFi, ZigBee or any other RF communication capability.

6.2.2. The Sensor Block

The processor can also send data collected from a sensor block where employed. This data could be extensive but the minimum configuration gives the output voltage and current levels from each of its local outputs and data in its registers, such as sun elevation angle settings, GPS data, local time and other information related to remotely monitoring of the system. Monitoring the precise current value on the control hardware local outputs is particularly important for street illumination application. It allows CCU to be able to monitor if the switch is actually working as it is programmed and if the correct number of lights are functional. If the current level is below a threshold level set for that control unit, it means one or more street lights are not functioning. For this function current sensing level of the unit must be better than current consumption of any lowest power street light. If the voltage is at different level compared to its register setting, it means that there is a problem with the switch and can be detected by the processor and can issue a phone call for servicing to the CMC. The CMC can request information related to any one of this information at any time for monitoring the city wide network of distributed artificial illumination controls.

For indoor controls the precise current and voltage levels at the hard wired switches are not as important; the voltage output level is good enough for monitoring switch functionality. Similarly the current level being low when the switch is activated means the unit that is being controlled is not functional. Any of these conditions that indicate a malfunction can initiate a service request phone call to the "distant outside world".

6.2.3. Auxiliary Sensor Inputs

Beyond the minimal sensing used to control sun elevation angle-based triggers, the system can have thermometer, barometer and humidity sensors. This meteorological data is helpful for accurate prediction of the sunrise and sunset times. It even can be tied to a weather station that can also monitor wind speed, light intensity and air quality for other applications. It could employ several CCD (Charge Coupled Device) cameras. All these external components to the unit can be accessed through a dedicated I/O port and the processor can be programmed to communicate or it can be accessed through the "local remote wireless" network.

The image data obtained by any camera accessible to the CCU can be used to monitor the lighting functions visually from the CMC at any time. If the CMC requests an image, the image will be attached to the text and sent to it by the CCU.

6.2.4. USB, Ethernet, Audio and HDMI Ports

When the processor is loaded with the astronomical routines cited above, it generates the timing functions for the electrical controls and graphical user interface. This is done with an I/O port that allows direct communication with a PC or the like for testing, for loading software and for developing and debugging software. This direct external I/O function is established with a dedicated port, such as a USB port. The hardware may provide support for two USB ports and an Ethernet port. An HDMI port is very useful for viewing the LCD touch screen on a large HDTV monitor for training purposes and for displays in public places with image and sound. Audio output is used for driving an audio amplifier with stored audio information, such as stored in flash memory or an MP3 player in the hardware. Thus one can broadcast sound, tunes, music or any kind of audio information stored in the flash memory at any set sun elevation angle at any selected day or any time from the CMC.

6.2.5. Local Remote Wireless Network

The CCU may supports multiple wireless communication protocols. One may be any of the widely used WiFi protocols (IEEE802.11.xx) such as those used in the 2.4-2.48 GHz band with a maximum of data rate of 600 Mbit/sec utilizing the full bandwidth of 40M Hz. The unit may also serve as a wireless access point for wireless auxiliary sensors or as a relay with an address in an already established wireless network that includes the wireless auxiliary sensors.

Another may be the slower (250 Kbit/sec data rate) ZigBee (IEEE802.15.4) protocol with hardware operating in the 2.4-2.48 GHz band and which is much faster than what is needed in this application. The great advantage that ZigBee brings to the picture is its mesh networking capability which provides long range two way RF communication capability with much less power compared to the WiFi alternative. With current consumption of 45 mA, a low power ZigBee module can achieve reliable two-way radio communication over ranges up to 100 meters in open area with 1 mW of RF transmit power. In the power-down mode the current consumption of the module drops to 10 µA. For longer range communication to reach up to 1500 m in open space, one can use the higher power version known as ZigBee Pro, which gives 100 mW of RF power consuming 215 mA at 2.8-3.4V of supply voltage range. As can be seen these power levels are much less than any WiFi alternatives also giving a far better communication range in large indoor space with complex propagation paths for wireless home and yard automation applications.

Another option is to use a power line modem, a hardware option that uses existing home power wiring as the backbone of the network. An external converter unit is connected to the power network with the USB port for coupling to the system.

In a particular embodiment, the CPU can access, from the LCD touch screen, all three types of wireless communication channels simultaneously or any combination by a simple and easy-to-use graphical user interface.

6.2.6. Relay Switch Box

The final control electrical switching functions are established with a hardwired relay box that typically has four relay switches (with short circuit protection), each with a maximum current drive capability of 20 mA per channel and with LEDs to show their status visually. While this may be considered a primitive control point of the system, it is also the most heavily utilized one in practice.

6.2.7. LCD Touch Screen

An LCD Touch Screen, available from a variety of commercial sources, is used for data display, diagnostics and use as a graphical user interface for programming of the sun elevation angles and time biases for any number of channels in any configuration.

USB, Ethernet, power line modem, WiFi or ZigBee access to the switches brings two-way digital communication capabilities between the system and control points, which can also support many kinds of data logging and monitoring capabilities that can be used for remote data acquisition applications as well as basic user settable control functions with sun elevation angle and time biases. All of the collected present and historical data can be displayed in a very comprehensive graphical manner.

FIG. [18.4] show an example of the processor control registers that are remotely settable or are accessible through the graphical user interface. There is a data field for actual digital values of the control variable. This can be simply a 0 or 1, but it may have an 8-bit word length in order to remotely control dimming, power level, rotational speed or any servo motor.

6.2.8. Remotely Accessible Control Point (RACP)

In indoor applications there are many places where several switches are at one location as shown in FIG. [18.5], all of which can be controlled independently by manual switches as indicated as $S_A$, $S_B$, $S_C$ and $S_D$. FIG. [18.5] shows a remotely accessible control point (RACP) with four local control addresses. Each RACP has an IP address and one component for two-way communication, such as WiFi, ZigBee or Power Line Modem capability for interactive communication with the main control unit (FIG. [18.3]). In its simplest form it is a standard four-bank switch used for lighting control with remote capability. The requirement of the system is to be able to support the manual switching functions as well as, when selected, allow the switching controls to be transferred to the central control unit. This is done by pressing a toggle button. The toggle button is an important piece of the unit, so it is necessary to explain its functionality in detail.

6.2.8.1. Toggle Button with Blinking and Color Changing LED

The toggle button has two states and alternates its state each time it is pressed. In the first state, the control of the switch is manual, so the switch may be turned on or off by the manual switches as shown in FIG. [18.5]. In its second state the LED lights up, telling a person that the switch is under the control of the central control unit. Pressing the toggle switch will disable the remote function and the LED will be turned off. When the unit is in its manual control mode it is controlled by the manual switches in the traditional manner.

The LED also serves as a way to communicate to the person in the room if there is a problem associated with the hardware. By changing its color it can show the signal strength and functionality of the unit from a distance. As an example, red, green and blue color corresponds to low, medium and high carrier signal strengths respectively. If it is blinking red it means that the signal is low and there is a communication problem with the main control unit. If it is blinking green, it means there is an issue with the relays. If it is blinking blue, the controlled unit is on but no current is drawn, so it might not be functioning as it should, as in the case of a dead bulb. As can be seen the status and issues, if any, with the system can be communicated anyone in the room with very simple indicators that should make sense to anyone. It may also have a reset function (for example, by pressing longer than a typical period of time).

The status of the RACP may be stored in the status registers and communicated to the central control unit where it can be displayed and sent to the "distant outside world" through its cell phone text messaging capability.

6.2.8.2. The Functional Block Diagram of the Remote Access Control Point (RACP)

The operation of the RACP can be easily explained with the use of switches and relays as shown in FIG. [18.6.1], FIG. [18.6.2] and FIG. [18.7]. First consider a single switch operation remotely and manually.

FIG. [18.6.1] shows the functional block diagram of the RACP for the Toggle Switch (TS) not pressed. As can be seen, the RACP has two current paths. The path as shown as the top path in FIG. [18.6.1] is called the "manual path." It has a Manual Switch (MS) and in series configuration to it is a Manual Path Relay (MPR), which is closed (conductive or "1") when the toggle switch is not pressed ("0"). In this mode the relay will not have any excitation current; it is in conductive mode, the output OUT will be the same as the manual switch state and the LED will be off.

The bottom path shown as the remotely controlled path in FIG. [18.6.1] has a Remote Path Relay (RPR) which is controlled by the central control unit as explained above through WiFi, ZigBee or power line modem. The Remote (R) output line connecting the controller to the RPR has a Remote Path Switch (RPS) in series configuration in which state is controlled by the toggle switch state. When the toggle switch is not pressed, it is in the OFF state, so regardless of the remotely controlled signal state there will be no excitation current present for the relay (RPR) and it will be in non-conductive state ("0"). As can be seen this arrangement the output OUT is only controlled by the manual switch state regardless of the remotely controlled state.

FIG. [18.6.2] shows the switch and relay states when the toggle switch (TS) is pressed. At this state of the toggle switch, MPR is activated and turns into OFF state ("0") and RPS is ON ("1") state and the RPR is remotely controlled path is on or off based on the state of R which is remotely controlled by the central control unit. In this state the LED is on and will be configured to blink if there are some issues as explained earlier. The sense inputs are shown with dotted lines on the right, connecting OUT to the RACP.

Since the "sense" line is connected to OUT, RACP always monitors the output voltage and current and will communicate this information to the central control unit. This allows CCU to always know which switch is on, its current consumption and the status of any RACP at any desired time.

FIG. [18.7] shows a extended functional block diagram for four switches based on single control as explained earlier. The system has a single toggle switch and a single LED, but it has four sense lines (S#1, S#2, S#3 and S#4) going in to RACP from its four outputs (R#1, R#2, R#3 and R#4), four RPR four MPR, and four RPS units. The only additional connectivity is connecting the TS to the four RPR, four MPR, and four RPS units as is shown in FIG. [18.7].

FIG. [18.8] shows a more detailed electrical block diagram. For any remote control function the circuit requires a DC power supply in the range of 3.3V to 5V as is shown on the left side of the figure. The block on the right side is basically the block with a WiFi or ZigBee module which also controls the LED functionality as well as the relay and switch controls. As can be seen, placing the toggle switch on the DC path allows all the gating functions to be easily performed by the WiFi or ZigBee module. Alternatively the manual switches can be placed on the DC path or the high voltage (110-220V) AC paths.

6.2.9. Remotely Accessible Control Point (RACP) with SCR or Triacs

The "functional" operation of RACP using switches and relays are explained in earlier section 6.2.8. This explanation gives a good understanding of the electrical operation, and can be done exactly as described. As can be seen it employs two relays (RPR, MPR), one toggle switch (TS) and one switch (RPS) per remote control system. Typically these are installed into the small voids in the walls where the switches and power outlets are installed in a house. The entire system can to fit into the small volume of the conduit. Therefore having a small volume for the system is an important requirement. If the system cannot fit into the conduit space, than it may be an attachment unit to the power outlets or standard switches. The largest components in the previously explained RACP system are the transformer used in the DC power supply and the relays. Since the DC power consumption of the RACP is measured in milliwatts, the transformer is small. Depending on the current levels the relays can be large and noisy when they change state. These three components can be eliminated by using power supply with no transformer and replacing the two relays with back to back SCR's or a single Triac. The RPR, MPR combination will provide another desirable feature, such as manually and remotely controllable power level control like a "light dimming" functionality at the RACP's along with the simple ON/OFF function.

FIG. [18.9] show the block diagram of the RACP system utilizing Triacs. The manual switch MS and the potentiometer on the DC path controlled by the A/D converter provides the manual control for ON/OFF function and analog setting for the Triac trigger timing circuit at the RACP location. The DC voltage on the potentiometer is sensed and feeds the analog to digital converter (A/D). If the manual switch is pressed there will be a DC voltage setting based on the potentiometer position. As an example, if the manual switch is not pressed there will be 0V input at the A/D input. If the manual switch is pressed and the potentiometer is at its mid level, it will have half the value of the DC supply voltage, giving 2.5V for a 5V DC supply. A/D gives the triggering angle of the triac triggering circuit. As can be seen for an 8 bit A/D converter there will be 256 Triac pulse triggering angle levels 0° to 360°, which is much more precise than the standard triac triggering circuits for light dimming application in use today. The Triac triggering, A/D, selection of the data at A and B ports as well as other needed digital functions such as LED control of the RACP may be performed by a low cost and low power 8-bit microcontroller, so everything shown in the bottom of the FIG. [18.9] is a single chip.

When the toggle switch is pressed the Triac triggering angle is controlled by the CCU with 8-bit precision as provided by the manual potentiometer dimming control. The CCU can monitor the RACP manual state, its potentiometer setting and can maintain the same setting or can be programmed by the user interface for a different setting. This capability also gives the electric motor speed and torque control capability at the RACP if there is a need for it at that RACP location.

6.3. The Central Monitoring and Control (CMC)

For home and yard automation the functions of the CMC is much simpler and can be performed by an application program running on a smart phone. Consider the Central Monitoring and Control function in detail for a city wide street lighting control and monitoring application. Since each central control unit is autonomously capable of predicting the time of performing any function related to the sun elevation angle, the use of a CMC is basically monitoring the city wide artificial illumination, generating statistics, diagnostics, graphical display of the collected data and customizing the desired sun elevation angle information for any CCU in the system.

In a typical embodiment, a CMC is a PC connected to a number of cell phones that can access to any CCU in the system through the cell phone network and communicate with them through text messaging (sms). It can run the ASAR program for customization and the OEA Astronomical and Navigational Utilities. It may have sophisticated mapping and display functions with a comprehensive graphical display capability.

Every CCU is preprogrammed to turn the street lights on when the sun elevation angle is below 4° of the horizon. As mentioned earlier topography effects and the reference street lighting conditions are not known by the CCU at its location. In addition not all CCU's have a temperature and barometric pressure sensor at their locations. One CCU can supply the temperature and barometric pressure at that day to every other CCU through text messaging infrequently, such as twice a day. To customize the sun elevation angle to match the street lighting used at that location requires running ASAR for each CCU location. The adjustments or fine tuning are minor. The CMC can change the sun elevation angles for turning the CCU's on or off based on date or for any reason, so it actually has full control on the sun elevation angles at each location that provides the city wide artificial illumination.

If the CCU units installed have audio systems with audio amplifiers and loudspeakers, they can broadcast selectively voice messages in case of an emergency for informing the public. The CMC might be obtain a video or a still picture at any time if the CCU has a camera attached to it. All these important safety features can be supported with the system as described, since they are all modular components of a city wide system.

7.0. Sunrise and Sunset Elevation Angle Calculation

Assuming a spherical earth, the geometrical basis of the sunrise/sunset is illustrated in FIG. [19]. FIG. [19] is drawn intentionally out of scale to clearly visualize the angles and relations to the entire related geometry. The daylight period of a day for a location of given latitude, longitude and altitude is defined as the time between sunrise and sunset where the sun is visible at an elevation angle with respect the horizon at that location for that date. For an observer on the surface of the earth at a point P at sea level, the sun is visible if the sun is above the plane which is tangent to the earth surface at point P. If the atmospheric refraction of the direct sunlight is ignored, at zero altitude from the sea level this sun visibility elevation angle will be 0° from the horizon or 90° with respect to the surface normal vector $n_P$. This is shown as the straight line noted as $PP_AS_A$. $S_A$ corresponds to sun position at ideal sunrise/sunset condition assuming no refractive effects from the atmosphere.

Using geometry, without taking the complex atmospheric refraction effects into consideration, angle δ can be calculated by applying elementary trigonometry to the triangle $TOP_h$ in giving:

$$\operatorname{Sin}(\delta) = \left(\frac{r_e}{r_e + h}\right) \quad (7.1)$$

where $r_e$ and h represent the radius of the earth and the altitude of the observer at the point $P_h$ from sea level respectively as shown in FIG. [19]. Angle $\theta_{DSS}$ (which stands for Direct Sunrise Sunset) is the complement of the δ angle to 90° and is given as:

$$\theta_{DSS} = \frac{\pi}{2} - \delta = \frac{\pi}{2} - \operatorname{Sin}^{-1}\left(\frac{r_e}{r_e + h}\right) = \operatorname{Cos}^{-1}\left(\frac{r_e}{r_e + h}\right) \quad (7.2)$$

FIG. [20] shows the angle $\theta_{DSS}$ as a function of altitude, the complement of δ angle to 90°. As can be seen angle $\theta_{DSS}$ will be approximately 20 below the horizon (−2°) for 4,000 meters altitude above sea level. For 15,000 meters altitude above sea level, angle $\theta_{DSS}$ will be approximately 4° below the horizon or in other words −4° of sun elevation angle. As a result, the sunrise and sunset times must be calculated by finding the time corresponding to these altitude-dependent sun elevation angles from the sea level results as shown FIG. [20].

7.1. Effect of Earths True Geometry

Earth is not a perfect sphere; its geometry is best expressed by a volume known as a geoid, which is obtained by the rotation of an ellipse that has equatorial and polar radii of 6,388.1 km and 6,356 km respectively, giving a difference of 32.1 km between two radii [6]. This geoid shape of the earth, which is not in scale, is shown in FIG. [21]. Since the differences between the equatorial and polar radii are very small compared to any one of the radii, this shape is also some time referred as "flattened sphere". Since the ratio of the differences between the equatorial and polar radii, or in other words the "flattening" is f=1/298.257.

The relations (7.1)-(7.2) have the earth radius $r_e$ as a parameter in them. Using geometry, one can calculate the curvature of the earth at any latitude for any given angle with respect to the geographic north [6]. Since the curvature of the earth is a function of the latitude, all of the derived relations should have latitude dependency as a parameter. As an example curvature of the earth is 6,335.437 km and 6,399.592 km at the equator and poles respectively. For a given latitude sunrise and sunset direction with respect to the geographic north (azimuth) varies with date, since curvature of the earth is also related to the direction this effect also has to be included in the formulations as well. Including all these effects makes sunrise and sunset angles with respect to horizon a function of date, altitude and latitude. These effects are small and insignificant at the equator and at many lower latitudes but they make a very significant difference in the extreme latitudes in sunrise and sunset calculations for the dates where sunrise and sunset is observed in the same day.

7.2. Atmospheric Refraction

Refraction index of light in air is also a function of its density. Since it changes with altitude, the sunlight will refract as it propagates, causing it to follow a curved path rather than a straight line. If the refractive index were uniform, the light would have followed a straight path and the only refraction would have been at the space to atmosphere interface. This over-simplified schematic representation of the atmospheric refraction is illustrated in the right hand side of FIG. [19] assuming that the only refraction of sunlight occurs in the space to atmosphere interface given as at the point $P_{AR}$.

When light propagating in a media with a refractive index of $n_1$ propagates into a media with a refractive index of $n_2$ it will refract and reflect from the interface. The relation between the incidence angle and refraction angle is given by the Snell's law as:

$$\frac{\text{Sin}(\theta_1)}{\text{Sin}(\theta_2)} = \frac{n_2}{n_1} \tag{7.3}$$

where, $\theta_1$ and $\theta_2$ are the incidence angle of the incoming and refracted light respectively with respect to the interface normal. Solving $\theta_2$ from (7.3) for a given $\theta_1$ gives:

$$\theta_2 = \text{Sin}^{-1}\left[\frac{n_1}{n_2}\text{Sin}(\theta_1)\right]. \tag{7.4}$$

As can be seen in (7.4) if $\theta_1=0$ or in other words if the sun is directly overhead, $\theta_2$ will be always 0 independent of $n_1$ and $n_2$. For larger $\theta_1$, or in other words lower sun elevation angles as at sunset and sunrise one would expect light rays to bend more towards to the earth as can be seen in Equation (7.4). For every interface sunlight will also attenuate due to the reflections at each interface. The refractive index is also a function of wavelength. As can be seen it is a complex phenomenon to analyze accurately but a very good empirical relation is given in references [6-9], which gives the overall effect as the function of sun elevation angle by, $$R = \frac{1}{tg\left(h_0 + \frac{7.31}{h_0 + 44}\right)} \tag{7.5}$$

where R is in minutes of arc $h_0$ is the apparent elevation angle of the sun. The inverse relation is also available and given in references [6-9] to calculate refractive effect from the true elevation angle of the sun. Since refractive index is assumed to be a function of air density and it is related to temperature and pressure, the correction term of:

$$c(T, P) = \frac{P}{1010}\frac{283}{273 + T} \tag{7.6}$$

is given and the main formulation becomes, $$R(T,P) = c(T,P)R. \tag{7.7}$$

FIG. [22] shows the atmospheric refraction effect $\theta_{ref}$(R in 7.7) as a function of sun elevation angle for two different atmospheric pressures and temperatures at sea level. If the atmospheric refraction of direct sunlight is taken into consideration, at sea level this sunrise and sunset sun visibility elevation angle $S_A PS_{AR}=\theta_{ref}$ will become in the order of −0.53° with respect to the horizon. In other words an observer at sea level will see the sun approximately until it is 0.53° below the horizon. So the sunset and sunrise angles will be −0.53° with respect to the horizon not 0° as done earlier at sea level.

7.3. Extreme Atmospheric Refraction Conditions

When considering the sunrise and sunset issues in the extreme latitudes, one must consider "extreme" atmospheric effects such as mirages as well [10]. In extreme latitudes there are more dominant effects caused by mirages that are not taken into consideration in this description but that need to be mentioned because they can affect the sunrise/sunset times greatly.

The well-known phenomenon called a mirage can change the apparent sunset and sunrise time greatly under certain conditions. In certain mirage conditions it has been recorded that when the evening sun has gone down for over 20 minutes it is still clearly visible [10]. These extreme conditions generally happen when there is very high temperature gradient, higher than 2° C. per meter and generally higher than 4-5° C. per meter over the ground. These conditions occur when there is strong heating at the ground level, and an "inferior" image is commonly generated as a result of this. It is called an inferior image because the resultant image seen is under the real object, in this case the sun.

Inferior images are not stable. This type of inferior image mirage is very often seen on highways, deserts, airport runways and looks like water on the surface. Hot air rises and cooler air descends. In the process, the layers mix, and turbulence will cause distortion of the image. The image might look as if it is distorted, vibrating; it might seem as if vertically extended. If there are several layers there can be multiple images. In any case, inferior images are not larger than one degree in height.

A "superior" image occurs when the air below the line of sight is colder than that above. This is called temperature inversion, since it does not represent the normal temperature gradient of the atmosphere. In this case, light rays are bent down so the image appears above the true object. Therefore they are called superior mirages. Superior mirages are in general less common than the inferior mirages, but when they occur, they tend to be more stable. This is due to the fact that the cold air has no tendency to move up or warm air to move down. Superior mirages are more common in Polar Regions, especially over large sheets of ice with a uniform low temperature, but they have been recorded in lower latitudes such as in San Francisco.

One of the most historic and striking events related to a superior mirage happened to William Barents during his search for the Northeast Passage in the year 1596 [10]. When stuck in the ice at Novaya Zemlya, Barents' crew saw the midwinter night come to an end with a distorted sun about two weeks earlier than expected!! The real sun was still below the horizon, but its light rays followed the curvature of the Earth. This effect is often called Novaya Zemlya. For every 111.12 km that light rays can travel parallel to the Earth's surface, the sun will appear 1° higher on the horizon. If the vertical temperature gradient is +11° C./100 m than the horizontal light rays will just follow the curvature of the Earth.

These effects are difficult to model but interesting from the academic point of view. Mathematical modeling of these effects can be done by applying the solution of Maxwell's equations in non-homogeneous media in spherical coordinates where propagation constant is defined by concentric spherical shells. This will lead into the solution of the Helmholtz equation in spherical coordinates [25]. As far as this invention is concerned, these effects cause earlier sunrise and later sunset conditions than predicted by the methods employed in this work and will not cause any discomfort by the setting the "critical sun elevation angle" to −3° to −4°.

8.0. Atmospheric Path Length

The direct sunlight attenuates and scatters as it propagates in the atmosphere directly proportional with its direct optical path length. Direct optical path length is a function of the sun elevation angle and altitude. FIG. [23] illustrates the importance of the altitude effects graphically. As can be seen for higher altitudes the atmospheric path length is shorter when the sun elevation angles are high when compared to its sea-level values for the same sun elevation angles. On the other hand it will be dramatically larger compared to its sea-level values during sunrise and sunset at higher altitudes. The atmospheric path lengths are shown as $PP_A$ and $P_hP_{Ah}$ for sea level and for an altitude h on the right and left side of FIG. [19] respectively.

The atmospheric path length can be calculated several ways. An easy way to calculate it is by employing trigonometry applied to the triangles $OPP_A$ and $OP_hP_{Ah}$ as shown in FIG. [23]. Triangles $OPP_A$ and $OP_hP_{Ah}$ illustrate the sun with an angle $\theta_n$ with respect to the surface normal for a point P at sea level and for a point $P_h$ at an altitude of h above the sea level respectively. The sides $PP_A$ and $P_hP_{Ah}$ are the direct atmospheric path lengths associated with the triangles $OPP_A$ and $OP_hP_{Ah}$ which shows the altitude effect very graphically. Assuming the atmosphere with a uniform thickness of $t_A$ and $r_e$ being the radius of the earth, the atmospheric path lengths associated with the triangles $OPP_A$ and $OP_hP_{Ah}$ can be calculated using the Sine rule. Apply the Sine rule for the $OP_hP_{Ah}$ triangle which corresponds to the point $P_h$ being on a given altitude h, directly above the point P. For this case the Sine rule for the triangle $OP_hP_{Ah}$ can be written as:

$$\frac{r_e + t_A}{\operatorname{Sin}(OP_hP_{Ah})} = \frac{P_hP_{Ah}}{\operatorname{Sin}(P_hOP_{Ah})} = \frac{r_e + h}{\operatorname{Sin}(OP_{Ah}P_h^e)} \tag{8.1}$$

The angle relations given in (8.1) becomes:

$$OP_hP_{Ah} = \pi - \theta_n \tag{8.2}$$

$$P_hOP_{Ah} + OP_{Ah}P_h = \theta_n \tag{8.3}$$

leading into:

$$\frac{r_e + t_A}{\operatorname{Sin}(\pi - \theta_n)} = \frac{r_e + h}{\operatorname{Sin}(OP_{Ah}P_h)} \rightarrow \operatorname{Sin}(OP_{Ah}P_h) = \operatorname{Sin}(\pi - \theta_n)\frac{r_e + h}{r_e + t_A} \tag{8.4}$$

$$OP_{Ah}P_h = \operatorname{Sin}^{-1}\left[\operatorname{Sin}(\pi - \theta_n)\frac{r_e + h}{r_e + t_A}\right] \tag{8.5}$$

$$\frac{P_hP_{Ah}}{\operatorname{Sin}(P_hOP_{Ah})} = \tag{8.6}$$

$$\frac{r_e + h}{\operatorname{Sin}(OP_{Ah}P_h)} \rightarrow P_hP_{Ah} = \operatorname{Sin}(P_hOP_{Ah})\frac{r_e + h}{\operatorname{Sin}(OP_{Ah}P_h)}$$

$$P_hOP_{Ah} = \theta_n - OP_{Ah}P_h \tag{8.7}$$

$$P_hP_{Ah} = \operatorname{Sin}(\theta_n - OP_{Ah}P_h)\frac{1}{\operatorname{Sin}(\pi - \theta_n)}\left(\frac{r_e + h}{r_e + t_A}\right) \tag{8.8}$$

$$PP_A(\theta_n, r_e, t_A, h) = \operatorname{Sin}(\theta_n - OP_AP)\frac{1}{\operatorname{Sin}(\pi - \theta_n)}\left(\frac{r_e}{r_e + t_A}\right) \tag{8.9}$$

for $0 < \theta_n < \pi$.

If the sun rays are perpendicular to earth surface, which makes $\theta_n = 0$ in (8.9), then the triangle that the Sine rule is applied to vanishes and (8.9) becomes invalid. For this case on the other hand the atmospheric path length can be calculated very simply by the difference between atmospheric thickness $t_A$ and the altitude h altitude as:

$$PP_A(\theta_n, r_e, t_A, h) = t_A - h \text{ for } \theta_n = 0. \tag{8.10}$$

FIG. [24] shows the atmospheric path length as a function of time on a particular day at a particular place. As can be seen, the atmospheric path length is in the order of 619 km at the sunrise and sunset for sea level and is a strong function of the altitude. Curve 2 in FIG. [24] shows the atmospheric path length variation for 4,000 m and as can be seen exceeds 950 km. As can be seen the atmospheric path length exceeds the atmospheric thickness $t_A$ by a very large amount at low sun elevation angles which was taken as 30 km in the calculations. Since the atmospheric path will always remain in the atmosphere, the altitude of any point on it will have an altitude less or equal to atmospheric thickness $t_A$.

The direct sunlight will attenuate and scatter while propagating along its atmospheric path. The attenuation, scattering of the sunlight is related to the number of molecules and particles on its path. On the other hand the number of air molecules is a function of the density of air and is a known function of altitude. Especially for aeronautical and meteorological work knowing the temperature, pressure, density and viscosity of the atmosphere as a function of altitude is very important. These physical parameters are available as tables and curve-fit functions from sea level to altitudes up to 85 km [33]. FIG. [25] shows the density of air as a function altitude assuming the sea level temperature and atmospheric pressure are 25° C. and 1 Bar respectively. To calculate attenuation and scattering one needs to know the air density along the atmospheric path. This can be done by calculating the altitude of the points along the atmospheric path and convert it to density for the calculated corresponding altitude using the density versus altitude shown in FIG. [25].

The altitude of a point on the atmospheric path can be calculated by using the Cosine rule for the triangles shown in FIG. [26]. The $r_n$'s are radii of concentric circles with centers in the center of the earth and the altitude of each point $h_n$ on the atmospheric path is simply the difference given as:

$$\text{Altitude} \rightarrow h_n = r_n - r_e. \quad (8.11)$$

The concentric circle radii $r_n$'s can be calculated employing the Cosine rule to the triangle $OP_hP_n$ as:

$$r_n^2 = a^2 + b^2 - 2ab\cos(\pi - \theta) \quad (8.12)$$

where $\theta$ is the sun elevation angle from the surface normal and a and b in (8.12) are:

$$a = r_e + h \quad (8.13)$$

$$b = p_n \quad (8.14)$$

where $p_n$ represents the distance between the point of observation $P_h$ and the point $P_n$ on any location on the atmospheric path, giving:

$$r_n = \sqrt{(r_e+h)^2 + p_n^2 + 2(r_e+h)p_n\cos(\theta)}. \quad (8.15)$$

The altitude of the points on the atmospheric path for 0, 15, 30, 45, 60, 75, 80, 85, 88 and 90 degrees of sun elevation angles is shown in FIG. [27] for a point at sea level. FIG. [28] gives the altitude of a point on the atmospheric path of sun elevation angle for an altitude of 4,000 m above the sea level for 0, 15, 30, 45, 60, 75, 80, 85, 88, 90 and 92.03 degrees of sun elevation angle with respect to surface normal which shows the effect of the altitude more clearly. As can be seen in every case, the altitudes along the atmospheric path are always between 0 and 30 km, which is the thickness of the atmosphere $t_A$, which is the value used in the calculations. At higher altitudes the sunrise will be earlier and sunset will be later, giving longer duration for daylight compared to sea level. At high altitudes the atmospheric path length is far greater compared to sea level during the sunrise and sunset as shown in FIG. [27-28]. Thus, one should expect smaller solar power densities for sunrise/sunset at higher altitudes compared to sea level sunrise/sunset.

There is also another effect to be considered due to the altitude along the atmospheric path length as shown in FIG. [28]. As can be seen, the altitude plotted in they axes starts at the given altitude of $P_h$ and drops to zero and then increases as the distance between the observation point and the point $p_n$ on the atmospheric path increases. As can be seen in curve 1 for sunrise/sunset conditions, when the elevation angle of the sun corresponds to 2.03° below the horizon, the rays of the sun pass from sea level for a much larger distance, where the air density has its highest value causes even more attenuation.

9.0. Theoretical Calculation of the "Magical −3° to −4°" Sun Elevation Threshold Angle This section shows that the −3° to −4° of sun elevation angle is not a coincidental result obtained from observations; there are fundamental physical reasons for it. Its derivation is not necessary for this invention. Any experimental work, especially in this area, requires a great amount of experimentation at different geographical locations for many dates on a large sample of subjects to be conclusive. One simply would need a great deal of resources to perform this task. If it is possible to theoretically model, understand and accurately quantify the physics of illumination for any sun elevation angle, it would not only be a good academic work, it would also lead to the magical −3° to −4° sun elevation angle to control the artificial illumination with higher confidence in experimental results and without much experimentation.

In the course of exploring a solution to the problem of unneeded artificial illumination, a study was performed on the solar power of direct sunlight employing astronomical routines using very widely used sun elevation versus solar power density formulas [11,12]. This initial work showed that the very widely used empirical relations are not accurate enough for any desired degree of accuracy for high altitudes and lower sun elevation angles in predicting total solar power.

J. M. Akcasu privately identified a need for a tool that could predict the "Golden Hour". This required a solution of predicting the received direct solar power spectrum at any date, time and altitude. Knowing the solar spectrum as a function of time for any given location and date on earth would enable the prediction of the "Golden Hour", an instant which is important in photography and computer graphics for the film industry. As a result of the development of the present invention, one can now predict the solar spectrum anywhere, at any date and time. One can therefore also predict the time for any desired color temperature. Calculation of the solar spectrum as a function of time or a given sun elevation angle requires the Rayleigh scattering to be included in the attenuation calculation for direct sunlight.

A natural extension for this work was the ability to calculate the solar power density after sunset or before sunrise, which is dominated by the Rayleigh scattering phenomenon. This is a challenging mathematical problem. It requires Rayleigh scattering calculations to be performed in the entire visible sky. During this study while calculating the power density of scattered sunlight as a function of sun elevation angle, this magical −3° to −4° of sun elevation angle showed up consistently, making possible the present invention. The theoretical work was confirmed by experimentation, so it is felt due credit should be given to the theoretical basis of this invention.

9.1. Scattering and Absorption of the Sunlight in the Atmosphere

For the mathematical explanation of the results given in this invention, one needs to be able to calculate the scattered sunlight power density spectrum at sun elevation angles before sunrise and after sunset, when the sun is not visible for any given altitude. This has several issues which have to be implemented with care, such as the sun elevation angle at sunrise and sunset, attenuation of the direct sunlight and emitted scattered sunlight, emitted scattered power calculation at any given point with given with an altitude in the atmosphere. The following section has important points related to this invention. These complicated procedures are implemented using the ASAR programming library. In principal, the underlying physical mechanisms of scattering and absorption are different, but they can be related by the total attenuation of radiation in the direction of propagation.

Consider a beam of light of intensity I(x) as graphically depicted in FIG. [29] propagating in a media such as the earth's atmosphere with particles or molecules on its path. If the media only had absorption properties with no scattering properties, it will attenuate along its propagation path. The absorbed radiation energy along its path will be converted into a different form of energy. In the case of absorption in the atmosphere, most likely it will to be converted to heat such that the energy conservation law is satisfied as well. If the media had no absorption properties at all but had scattering properties, the radiation will still attenuate along its propagation path due to the power or energy loss in the original direction of propagation due to scattering. The difference between the two cases is that the radiation will not be lost or converted to some other form of energy in the case of scattering, since some of its power is scattered away from its initial propagation direction it will still attenuate along its initial path. So, one can combine the absorption and scattering effects by the use of defining the attenuation as a sum of absorption and scattering properly along the direction of the propagation.

Scattering in the atmosphere can be due to Rayleigh or Mie scattering, or both [2, 13-20]. Mie scattering is nearly independent of the wavelength and it can be considered nearly independent of direction. It occurs when the size of the scatterers are large compared to the wavelength; such as for dust particles and water vapor in clouds or fog in the atmosphere. Since the size of molecules in the atmosphere is very small compared to the any wavelength of interest herein, scattering in the atmosphere from molecules is assumed to be due to Rayleigh scattering and is inversely proportional to the fourth power of the wavelength and has directional dependence with respect to the scattering angle given as:

$$I_S = I_0 \frac{1 + \cos^2(\theta)}{2r^2} \left(\frac{2\pi}{\lambda}\right)^4 \left(\frac{n^2-1}{n^2+2}\right)^2 \left(\frac{d}{2}\right)^6 \quad (9.1)$$

Thus, the scattered light intensity $I_S$ is related to the incoming light intensity $I_0$ with (9.1) where $\theta$, $\lambda$, r, n and d are scattering angle, wavelength, distance to the scatterer, refractive index and diameter of the scatterer respectively as shown in FIG. [30]. One can also define Rayleigh cross-section of a scatterer as:

$$\sigma_s = \frac{2\pi^5}{3} \frac{d^6}{\lambda^4} \left(\frac{n^2-1}{n^2+2}\right)^2. \quad (9.2)$$

Through measurements or theoretical calculations one can determine the attenuation due to scattering. As an example for Nitrogen ($N_2$), which accounts for 75% of the atmosphere, at 25° C. and 1 Atmosphere of pressure, $\alpha_s = 10^{-5}$ $m^{-1}$ at 532 nm wavelength.

As can be seen in (9.1) even to start dealing with scattering, one needs to know the initial or coming light intensity $I_0$. Since the scattering point is a point in the atmosphere, one needs to calculate the incoming light intensity $I_0$ at that point. Direct sunlight comes from the sun which is located a great distance away from the earth. When it enters the atmosphere it attenuates until reaching the point P. For a quantitative analysis, it is proper to start from the attenuation process of radiation in the atmosphere.

9.2. Attenuation of the Direct Sunlight Along the Direct Atmospheric Path

Using the Sine rule the direct atmospheric path length is given as a function of sun elevation angle, thickness of the atmosphere and altitude. The problem then becomes one of finding the attenuation of sunlight along this calculated direct atmospheric path. Absorption and scattering is the main cause of power loss of sunlight during its propagation along the direct atmospheric path. The Beer-Lambert law gives a good representation of the attenuation in the clear sky in the absence of refractive and reflective effects. If the incoming sun power density at a given wavelength is represented with $I_0$, then the power density at that wavelength along the atmospheric path can be given as:

$$I = I_0 e^{-m\tau} \quad (9.3)$$

where:

$$\tau = \tau_0 + \tau_{(CO_2,O_2)} + \tau_{NO_2} + \tau_{H_2O} + \tau_{O_3} + \tau_R. \quad (9.4)$$

As can be seen, $\tau$ in equations (9.4 and 9.3) has many components due to the composition of the atmosphere, which are attenuation due to aerosols and dust, $NO_2$ (Nitrous Oxide), $O_2$ (Oxygen), $H_2O$ (water vapor), $O_3$ (ozone), etc. All parameters are functions of the altitude as well. Note, m is the optical mass along the atmospheric path as shown earlier and $\tau_R$ is the Rayleigh scattering term [12, 21-24].

FIG. [29] illustrates the derivation of the Beer-Lambert law as found in reference [26]. Assume that the $I_0$ is the incident sunlight at a given wavelength at the edge of the atmosphere represented at x=0 in as shown in FIG. [29]. As it propagates along the atmospheric path let's assume that it attenuates with a constant attenuation constant $\alpha$ per unit length. So for the region from x to x+dx one can write:

$$I(x) - I(x+dx) = dI(x) = -I(x)\alpha dx. \quad (9.5)$$

Rearranging (9.5) will give:

$$\frac{dI(x)}{dx} = -I(x)\alpha \quad (9.6)$$

resulting in the well-known first order differential equation:

$$\frac{dI}{dx} + I\alpha = 0 \quad (9.7)$$

for which the solution of (9.7) will give:

$$I(x) = I_0 e^{-\alpha x}. \quad (9.8)$$

Since the air density is function of altitude and since the altitude changes along the atmospheric path with a known relation as shown in FIG. [27, 28], for the present case attenuation constant $\alpha$ becomes a function of x, represented by $\alpha(x)$ along the atmospheric path in the atmosphere and the solution of (9.7) will give:

$$I(x) = I_0 e^{-\int_0^x \alpha(x')dx'}. \quad (9.9)$$

The problem thus becomes finding α as a function of altitude and performing the numerical integration in the exponent of (9.9), which is given as m in the Beer-Lambert law expressed as in (9.3).

Attenuation has basically two different components with different mechanisms, namely absorption and scattering. In absorption the light will be absorbed by the molecules or particles present in the path. So it is basically a pure optical loss with no recovery. In scattering, the scattered light is not lost; it is scattered in every direction, but still is a loss in the direction of propagation due to scattering of power in directions other than the propagation direction. Later focus will be on the scattering in detail. Both can be assumed to be linearly proportional to the number of molecules in the atmosphere in the propagation direction. If the number of molecules is assumed to be uniformly distributed in every direction, one can relate the density of molecules in the propagation direction by:

$$\alpha_a, \alpha_s \propto N_{molecules}[m^{-1}] \rightarrow \alpha(h) = k\rho^\gamma(h) \quad (9.10)$$
$$\text{where } \gamma = \frac{1}{3}$$

and where $\rho(h)$ and k are respectively the density of air at an altitude h along the atmospheric path in the atmosphere and a linear proportionality coefficient. Since the total attenuation at a given wavelength will be the sum of absorption and scattered components, the total attenuation in the direction of propagation can be represented as:

$$\alpha = \alpha_s + \alpha_a. \quad (9.11)$$

If the values of $\alpha_s$ and $\alpha_a$ at sea level are known as $\alpha_s(0)$ and $\alpha_a(0)$, then using (9.10), they can be expressed as a function of sea level air density. For absorption related attenuation (9.10) becomes:

$$\alpha_a(0) = k\rho^\gamma(0) \quad (9.12)$$

giving k as:

$$k = \frac{\alpha_a(0)}{\rho^\gamma(0)}. \quad (9.13)$$

Substituting k in (9.10) gives α at an altitude of h as:

$$\alpha_a(h) = \frac{\alpha_a(0)}{\rho^\gamma(0)}\rho^\gamma(h). \quad (9.14)$$

Rearranging (9.14) results in:

$$\alpha_a(h) = \alpha_a(0)\frac{\rho^\gamma(h)}{\rho^\gamma(0)} = \alpha_a(0)\left[\frac{\rho(h)}{\rho(0)}\right]^\gamma. \quad (9.15)$$

As can be seen, (9.15) gives the absorption portion of attenuation as a function of altitude h by just knowing the air density as a function of altitude and attenuation due to absorption at sea level, which is a measurable quantity. A similar relation is true for the scattering portion of the attenuation giving:

$$\alpha_s(h) = \alpha_s(0)\left[\frac{\rho(h)}{\rho(0)}\right]^\gamma. \quad (9.16)$$

Again for sea level air density scattering related attenuation $\alpha_s(0)$ can be measured. So both attenuation and scattering will be higher at sea level compared to an altitude h and both can be calculated by knowing their sea level values by the use of (9.15) and (9.16).

Substituting (9.15, 9.16) in (9.9) gives attenuation along the atmospheric path for a given wavelength as:

$$I(x,\lambda) = I_0 e^{-u(x,\lambda)} \quad (9.17)$$

where, $$u(x,\lambda) = \left[\alpha_a(0) + \frac{\alpha_s(0)}{\lambda^4}\right]\int_0^x \left[\frac{\rho(x')}{\rho_0}\right]^\gamma dx'. \quad (9.18)$$

In the formulation given by (9.18), attenuation due to absorption is assumed to be wavelength independent for simplicity. For water vapor ($H_2O$) and carbon dioxide ($CO_2$) this is not the case; they have many absorption peaks, and they are at known wavelengths [22]. As can be seen, (9.18) can be written as multiplication of two functions as:

$$u(x,\lambda) = u_1(\lambda) \cdot u_2(x) = \left[\alpha_a(0) + \frac{\alpha_s(0)}{\lambda^4}\right]\int_0^x \left[\frac{\rho(x')}{\rho_0}\right]^\gamma dx' \quad (9.19)$$

FIG. [31] shows the wavelength dependency of the first bracket named as the $u_1(\lambda)$ function, which is expressed as:

$$u_1(\lambda) = \left[\alpha_a(0) + \frac{\alpha_s(0)}{\lambda^4}\right]. \quad (9.20)$$

The visible spectrum of 380 nm to 780 nm and the major colors are indicated as dots in the bottom of the chart in FIG. [31]. Having (9.18) as a multiplication of two functions, as given in (9.19), gives a great deal of flexibility in calculating the atmospheric attenuation of the direct sunlight for any atmospheric path. All that needs to be done is evaluation of the $u_2(x)$ with numerical integration along the atmospheric path and multiplication of it with $u_1(\lambda)$ function for a given wave length to get the exponent of the attenuation as given in (9.17) [5]. The $u_2(x)$ function corresponds to m in the Beer-Lambert law as given in (9.3) and is also known as the air mass integral or optical mass m and it is explicitly written as:

$$m = u_2(x) = \int_0^x \left[\frac{\rho(x')}{\rho_0}\right]^\gamma dx'. \quad (9.21)$$

FIG. [32.1] and FIG. [32.2] show the argument of the integral as a function of altitude from sea level to 30 km and 0 to 80 km respectively. FIG. [33] illustrates the argument of the air mass integral for 0, 15, 30, 45, 60, 75, 80, 85, 88 and 90 degrees of sun elevation angle for a point at sea level. There are two sets of curves, the first one is just the air density ratio along the path length and the second one is the ratio raised to the power ⅓ noted as γ. FIG. [34] gives the argument of the air mass integral for a point on an altitude of 4,000 m above the sea level for 0, 15, 30, 45, 60, 75, 80, 85, 88, 90 and 92.03 degrees of sun elevation angle with respect to surface normal. As can be seen, the argument of the integral is dimensionless and the unit of the integral (9.21) that gives $u_2(x)$ will be in the units of meter.

FIG. [35] shows air mass as a function of altitude for sunrise/sunset conditions and for 90° of sun elevation angle from the surface normal (0° from the horizon). As can be seen air mass is a decreasing function as a function of altitude for sun elevation angle of 0° from the horizon. On the other hand it is an increasing function for the sunrise/sunset conditions as a function of altitude. FIG. [36] shows air mass versus 0, 15, 30, 45, 60, 75, 80, 85, 88 and 90 degrees of sun elevation angle as a function of altitude along with the sunrise/sunset conditions in logarithmic scale. FIG. [37] shows air mass as a function of sun elevation angle from the surface normal for 0, 2,000, 4,000, 7,000 and 10,000 meters. In every case, air mass shows very smooth and expected physically meaningful functions.

Another interesting and important issue to cover here is the wave length dependency of attenuation. FIG. [38.1] shows the attenuation for wavelengths of 780, 500, 380 and 280 nm along the atmospheric path for 0° sun elevation angle. FIG. [38.2] and FIG. [38.3] show the attenuation for sun elevation angles of 45° and 90°. In all of the plots the atmospheric thickness t1 is taken as 80 km. Taking atmospheric thickness $t_A$ as 80 km versus 30 km as shown in atmospheric path length versus sun elevation angle plots as given earlier allows one to quantify the correct atmospheric thickness to be taken in calculations. As can be seen for smaller wavelengths just due to the Rayleigh scattering, which is in the $u_1(\lambda)$ term, the attenuation is very large compared to the larger wavelengths as the atmospheric path increases as during sunrise and sunset.

Solar radiation is not a single wavelength; it can be represented with a spectrum. The shorter wavelengths in its spectrum will be attenuated more than the longer wavelengths as shown earlier due to scattering. This is the reason for the reddish appearance of the sun at sunrise and sunset. This is a qualitative explanation; a quantitative explanation follows which can be used to predict the solar power density in W/m² at a given wavelength, altitude and sun elevation angle. To be able to do that relation, equation (9.17) needs to be rewritten as:

$$I(x,\lambda) = I_o(\lambda) e^{-u(x,\lambda)} \quad (9.22)$$

where $I_o(\lambda)$ is the solar power density at a given wave length in the space atmosphere interface in the units of W/m².

$I_o(\lambda)$ does not change with time, but as shown above, the atmospheric path length changes with sun elevation angle, which in turn changes with time during the day as shown in FIG. [24]. Therefore the relation (9.22) becomes a time dependent relation.

10.0. The Spectrum of the Attenuated Direct Sunlight in the Atmosphere

Sunlight is not a single wavelength radiation and its spectrum can be represented with Planck's black body radiation law from the sun's surface temperature. From the best fit to the Planck black body radiation spectrum for sunlight gives 5780° K as the surface temperature for the sun. There are several formulations of Planck's black body radiation law [2]. The two most common forms follow. The first one, which is known as the spectral radiance, is expressed in terms of frequency and is given as:

$$I(v, T_s) = \frac{2hv^3}{c^2} \frac{1}{e^{\frac{hv}{kT_s}} - 1}. \quad (10.1)$$

The units of (10.1) are $J/s^1 m^{-2} sr^{-1} Hz^{-1}$, where sr is the unit solid angle in steradians. The second representation is given in terms of wavelength as:

$$I'(\lambda, T_s) = \frac{2hc^2}{\lambda^5} \frac{1}{e^{\frac{hc}{\lambda kT_s}} - 1}. \quad (10.2)$$

The units of (10.2) are $J/s^1 m^{-2} sr^{-1} m^{-1}$, where sr is the unit solid angle in steradians. The symbols in (10.1) and (10.2) h, k, c, $T_S$, v, $\lambda$ are Planck's and Boltzmann's constants, speed of light, surface temperature in Kelvin, frequency and the wave length corresponding to the frequency for the speed of light given as:

$$v = \frac{c}{\lambda} \quad (10.3)$$

Relations (10.1) and (10.2) are related to each other as:

$$I'(\lambda, T) = I(v, T) \left| \frac{dv}{d\lambda} \right| \quad (10.4)$$

where, $$\left| \frac{dv}{d\lambda} \right| = \frac{c}{\lambda^2} \quad (10.5)$$

The relations (10.1) and (10.2) produce peaks at different wavelengths which are only a function of temperature T. They can be calculated by taking the derivatives of (10.1) and (10.2) with respect to v or $\lambda$ and equating them to zero. The solution requires the solutions of non-linear equations, but they can be analytically given for (10.1) as:

$$\lambda_{peak} = \frac{5.1 \times 10^{-3}}{T} [m] \quad (10.6)$$

$$v_{peak} = \frac{c}{\lambda_{peak}}.$$

Similarly the peak for (10.2) can be given as:

$$\lambda'_{peak} = \frac{2.8977685 \times 10^{-3}}{T} [m]. \quad (10.7)$$

As can be seen, the peak wavelengths given by (10.6) and (10.7) are different. The radiance emitted over a frequency or a wavelength interval can be given as:

$$\int_{\lambda_2}^{\lambda_1} I'_n(\lambda, T_s) d\lambda = \int_{v_1}^{v_2} I_n(v, T_s) dv. \quad (10.8)$$

The differences and similarities of (10.1) and (10.2) can be best shown by their normalized plots as given in FIG. [39.1]. In FIG. [39.1] the functions (10.1) and (10.2) are normalized with their peak values corresponding to the wavelengths as given by (10.6) and (10.7) and are shown along with their normalized integration values between zero to infinite wavelength. As can be seen, the percentile integral for both give the same curves as the property given in (10.8).

Since it is necessary to calculate integrals as shown in (10.8) and their multiplication with several luminosity functions, the number of points and the range of wavelength that are taken in the numerical representation are important for the accuracy of the numerical integrations. This process is taken care of automatically by an adaptive sampling technique resulting in typically in the order of 2000 points in the range of 50 nm to 2500 nm wavelength [5]. As can be seen, it is far larger than the "only" four wavelengths in the visible range that were used in prior estimations, which cannot give a good integration value needed for the spectral matching technique described here [18].

10.1. Solar Power Density at the Atmosphere-Space Boundary

Solar power density at the atmosphere-space boundary can be calculated by employing the Planck radiation law with the combination of the Stefan-Boltzmann law using Gauss's law on the location of earth with respect to the sun. The Stefan-Boltzmann law gives the radiated power density from a surface as its temperature as:

$$P = \sigma T^4 \quad (10.9)$$

where, $\sigma$ is the Stefan-Boltzmann constant. Assuming the sun radiates uniformly in every direction, from the radius of the sun $r_s$ and its distance of earth $r$, one can calculate the received solar power density at the space-to-atmosphere interface with using Gauss's law as:

$$P = \sigma T_s^4 \frac{4\pi r_s^2}{4\pi r^2} = \sigma T^4 \left(\frac{r_s}{r}\right)^2 \quad [\text{W m}^{-2}]. \quad (10.10)$$

Since earth follows an elliptical orbit around the sun with an eccentricity of 0.01671123, the distance between the sun and the earth changes slightly with date, so the relation (10.10) will give 1,411 [W/m²] to 1,320 [W/m²] of power density depending upon the date. The measured average value of 1,370 [W/m²] is known to be the "solar constant".

Relation (10.10) does not give the power density spectrum; it only gives the integration value over all wavelengths as it is done in (10.8). What is needed is the power density spectrum over all wavelengths, which can be done with straightforward normalization on Planck's radiation law as given by (10.1) or (10.2).

10.2. Normalization of Planck Radiation Formula for a Given Received Power Density Since the solar spectrum must obey Planck' radiation law, wavelength dependency, with the introduction of a constant $P_0$, is:

$$P_s = \int_0^\infty \frac{P_0}{\lambda^5} \frac{1}{e^{\frac{hc}{\lambda k T_s}} - 1} d\lambda \to \left[\frac{W}{m^2}\right]. \quad (10.11)$$

Since the integration value $P_s$ as given in (10.10) is known, $P_0$ can be calculated from it. Letting:

$$x = \frac{hc}{\lambda k T_s} \quad (10.12)$$

$$\lambda = \frac{hc}{k T_s x}$$

$$d\lambda = -\frac{hc}{k T_s x^2} dx,$$

the integral (10.11) transforms into:

$$P_s = P_0 \int_0^\infty \frac{\lambda^{-5}}{e^{\frac{hc}{\lambda k T_s}} - 1} d\lambda = P_0 \int_\infty^0 \left(\frac{hc}{k T_s x}\right)^{-5} \frac{1}{e^x - 1} \left(-\frac{hc}{k T_s x^2}\right) dx \quad (10.13)$$

giving:

$$P_s = P_0 \left(\frac{k T_s}{hc}\right)^4 \int_0^\infty \frac{x^3}{e^x - 1} dx \quad (10.14)$$

where, $$\int_0^\infty \frac{x^3}{e^x - 1} dx = \frac{\pi^4}{15} \quad (10.15)$$

given by the use of Riemann-Zeta and Gamma Function [3-4] relation:

$$\int_0^\infty \frac{x^n}{e^x - 1} dx = \Gamma(n+1)\zeta(n+1) = n!\zeta(n+1) \quad (10.16)$$

Where:

$$\Gamma(z) = \int_0^\infty t^{z-1} e^{-t} dt \quad \zeta(n) = \sum_{k=1}^\infty k^{-n}. \quad (10.17)$$

The relation (10.15) can be calculated using (10.16) and (10.17), giving:

$$\int_0^\infty \frac{x^3}{e^x - 1} dx = \Gamma(4)\zeta(4) = 3!\zeta(4) = 6\frac{\pi^4}{90} = \frac{\pi^4}{15} \quad (10.18)$$

giving:

$$P_0 = \frac{15 P_s}{\pi^4} \left(\frac{hc}{k T_s}\right)^4. \quad (10.19)$$

The units of $P_0$ will be:

$$P_0 = \left(\frac{W}{m^2}\right) \left[\frac{(J.\text{Sec})\left(\frac{m}{\text{Sec}}\right)}{\left(\frac{J}{K}\right)(K)}\right]^4 = \left(\frac{W}{m^2}\right)(m)^4 = W m^2. \quad (10.20)$$

Substituting (10.20) into (10.11) in the dimensional analysis will result in units of W/m² for (10.11).

FIG. [39.2] shows the incident solar radiation power spectrum in space and at sea level for 0° sun elevation angle for ($\alpha_s=0$, $\alpha_a=0.184\cdot10^{-4}$ m$^{-1}$), [$\alpha_s(0)=0.801\cdot10^6$ nm$^{-4}$m$^{-1}$, $\alpha_a=0$] and [$\alpha_s(0)=0.801\times10^6$ nm$^{-4}$m$^{-1}$, $\alpha_a=0.184\times10^{-4}$ m$^{-1}$] by just applying (9.20) to show the contributions of the absorption and scattering components of attenuation on the received spectrum at sea level. As can be seen, one can get any value which is less than the "solar constant" at any location in the atmosphere by having the right combination of absorption and scattering attenuation parameters. The important issue is matching the measured solar irradiation values for any measurement using physically meaningful and measured absorption and scattering attenuation parameters.

FIG. [40] and FIG. [41] show the effects of the altitude and sun elevation angle on the received spectrum. The altitude is taken as 4,000 m in FIG. [41]. In none of the curves after 88° sun elevation angle does the power spectrum show very clearly, because they are relatively very small compared to the high elevation values. To see the power density at these sun elevation angles, consider FIG. [42] which shows the FIG. [41] results in logarithmic scale. Numerical integration of these curves from 0 to ∞ will give the total power density in [W/m²] as:

$$P_r(x) = \int_\infty^0 I_0(\lambda) e^{-u(x,\lambda)} d\lambda [Wm^{-2}] \qquad (10.21)$$

where, x is any location chosen in the atmospheric path. To calculate the power density for a given wavelength range between $\lambda_1$, $\lambda_2$ only the integral limits in (10.21) will change and will become:

$$P_r(x)_{\lambda_1-\lambda_2} = \int_{\lambda_2}^{\lambda_1} I_0(\lambda) e^{-u(x,\lambda)} d\lambda [Wm^{-2}] \text{ where } \lambda_1 < \lambda_2. \qquad (10.22)$$

As can be seen in all curves, the peak $\lambda$, where the received power densities have its maximum denoted as $\lambda_{peak}$, moves toward to the larger wavelengths as the elevation angle decreases. FIG. [43] shows this effect as a function of time. This will give the change of color of the sun towards red for sunrise and sunset and can be seen very clearly in FIG. [43] for sea level and at 4,000 m. The second set of curves shows the $\lambda_{peak}$ of the scattered light which will be explained after covering the scattering of sunlight in the atmosphere.

Having the capability of predicting the received direct sunlight power density at any point on the atmospheric path at any wavelength and numerical of integration value of it over any range of wavelength interval gives a great deal of flexibility in any solar power calculations. As an example, herein one is only interested in the power density at a point for visible power density that is determined by the visible spectrum in the visible range of 380 nm to 780 nm. By combining the sun elevation angle as a function of time with the solution obtained for power density as a function of sun elevation angle, one can calculate the visible power density at any point on earth and at any date as a function of local time. FIG. [44] shows the visible power density as a function of time for sea level and 4,000 m of altitude at one representative location and date. For sun tanning and skin health care related issues, ultra-violet radiation is important. FIG. [45] shows the solar ultraviolet power density as a function of local time in the wavelength range up to 380 nm for sea level and 4,000 m of altitude at the same location and date.

FIG. [46] shows the total power density as a result of (10.21) for altitudes of 0, 2,000, 4,000, 7,000 and 10,000 meters compared to solar radiation in space. As can be seen they show no issues with any altitude in the atmosphere!

There are widely used empirical solar power estimation formulas [11,12]. For sea level the empirical relation that gives a very good fit for all practical purposes given by relation:

$$I_{SP}[\theta(t)]=1.353\times0.7^{[AM(t)^{0.678}]} \rightarrow [kWm^{-2}] \qquad (10.23)$$

where AM is the Air Mass number and is given as:

$$AM(t) = \frac{1}{\cos[\theta(t)] + 0.50572[96.07995 - \theta(t)]^{-x}}. \qquad (10.24)$$

Another empirical relation is introduced to cover the altitude effects by modifying (10.23) as:

$$I_{SP}[\theta(t),h]=1.353\{(1-ah)0.7^{[AM(t)^{0.678}]}+ah\} \qquad (10.25)$$

where a=0.14 km. The parameter x in the empirical formulation of air mass in (10.24) has a value found in published literature [11,12], which is in the range of:

$$1.36364 \leq x < 1.6364. \qquad (10.26)$$

Since these are curve-fit formulas with no physical basis, they have a limited range of validity for sun elevation angle and altitude. The formulas all fail at high altitude. This is shown in FIG. [47]. Although they match very closely with this work for practical purposes at sea level and up to 2,000 m altitude, they give more power density than the actual values at the top of the atmosphere, which is physically not possible. At altitudes higher than 7,000 m, in addition to non-physical possibility values of more power densities than available in space, they also start to give more power densities at sunrise/sunset compared to noon! In addition to these issues, they also don't show any wavelength dependency of power density, something that is essential for this to be able to deal with any scattering issues. Since here the power densities before the sunrise and after the sunset are needed, the only thing of interest is scattered power, and as seen, the Rayleigh scattering expression is very strongly related to wavelength!

11.1. Calculation of the Scattered Power from an Arbitrary Point in the Atmosphere As can be seen in the Rayleigh scattering formula given in (9.1), one needs the incident power $I_0$ as a function of wavelength. The physics and math related to this first step is for the calculation of $I_0$ is explained in the previous section. Now the emitted scattered power from an arbitrary point in the atmosphere is explained. For this one must review to the differential equation used in the derivation of the Beer-Lambert law.

FIG. [48] is a diagram for showing calculations for a layer of the atmosphere at an altitude of h with a thickness of dz which is perpendicular to the propagation direction of the direct sunlight which is incident along the z axis. Assume that the layer also has a uniform absorption and scattering attenuation constants of $\alpha_a$ and $\alpha_s$ respectively. If the incoming power density at the point P is $I_S$, then the total power loss $dI_{STOTAL}$, in the layer with a thickness of dz and for an area of dS will be:

$$dI_S = I_S(\alpha_s + \alpha_a)dzdS \tag{11.1}$$

where dS is the infinitely small area perpendicular to the layer and the units of (11.1) will be:

$$dI_{STOTAL} = \left[\frac{W}{m^2}\right]\left[\frac{1}{m}\right][m][m^2] \rightarrow W \tag{11.2}$$

The scattered portion of (11.1) can be thought as a radiation source which is emitting total radiative power of $dI_S$ from an infinitely small area dS area in every direction. Since the incoming power density $I_S$ and $\alpha_s$ is wavelength dependent, this infinitely small scattered power for a given $\lambda$ at an altitude of h can be explicitly written as:

$$dI_S(\lambda, h) = I_S(\lambda, h)\alpha_S(h)dzdS = I_S(\lambda)\frac{\beta\alpha_s(0)}{\lambda^4}dzdS \tag{11.3}$$

where $\beta$ is a dimensionless constant which relates the $\alpha_s$ to the sea level scattering attenuation constant $\alpha_s(0)$ as done earlier in (9.16) as:

$$\alpha_s(h) = \alpha_s(0)\left[\frac{\rho(h)}{\rho(0)}\right]^\gamma = \beta\alpha_s(0) \text{ where } \beta = \left[\frac{\rho(h)}{\rho(0)}\right]^\gamma. \tag{11.4}$$

Along at any point in the atmospheric path for a given sun elevation angle and wavelength it is known that the power density $I_S(\lambda,h)$ as the solution of (9.22) is given by the Beer-Lambert law. Therefore by assigning values to dz and dS in (11.3) as 1 m and 1 m² respectively, one can calculate the scattered power from a layer thickness of 1 m from an area of 1 m² perpendicular to the propagation direction for any selected wavelengths in the solar spectrum. FIG. [49] shows the scattered power along the atmospheric path for 0° sun elevation angle at 780 nm, 500 nm, 380 nm and 280 nm wavelengths, along with the total power loss in this unit volume. FIG. [50] and FIG. [51] show the scattered power along the atmospheric path at 780 nm, 500 nm, 380 nm and 280 nm of wavelengths along with the total power loss in this unit volume for 45° and 90° sun elevation angles respectively. As can be seen the scattered power from the unit volume is altitude and wavelength dependent as expected and can be quantified accurately.

One can also select any point in the atmospheric path and integrate the power over any desired wavelength range and calculate the power spectrum of the scattered emission from that point having the same unit volume. For this application since one is only interested in illumination issues for the human eye, the only important wavelength limits of integration is the visible spectrum range of 380 nm to 780 nm. FIG. [52] and FIG. [53] show the scattered power spectrum at sea level for $\theta$=0, 15, 30, 45, 60, 75, 80, 85, 88 and 90° where the y axes are taken as linear and logarithmic scale respectively. As can be seen the peak $\lambda$ symbolized as $\lambda_{peak}$ for the scattered light also moves towards longer wavelengths with the increasing elevation angle as in the direct sunlight. It also predicts the blue color of the sky. The variation of $\lambda_{peak}$ with time during the day and is plotted in FIG. [43] as the lower set of curves to show its relation to the direct sunlight $\lambda_{peak}$ as a function of time during the day.

Another useful application of the formulation is the calculation of absorbed and scattered power between any two arbitrary points along any atmospheric path at a desired wavelength or for an interval of wavelengths. S being a perpendicular area along the atmospheric path small enough so the solar radiation can be assumed constant and $x_1$ and $x_2$ being arbitrary two points along any chosen atmospheric path in the atmosphere, the scattered power intensity for a given wavelength can be calculated as:

$$P_s(\lambda)_{x_1-x_2} = -S\int_{x_1}^{x_2} I_0(\lambda)e^{-u(x',\lambda)}\alpha_s(\lambda, x')dx' \rightarrow [Wnm^{-1}]. \tag{11.5}$$

Total power scattered from this volume in the wavelength interval defined by $\lambda_1$ and $\lambda_2$ can be calculated with a double integral:

$$P_s(\lambda_1 - \lambda_2)_{x_1-x_2} = \tag{11.6}$$

$$-S\int_{\lambda_2}^{\lambda_1}\int_{x_1}^{x_2} I_0(\lambda')e^{-u(x',\lambda')}\alpha_s(\lambda', x')dx'd\lambda' \rightarrow [W]$$

A similar calculation can be done for the absorbed power as:

$$P_a(\lambda)_{x_1-x_2} = -S\int_{x_1}^{x_2} I_0(\lambda)e^{-u(x',\lambda)}\alpha_a(x')dx' \rightarrow [Wnm^{-1}] \tag{11.7}$$

and $$P_a(\lambda_1 - \lambda_2)_{x_1-x_2} = -S\int_{\lambda_2}^{\lambda_1}\int_{x_1}^{x_2} I_0(\lambda')e^{-u(x',\lambda')}\alpha_a(x')dx'd\lambda' \rightarrow [W]. \tag{11.8}$$

As can be seen, the methodology can give virtually endless sets of information and plots related to the attenuation and scattering issues in the atmosphere for use in many different applications.

11.2. Received Scattered Power Density at any Point in the Atmosphere from a Single Scattering Point It is now possible to find out the power density $dI_{so}$ received from a point P due to the emission of a known power $dI_S(\lambda,h)$ from the point P as given by (11.3). If the emitted radiation were uniform in every direction and had no attenuation along its direct path from P to $P_{SO}$, $dI_{so}$, would be:

$$dI_{SO}(\lambda, h) = \frac{I_S(\lambda, h)\alpha_S(h)dzdS}{4\pi r^2} = I_S(\lambda, h)\frac{\beta\alpha_s(0)}{4\pi r^2 \lambda^4}dzdS \tag{11.8}$$

where r is the distance between P and $P_{SO}$ and the units of (11.8) are in [W/m²]. As can be seen (11.8) has no $\theta$ dependency as expected. But for Rayleigh scattering, the emitted radiation from the point P has directional dependency that is given by:

$$I(\theta) \propto I_0[1+\text{Cos}^2(\theta)] \tag{11.9}$$

where $\theta$ is the scattering angle defined as the angle between the incoming primary radiation $I_S(\lambda,h)$ and the vector between $P_s$ and $P_{so}$, which is shown in FIG. [48] as:

$$\theta = \angle P_2PP_{SO}. \tag{11.10}$$

To derive the scattered power density at the point $P_{SO}(r,\theta)$, one applies the Gauss theorem that comes as vector integration on the surface of the sphere with a radius of r centered at P. The Gauss theorem states that the total surface integration of the power density must be equal to the total power emitted from the point P. The scattered power density could be expressed as a vector on the surface of the sphere in spherical coordinate system which has an origin at P as:

$$\vec{I}_r = I_a[1 + \text{Cos}^2(\theta)]\vec{u}_r \quad (11.11)$$

where $u_r$ is the unit vector in radial direction and $I_0$ is the variable that satisfies the Gauss theorem [27,28]. The Gauss theorem in vector formulation for (11.11) on a sphere gives:

$$I = \int_{\varphi=0}^{2\pi}\int_{\theta=0}^{\pi} I_0[1 + \text{Cos}^2(\theta)]\vec{u}_r d\vec{S}. \quad (11.12)$$

where I in (11.12) is the scattered power emitted from the point P, which we already calculated in (11.3). Using I instead of its open form as given in (11.3) keeps the formulation shorter for convenience.

On the other hand, in spherical coordinates, the outward normal vector representing the surface element dS on a sphere with a radius of r is:

$$d\vec{S}(r,\theta,\varphi) = r^2 \text{Sin}(\theta) d\theta d\varphi \vec{u}_r. \quad (11.13)$$

Substituting (11.13) in (11.12) gives:

$$I = I_0 r^2 \int_{\varphi=0}^{2\pi}\int_{\theta=0}^{\pi} [1 + \text{Cos}^2(\theta)]\text{Sin}(\theta)d\theta d\varphi \quad (11.14)$$

giving $I_0$ as:

$$I_0 = \frac{I}{r^2 \int_{\varphi=0}^{2\pi}\int_{\theta=0}^{\pi} [1 + \text{Cos}^2(\theta)]\text{Sin}(\theta)d\theta d\varphi}. \quad (11.15)$$

As expected, $I_0$ becomes inversely proportional with the square of r explicitly given by (11.15). If the cosine term in the brackets of (11.15) didn't exist, the denominator would have given the area of the sphere with a radius of r as $4\pi r^2$ as used in (11.8). This corresponds to the Mie scattering case where the scattering can be assumed uniform in every direction, also with insignificant wavelength dependency. If one can evaluate the integral in (11.15), one can calculate the power density at any point in space from a scatterer as a function of r and $\theta$. The integral in (11.15) has two parts as:

$$I_{12} = r^2 \int_{\varphi=0}^{2\pi}\int_{\theta=0}^{\pi}[1+\text{Cos}^2(\theta)]\text{Sin}(\theta)d\theta d\varphi = I_1 + I_2 \quad (11.16)$$

where:

$$I_1 = r^2 \int_{\varphi=0}^{2\pi}\int_{\theta=0}^{\pi} \text{Sin}(\theta)d\theta d\varphi = 4\pi r^2 \quad (11.17)$$

and:

$$I_2 = r^2 \int_{\varphi=0}^{2\pi}\int_{\theta=0}^{\pi} \text{Cos}^2(\theta)\text{Sin}(\theta)d\theta d\varphi. \quad (11.18)$$

By the variable transformation:

$$x = \text{Cos}(\theta) \quad dx = -\text{Sin}(\theta)d\theta \quad (11.19)$$

the first integral with respect to $\theta$ in (11.18) in its indefinite form becomes:

$$\int \text{Cos}^2(\theta)\text{Sin}(\theta)d\theta \to -\int x^2 dx = -\frac{1}{3}x^3 \quad (11.20)$$

giving:

$$\int \text{Cos}^2(\theta)\text{Sin}(\theta)d\theta = -\frac{1}{3}\text{Cos}^3(\theta). \quad (11.21)$$

Using (11.21) in (11.18) gives the definite integral (11.18) with respect to $\theta$ as:

$$\int_{\theta=0}^{\pi} \text{Cos}^2(\theta)\text{Sin}(\theta)d\theta = \quad (11.22)$$

$$-\frac{1}{3}[\text{Cos}^3(\pi) - (-1)\text{Cos}^3(0)] = \frac{1}{3}(1+1) = \frac{2}{3}.$$

The second integral with respect to $\varphi$ is straight forward; it will give $2\pi$ giving $I_{12}$ as:

$$I_{12} = \quad (11.23)$$

$$r^2 \int_{\varphi=0}^{2\pi}\int_{\theta=0}^{\pi}[1+\text{Cos}^2(\theta)]\text{Sin}(\theta)d\theta d\varphi = 4\pi r^2 + \frac{4\pi r^2}{3} = \frac{16\pi r^2}{3}.$$

Substituting (11.23) in (11.11) gives:

$$\vec{I}_r = \frac{3I}{16\pi r^2}[1 + \text{Cos}^2(\theta)]\vec{u}_r. \quad (11.24)$$

I in (11.24) is in units of Watts and is given in (11.3) as $dI_S(\lambda,h)$. As can be seen, integration of (11.24) on any spherical surface with a radius of r will give $I_s$ and therefore satisfies the Gauss theorem expressed in vector form as in (11.12). Substituting (11.3) in (11.24) will give the scattered power density received at point $P_{SO}$ as:

$$dI_{SO}(r, \theta, \lambda) = \frac{3I_S(\lambda, h)}{16\pi r^2 \lambda^4}\beta\alpha_s(0)[1 + \text{Cos}^2(\theta)]dzdS. \quad (11.25)$$

Relation (11.25) does not include any attenuation along the path between the scatterer point P and the observation point $P_{SO}$. Since the scattered emission also attenuates along the direct path between P and $P_{SO}$, it will be less than (11.25) and also can be calculated with the methodology explained in the earlier section with the relation (9.22) and can be formulated as:

$$dI_{SO}(r, \theta, \lambda) = \frac{3I_S(\lambda, h)}{16\pi r^2 \lambda^4}\beta\alpha_s(0)f(r)[1 + \text{Cos}^2(\theta)]dzdS \quad (11.26)$$

where f(r) is the attenuation as a function of r of the emitted scattered radiation as calculated using (9.20) which can be named as the direct path attenuation due to absorption and scattering along its direct path between P and $P_{SO}$. It can be shown that attenuation due to the direct path attenuation f(r) is of a secondary effect compared to the $1/r^2$ attenuation term in (11.25) for typical r values in the visible atmosphere. It becomes a significant component of attenuation for r>30 km; therefore it can be ignored for most of the cases. ASAR has an option to include or ignore the f(r) function in (11.25) to investigate its effects on any simulation results. Simulation results show it is an important effect to take into consideration for sun elevation angles below the horizon.

12.0. Integration of the Scattered Power in the Visible Atmospheric Volume for an Arbitrary Point or a Surface in the Atmosphere For present purposes, interest is in the visible power density that an observer receives at any point in the atmosphere due to scattering of the direct sunlight from the entire visible atmospheric volume for a given sun elevation angle. This will result in many forms of integration, depending upon the application. The methodology explained herein is very general and can be applied to not only indirect illumination when the sun elevation angle is below the visible horizon, but also to any kind of atmospheric scattering of any type of source of radiation. There are many applications for this capability in real life. It is entirely based on the property that one can calculate the scattered power from a point as formulated in (11.25) for which its analytical or semi-analytical integrations are possible on a circle or on a segment of a circle. With some approximations even a completely analytical triple integral solution to the problem can be performed in a very computationally efficient and very fast manner, in the order of seconds of CPU time on a laptop, even when the sun elevation angle from the horizon is 90°!

There are two possible forms of integrals that apply here. FIG. [54] illustrates these two cases. The first case is for the observation of the scattered radiation done for a point. This is the case for a point in the atmosphere and is used for taking the multiple scattering effects in the atmosphere into consideration. The two points for this case are shown as $P_0(0,0,z_1)$ and $P_1(x_1,y_1,z_1)$ in FIG. [54].

The second possible form of the integration process is for a surface that is defined by a normal vector, such as a solar panel or a road surface. In that instance the unit normal vector of the surface must be multiplied with the incoming vector and then the result must be integrated. The surface Γ and its normal vector n are shown in FIG. [54].

12.1. Integration of the Scattered Power in the Visible Atmospheric Volume for an Arbitrary Point in the Atmosphere Assume that there is an area which is bounded by a circle with a radius of R and has a given thickness dz and receives a given uniform direct radiation with a wavelength of λ and power density $I_0(\lambda)$ in [W/m²] that is "perpendicular" to this surface, as shown as a light ray in FIG. [54]. Assume that the thickness dz is small enough so that the atmospheric density can be assumed to be uniform, giving a constant $\alpha_s$ along its thickness. Using relation (11.3), the emitted scattered power $dP_S$ from the infinitely small surface dS on any point of the circle can be calculated as:

$$dP_S(\lambda) = \frac{I_0(\lambda)\beta\alpha_s(0)dzdS}{\lambda^4}. \tag{12.1}$$

For convenience in the following mathematical formulation let:

$$P(\lambda) = \frac{I_0(\lambda)\beta\alpha_s(0)dz}{\lambda^4} \to \left[\frac{W}{m^2}\right]. \tag{12.2}$$

The received scattered power density $I_{S1}$ at a point $P_1$ having coordinates $x_1, y_1, z_1$ can be calculated by integrating (11.25) in circular coordinates, assuming no attenuation along the direct path between $P_1$ and the source point P on the circle, as:

$$I_{S1} = \frac{3P(\lambda)}{16\pi} \int_{\varphi=0}^{2\pi} \int_{r=0}^{R} \frac{1+\cos^2(\theta_S)}{d_1^2} r dr d\varphi. \tag{12.3}$$

As can be seen in (12.3), both the distance $d_1$ and the scattering angle $\theta_S$ vary as a function of the x, y coordinates of the point P as:

$$d_1 = \sqrt{((x_1-x)^2+(y_1-y)^2+z_1^2)} \tag{12.4}$$

$$\cos(\theta_S) = \frac{z_1}{d_1}. \tag{12.5}$$

Since (12.3) involves the square of the scattering angle, the direction of the incoming ray $I_0$ is not important. This is shown as $I_0'$ in FIG. [54] as a ray propagating in +z direction. The integral (12.3) can be written as the sum of two integrals:

$$I_{S1} = A_1 + A_2 \tag{12.6}$$

where $A_1$ is:

$$A_1 = \frac{3P(\lambda)}{16\pi} \int_{\varphi=0}^{2\pi} \int_{r=0}^{R} \frac{1}{d_1^2} r dr d\varphi \tag{12.7}$$

and $A_2$ is:

$$A_2 = \frac{3P(\lambda)}{16\pi} \int_{\varphi=0}^{2\pi} \int_{r=0}^{R} \frac{\cos^2(\theta_S)}{d_1^2} r dr d\varphi \tag{12.8}$$

Using the well-known Cartesian to circular coordinate transformations given as:

$$x = r \cos \varphi \text{ and } y = r \sin \varphi. \tag{12.9}$$

$A_1$ can be written as a function of r and φ as:

$$A_1 = \frac{3P(\lambda)}{16\pi} \int_{\varphi=0}^{2\pi} \int_{r=0}^{R} \frac{1}{(x_1-r\cos\varphi)^2+(y_1+r\sin\varphi)^2+z_1^2} r dr d\varphi. \tag{12.10}$$

By introducing variables u and v in to (12.10) it can be written as, $$A_1 = \frac{3P(\lambda)}{16\pi} \int_{\varphi=0}^{2\pi} \int_{r=0}^{R} \frac{1}{(u^2+v^2)+z_1^2} r\, dr\, d\varphi \qquad (12.11)$$

where u is:

$$u^2 = x_1^2 - 2x_1 r \cos\varphi + r^2 \cos^2\varphi \qquad (12.12)$$

and v is:

$$v^2 = y_1^2 - 2y_1 r \sin\varphi + r^2 \sin^2\varphi \qquad (12.13)$$

Substituting (12.12) and (12.13) in the denominator of (12.11) gives:

$$u^2 + v^2 = x_1^2 + y_1^2 - 2r(x_1 \cos\varphi + y_1 \sin\varphi) + r^2. \qquad (12.14)$$

Finally the integral $A_1$ only expressed in terms of r and $\varphi$ becomes:

$$A_1 = \frac{3P(\lambda)}{16\pi} \int_{\varphi=0}^{2\pi} \int_{r=0}^{R} \frac{r\, dr\, d\varphi}{r^2 - 2r(x_1 \cos\varphi + y_1 \sin\varphi) + x_1^2 + y_1^2 + z_1^2}. \qquad (12.15)$$

Substituting (12.5) into (12.8) the second integral $A_2$ becomes:

$$A_2 = \frac{3P(\lambda)}{16\pi} \int_{\varphi=0}^{2\pi} \int_{r=0}^{R} \frac{z_1^2}{d_1^2} \frac{1}{d_1^2} r\, dr\, d\varphi. \qquad (12.16)$$

With the similar manipulations as for $A_1$, $A_2$ becomes:

$$A_2 = \frac{3P(\lambda)}{16\pi} z_1^2 \int_{\varphi=0}^{2\pi} \int_{r=0}^{R} \frac{r\, dr\, d\varphi}{[r^2 - 2r(x_1 \cos\varphi + y_1 \sin\varphi) + x_1^2 + y_1^2 + z_1^2]^2} \qquad (12.17)$$

Both of the $A_1$ and $A_2$ integrals can be evaluated analytically, which gives the method a very distinctive advantage in calculation of the triple integral needed to be evaluated in the huge volume of the visible atmosphere as compared to purely numerical methods of integration! Analytical integration of the integrals (12.15) and (12.17) requires mathematics of great length, which is not necessary to demonstrate for its use in this invention. Some analytical work for this case is presented in Appendix 2 and 3.

On the other hand, if the observer is located on the z axes, the mathematics associated with the integration becomes short and very clear, thus demonstrating the superiority of the method disclosed above. In the later sections, the exact results obtained by the integrals (12.15), (12.17) are compared along their sum with their approximations when the observation point is on z axes. Therefore it is helpful to symbolize them with $A_{1E}$, $A_{2E}$ and their sum $A_E$ at this point, subscript E representing "Exact". Similarly we will note $B_{1E}$, $B_{2E}$ and their sum $B_E$ at subscript E representing "Exact"

12.1.1. Integration of the Scattered Power in the Visible Atmospheric Volume for an Arbitrary Point in the Atmosphere on the z Axes If the point $P_0$ which is on the z axes, the integrals (12.15) and (12.17) become even simpler to evaluate. For this case letting $x_1$ and $y_1$ equal to zero, (12.15) becomes:

$$A_1 = \frac{3P(\lambda)}{16\pi} \int_{\varphi=0}^{2\pi} \int_{r=0}^{R} \frac{r\, dr\, d\varphi}{r^2 + z_1^2} \qquad (12.18)$$

and (12.17) can be written as:

$$A_2 = \frac{3P(\lambda)}{16\pi} z_1^2 \int_{\varphi=0}^{2\pi} \int_{r=0}^{R} \frac{r\, dr\, d\varphi}{[r^2 + z_1^2]^2}. \qquad (12.18)$$

Performing a variable transformation of:

$$t^2 = r^2 + z_1^2 \quad t = \sqrt{r^2 + z_1^2} \qquad (12.20)$$

gives:

$$2t\, dt = 2r\, dr \rightarrow t\, dt = r\, dr. \qquad (12.21)$$

Substituting (12.21) into (12.18) the integration transforms into a known form of integration as:

$$\int \frac{t\, dt}{t^2} = \int \frac{dt}{t} = \ln(t) \qquad (12.22)$$

giving:

$$A_1 = \frac{3P(\lambda)}{16\pi} \left[ \int_{\varphi=0}^{2\pi} \ln\sqrt{R^2 + z_1^2}\, d\varphi - \int_{\varphi=0}^{2\pi} \ln\sqrt{z_1^2}\, d\varphi \right] \qquad (12.23)$$

Some arithmetic on (12.23) followed by the integration with respect to $\varphi$ gives:

$$A_1 = \frac{3P(\lambda)}{16\pi} \left[ \ln\sqrt{\frac{R^2 + z_1^2}{z_1^2}} \right] \int_{\varphi=0}^{2\pi} d\varphi = \frac{3P(\lambda)}{8} \ln\sqrt{\frac{R^2 + z_1^2}{z_1^2}}. \qquad (12.24)$$

More conveniently, (12.24) can be written as:

$$A_1 = \frac{3P(\lambda)}{8} \ln\left[\sqrt{1 + \frac{R^2}{z_1^2}}\right] = \frac{3P(\lambda)}{16} \ln\left(1 + \frac{R^2}{z_1^2}\right) \qquad (12.25)$$

It can also be approximated as:

$$A_1 = \frac{3P(\lambda)}{8} \ln\left[\frac{R}{z_1}\right] \qquad (12.26)$$

for $$\left(\frac{R}{z_1}\right)^2 \gg 1.$$

To evaluate $A_2$ one may use the same variable transformations (12.20) and (12.21) giving:

$$\int \frac{tdt}{t^4} = \int \frac{dt}{t^3} = -\frac{1}{2t^2} \tag{12.27}$$

resulting in:

$$A_2 = \frac{1}{2} \frac{3P(\lambda)}{16\pi} z_1^2 \int_{\varphi=0}^{2\pi} \left[ \frac{1}{z_1^2} - \frac{1}{R^2 + z_1^2} \right] d\varphi = \frac{3P(\lambda)}{16} z_1^2 \left[ \frac{1}{z_1^2} - \frac{1}{R^2 + z_1^2} \right] \tag{12.28}$$

which can be more conveniently written as:

$$A_2 = \frac{3P(\lambda)}{16} \left( 1 - \frac{1}{1 + \frac{R^2}{z_1^2}} \right) \tag{12.29}$$

As can be seen for all cases, $A_1$ and $A_2$ go to zero for infinite $z_1$ for any R. $A_1$ shows a singularity issue for $z_1=0$, but can be easily resolved both analytically and in the process of numerical integration.

12.2. Integration of the Scattered Power in the Visible Atmospheric Volume for Given Surface in the Atmosphere In some cases one is interested in total scattering power density received on a surface rather than a point. An example is the received scattered power density on a solar panel placed at any orientation. Another good example applies directly to this invention. If the surface F is defined as a plane parallel to the xy plane at $z=z_1$ this special case will correspond to calculating the received scattered power density on a road surface to perform the spectral matching technique compared to an artificial illumination source.

Mathematically the cosine effect is included in the earlier integrals by multiplying the integrands given in the earlier cases by the dot product of vectors n and $d_\Gamma$ as shown in FIG. [54]. To illustrate the process one performs the analysis for a special case where the surface is parallel to the scattering disc. For this case the angle between the surface normal vector n and $d_\Gamma$ becomes equal to the scattering angle $\theta_{S1}$ and the principal integral will become:

$$I_{S1} = \frac{3P(\lambda)}{16\pi} \int_{\varphi=0}^{2\pi} \int_{r=0}^{R} \frac{1 + \cos^2(\theta_s)}{d_1^2} \cos(\theta_s) r dr d\varphi. \tag{12.30}$$

The integral (12.30) this time becomes the sum of $B_1$ and $B_2$ as:

$$B_1 = \frac{3P(\lambda)}{16\pi} \int_{\varphi=0}^{2\pi} \int_{r=0}^{R} \frac{1}{d_1^2} \cos(\theta_s) r dr d\varphi \tag{12.31}$$

$$B_2 = \frac{3P(\lambda)}{16\pi} \int_{\varphi=0}^{2\pi} \int_{r=0}^{R} \frac{1}{d_1^2} \cos^3(\theta_s) r dr d\varphi. \tag{12.32}$$

Substituting (12.5) in (12.31) and (12.32) will give:

$$B_1 = \frac{3P(\lambda)}{16\pi} z_1 \int_{\varphi=0}^{2\pi} \int_{r=0}^{R} \frac{1}{d_1^3} r dr d\varphi \tag{12.33}$$

-continued $$B_2 = \frac{3P(\lambda)}{16\pi} z_1^3 \int_{\varphi=0}^{2\pi} \int_{r=0}^{R} \frac{1}{d_1^5} r dr d\varphi \tag{12.34}$$

giving integrals in open form as:

$$B_1 = \frac{3P(\lambda)}{16\pi} z_1 \int_{\varphi=0}^{2\pi} \int_{r=0}^{R} \frac{r dr d\varphi}{(r^2 + z_1^2)^{1.5}} \tag{12.35}$$

$$B_2 = \frac{3P(\lambda)}{16\pi} z_1^3 \int_{\varphi=0}^{2\pi} \int_{r=0}^{R} \frac{r dr d\varphi}{(r^2 + z_1^2)^{2.5}}. \tag{12.36}$$

By using the same variable transformations as in (12.20) and (12.21), the relation (12.35) will have the form of:

$$\int \frac{tdt}{t^3} = \int \frac{dt}{t^2} = -\frac{1}{t}. \tag{12.37}$$

Applying (12.37) to (12.35) will lead into:

$$B_1 = \frac{3P(\lambda)}{16\pi} z_1 \int_{\varphi=0}^{2\pi} \left[ \frac{1}{z_1} - \frac{1}{\sqrt{(R^2 + z_1^2)}} \right] d\varphi \tag{12.38}$$

giving:

$$B_1 = \frac{3P(\lambda)}{8} \left[ 1 - \frac{z_1}{\sqrt{(R^2 + z_1^2)}} \right] \tag{12.39}$$

which in more convenient form is:

$$B_1 = \frac{3P(\lambda)}{8} \left[ 1 - \frac{1}{\sqrt{\left(1 + \frac{R^2}{z_1^2}\right)}} \right]. \tag{12.40}$$

Similarly (12.36) will have the form of:

$$\int \frac{tdt}{t^5} = \int \frac{dt}{t^4} = -\frac{1}{3t^3}. \tag{12.41}$$

Applying (12.37) to (12.36) will lead into:

$$B_2 = \frac{1}{3} \frac{3P(\lambda)}{16\pi} z_1^3 \int_{\varphi=0}^{2\pi} \left[ \frac{1}{z_1^3} - \frac{1}{(R^2 + z_1^2)^{1.5}} \right] d\varphi \tag{12.42}$$

giving:

$$B_2 = \frac{P(\lambda)}{8} \left[ 1 - \frac{z_1^3}{(R^2 + z_1^2)^{1.5}} \right]. \tag{12.43}$$

As done before, relation (12.43) can be more conveniently written as:

$$B_2 = \frac{P(\lambda)}{8}\left\{1 - \frac{z_1^3}{\left[z_1^2\left(1 + \frac{R^2}{z_1^2}\right)\right]^{1.5}}\right\} = \frac{P(\lambda)}{8}\left[1 - \frac{1}{\left(1 + \frac{R^2}{z_1^2}\right)^{1.5}}\right]. \quad (12.44)$$

As can be seen for all cases, $B_1$ and $B_2$ go to zero for infinite $z_1$ for any R, with no singularity issues for $z_1=0$.

As can be seen, all of these integrals are actually functions of $R/z_1$. As can be seen in FIG. [54.1]-FIG. [54.3], where $P(\lambda)$ is taken as 1 [W/m²], all the integrals become functions of:

$$\frac{R}{z_1} = tg(\xi) \text{ or } \left(\frac{R}{z_1}\right)^2 = tg^2(\xi) \quad (12.45)$$

where $\xi$ is the half angle which the observer sees the disc from its location, which does not look obvious at all!

We gave a special case example to show the form of integrals to be expected in the analysis. The generalization of the process using vector formulation makes all of the cases very general and very straightforward for any $\theta_n$ angle between the surface normal vector n and $d_\Gamma$. If we write the unit normal vector n of the arbitrary plane $\Gamma$ towards to the circle as:

If we write the unit normal vector n of the arbitrary plane $\Gamma$ towards to the circle as:

$$\vec{n} = a_x\vec{i} + a_y\vec{j} + a_z\vec{k} \quad (12.46)$$

for a point on the circle defined by $(r,\varphi)$, the distance vector to the arbitrary point $(x_P, y_P, z_P)$ can be written as:

$$\vec{r}_p = (x_p - r\cos\varphi)\vec{i} + (y_p - r\sin\varphi)\vec{j} + z_p\vec{k}. \quad (12.47)$$

If d is the magnitude of the distance vector (12.47), it can be expressed as:

$$d = |\vec{r}_p| = \sqrt{(x_p - r\cos\varphi)^2 + (y_p - r\sin\varphi)^2 + z_p^2} \quad (12.48)$$

The unit distance vector $u_p$ is, $$\vec{u}_p = \frac{(x_p - r\cos\varphi)\vec{i} + (y_p - r\sin\varphi)\vec{j} + z_p\vec{k}}{d}. \quad (12.49)$$

Since the direction vector of the light beam $I(\lambda)$ is always perpendicular to the circle, it is always the unit vector along the z axes k of the local coordinate system. Therefore $\cos(\theta_S)$ can be written in vector formulation as the dot product of the unit distance vector (12.49) and k as:

$$\cos(\theta_S) = \vec{u}_p \cdot \vec{k} = \frac{z_p}{d}. \quad (12.50)$$

As can be seen it gives the same result as used in earlier formulations. On the other hand the cosine of the angle between the distance vector and the unit normal vector n towards the circle from the arbitrary surface $\Gamma$ is:

$$\cos(\theta_n) = -\vec{r}_p \cdot \vec{n} = -\frac{(x_p - r\cos\varphi)a_x + (y_p - r\sin\varphi)a_y + z_p a_z}{d} \quad (12.51)$$

again giving the same result as taken earlier in the special case for $a_x = a_y = 0$ and $a_z = -1$ but it becomes a generalized formulation for any surface orientation. ASAR uses this general formulation in the calculations. Again for the comparative analysis which will be given in later section we denote the "Exact" values of $B_1$, $B_2$ and B integrals as $B_{1E}$, $B_{2E}$ and $B_E$ as symbolized earlier for the A integrals.

Since the atmospheric path length for the incoming solar radiation is non-uniform on the integration circle, the power density on the integration circle will also be non-uniform. This non-uniformity is also taken into account in the semi-numerical integration process in ASAR. This is briefly explained in Appendix 5 for the special case where it can be formulated easily.

Having an analytical base for the integration process compared to brute force numerical integration will increase the accuracy significantly and will result in orders of magnitude faster simulation times in the calculations. The method is based on slicing the visible volume of the atmosphere with planes that are always perpendicular to the direction defined by the sun elevation angle. The methodology applies equally well to visible sun elevation angles from zenith to sunrise/sunset conditions, as well as the cases where the sun is below the horizon such as twilight conditions.

13.0. The Method of "Plane Slicing of the Visible Atmosphere" for the Semi-Analytical Integration of the Scattering Integrals As shown above, the integration of scattered power from a circular disc results in an analytical formulation that leads to a very CPU-time-efficient numerical triple integration required for the calculation of scattered spectral power density at any arbitrary point in the atmosphere. Therefore, instead of generating the required very large number of sampling points in the visible atmosphere and summing the scattered power from each sampling point to the desired arbitrary point in the atmosphere, the visible atmosphere is sliced with planes with a finite thickness of $\Delta t$, which are always perpendicular to the line defining the sun elevation angle under consideration. This is a key point to the invention and converts the triple numerical integration to a single numerical integration process along the direction of the sun elevation angle. In other words the integration mesh or the sampling points are not fixed, it is sun elevation angle dependent.

The cross sectional geometry between a plane and a sphere is always a circle, independent of the slicing angle. Consider a plane perpendicular to the line defining the sun elevation angle and its intersection with a sphere. Depending upon the sun elevation angle and the altitude of an observer in the atmosphere, the observer can either see this entire circle or a portion of it. The radius of any of these intersection circles can be calculated. In the case of partial visibility of this circle, the visible circle geometry is a segment of the circle defined by chord line. The chord line divides the circles it two regions, and their location and length, which are related, can also be calculated for any cross section in the region. Depending upon the geometric configuration defined by the altitude of the observer and the sun elevation angle, the observer can only see one of these circle segments. One can analytically calculate the area and all the necessary geometric parameters of all the possible "visible disc surface geometries" as a function of sun elevation angle and can also perform the integrals on these surfaces semi-analytically in a very CPU-time-efficient manner even without making any approximations and can compare the validity of the degree of approximations taken in the overall integral. Before going into the details of these, it is first helpful to have an insight of the three-dimensional scattering integration region, its variation with sun elevation angle and some critical angles associated with the sun elevation angle.

13.1. The Three Dimensional Integration Region; the "Scattering Region"

The three-dimensional region where the scattering integral is performed is designated the "Scattering Region". It can be defined by the intersection of two concentric spheres having their centers at the same coordinate, with different radii of $r_e$ and $r_e+t_A$ and two planes. The inner sphere represents the earth with a radius of $r_e$ and the outer sphere is where the earth's atmosphere is assumed to end in a perfect vacuum. Since zero scatterer density is assumed above the altitude of $t_A$, there will also be zero scattering for $r>r_e+t_A$. The three-dimensional view of the scattering region for sun elevation angle below the horizon for an observer at a point P at sea level is shown in FIG. [55].

Referring to the two planes, the first plane is the horizontal plane. For an observer at sea level it is called the "Horizontal Plane". It is a plane tangent to the inner sphere of radius $r_e$ at the point P, the location of the observer. The intersection of the Horizontal Plane and the yz plane at x=0 gives the "Horizontal Line". The second intersection plane is called the "Shadow Plane" which is another tangent plane, its tangent again to the inner sphere with the radius $r_e$ but with an angle defined by the sun elevation angle θ. The point where it is tangent to the inner sphere with the radius of $r_e$ is a function of the sun elevation angle θ. The center line of the "Shadow Plane" is called the "Shadow Line" which is actually the shadow of the earth on the yz plane at x=0. As can be seen, "Shadow Plane" and "Shadow Line" can only exist when the sun is below the horizontal plane.

As can be seen, every point in the integration region is visible to the observer and to the sun. Its volume is constant for visible sun elevation angles but it changes with sun elevation angle when the sun goes below the horizontal plane. For an observer at sea level and for any visible sun elevation angles, 0°<θ<90°, it is a spherical cap region where its volume can be calculated as:

$$V = \frac{\pi t_A^2}{3}(3r_e - t_A). \qquad (13.1)$$

For $t_A$=80 km and $t_A$=30 km, the spherical cap volume (13.1) gives 1.293·$10^{17}$ and 1.809·$10^{16}$ m³ respectively and the radius of the Horizontal Planes can be determined. As can be seen for any case, the scattering volume is very large for any three-dimensional numerical integration. If one divides this volume into sampling cubes each having sides of 100 meters, the total number of sampling cubes for $t_A$=80 km and $t_a$=30 will be approximately 1.293·$10^{11}$ and 1.809·$10^{10}$ respectively. If one decreases the sampling side of the cubes by k, the number of sampling cubes will increase by a factor of $k^3$ which turns the problem into a numerical integration nightmare.

It is very useful to see how the intersection circle geometries form as a function of sun elevation angle. FIG. [56.1] shows the cross-sectional geometry of these plane-sphere intersection circles when the sun is at 90° elevation from the horizon at the yz plane at x=0. These lines are called the "Cut Lines". Their lengths between the circle intersection points are the diameter of the "Cut Circles" and their diameter is a function of the altitude in the atmosphere.

FIG. [56.2] shows a sun elevation angle for 0°<θ<90°. The "Sun Line" is the line passing from point P and has its slope defined by the sun elevation angle θ, so its line equation is known. Since the Sun Line and the Cut Lines are orthogonal to each other, the slope of the Cut Lines is also known. For any given coordinate on the Sun Line, one can calculate the Cut Line equation passing from that point and its intersection point to the horizontal line. For some of the Cut Lines, the z coordinate of one of the intersection point is smaller than $r_e$ or below the Horizontal Line. Since the observer at point P cannot see below the horizontal line, the dashed portions of the cut lines are not visible. The chord line for these circle segments, which is parallel to the x axes, will have its z coordinates at $z=r_e$. Solving the cut line equation for this condition will give the y coordinate of the intersection point.

FIG. [56.3] illustrates the case where the sun is below the horizon. For this case the point P is at the shadow of the earth or below the shadow line. If only single scattering is assumed, the left of the shadow line will be completely dark. Applying the same process as done earlier to generate the cut lines, they are much shorter and again illustrated with dashed lines in the dark region. One other important difference is that they might either intersect the shadow line or the horizontal line, depending to their location.

When the sun goes below the horizontal plane, the shadow plane forms, and the volume of the scattering region decreases. Its volume can be calculated numerically and is a function of h, $r_e$, $t_A$ and the sun elevation angle θ. At a certain sun elevation angle below the visible horizon, the volume of the integration region becomes zero. This critical angle is the "Scattering Sunrise or Sunset Angle" and it is denoted as $θ_{SSS}$. This is illustrated in FIG. [57.1], which shows the geometry for the yz plane at x=0 for an observer at sea level. As shown in FIG. [57.2], the scattering region becomes more complex for an observer at an altitude of h. The horizontal plane actually becomes a cone surface and its geometry for the yz plane at x=0 is shown FIG. [57.2] For any case where the sun elevation angle is below $θ_{SSS}$, there will be no visible single scattering from the observation points.

The "Scattering Area" is the area for the yz plane at x=0 and is illustrated by the closed area of $P_{H1}P_{S1}P_{S2}PP_2P_{H1}$ in FIG. [57.1]. When the sun is at a point shown as $S_1$, which is below the horizontal plane, the direct sunlight will only be present in a portion of the visible area or in other words in Scattering Area. The portion of the visible area by the observer given by $PP_{H2}P_2P$ will have the shadow of the earth and will be dark, having no direct sunlight, and as a result there can be no direct scattering that is visible by the observer. This area is called the "Dark Area". There can be secondary scattering due to the scattered light from the "Scattering Area" and reflection from the earth's surface into the atmosphere that can scatter into the "Scattering Area", but it will have much weaker intensity compared to the first level of scattering. Herein focus is on the single scattering, so the results shown will be the lower bounds of illumination due to scattering.

The direct sunlight at the given angle will go through the atmosphere, attenuate along its atmospheric path arriving to the scattering points along its atmospheric path as shown $P_{S1}$, $P_{S3}$ and $P_{Sn}$, which are taken on the same atmospheric path of the direct sunlight as shown in FIG. [57.1]. As explained earlier, one can calculate the incoming spectrum and its incoming power at these scattering points between any wavelengths at points $P_{S1}$, $P_{S3}$, and $P_{Sn}$. The direct sunlight arriving at $P_{S1}$, $P_{S3}$ and $P_{Sn}$ will scatter in every direction, and some of the scattered power will be received by the observer at point P. The scattered light will attenuate along its scattered atmospheric path while reaching P. One can calculate the received power of the scattered light using the same principles explained above. Each scattering point has a different direct sunlight power, scattering angle and the distance to the observer at the point P. As can be seen, this "Scattering Area" will be a function of sun elevation angle, atmospheric thickness, altitude of the point P and radius of the earth.

The first problem is to determine at which sun elevation angle there will be no direct sunlight in the visible area from the observer at point P, namely the "Scattered Sunrise/Sunset" elevation angle $\theta_{SSS}$. When the sun goes below the angle $\theta_{SSS}$ as shown by $S_2$ in FIG. [57.1], there can be no direct sunlight where its scattering can be observed from the observation point P at sea level. For an observation point with an altitude of h, indicated as $P_h$ in FIG. [57.2], $\theta_{SSS}$ occurs when the sun is at location $S_{2h}$. As can be seen, the sun is at location $S_2$, which is the sea level or $\theta_{SSS}$, the observer at $P_h$ can still see the scattered light. The angle $\theta_{SSS}$ is only a function of h, $r_e$, $t_A$, and so with some basic trigonometry applied, the yz plane cross-section at x=0 can be calculated as shown in FIG. [58] and explained below.

13.2. Calculation of the $\theta_{SSS}$ "Scattering Sunrise or Sunset" Sun Elevation and the "Mid-Angle" $\theta_{SMID}$ Calculation of $\theta_{SSS}$ is fairly easy and can be calculated with basic trigonometry applied to the right angled triangles in FIG. [58]. The γ angle in FIG. [58] is basically the angle between the lines connecting the point $P_2$ to the center of the concentric circles with radiuses of $r_e$ and $r_e+t_A$ and the a tangent line drawn from $P_2$ to the circle with a radius r, giving.

$$\gamma = \operatorname{Sin}^{-1}\left(\frac{r_e}{r_e + t_A}\right). \tag{13.2}$$

As can be seen, the point $P_2$ is at altitude $t_A$. The distances $P_2P_{T1}=P_2P_{T2}=d$ and is given by:

$$d = (r_e + t_A)\operatorname{Cos}(\gamma) = \frac{r_e}{tg(\gamma)} = \sqrt{(r_e + t_A)^2 - r_e^2}. \tag{13.3}$$

The $\gamma_h$ angle is angle between the lines connecting the point $P_h$ at an altitude h to the center of the concentric circles with radii of $r_e$ and $r_e+t_A$ and the tangent line to the circle with a radius $r_e$. It is one of the angles of the right angled triangle $P_hT_1O$ in FIG. [58] and is given by:

$$\gamma_h = \operatorname{Sin}^{-1}\left(\frac{r_e}{r_e + h}\right). \tag{13.4}$$

The distance $P_h T_1=d_h$ in the same triangle $P_hT_1O$ is:

$$d_h = (r_e + h)\operatorname{Cos}(\gamma_h) = \frac{r_e}{tg(\gamma_h)} = \sqrt{(r_e + h)^2 - r_e^2}. \tag{13.5}$$

Let the angles δ, β and already calculated $\gamma_h$ be:

$$\theta_{SSS} \angle T_2P_2P_{2F} \, \delta\angle P_4P_2T_2 \, \beta=OP_2P_4 \, \gamma_h\angle OP_hT_1. \tag{13.6}$$

The line $P_2P_4$ is drawn perpendicular to $P_hP_4$ and for the right angled triangle $P_hP_4P_2$ so one can write:

$$\beta + \gamma = \frac{\pi}{2} - \gamma_h \tag{13.7}$$

giving, $$\beta = \frac{\pi}{2} - \gamma_h - \gamma. \tag{13.8}$$

On the other hand, $$\delta \angle (\gamma - OP_2P_4) = (\gamma - \beta). \tag{13.9}$$

Substituting (13.8) in (13.9) gives:

$$\delta = \gamma - \frac{\pi}{2} + \gamma_h + \gamma = 2\gamma + \gamma_h - \frac{\pi}{2} \tag{13.10}$$

Since $$\theta_{SSS}=\pi-\delta \tag{13.11}$$

explicitly the "scattered sunrise/sunset" angle $\theta_{SSS}$ becomes only a function of γ and $\gamma_h$, or:

$$\theta_{SSS} = \pi - 2\gamma + \left(\frac{\pi}{2} - \gamma_h\right) = \frac{3\pi}{2} - (2\gamma + \gamma_h). \tag{13.12}$$

Another important angle is the mid angle $\theta_{MID}$, which is needed for the scattering area and volume calculations. It is shown as the radius line $OP_5$, which divides the spherical cap region into two equal sections as seen in FIG. [59]. Point $P_5$ is at an altitude of $t_A$ and is the intersection of the radial line $OT_1$ passing from the tangent point $T_1$ of the tangent line drawn from $P_h$ to the circle with the radius of $r_e$. The mid angle is the mid angle between direct sunrise/sunset angle $\theta_{DSS}$ and the $\theta_{SSS}$ and gives the sun location at $P_{SMID}$, which is the intersection of the tangent line drawn from $P_5$ to the circle with the radius of $r_e$ and the circle with the radius of $r_e+t_A$.

The $P_6P_5$ line in FIG. [59] is drawn perpendicular to the $OP_h$ line and forms a right angled triangle $P_6P_5O$ and the angle $P_6P_5O$ is equal to $\gamma_h$ angle. Since $OP_5T_3$ angle is equal to γ the $\theta_{SMID}$ angle simply becomes:

$$\theta_{SMID}=\pi-(\gamma_h+\gamma). \tag{13.13}$$

As can be seen, subtracting (13.13) from (13.12) gives:

$$\theta_{SSS} - \theta_{SMID} = \frac{3\pi}{2} - (2\gamma + \gamma_h) - \pi + (\gamma_h + \gamma) = \frac{\pi - 2\gamma}{2}. \tag{13.14}$$

Since γ is not a function of h, the difference in the angles between $\theta_{SSS}$ and $\theta_{SMID}$ is not a function of altitude h. For a meaningful scattering analysis, the altitude h of a point has to be less or equal to $t_A$. FIG. [60.1] show the $\theta_{DSS}$, $\theta_{SSS}$ and $\theta_{SMID}$ as a function of altitude from 0 km to 30 km for $t_A$=30 km. FIG. [60.2] shows the altitude effect for higher altitudes, all the way up to 80 km, along with the results shown in FIG. [60.1]. Since a meaningful analysis can be done for $t_A$ greater or equal to h, the second set of curves where h goes as high as 80 km were generated using $t_A$=80 km. The difference between $\theta_{SSS}$ and $\theta_{SMID}$ remains constant with altitude as predicted by (13.14) and is not the half value of $\theta_{SSS}$. The importance of $\theta_{SMID}$ is in the analytical derivation of the scattering area, which also gives a better insight to the problem. Before going into that, it is important to show the $\theta_{SSS}$ as a function of atmospheric thickness for sea level as shown in FIG. [61]. FIG. [61] also shows the direct sun elevation angle at sunrise/sunset as a function of altitude taken as the atmospheric thickness to give a good comparative insight to $\theta_{SSS}$.

13.3. Determining the Atmospheric Thickness from $\theta_{SSS}$

From FIG. [61] showing a very useful curve, one can actually determine the atmospheric thickness $t_A$ by using it along with an accurate astronomical routine. If one can decide on a complete darkness level and know the sun elevation angle at that time by an astronomical routine, FIG. [61] can tell the atmospheric thickness at that time. Another use is to decide which atmospheric thickness $t_A$ to use in the simulations without violating any accepted twilight conditions. As can be seen, if one uses $t_A=100$ km, there will be scattered light at sea level when the sun is even 20° below the horizontal plane, yet this is not the case. A more accepted figure is 18°, which is known as the astronomical twilight condition. In other words, one can assume that it will not get any darker after the sun elevation angle is below 18°. FIG. [61] shows that to have no visible single scattering in the atmosphere when the sun elevation angle is below the horizon of 18°, the atmospheric thickness has to be less than 80 km. If $t_A=10$ km on the other hand, FIG. [61] shows that the astronomical twilight has to be at 6°, which is also not correct! FIG. [61] shows that at $t_A=30$ km it is barely past the 12° nautical twilight condition, which tells that the correct value of $t_A$ has to be between 30 km to 80 km.

13.4. Calculation of the Scattering Area as a Function of Sun Elevation Angle θ Below the Horizontal Plane Calculation of the Scattering Area as a function of Sun Elevation Angle below the horizontal plane can be done entirely analytically, giving better insight to the problem. The more important point is the "Scattering Volume" as a function of sun elevation angle below the horizontal plane, which is determined numerically and is explained in the next section, but having a two-dimensional versus three-dimensional simulation result comparison is always useful in any multidimensional analysis.

The issue now is to calculate the "Scattering Area" for sun elevation angles between $\theta_{DSS}$ and $\theta_{SSS}$ for any given $t_A$ and altitude h which is less than $t_A$. Knowing $\theta_{DSS}$, $\theta_{MID}$ and $\theta_{SSS}$ analytically as a function of $t_A$ and altitude h, this calculation becomes possible analytically as well. It can be calculated many ways but using pure geometry involving addition and subtraction of geometries which can be calculated as a function of $r_e$, $t_A$ and $\theta_{DSS} < \theta < \theta_{SSS}$ gives more geometrical insight to the problem to which one can better relate. The geometries involved are partial circular wedges, circle sections and triangle areas.

FIG. [62.1] shows the "Scattering Area" geometrically for the sun elevation angle between $\theta_{DSS}$ and $\theta_{MID}$. The geometry of the "Scattering Area" is an area that geometrically can be as:

$$S_\Omega = S_{P_5T_1P_2} - S_{P_7T_1P_8} + S_{P_7P_3P_5} \text{ for } \theta_{DSS} \leq \theta \leq \theta_{MID}. \tag{13.15}$$

As can be seen, (13.15) is only valid for θ between $\theta_{DSS}$ and $\theta_{MID}$, and there is a sign change when θ falls in the interval of $\theta_{MID}$ and $\theta_{SS}$. This is illustrated geometrically in FIG. [62.2] and (13.15) becomes:

$$S_\Omega = S_{P_5T_1P_2} - S_{P_5T_1P_3} + S_{P_1P_3P_8} \text{ for } \theta_{MID} \leq \theta \leq \theta_{SSS}. \tag{13.16}$$

As can be seen, there is a difference in the summation signs, which shows the importance of the $\theta_{MID}$ angle. For the sun elevation angle between $\theta_{DSS}$ and $\theta_{MID}$ the "Dark Triangle" area $P_7T_1P_8$ is subtracted from the partial wedge area $P_7P_3P_5$. The difference is added to the half wedge area shown as $P_5T_1P_2$. On the other hand, for the sun elevation angle between $\theta_{MID}$ and $\theta_{SSS}$ the area is calculated only with the subtraction of the triangle $T_1P_3P_8$ and the partial wedge $P_5T_1P_3$ areas from the half wedge area shown as $P_5T_1P_2$. The mathematics associated with the area calculations is given in detail in Appendix 1 as a function of atmospheric thickness $t_A$, sun elevation angle θ and for any given altitude h.

FIG. [63] show the "Scattering Area" and its complement "Dark Area" as a function of sun elevation angle for altitudes at sea level and h=10,000 m for $t_A$=30 km. As can be seen in FIG. [63] for the altitudes h for 0 m and 10,000 m, the scattering area starts with an initial area of $2.478 \cdot 10^{10}$ m$^2$ at $\theta_{DSS}(h)$ and falls to zero at $\theta_{SSS}(h)$ for both of the altitudes. The horizontal mid-line shown in FIG. [63] gives the half of the initial area, which is not the area at $\theta_{MID}$; they are marked on each curve separately.

13.5. Shadow Line Equation as a Function of Sun Elevation Angle Below the Horizontal Plane To analytically calculate the shadow line equation as a function of sun elevation angle below the horizontal plane θ one only needs to know the slope and a point on it. The geometry associated with it is shown in FIG. [64.1] for a point P at sea level for simplicity. The slope of the shadow line is straightforward and is directly related to the sun elevation angle below the horizontal plane θ as:

$$m = -tg(\theta). \tag{13.17}$$

As a point on the shadow line it is convenient to select the y, z coordinates of the intersection point $P_S(\theta)$ between the shadow and horizontal lines. Since the horizontal line is parallel toy axes, its slope is zero and every point on it will have the same z coordinate of $r_e$. So the z coordinate of $P_S(\theta)$ is equal to $r_e$.

On the other hand, the sections of the horizontal and shadow lines, $PP_S(\theta)$ and $P_S(\theta)P_T(\theta)$ as shown in FIG. [64.1] are pieces of the tangent lines to the circle with a radius of $r_e$ and they are in equal length. The angle δ is defined in FIG. [64] as:

$$\delta \angle PP_S(\theta)O = \angle OP_S(\theta)P_T(\theta) \tag{13.18}$$

and is related to θ as:

$$\theta + 2\delta = \pi \tag{13.19}$$

Solving (13.19) for δ gives:

$$\delta = \frac{\pi - \theta}{2}. \tag{13.20}$$

The α angle is defined as:

$$\alpha \angle POP_S(\theta) = \angle P_Y(\theta) OP_S(\theta). \tag{13.21}$$

Since the triangles $POP_S(\theta)$ and $OP_S(\theta)P_T(\theta)$ are right angled triangles:

$$\alpha = \frac{\pi}{2} - \delta. \tag{13.22}$$

Substituting (13.20) in (13.22) gives:

$$\alpha = \frac{\pi}{2} - \delta = \frac{\pi}{2} - \frac{\pi}{2} + \frac{\theta}{2} = \frac{\theta}{2}. \qquad (13.23)$$

The length of the lines $PP_S(\theta)$ and $P_S(\theta)P_T(\theta)$ gives the y coordinate of $P_S(\theta)$ as:

$$y_{P_S} = \frac{r_e}{tg(\delta)}. \qquad (13.24)$$

Since the y,z coordinates of $P_S(\theta)$ and the slope are known, one can calculate the line equation of the shadow line $P_T(\theta) P_S(\theta)$ as a function of y. The shadow line z intercept $z_{INT}(\theta)$ is:

$$z_{INT}(\theta) = r_e + \frac{tg(\theta)}{tg(\delta)} r_e = r_e + \frac{tg(\theta)}{tg\left(\frac{\pi-\theta}{2}\right)} r_e \qquad (13.25)$$

giving the shadow line equation as a function of y and θ as:

$$z(y, \theta) = my + z_{INT}(\theta) = -tg(\theta)y + r_e + \frac{tg(\theta)}{tg\left(\frac{\pi-\theta}{2}\right)} r_e. \qquad (13.26)$$

Another useful parameter for the $P_S(\theta)$ is the distance to the center of the earth O, which is:

$$OP_S(\theta) = \frac{r_e}{\cos(\alpha)} = \frac{r_e}{\cos\left(\frac{\theta}{2}\right)}. \qquad (13.27)$$

The altitude of the point $P_S(\theta)$ from the earth surface with the use of (13.27) gives:

$$h[P_S(\theta)] = \frac{r_e}{\cos\left(\frac{\theta}{2}\right)} - r_e. \qquad (13.28)$$

The slopes of the spherical slices, for the scattering integral taken as planes perpendicular to the direct sunlight, are directly related to the slope of the sun elevation angle θ and given as [3]:

$$m_{slice} m = -1 = -tg(\theta) m_{slice} \rightarrow m_{slice} = \frac{1}{tg(\theta)}. \qquad (13.29)$$

For the mesh generation for the scattering integral one also needs the intersection points between many lines with a given equation and a circle. For shortness in the arithmetic, represent the line equation in general form as:

$$z = my + a. \qquad (13.30)$$

The circle equation having a radius of r and its center at origin O that (13.30) will intersect is:

$$r^2 = z^2 + y^2. \qquad (13.31)$$

Basically there are three possible cases. The line might not intersect the circle; it might be tangent or intersect it at two points. For many cases related to the problem here, the line intersects the circle at two points. One also needs the intersection coordinates, the chord length and the center coordinates of the chord line. The line to circle intersection coordinates are shown as $P_{C_1}(\theta)$ and $P_{C_2}(\theta)$ in FIG. [64.1]. Substituting (13.30) into (13.31) will give a quadratic equation in y. Solving the roots of the resulting quadratic equation will be enough to perform all these tasks. For the shadow line one also must know that the intersection point of interest has z value larger than $r_e$. To make the selection easier, the line equation is rewritten as:

$$y = \frac{z-a}{m}. \qquad (13.32)$$

Substituting (13.32) into (13.30) directly gets the quadratic equation as:

$$r^2 = z^2 + \left(\frac{z-a}{m}\right)^2 \qquad (13.33)$$

which with some arithmetic (13.33) becomes:

$$r^2 = z^2 + \left(\frac{z^2 - 2az + a^2}{m^2}\right) \qquad (13.34)$$

which is only represented in z, which makes the root selection process more direct and easier giving:

$$m^2 z^2 + z^2 - 2az + a^2 - m^2 r^2 = 0. \qquad (13.35)$$

With arranging (13.35), it is:

$$(1+m^2)z^2 - 2az + (a^2 - m^2 r^2) = 0. \qquad (13.36)$$

The discriminant $\Delta$ of (13.36) will be:

$$\Delta = 4a^2 - 4(1+m^2)(a^2 - m^2 r^2). \qquad (13.37)$$

If $\Delta$ is negative, the line will not intersect the circle. If it is zero, it will be tangent, and if it is positive, it will intersect the circle at two points. For $\Delta > 0$ case the real two z roots of (13.37) will be:

$$z_{1,2} = \frac{2a \pm \sqrt{\Delta}}{2(1+m^2)}. \qquad (13.38)$$

As can be seen for the shadow line one needs the intersection point which is in the atmosphere and that always has a z value greater than $r_e$, which makes the selection easier and direct. For the chord length calculation both of the roots $z_1$ and $z_2$ in (13.38) are used and one can get their corresponding $y_1$ and $y_2$ coordinates by substituting them into (13.32). The chord length is the distance between them and is calculated by using:

$$\text{chord} = \sqrt{(y_1 - y_2)^2 + (z_1 - z_2)^2}. \qquad (13.39)$$

The chord length will be the diameter of the intersection circle. The center coordinate is basically the average points of the intersection coordinates $(y_1, z_1)$ and $(y_2, z_2)$ and will give the center coordinate of the intersection circle which is also the tangent point $P_T(\theta)$. Since all the calculations are done at yz plane at x=0, all of the x coordinates of the calculated points are also zero. The family of "shadow lines" for several sun elevation angles below the horizon are shown in FIG. [64.2] for atmospheric thickness of $t_A$=30 km.

Another condition which is used in developing this invention and needs to be evaluated is the tangent line case, where the slope m of the tangent line is known and the need is to find a in the line equation (13.30) or (13.32). This property is used in the "Principal Mesh Line" generation; therefore it is important to cover it thoroughly. This condition corresponds to the case where the determinant is zero, giving a single root to the equation (13.36) and is explicitly given by:

$$4a^2-4(1+m^2)(a^2-m^2r^2)=0. \qquad (13.40)$$

Doing the arithmetic on (13.40) gives:

$$4a^2-4(a^2-m^2r^2+m^2a^2-m^4r^2)=0. \qquad (13.41)$$

Opening the bracket in (13.41) and doing the arithmetic gives the equation:

$$4m^2r^2-4m^2a^2+4m^4r^2=0 \qquad (13.42)$$

Dividing (13.42) by $4m^2$ gives the final form of the equation which is:

$$r^2-a^2+m^2r^2=0. \qquad (13.43)$$

This will result in:

$$a^2=r^2+r^2m^2=r^2(1+m^2). \qquad (13.44)$$

Solving (13.44) for a for a given slope of m gives two solutions as:

$$a=\pm r\sqrt{1+m^2} \qquad (13.45)$$

Substituting the zero value of the determinant in (13.38) gives the z coordinate of the tangent point as:

$$z_{TAN} = \pm \frac{2r\sqrt{(1+m^2)}}{2(1+m^2)} = \pm \frac{r}{\sqrt{(1+m^2)}} \qquad (13.46)$$

13.6. The "Variable Length Principal Mesh Line" for Meshing the Visible Atmospheric Region for any Given Sun Elevation Angle θ

The goal of the mesh generation is to generate slices that are always perpendicular to a given "any" sun elevation angle with a given spacing between them that covers the entire scattering region. The most obvious choice is to use the sun line for visible sun elevation angles and use the shadow line for the cases when the sun elevation angle is below the horizon. The simplest cases are for sun elevation angle θ=90° and 0° from the horizon which are shown in FIG. [65.1] and FIG. [65.2] respectively. Since one can calculate the principal mesh line equation in any case for any sun elevation angle θ, one can also find its proper intersection point with the outer circle having the radius of $r_e+t_A$ or with the horizontal line. Finding the first coordinate $P_{M\_1}(\theta)$ on the principal mesh line for any case is straightforward. But there are some issues with calculating the last coordinate $P_{M\_n}(\theta)$ of the principal mesh point that require some care for a mesh which will cover the entire scattering region. The procedures are as follows:

i) The First Coordinate on the Principal Mesh Line for Sun Elevation Angle Below the Horizon Go to coordinate $P_{H\_2}$ and generate a line with the cut line slope and intersect it with the principal mesh line and assign it as $P_{M\_1}(\theta)$ as shown in FIG. [65.3]

ii) The Last Coordinate on the Principal Mesh Line for Sun Elevation Angle Below the Horizon Find the intersection point between the principal mesh line and the circle with a radius of $r_e+t_A$ indicated as $P_{M\_n}(\theta)$ as shown in FIG. [65.3].

iii) The First Coordinate on the Principal Mesh Line for Sun Elevation Angle Above the Horizon Go to coordinate $P_{H\_1}$ and generate a line with the cut line slope and intersect it with the principal mesh line and assign it as $P_{M\_1}(\theta)$ as shown in FIG. [65.4].

iv) The Last Coordinate on the Principal Mesh Line for Sun Elevation Above the Horizon (This case requires some thought. As can be seen in FIG. [65.4] if the intersection point between the principal mesh line and the circle is assigned a radius of $r_e+t_A$ indicated as $P_{M\_C}(\theta)$ the cut line might intersect the horizontal line at $P_{H\_C}(\theta)$, having a y coordinate which is less than they coordinate of the $P_{H\_2}$. This will leave an unmeshed region shown as $P_{M\_C}(\theta)$ $P_{H\_C}(\theta)$ $P_{H\_2}$ in FIG. [65.4]. The proper choice at the first glance then is to:)

Go to coordinate $P_{H\_2}$ and generate a line with the cut line slope and intersect it with the principal mesh line and assign it as $P_{M\_n}(\theta)$. Name this choice "Choice A."

(This works for lower sun elevation angles. Assume the sun has an elevation angle θ>θc, as shown in FIG. [65.5]. For this case the cut lines can't go above the point $P_{M\_H2}(\theta)$ and leave an unmeshed region. As an extreme case, take θ=0 and for this case it is clear that there can be no cut lines generated for this condition. So for this case the proper choice is:)

Find a $P_{M\_n}(\theta)$ point that is the intersection point between the tangent line to the circle with a radius of $r_e+t_A$ and which also has the cut line slope.

The initial work for this was given (13.40)-(13.46), all that is needed is to make the proper choices for the signs and find the critical angle θc where this condition happens. The $z_{TAN}$ coordinate of the tangent point T(θ) has to be positive and greater than $r_e$ giving:

$$z_{TAN} = \frac{r}{\sqrt{(1+m^2)}} \geq r_e \qquad (13.47)$$

where $r=r_e+t_A$. Doing the arithmetic on (13.47) gives:

$$\frac{r^2}{1+m^2} \geq r_e^2. \qquad (13.48)$$

Solving m from (13.48) will lead into:

$$\frac{r^2}{r_e^2} - 1 \geq m^2 \qquad (13.49)$$

which (13.49) gives:

$$\pm \sqrt{\left(\frac{r^2}{r_e^2} - 1\right)} \geq m. \qquad (13.51)$$

Simplifying (13.51) gives:

$$\pm \frac{\sqrt{(r+r_e)(r-r_e)}}{r_e} \geq m. \qquad (13.52)$$

Substituting the $r=r_e+t_A$ in (13.52) yields the relation between the slope m of the cut line and $r_e$ and $t_A$ as:

$$\pm \frac{\sqrt{t_A(2r_e+t_A)}}{r_e} \geq m. \qquad (13.53)$$

Since the sun line is orthogonal to the cut line and its slope is related to the tangent of the sun elevation angle, $\theta c$ becomes:

$$\theta_c = tg^{-1}\left[\frac{r_e}{\sqrt{t_A(2r_e+t_A)}}\right]. \qquad (13.54)$$

Therefore this case has an "if" condition for the generation of the last mesh $P_{M\_n}(\theta)$:

If $\theta > \theta c$ go to coordinate $T(\theta)$ and generate a line with the cut line slope and intersect it with the principal mesh line and assign it as $P_{M\_n}(\theta)$ as shown in FIG. [65.5].
Else
get the proper sign for a given in (13.45) as:

$$a = (r_e+t_A)\sqrt{1+m^2}. \qquad (13.55)$$

Find the intersection point between the principal mesh line and the cut line, where its line equation is given as:

$$z = my+a \qquad (13.56)$$

where m is the slope of the cut line which is known and the a given in (13.55) and assign it as $P_{M\_n}(\theta)$ as shown in FIG. [65.5]. Name this choice "Choice B."

FIG. [66] shows the ratio of the length of the principal mesh generation line to the atmospheric path length as a function of the sun elevation angle above the horizon. Curve A and Curve B in FIG. [66] graphically show the ratio of the length of the principal mesh generation line to the atmospheric path length based on the choices selected. As can be seen, we start with "Choice B" until sun elevation is angle is lower than $\theta c$ and continue with "Choice A" for complete meshing of the scattering volume.

13.7. Fixed Points on the Principal Mesh Generation Line, the "Marker Points"

Once the principal mesh generation line as a function of the sun elevation angle and its first and last coordinates are found as explained above, several fixed mesh points on it can be defined. These points are called the "Marker Points".

For sun elevation angle above the horizon there are three marker points. The first marker point, MARK(1) is the coordinates of P. The second marker point, MARK(2), is principal mesh generation line and outer circle intersection point $P_{M\_C}(\theta)$. The third marker point, MARK(3), is the intersection point between the principal mesh generation line and the cut line which passes from $P_{H\_2}$. As can be seen the third mark point, MARK(3), does not exist for $\theta=90°$. These points are shown in FIG. [65.3] and FIG. [65.4].

For sun elevation angles below the horizon there are three marker points. The first marker point, MARK(1), is the coordinates of $P_{M\_1}(\theta)$. The second marker point, MARK (2), is principal mesh generation line and outer circle intersection point $P_{M\_n}(\theta)$. The third marker point, MARK(3), is the intersection point between the principal mesh generation line and the horizontal line, $P_S(\theta)$. As can be seen, the third marker point, MARK(3) does not exist for $\theta=0°$. For this case it becomes $P_{H\_2}$ and MARK(2) becomes $P_{H\_1}$.

After the marker points are set, the principal mesh generation line is divided into segments not exceeding a defined value of $\Delta t$. The mesh point indices corresponding to the marker points are stored and (y,z) coordinates of each mesh point on the principal mesh generation line are calculated and stored. The $\Delta t$ value chosen for the simulations shown here is set to 75 m, which is far more than enough. This could be verified very easily by changing the $\Delta t$ values and comparing the simulation results, which makes the method very easy to be capable of the adaptive mesh generation.

13.8. The Cross-Sectional Slice Geometries

Once the principal mesh generation is complete, all that needs to be done are the generation of the cross-sectional slice geometries for each mesh point. Since all the cut lines will have the same slope and the $(y_m,z_m)$ coordinates of each the mesh point are known, one can write the line equation for all of them and find their circle intersection coordinates $(y_{c1},z_{c1})$ and $(y_{c2},z_{c2})$ as explained above. The diameter of the intersection circle will be the distance between the circle intersection coordinates $(y_{c1},z_{c1})$ and $(y_{c2},z_{c2})$. The radius is half of this value and is labeled $r_{cut}$, and its center coordinate $(y_{avg},z_{avg})$ will be the average values of these coordinates. From this point the flow of the algorithm becomes dependent on the sun elevation angle.

13.8.1. For Sun Elevation Angle Above the Horizon

Since there are only two lines to intersect in this case, which are the cut lines and the horizontal line, the sun elevation angle above the horizon is the simpler case. If both of the z coordinates of the cut line and the outer circle intersection points are greater than $r_e$, then the cut circle is a full circle. If one of the z coordinates is less than $r_e$, the intersection coordinates are found between the horizontal line and the cut line $(y_{int}, z_{int})$. As can be seen, $z_{int}=r_e$ and the distance between the valid cut line circle intersection point $(y_c,z_c)$ is calculated. This is called the chord distance $c_d$. This will determine the location of the chord line from the edge of the circle, which splits the circle into two regions, labeled the "lit" or "visible" and the "dark" or "Invisible" region as shown in FIG. [67.1]. Chord distance $c_d$ can be larger than the cut circle radius $r_{cut}$, but never greater than its diameter. The region of interest for integrations or some other calculations is the "lit" region, which is the visible portion of the circle from the observation point P. As can be seen, the marker points define the full and partial circle regions without any checking as well.

13.8.2. For Sun Elevation Angle Below the Horizon

In the case of the sun elevation angle below the horizon, both of the z coordinates of the cut line and the outer circle intersection points cannot be greater than $r_e$. Only one will give the desired $(y_c,z_c)$ solution. There are two cases of line intersections. The first is the cut line horizontal line intersection and is very similar to the case where the sun is above the horizon. One finds the intersection coordinates between the horizontal line and the cut line $(y_{int},z_{int})$. As can be seen, $z_{int}=r_e$ and the distance between the valid cut line circle intersection point $(y_c,z_c)$ is calculated. This again is called the chord distance. This will determine the location of the chord line from the edge of the circle, which splits the circle in to two regions, labeled the "lit" or "visible" and the "dark" or "invisible" region as shown in FIG. [67.1]. The second is the case when the mesh point $(z_m, y_m)$ on the principal mesh generating line is above the horizontal plane giving $z_m > r_e$.

The region of interest for integrations or some other calculations is the "lit" or "visible" region, which is the visible portion of the circle from the observation point P. As can be seen, the marker points define the full and partial circle regions without any checking as well for this case.

13.9. Geometrical Parameters for the "Lit" and "Dark" Regions of the Intersection Circles and the x', y', z' Coordinate System for Integration To perform the integrals needed and for other calculations one needs to be able to have the geometrical parameters of the "Intersection Circles" on the "Cut Lines" which pass from any mesh point on the "Principal Mesh Generation Line". FIG. [67.2] gives the perspective view of the intersection circle which is cut by a "Chord Line" as explained earlier looking from a point on z' axes in the coordinate system (x',y', z'). This coordinate system is obtained by rotation and translation of the (x, y, z) coordinate system which has its origin in the center of the earth from which all the earlier geometrical calculations originated. The origin of the (x', y', z') system is the center coordinate of the Intersection Circle. As shown above its radius $r_{cut}$ and the distance between the chord line and the edge of the "lit" region $c_d$ is known. For area calculations there is no need for a coordinate transformation, but it becomes useful for the analytical evaluation of the integrals as given at (12.3) and (12.30) on this partial or full circle which is shown as hatched circle segment in FIG. [67.2].

The geometric parameters of the Intersection Circle can be more easily understood in a simpler plot as shown in FIG. [67.1]. The geometry of all of the Intersection Circles are as in shown in FIG. [67.1]. The only differences between them are their radii and the location of the chord line with respect to the circle center. The area of the circle segment for $c_d < r_{cut}$ can be calculated by solving $\varphi$. Since $$d_C = r_{cut} - c_d \text{ for } r_{cut} \geq c_d \tag{13.57}$$

The $\varphi$ becomes:

$$\varphi = \text{Cos}^{-1}\left(\frac{d_c}{r_{cut}}\right). \tag{13.58}$$

The $x_C$ coordinate can also be calculated as:

$$x_C = r_{cut}\text{Sin}(\varphi) = r_{cut}\text{Sin}\left[\text{Cos}^{-1}\left(\frac{d_c}{r_{cut}}\right)\right] \tag{13.59}$$

Using (13.57) and (13.58), the "lit" circle segment area $O'P_1P_{C1\_1}P_2O'$ can be calculated by multiplying the wedge area $O'P_1P_{C1\_1}O'$ minus the triangle area $O'P_1P_{INT}O'$ with 2 as:

$$S_L(c_d, r_{cut}) = 2\left[\frac{\varphi r_{cut}^2}{2} - \frac{1}{2}x_C d_C\right]. \tag{13.60}$$

On the other hand the other piece of the circle segment $S_D(c_d, r_{cut})$ is the remaining area portion of the circle which can be calculated by the relation:

$$S_D(c_d, r_{cut}) + S_L(c_d, r_{cut}) = \pi r_{cut}^2 \tag{13.61}$$

For sun elevation angles above the horizon, some of the intersection circles will have $2r_{cut} > c_d > r_{cut}$ for which (13.58) to (13.60) cannot be used. For these conditions to calculate the smaller circle segment area, first modify $d_c$ as:

$$d_C = 2r_{cut} - c_d \text{ for } 2r_{cut} \geq c_d \geq r_{cut}. \tag{13.62}$$

Then by using (13.61) the "lit" area becomes related to the smaller circle segment area as:

$$S_L(c_d, r_{cut}) = \pi r_{cut}^2 - 2\left[\frac{\varphi r_{cut}^2}{2} - \frac{1}{2}x_C d_C\right]. \tag{13.63}$$

13.10. Calculation of the "Scattering Volume"

Unfortunately a general analytical formulation of a partial spherical cap as a function of sun elevation angle with the geometrical properties as explained above does not exist. Therefore this task requires a numerical procedure. Here a semi-analytical method of numerical integration can be used, which is more accurate and much faster compared to a standard three-dimensional numerical volume integration method. Since the principal mesh generation line is known one can calculate all intersection circle areas analytically at each mesh point and know all their thicknesses, the integration process transforms itself to a single integral from a triple integral. This saves very significant CPU time as well as improves accuracy compared to standard three-dimensional numerical volume integration methods based on division of the three-dimensional region into small volume elements and finding the ones in the region and summing their volumes.

FIG. [68] shows the scattering volume as a function of sun elevation angle below the horizon for atmospheric thicknesses of $t_A=30$ and 80 km respectively. It is useful to demonstrate the three-dimensional nature of the scattering problem in the atmosphere. This is shown in FIG. [69] where normalized scattering volumes from three-dimensional volume integration and scattering areas from a two-dimensional calculations as a function of sun elevation angle below the horizon is given for atmospheric thicknesses of $t_A=30$ km and 80 km respectively. The normalized value for the scattering area $S_{norm}$ is scattering area for sun elevation angle at $\theta=0$ for any given atmospheric thickness. Similarly the normalized value for the scattering volume $V_{norm}$ is taken as its volume for sun elevation angle at $\theta=0$ for any given atmospheric thickness. This type of normalization will give the ability to compare the effects of the atmospheric thickness as well as two-dimensional and three-dimensional results of the atmospheric scattering problem for sun elevation angle below the horizontal plane in a single plot. As can be seen the atmospheric scattering problem is a highly three-dimensional problem and two-dimensional analysis will highly overestimate the scattered light at any point in the atmosphere by at least 25% for $-3°$ to $-4°$ of sun elevation angles for any reasonable choice of $t_A$.

14.0. Scattered Sunlight Intensity as a Function of Sun Elevation Angle

To calculate the scattered light power density at a point P, the integrations as shown earlier on the segment of the circle are necessary, although not on the full circle as shown in FIG. [54], but as shown in FIG. [70] for a given sun elevation angle $\theta$. The related mathematics for this task are given in earlier sections and is complemented with Appendices 2 and 3.

A reason for the extensive mathematics presented in this disclosure is to give the mathematical details for determining the sun elevation angle and the time associated with it at a given location, taking its surrounding topography, altitude, temperature, date and atmospheric pressure, which matches human vision for a given artificial illumination used at that location for effectively turning on and off the artificial illumination for significant energy saving use. Herein is the overall flow diagram and sequence of calculations explained above that make this task possible.

The numerical integration method for calculation of the received scattered power density at a point $P_o$ and at a surface given with its unit normal vector $n_s$, pointing towards the sky at the point $P_o$ is as follows:

i) Calculate the scattered sunrise/sunset $\theta_{SSS}$ for the altitude h and atmospheric thickness $t_A$. Select the $\Delta\theta$ for incrementing the sun elevation angle and the first value $\theta_0$. Generate the sun elevation angle array $\theta_j$ from $\theta_0$ to $\theta_{SSS}$ by $\Delta\theta$ increments having m angles. Set j=1 and pick $\theta_j$.

ii) Perform the integration process for the power density spectrum for the given artificial illumination source at a selected distance or a sampled surface using Photopic, Scotopic and chosen Mesopic Luminosity functions and integrate all of the calculated functions over the wavelength. (The units of this process will be in the units of $W/m^2$.)

iii) Generate the principal mesh generation line for the sun elevation angle $\theta_j$. Put the marker coordinates on the principal mesh generation line.

iv) Calculate the distance between the sun and the earth for that date, for example using Astronomical and Navigational routines, and calculate the spectral power density at the earth location using the normalized Planck radiation law. Sample the incoming solar radiation in space for that date for n wavelengths, $\lambda_1$ being the first and $\lambda_n$ being the last. Form the wavelength array. Set k=1 and pick $\lambda=\lambda_k$.

v) Generate cut lines that are perpendicular to the sun line or the shadow line by dividing the principal mesh generation line by a given $\Delta t$.

vi) Generate intersecting circle parameters, lit areas and dark areas and form the geometry of the partial cut circles.

vii) Calculate the incoming solar power density for $\lambda$ at the sampling points on the partial cut circles.

viii) Calculate the scattering power density at each sampling point on the partial cut circles for $\lambda$.

ix) Calculate the scattering integrals on point $P_o$ and on the plane surface defined by the outward normal vector $n_s$. Store both of the integral values in the power density array for each wavelength. (This will give the power density spectrum as a function of wavelength in the units of $W/m^2$ nm for $\lambda$.)

x) Increment wavelength subscript k by 1 (k=k+1) and get the next wavelength value $\lambda=\lambda_k$ from the wavelength array and GO TO vii). If k=n (i.e., wavelength scan complete) go to xi)

xi) With the received scattered power density spectra thus completed, get the power density by integrating it between $\lambda_1$ and $\lambda_n$. (This will give the received power densities in $W/m^2$ giving the total power density in the received scattered spectrum.)

xii) Multiply the scattering integral as a function of wavelength in $W/m^2$ nm as calculated in step ix) with the Photopic, Scotopic and chosen Mesopic Luminosity functions and integrate all of the calculated functions over the wavelength. (The units of this process will be in the units of $W/m^2$.)

xiii) Increment the sun elevation angle subscript j=j+1 and get $\theta_j$ if j<m go to iii)

xiv) The result is the scattered power density as a function of sun elevation angle $\theta$ that has to be compared with the artificial illumination values.) Find the equivalent $\theta$ that gives the same values for both the scattered sunlight and for artificial illumination. (This is the spectral matched sun elevation angle $\theta_{SM}$.)

xv) Calculate the time to turn on and off the artificial illumination at that location that corresponds to $\theta_{SM}$ (using for example Astronomical and Navigational Utilities routines) to obtain the GPS location, altitude, temperature, atmospheric pressure and date information.

xvi) Generate the timing functions for all the electrical activities, including the activation and deactivation of artificial illumination.

It is noted that this procedure may be applied with context-appropriate modifications in other contexts involving sun-position-related functions, such as Islamic prayer time notifications.

14.1. General Functional Properties of $A_E$ and $B_E$ Integrals Evaluated on Full and Partial Circles and Final Results As can be seen, the $A_E$ and $B_E$ integrals are performed on partial circles in the order of thousands with different radii and partial areas and orientations with respect the observation point for each sun elevation angle, which are used in calculation of the scattered power density spectrum. Finally multiplying the calculated scattered power density spectrum with the chosen luminosity function and once more integrating the result over the wavelength to perform the spectral matching technique yields the results in accordance with this invention. It is useful to see some of the properties of $A_E$ and $B_E$ integrals to completely understand the mechanism. Here the only focus is on the results for sun elevation angles below the horizon. A more extended work that covers all the aspects of atmospheric attenuation and scattering for any sun elevation angle is presented in reference [37]; also in the Appendixes.

FIG. [71.1] shows the general "Exact" scattering integral results $A_E$ and $B_E$ for full and partial circles. The first set of plots 1 and 2 in FIG. [71.1] show the $A_E$ and $B_E$ integral results respectively when the point P(x,y,z) y coordinate is scanned between −400 to 400 while x=0, z=200 for a circle having a radius of R=100 units. So when y=0, the point P is on the z axes, having R/z ratio of 0.5 and corresponding to $\tau$=26.57°. As can be seen they are symmetric with respect to y=0 line as expected. The peak value must equal the A value when $\xi$=26.57° in FIG. [54.1]; it can be seen better in FIG. [54.2], which is its log plot. The A value is plotted as curve 3, which is a line parallel to the x axes and matches the peak value of Curve 1 at y=0 as expected. The same can be said for Curve 4, which is the B value for $\xi$=26.57° in FIG. [54.3] or FIG. [54.4].

Curves 5 and 6 are the $A_E$ and $B_E$ integrals performed for the half circle where y<0 region of the circle with the radius of R. Since they are performed in the y<0 half circle, we can denote them as $A_{E-1/2}$ and $B_{E-1/2}$. Curves 7 and 8 are $A_E$ and $B_E$ for integrals performed for the half circle where the y>0 half circle. Since they are performed in the y>0 half circle we can denote them as $A_{E+1/2}$ and $B_{E+1/2}$. The curves $A_{E-1/2}$ and $A_{E+1/2}$ as well as $B_{E-1/2}$ and $B_{E+1/2}$ must be symmetric curves for y=0. This is clearly seen in FIG. [71.1]. Moreover the sum of $A_{E+1/2}$ and $A_{E-1/2}$ should be equal to $A_E$ as shown with Curves 1 for any y value. Again, the sum of $B_{E+1/2}$ and $B_{E+1/2}$ equals $B_E$ as shown with Curves 2 for any y value as well. The peak values of $A_{E+1/2}$ and $A_{E-1/2}$ must be larger than the half value of the A, which is plotted as Curve 9. FIG. [71.1] shows these properties very clearly.

Curve 10 and 11 are the $A_E$ and $B_E$ integrals for a wedge of the circle with the radius of R when the central angle is set to 90°. In other words the integration is done on a quarter circle; which is also symmetric along y axes having 45° of wedge central angle at the each direction of they axes and has only y>0 coordinates. These integrals are denoted as $A_{E+1/4}$ and $B_{E+1/4}$. These integrals are not what is sought but are needed to show how they are related to the partial circle integrals which are generated by the chord line intersection of the circle with a radius of R at a given $y_{INT}$ as shown in FIG. [70]. The wedge region $OP_1P_2$ as shown in FIG. [70] is the sum of a partial circle region; where the $A_E$ and $B_E$ integrals need to be evaluated, and the triangle $OP_2P_1$ in FIG. [67.1]. Curve 12 and 13 are actually two curves, each of which is difficult to distinguish with arrows; therefore only one arrow is used to identify them. The top curves of Curve 12 and 13 are the $A_E$ and the lower ones are the $B_E$ integrals evaluated in the triangle and the partial circle regions respectively. Again, the sums of these integrals should give $A_{E+1/4}$ and $B_{E+1/4}$ integrals for the wedge region. Their peaks are at different y coordinates as expected but their sums are equal to $A_{E+1/4}$ and $B_{E+1/4}$ as shown with Curves 10 and 11 for any y value. These are necessary conditions for all the integrals that need to satisfy for their correctness.

FIG. [71.2] shows the properties of the $A_E$ and $B_E$ integrals by rotating the point P starting from z=200 (where θ=0°) to z=0, y=200 (where θ=90°) with a constant radius of 200 units from the origin. In the rotation process the unit normal vector of the surface is maintained to be −k for all cases. Curves 1 and 2 are again $A_E$ and $B_E$ integrals respectively for the full circle. The peak value must equal the A value when ξ=26.57° in FIG. [54.1] and can be seen better in FIG. [54.2], which is its log plot. The A value is plotted as Curve 3 which is a line parallel to the x axes and matches the peak value of Curve 1 at y=0 as expected. The same can be said for Curve 4, which is the B value for ξ=26.57° in FIG. [54.3] or FIG. [54.4].

Curves 5 and 6 are $A_E$ and $B_E$ integrals performed for the half circle where y>0 region of the circle with the radius of R. Since they are performed in the y>0 half circle, we denote them as $A_{E+1/2}$ and $B_{E+1/2}$ as before. Curves 7 and 8 are $A_E$ and $B_E$ integrals performed for the half circle where y<0 region of the circle with the radius of R. Since they are performed in the y<0 half circle, we denote them as $A_{E-1/2}$ and $B_{E-1/2}$ as before. The half value of A for the full circle when z=200 (ξ=26.57°) is plotted as Curve 9 and it has the same value of $A_{E+1/2}$ and $A_{E-1/2}$ at θ=0° as expected. For θ=90° since the surface normal is perpendicular to the distance vector for all points in the circle plane $Cos(\theta_n)$ will be zero, and all of the $B_E$ curves which are curves 2, 6 and 8 must be zero, as can be seen in FIG. [71.2].

FIG. [71.3] shows the partial circle areas as a function of y for various sun elevation angles below the horizon.

FIG. [71.4] shows the final intermediate plot. It shows the logarithm of the received scattered visible power at the point P as a function of y (FIG. [70]). This plot is a continuation of the data shown in FIG. [67.2] showing the received scattered power density from the partial circles where their areas were plotted as a function of y for a set of sun elevation angles below the horizon. An interesting point is that until approximately θ=5° of sun elevation angle below the horizon, the peak scattered power density comes directly from the top of the point P.

FIG. [72.1] and its logarithmic representation for the vertical axes FIG. [72.2] show the results obtained using the flow explained to show the noteworthy −3 to −4 degrees of sun elevation angle that matches majority of street lights.

15.0. Issues Associated with Beer-Lambert Attenuation

Since sunlight is a form of electromagnetic radiation it can be analyzed by employing Maxwell's equations [27,28].

After suitable vector analysis and use of complex variable representations of time dependencies, Maxwell's equations will lead into the Helmholtz wave equation that can be applied to atmospheric propagation of sunlight. Maxwell's equation of relevance is expressed as:

$$\nabla \vec{E}_s - \gamma^2 \vec{E}_s = 0 \quad (15.1)$$

where propagation constant γ is given as, $$\gamma^2 = j\omega\mu(\sigma + j\omega\in) \text{ where } j = \sqrt{-1} \quad (15.2)$$

In the propagation constant expression (15.2), ω, μ, σ and ∈ represent angular frequency, magnetic permeability, conductivity, and dielectric permeability, respectively. If it is assumed that electric and magnetic fields have no x and y dependence, the free charge densities are zero, and the μ, σ and ∈ parameters are linear, homogeneous and isotropic, then the solution of (15.1) becomes a plane wave propagating along +z axes and can be expressed as:

$$E_x^+(z,t) = E_0 e^{-\alpha z} \cos(\omega t - \beta z). \quad (15.3)$$

Similarly the associated magnetic field wave becomes:

$$H_y^+(z,t) = H_0 e^{-\alpha z} \cos(\omega t - \beta z - \theta). \quad (15.4)$$

The attenuation and phase constants α and β in (15.3) and (15.4) are expressed as:

$$\alpha = \omega \sqrt{\frac{\varepsilon\mu}{2}\left(\sqrt{1+\left(\frac{\sigma}{\omega\varepsilon}\right)^2} - 1\right)} \quad (15.5)$$

$$\beta = \omega \sqrt{\frac{\varepsilon\mu}{2}\left(\sqrt{1+\left(\frac{\sigma}{\omega\varepsilon}\right)^2} + 1\right)}. \quad (15.6)$$

The origin of the differences comes from the difference in the differential equations solved. In deriving the Beer-Lambert Law, the differential equation solved in one dimension is:

$$\frac{dI}{dx} + I\alpha(x) = 0. \quad (15.7)$$

If (15.7) is differentiated with respect to x, $$\frac{d}{dx}\left[\frac{dI}{dx} + I\alpha(x)\right] = 0, \quad (15.8)$$

it will give:

$$\frac{d^2 I}{dx^2} + \alpha(x)\frac{dI}{dx} + I\frac{d}{dx}\alpha(x) = 0. \quad (15.9)$$

As can be seen, it will not give the Helmholtz equation in one dimension, which is the complete formulation of propagation! If it is only assumed that the following condition is satisfied, $$\text{For } I\frac{d}{dx}\alpha(x) \ll \alpha(x)\frac{dI}{dx} \rightarrow \frac{d^2 I}{dx^2} + \alpha(x)\frac{dI}{dx} \approx 0, \quad (15.10)$$

then Equation (15.7) will be close enough to the Helmholtz wave equation in one dimension for these purposes! Physically this means the Beer-Lambert law cannot be accurate for media having abrupt changes in $\alpha$! The physical meaning in plain terms of the condition given by (15.10) means there should be no significant reflection in layer boundaries, and this applies to clear skies!

This disclosure has covered many topics. The journey started from the surface of the sun. Taking its surface temperature of 5780° K, its spectrum was calculated using Planck's radiation law. Using the Stefan-Boltzmann Law, the upper atmosphere was brought in where spectral power density was calculated, then it was refracted with Snell's law, scattered using Rayleigh and Mie scattering, attenuated with the Beer-Lambert Law, used Maxwell's equations, Gauss's law and finally used a great deal of trigonometry and integral calculus along with differential equations, performed quadruple integrals in the vast space of the visible atmosphere to get the spectral power density of the scattered light for sun elevation angles below the horizontal plane. The journey ended up multiplying the spectral power density of the scattered light with luminosity functions and that were then integrated again over the wavelength to come up with a very simple condition: the "magical" 3° to 4° of sun elevation angle below the horizon, which applies everywhere and on any date where there is a need for artificial illumination! Using this condition it has been determined what the times should be to turn "ON" and "OFF" street lights, outdoor and yard lighting—with the help of astronomical routines. The hardware that saves at least 2-18% energy for street illumination has been described! The goal was to base the invention on solid foundations and have conclusive results backed up with measurements that hold anywhere on earth, all the time with confidence!

It can thus be said that the invention has now been explained with sufficient background and reference to specific embodiments to allow one of ordinary skill in the art to make and use the invention. Other embodiments will be evident to those skilled in the relevant art. It is therefore not intended that this invention be limited, except as indicated by the appended claims.

What is claimed is:

1. A method for controlling artificial lighting comprising:
    selecting a first value representative of a desired sun elevation angle of at least three degrees below the horizon;
    determining a specific terrestrial latitude, longitude, altitude, current date and current time from Global Positioning System (GPS) information using a GPS receiver;
    causing a processor to generate a second value representing a current sun elevation angle by determining in real time the current sun elevation angle based on the specific terrestrial latitude, the longitude, the altitude, the current date and the current time from the GPS information; and
    comparing the second value with the first value; and
    upon a match between the second value representing the current sun elevation angle and the first value representing the desired sun elevation angle, generating a signal to switch a source of illumination between states to yield a desired illumination that matches artificial illumination to ambient natural illumination in order to conserve energy used for the illumination.

2. The method according to claim 1, wherein the desired sun elevation angle is greater than three degrees below the horizon and less than four degrees below the horizon.

3. The method according to claim 1, wherein determining the current sun elevation angle comprises slicing the visible volume of the atmosphere into planes of an arbitrary thickness, the planes being perpendicular to a line defining the current sun elevation angle referenced to the horizon; and integrating the planes along a direction of the current sun elevation angle to achieve a single numerical integration process along the direction of the current sun elevation angle.

4. An apparatus for controlling artificial lighting comprising:
    a Global Positioning System (GPS) receiver operative to determine a specific terrestrial latitude, longitude, altitude, current date and current time from GPS information at a specified location;
    an input for receiving a first value representative of a desired sun elevation angle, wherein the desired sun elevation angle is at least 3 degrees below the horizon;
    a processor for executing a process for calculating in real time a second value representative of a current sun elevation angle based on the specific terrestrial latitude, the longitude, the altitude, the current date and the current time from the GPS information;
    a switch responsive to a state change for generating a signal to switch a source of illumination between states to yield a desired illumination that matches artificial illumination to ambient natural illumination when said first value matches the second value.

5. The apparatus according to claim 4, wherein the desired sun elevation angle is greater than three degrees below the horizon and less than four degrees below the horizon.

6. The apparatus according to claim 4, wherein the process of calculating the current sun elevation angle includes slicing the visible volume of the atmosphere into planes with an arbitrary thickness, the planes being perpendicular to an axis defining the current sun elevation angle; and integrating the planes along a direction of the current sun elevation angle to achieve a single numerical integration process along the direction of the current sun elevation angle.

* * * * *